(12) United States Patent
Knapp

(10) Patent No.: US 8,471,496 B2
(45) Date of Patent: Jun. 25, 2013

(54) LED CALIBRATION SYSTEMS AND RELATED METHODS

(75) Inventor: David J. Knapp, Austin, TX (US)

(73) Assignee: Ketra, Inc., Austin, TX (US)

( * ) Notice: Subject to any disclaimer, the term of this patent is extended or adjusted under 35 U.S.C. 154(b) by 169 days.

(21) Appl. No.: 12/806,121

(22) Filed: Aug. 5, 2010

(65) Prior Publication Data

US 2011/0062874 A1    Mar. 17, 2011

Related U.S. Application Data

(63) Continuation-in-part of application No. 12/803,805, filed on Jul. 7, 2010, which is a continuation-in-part of application No. 12/360,467, filed on Jan. 27, 2009, now Pat. No. 8,179,787, and a continuation-in-part of application No. 12/584,143, filed on Sep. 1, 2009.

(60) Provisional application No. 61/273,518, filed on Aug. 5, 2009, provisional application No. 61/273,536, filed on Aug. 5, 2009, provisional application No. 61/277,871, filed on Sep. 30, 2009, provisional application No. 61/281,046, filed on Nov. 12, 2009, provisional application No. 61/336,242, filed on Jan. 19, 2010, provisional application No. 61/339,273, filed on Mar. 2, 2010, provisional application No. 61/224,904, filed on Jul. 12, 2009, provisional application No. 61/094,595, filed on Sep. 5, 2008.

(51) Int. Cl.
*H05B 37/02* (2006.01)

(52) U.S. Cl.
USPC ........... 315/307; 315/150; 315/158; 315/308; 315/311

(58) Field of Classification Search
USPC .......................... 315/149–159, 307–308, 311
See application file for complete search history.

(56) References Cited

U.S. PATENT DOCUMENTS 4,713,841 A  12/1987 Porter et al.
5,103,466 A   4/1992 Bazes (Continued)

FOREIGN PATENT DOCUMENTS

EP    0456462      11/1991
JP    06-302384    10/1994

(Continued)

OTHER PUBLICATIONS

Office Action mailed May 12, 2011 for U.S. Appl. No. 12/360,467.

(Continued)

*Primary Examiner* — Jason M Crawford
(74) *Attorney, Agent, or Firm* — Kevin L. Daffer; Daffer McDaniel, LLP

(57) ABSTRACT

LED calibration systems and related methods are disclosed that use the photo-sensitivity of LEDs to correct for variations between LEDs during initial production and over the lifetime of systems using LEDs. The disclosed systems and methods include methods to set the color or color temperature produced by a group of LEDs during the manufacturing of a device such as a lamp, an LED display, or an LCD backlight, and maintaining such color or color temperature over the operating life of such a device. The methods involve measuring the intensity and/or wavelength of light produced by each LED within a group of LEDs and adjusting an amount of light generated by the LEDs to produce precise color and intensity from the group of LEDs. Two methods that operate some of the LEDs in photovoltaic or photoconductive mode to measure the light intensity produced by other LEDs in the group are presented. The first method uses an additional light source as a reference and determines the light intensity emitted from each LED relative to such reference, while the second method determines the light intensity emitted from each LED relative to each other.

91 Claims, 48 Drawing Sheets

U.S. PATENT DOCUMENTS

| | | |
|---|---|---|
| 5,181,015 A | 1/1993 | Marshall et al. |
| 5,299,046 A | 3/1994 | Spaeth et al. ............... 359/154 |
| 5,619,262 A | 4/1997 | Uno |
| 5,657,145 A | 8/1997 | Smith |
| 6,016,038 A | 1/2000 | Mueller et al. .............. 315/291 |
| 6,067,595 A | 5/2000 | Lindenstruth |
| 6,150,774 A | 11/2000 | Mueller et al. .............. 315/291 |
| 6,234,645 B1 | 5/2001 | Börner et al. ............... 362/231 |
| 6,234,648 B1 | 5/2001 | Börner et al. ............... 362/235 |
| 6,250,774 B1 | 6/2001 | Begemann et al. .......... 362/231 |
| 6,384,545 B1 | 5/2002 | Lau .............. 315/292 |
| 6,396,815 B1 | 5/2002 | Greaves et al. |
| 6,441,558 B1* | 8/2002 | Muthu et al. ............... 315/149 |
| 6,498,440 B2 | 12/2002 | Stam et al. ................. 315/291 |
| 6,513,949 B1 | 2/2003 | Marshall et al. .............. 362/231 |
| 6,617,795 B2 | 9/2003 | Bruning ...................... 315/151 |
| 6,636,003 B2 | 10/2003 | Rahm et al. ................. 315/179 |
| 6,639,574 B2 | 10/2003 | Scheibe |
| 6,664,744 B2 | 12/2003 | Dietz ........................ 315/291 |
| 6,692,136 B2 | 2/2004 | Marshall et al. .............. 362/231 |
| 6,788,011 B2 | 9/2004 | Mueller et al. .............. 315/294 |
| 6,806,659 B1 | 10/2004 | Mueller et al. .............. 315/295 |
| 6,831,569 B2 | 12/2004 | Wang et al. ............ 340/825.52 |
| 6,853,150 B2 | 2/2005 | Clauberg et al. .............. 315/185 |
| 6,879,263 B2 | 4/2005 | Pederson et al. ......... 340/815.45 |
| 6,969,954 B2 | 11/2005 | Lys ........................ 315/155 |
| 6,975,079 B2 | 12/2005 | Lys et al. .................... 315/292 |
| 7,014,336 B1 | 3/2006 | Ducharme et al. ............ 362/231 |
| 7,038,399 B2 | 5/2006 | Lys et al. .................... 315/291 |
| 7,046,160 B2 | 5/2006 | Pederson et al. ......... 340/815.45 |
| 7,072,587 B2 | 7/2006 | Dietz et al. .................. 398/138 |
| 7,135,824 B2 | 11/2006 | Lys et al. .................... 315/292 |
| 7,161,311 B2 | 1/2007 | Mueller et al. .............. 315/294 |
| 7,166,966 B2 | 1/2007 | Naugler, Jr. et al. |
| 7,233,115 B2 | 6/2007 | Lys ........................ 315/291 |
| 7,233,831 B2 | 6/2007 | Blackwell ................... 700/17 |
| 7,252,408 B2 | 8/2007 | Mazzochette et al. ........ 362/294 |
| 7,255,458 B2 | 8/2007 | Ashdown .................... 362/246 |
| 7,256,554 B2 | 8/2007 | Lys ........................ 315/291 |
| 7,294,816 B2 | 11/2007 | Ng et al. |
| 7,315,139 B1* | 1/2008 | Selvan et al. ................ 315/291 |
| 7,329,998 B2 | 2/2008 | Jungwirth |
| 7,358,706 B2 | 4/2008 | Lys .......................... 323/222 |
| 7,372,859 B2 | 5/2008 | Hall et al. ................... 370/400 |
| 7,400,310 B2* | 7/2008 | LeMay ..................... 345/82 |
| 7,445,340 B2 | 11/2008 | Conner et al. |
| 7,525,611 B2 | 4/2009 | Zagar et al. |
| 7,583,901 B2 | 9/2009 | Nakagawa et al. |
| 7,606,451 B2 | 10/2009 | Morita ........................ 385/24 |
| 8,018,135 B2 | 9/2011 | Van De Ven et al. |
| 8,040,299 B2 | 10/2011 | Kretz et al. |
| 8,044,899 B2 | 10/2011 | Ng et al. |
| 8,159,150 B2* | 4/2012 | Ashdown et al. ............. 315/307 |
| 2002/0014643 A1 | 2/2002 | Kubo et al. |
| 2002/0049933 A1 | 4/2002 | Nyu |
| 2003/0122749 A1 | 7/2003 | Booth, Jr. et al. .............. 345/82 |
| 2004/0052076 A1 | 3/2004 | Mueller et al. .............. 362/293 |
| 2004/0052299 A1 | 3/2004 | Jay et al. |
| 2004/0136682 A1 | 7/2004 | Watanabe |
| 2005/0004727 A1 | 1/2005 | Remboski et al. .............. 701/36 |
| 2005/0030267 A1 | 2/2005 | Tanghe et al. |
| 2005/0110777 A1 | 5/2005 | Geaghan et al. .............. 345/179 |
| 2005/0200292 A1 | 9/2005 | Naugler, Jr. et al. .......... 315/149 |
| 2005/0242742 A1* | 11/2005 | Cheang et al. ................ 315/149 |
| 2006/0164291 A1 | 7/2006 | Gunnarsson .................. 342/51 |
| 2006/0220990 A1 | 10/2006 | Coushaine et al. |
| 2006/0227085 A1 | 10/2006 | Boldt, Jr. et al. ................ 345/83 |
| 2007/0040512 A1* | 2/2007 | Jungwirth et al. ............ 315/159 |
| 2007/0109239 A1 | 5/2007 | den Boer et al. |
| 2007/0132592 A1 | 6/2007 | Stewart et al. ............. 340/572.8 |
| 2007/0139957 A1 | 6/2007 | Haim et al. .................. 362/600 |
| 2007/0248180 A1 | 10/2007 | Bowman et al. |
| 2008/0107029 A1 | 5/2008 | Hall et al. |
| 2008/0150864 A1 | 6/2008 | Bergquist |
| 2008/0186898 A1 | 8/2008 | Petite |
| 2008/0222367 A1 | 9/2008 | Co |
| 2008/0235418 A1 | 9/2008 | Werthen et al. |
| 2008/0253766 A1 | 10/2008 | Yu et al. |
| 2008/0265799 A1 | 10/2008 | Sibert ........................ 315/292 |
| 2008/0297070 A1 | 12/2008 | Kuenzler et al. ............. 315/308 |
| 2008/0304833 A1 | 12/2008 | Zheng |
| 2008/0309255 A1 | 12/2008 | Myers et al. .................. 315/297 |
| 2009/0026978 A1 | 1/2009 | Robinson |
| 2009/0040154 A1 | 2/2009 | Scheibe |
| 2009/0049295 A1 | 2/2009 | Erickson et al. |
| 2009/0171571 A1 | 7/2009 | Son et al. |
| 2009/0196282 A1 | 8/2009 | Fellman et al. |
| 2009/0245101 A1 | 10/2009 | Kwon et al. |
| 2010/0005533 A1 | 1/2010 | Shamir |
| 2010/0061734 A1 | 3/2010 | Knapp ........................ 398/128 |
| 2010/0096447 A1 | 4/2010 | Kwon et al. |
| 2010/0134021 A1* | 6/2010 | Ayres .......................... 315/149 |
| 2010/0182294 A1* | 7/2010 | Roshan et al. ................ 345/207 |
| 2010/0188972 A1 | 7/2010 | Knapp ......................... 370/226 |
| 2010/0272437 A1 | 10/2010 | Yoon et al. |
| 2010/0327764 A1 | 12/2010 | Knapp ......................... 315/250 |
| 2011/0031894 A1 | 2/2011 | Van De Ven |
| 2011/0044343 A1 | 2/2011 | Sethuram et al. |
| 2011/0062874 A1 | 3/2011 | Knapp ......................... 315/158 |
| 2011/0063214 A1 | 3/2011 | Knapp ......................... 345/158 |
| 2011/0063268 A1 | 3/2011 | Knapp ......................... 345/207 |
| 2011/0068699 A1 | 3/2011 | Knapp ......................... 315/158 |
| 2011/0069094 A1 | 3/2011 | Knapp ......................... 345/690 |
| 2011/0069960 A1 | 3/2011 | Knapp ......................... 389/103 |
| 2011/0133654 A1* | 6/2011 | McKenzie et al. ............ 315/152 |
| 2011/0253915 A1 | 10/2011 | Knapp |
| 2011/0309754 A1* | 12/2011 | Ashdown et al. ............. 315/151 |

FOREIGN PATENT DOCUMENTS

| | | |
|---|---|---|
| JP | 08-201472 | 8/1996 |
| JP | 11-025822 | 1/1999 |
| JP | 2001-514432 | 9/2001 |
| JP | 2007-266974 | 10/2007 |
| WO | 2010/124315 | 11/2010 |

OTHER PUBLICATIONS

B. Hall et al., "Jet Engine Control Using Ethernet with a BRAIN (Postprint)," Postprint of the 44th AIAA/ASME/SAE/ASEE Joint Propulsion Conference and Exhibition, Jul. 2008, See Section II.G.

A. Kebemou, "A Partitioning-Centric Approach for the Modeling and the Methodical Design of Automotive Embedded System Architectures," Dissertation of Technical University of Berlin, 2008, See Section 2.2.3.

D. O'Brien et al., Visible Light Communications and Other Developments in Optical Wireless, Wireless World Research Forum, 2006.

J. Zalewski et al., "Safety Issues in Avionics and Automotive Databases," IFAC World Congress, Jul. 4, 2005.

Project IEEE P802.15 Working Group for Wireless Personal Area Networks (WPANs), "Visible Light Communication; Tutorial," Mar. 9, 2008.

PCT/US2010/000219, "International Search Report," dated Oct. 12, 2010.

PCT/US2010/002171, "International Search Report," dated Nov. 24, 2010.

PCT/US2010/004953, "International Search Report," dated Mar. 22, 2010.

PCT/US2010/001919, "International Search Report," dated Feb. 24, 2011.

U.S. Appl. No. 12/924,628, "LED Transceiver Front End Circuitry and Related Methods," filed on Sep. 30, 2010.

PCT/US2009/004953, "International Preliminary Report on Patentability and Written Opinion," dated Mar. 8, 2011.

PCT/US2010/000219, "Written Opinion of the International Searching Authority," dated Oct. 12, 2010.

PCT/US2010/001919, "Written Opinion of the International Searching Authority," dated Feb. 24, 2011.

PCT/US2010/002171, "Written Opinion of the International Searching Authority," dated Nov. 24, 2010.

Final Office Action mailed Nov. 28, 2011 for U.S. Appl. No. 12/360,467.

Notice of Allowance mailed Jan. 20, 2012 for U.S. Appl. No. 12/360,467.

Office Action Mailed Feb. 1, 2012 for U.S. Appl. No. 12/584,143.

Final Office Action Mailed Sep. 12, 2012 for U.S. Appl. No. 12/584,143.
Office Action Mailed Aug. 2, 2012 for U.S. Appl. No. 12/806,114.
Office Action Mailed Oct. 2, 2012 for U.S. Appl. No. 12/806,117.
Office Action mailed Dec. 17, 2012 for U.S. Appl. No. 12/806,118.
Office Action mailed Oct. 9, 2012 for U.S. Appl. No. 12/806,126.
Office Action mailed Jul. 10, 2012 for U.S. Appl. No. 12/806,113.
Notice of Allowance mailed Oct. 15, 2012 for U.S. Appl. No. 12/806,113.

International Search Report & Written Opinion mailed Sep. 19, 2012 for PCT/US2012/045392.
Partial International Search Report mailed Nov. 16, 2012 for PCT/US2012/052774.
International Search Report & Written Opinion for PCT/US2012/052774 mailed Feb. 4, 2013.

* cited by examiner

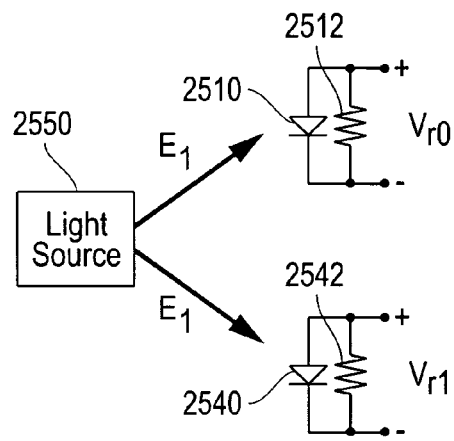
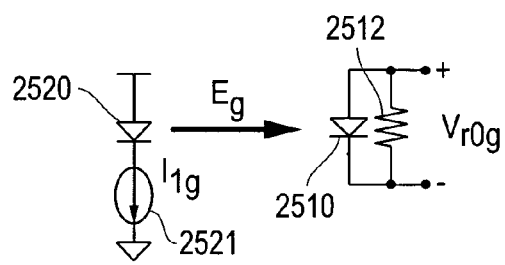
*FIG. 26A*  *FIG. 26B*
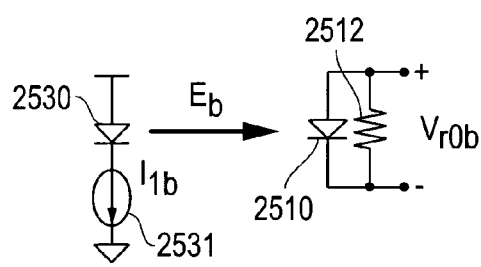
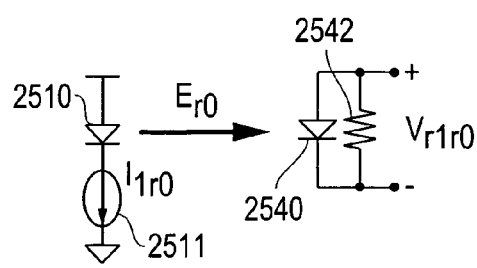
*FIG. 26C*  *FIG. 26D*

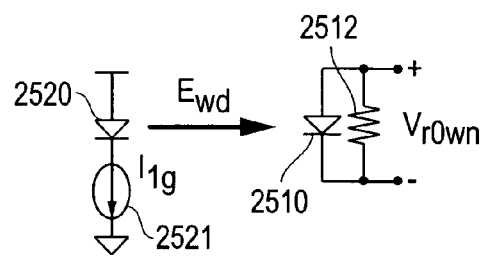
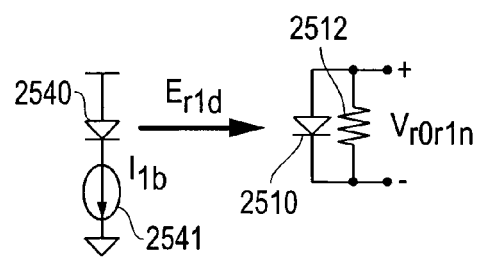
*FIG. 27A*  *FIG. 27B*
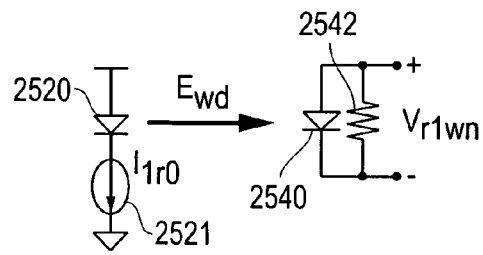
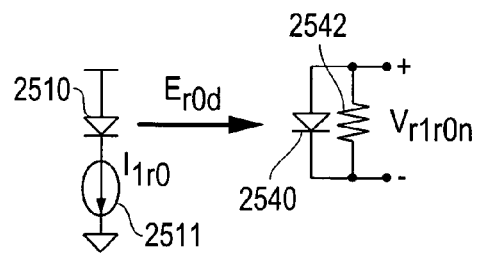
*FIG. 27C*  *FIG. 27D*

| Hex Code | Commands |
|---|---|
| 0 | On |
| 1 | Off |
| 2 | Dimmer up |
| 3 | Dimmer down |
| 4 | On event - Timer |
| 5 | On event - Photosensor |
| 6 | Set On time |
| 7 | Clear On event |
| 8 | Off event - Timer |
| 9 | Off event - Photosensor |
| A | Set Off time |
| B | Clear Off event |
| C | Set Time of Day |
| D | Set Color 1 |
| E | Set Color 2 |
| F | Set Color 3 |

Table 2: List of Functions

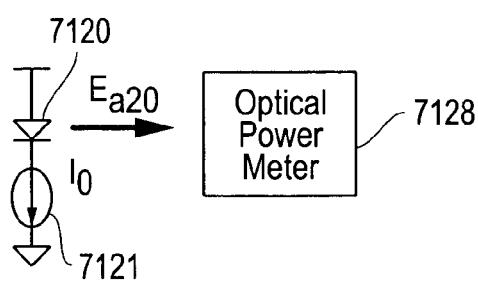
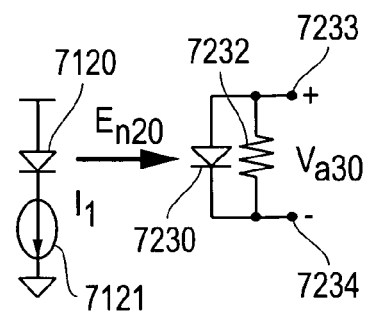
*FIG. 71*      *FIG. 72*
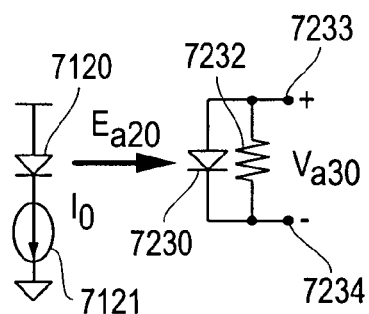
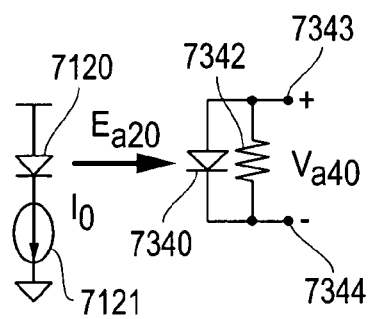
*FIG. 73A*      *FIG. 73B*
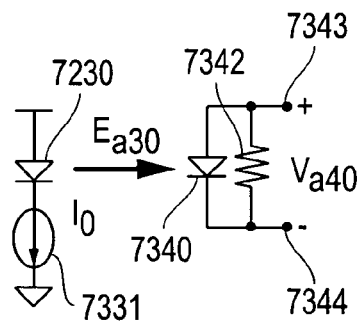
*FIG. 73C*

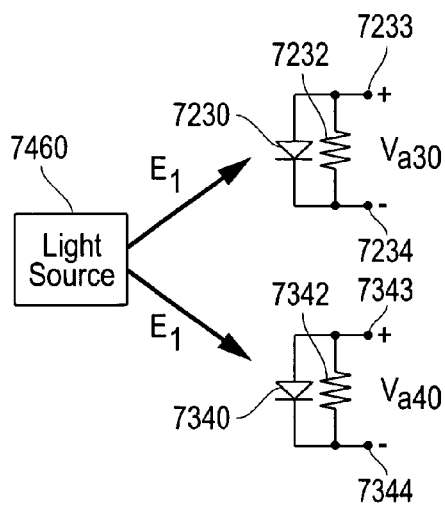
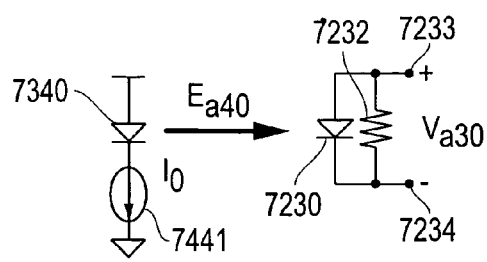
FIG. 74A
FIG. 74B
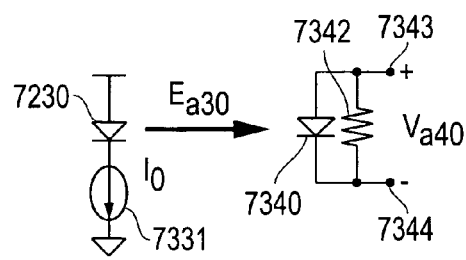
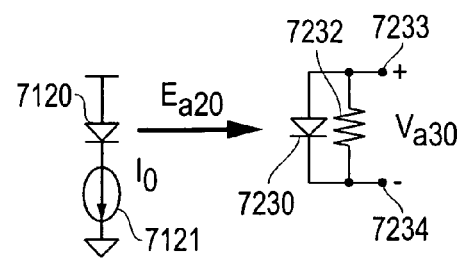
FIG. 74C
FIG. 74D

LED CALIBRATION SYSTEMS AND RELATED METHODS

RELATED APPLICATIONS

This application claims priority to the following co-pending provisional applications: U.S. Provisional Patent Application Ser. No. 61/273,518 filed Aug. 5, 2009 by David J. Knapp and entitled "Display and Optical Pointer Systems and Related Methods;" U.S. Provisional Patent Application Ser. No. 61/273,536 filed Aug. 5, 2009 by David J. Knapp and entitled "Display Calibration Systems and Related Methods;" U.S. Provisional Patent Application Ser. No. 61/277,871 filed Sep. 30, 2009 by David J. Knapp and entitled "LED Calibration Systems and Related. Methods;" U.S. Provisional Patent Application Ser. No. 61/281,046 filed Nov. 12, 2009 by David J. Knapp and entitled "LED Calibration Systems and Related Methods;" U.S. Provisional Patent Application Ser. No. 61/336,242 filed Jan. 19, 2010 by David J. Knapp and entitled "Illumination Devices and Related Systems and Methods;" and U.S. Provisional Patent Application Ser. No. 61/339,273 filed Mar. 2, 2010 by David J. Knapp, et al., and entitled "Systems and Methods for Visible Light Communication;" each of which is hereby incorporated by reference in its entirety.

This application is also a continuation-in-part application of the following co-pending application: U.S. patent application Ser. No. 12/803,805 filed on Jul. 7, 2010 by David J. Knapp and entitled "Intelligent Illumination Device;" which in turn claims priority to U.S. Provisional Patent Application Ser. No. 61/224,904 filed on Jul. 12, 2009 by David J. Knapp and entitled "Intelligent Illumination Device;" each of which is hereby incorporated by reference in its entirety. This application is also a continuation-in-part application of the following co-pending patent applications: U.S. patent application Ser. No. 12/360,467 filed Jan. 27, 2009 now U.S. Pat. No. 8,179,787 by David J. Knapp and entitled "Fault Tolerant Network Utilizing Bi-Directional Point-to-Point Communications Links Between Nodes;" and U.S. patent application Ser. No. 12/584,143, filed Sep. 1, 2009 by David J. Knapp and entitled "Optical Communication Device, Method and System;" which in turn claims priority to U.S. Provisional Patent Application Ser. No. 61/094,595 filed on Sep. 5, 2008 by David J. Knapp and entitled "Optical Communication Device, Method and System;" each of which is hereby incorporated by reference in its entirety.

This application is also related to the following concurrently filed patent applications: U.S. patent application Ser. No. 12/806,114 filed Aug. 5, 2010 by David J. Knapp and entitled "Display and Optical Pointer Systems and Related Methods:" U.S. patent application Ser. No. 12/806,117 filed Aug. 5, 2010 by David J. Knapp and entitled "Display Calibration Systems and Related Methods:" U.S. patent application Ser. No. 12/806,118 filed Aug. 5, 2010 by David J. Knapp and entitled "Illumination Devices and Related Systems and Methods;" U.S. patent application Ser. No. 12/806,113 filed Aug. 5, 2010 by David J. Knapp and entitled "Broad Spectrum Light Source Calibration Systems and Related Methods;" and U.S. Patent Application Serial No. filed August, 2010 by David J. Knapp, et al., and entitled "Systems and Methods for Visible Light Communication;" each of which is hereby incorporated by reference in its entirety.

TECHNICAL FIELD OF THE INVENTION

The inventions relate to light emitting diodes (LEDs) and systems and methods that utilize LEDs.

BACKGROUND

Displays and lamps using LEDs for illumination are becoming increasingly popular in commercial and residential environments. LEDs provide a number of advantages over traditional light sources, such as fluorescent bulbs, which are common for most applications such as low power consumption, long lifetime, and no hazardous material, and additional specific advantages for different applications. For instance, LEDs are rapidly replacing Cold Cathode Fluorescent Lamps (CCFL) as LCD backlights due to smaller form factor and wider color gamut. LEDs for general illumination provide the opportunity to adjust the color or white color temperature for different effects. LED billboards are replacing paper billboards to enable multiple advertisements to timeshare a single billboard.

LEDs are popular for such display and lamp applications due to the low cost, high energy efficiency, and long lifetime, however, variations in light output between individual LEDs and between LEDs from each color component group can limit performance and increase cost. For instance, the amount of light produced by an LED for a given current can vary by a factor of two to one or more between LEDs within a manufacturing lot and between lots, which when combined with the light produced by different color LEDs in a display pixel or LCD backlight for instance, the blended color produced can vary tremendously. Likewise, the wavelength of the light produced by such LEDs can vary by 20 nm or more which produces a clearly visible color shift. Consequently, LED vendors typically sort LEDs into groups or bins with narrower specifications. LED customers may either purchase only specific bins for a higher price or design products that can tolerate wider tolerances, which may limit performance.

Further, an LED array that is designed and calibrated to produce uniform brightness and color when manufactured will degrade with use. As LEDs age, the light intensity produced for a fixed current may increase or decrease over some amount of time and then will continue decreasing until end of life. Different color LEDs have different average aging characteristics, which may varying widely between individual LEDs. Consequently, perfectly built LED arrays will develop a grainy appearance with a different hue over time.

Displays with such arrays typically are recalibrated periodically over time to compensate for changing LED characteristics, which can be costly and time consuming. For instance, stadium displays are apparently re-calibrated every two years, which takes a team of people days to complete. Special cameras with telescopes focus on each individual LED to determine brightness and color, which is fed back to the display controller. Billboards, which operate continuously, should be re-calibrated more frequently to maintain optimum performance, which is costly and produces downtime.

LED backlights for LCD televisions, computers, and mobile phones for instance produce white light from either phosphor coated blue LEDs or a combination of multi-color LEDs, such red, green, and blue. Such light typically passes through a diffusing layer before being applied to the back of the liquid crystal layer, which combines the light from the LEDs to produce uniform light behind the liquid crystal. Smaller displays typically have LEDs placed along one side of the display and inject light into specially shaped waveguides behind the diffuser, while larger displays have arrays of LEDs behind the liquid crystal layer that match the physical dimensions of the display and typically use thin diffusing elements to produce uniform light from the LED point sources.

Displays with arrays of LEDs for backlighting have at least two advantages over displays with LEDs along one or more sides. First, illumination generally is more uniform across the display, and second, the illumination from each LED in the array can be independently adjusted to improve the contrast ratio, which is called "local dimming" in the industry. However, illumination is more uniform only if the light output from each LED, or combination of LEDs for RGB backlights for instance, is the same. As in LED billboards and stadium displays, such arrays can be calibrated during manufacturing, but illumination uniformity and color, in particular with RGB backlights, will change over time for the reasons previously discussed.

LCD backlighting from red, green, and blue LEDs provides many advantages over lighting from white LEDs including wider color gamut and potentially substantially lower power consumption and simpler designs. Conventional LCD displays with white backlights use a layer of color filters to produce red, green, and blue light from the three liquid crystal elements in each pixel. Such color filters add cost and complexity to the design of the display and possibly more importantly for mobile devices block most of the light produced by the backlight. Displays using RGB backlighting can eliminate the color filters by sequencing the colors produced using a technique known in the industry as Field Sequential Color (FSC). Such an approach uses one liquid crystal element per pixel instead of the conventional three and is updated three times as fast sequentially with the red, green, and blue pixel data. Each color of the backlight is flashed sequentially to match the pixel data currently applied to the liquid crystal element without any of the light power blocked by the color filters. Consequently, the RGB backlight can produce substantially less light using substantially less battery power for the same display brightness than a white LED backlight.

The problem with RGB backlights is producing and maintaining the desired color and intensity produced by each red, green, and blue triplet. LCDs with RGB backlights along one or more sides typically use photo-sensors to detect the average intensity of each color component, which is fed back to the LED driver circuitry to maintain the proper mix of colors, however, such photo-sensors and associated feedback circuitry is costly.

High end large screen LCD televisions with LED backlighting have recently been introduced by companies such as Samsung and Sony, which have arrays of LEDs that enable local dimming for high contrast ratios. At least some of such Samsung products have arrays of white LEDs, while at least some of such Sony products have arrays of RGB LEDs to support a wider color gamut. It is unclear how Sony maintains the proper color point, but such Sony products are sold for substantially more than such Samsung products. The relatively simple approach described previously for RGB LED backlights along one or more sides of the display that uses one or more sets of photo-sensors to detect the intensity of each color component is not possible with such Sony products that support local dimming. Many sets of photo-sensors distributed throughout the array of RGB LEDs would be necessary to maintain uniform brightness and color across such a display.

LED lamps for general illumination typically use blue LEDs covered with a phosphor that absorbs most of the blue photons and re-emits photons with longer wavelengths to produce white light, which produces energy loss proportional to the wavelength shift. Phosphors that shift significant photons towards the red end of the spectrum (long wavelength) produce a desirable so called "warm light" but are the least energy efficient. Additionally, over time the phosphors can degrade causing the light produced to become bluer over time.

To overcome the inefficiencies of producing warm light comparable to that produced by an incandescent lamp, some LED lamps use a combination of phosphor coated blue LEDs to produce the blue to yellow wavelengths and red LEDs to produce the red. Such lamps generally perform well, but are expensive due to the complex circuitry necessary to produce the proper mix of light from the white LEDs versus the red LEDs. Any shift in the balance produces a shift in white color temperature and is particularly noticeable when viewed next to another lamp with a slightly different color temperature. The circuit that controls the color temperature typically includes photodiodes in a feedback loop to control the currents provided to the different colored LEDs.

Lamps that use combinations of red, green, and blue LEDs to produce light can be more energy efficient and can produce a much wider range of colors than lamps with just phosphor coated blue or phosphor coated blue plus red LEDs, however, producing and maintaining a fixed color point is more difficult. Such lamps require complex optical feedback mechanism that monitor and adjust each color component during manufacturing and over operating lifetime of such a lamp.

A need exists for a means to maintain uniform brightness and color across an array of multi-color LEDs, such as RGB, used to directly produce images in the case of LED billboards and stadium displays, for instance, and indirectly in the case of LCD backlighting, without the expense and complexity of on site pixel by pixel calibration in the case of LED billboards and stadium displays for instance, and special photo-sensors in the case of LCD backlights. Likewise, there is a need to produce and maintain a fixed color or color temperature from an LED lamp. In all cases, a need exists to minimize the need for binned LEDs.

SUMMARY OF THE INVENTION

LED calibration systems and related methods are also disclosed that use the photo-sensitivity of LEDs to correct for variations between LEDs during initial production and over the lifetime of systems using LEDs. Various embodiments are described with respect to the drawings below. Other features and variations can also be implemented, if desired, and related systems and methods can be utilized, as well.

In part, the disclosed embodiments relate to using the photo-sensitivity of an LED to determine emission parameters such as intensity and wavelength. Applications for the disclosed embodiments include solid state lamps, LCD backlights, and LED displays for instance. Variations in LED brightness and wavelength should be compensated for in order for such devices to have uniform color and brightness. Such compensation, which is typically done by measuring the optical output of each individual LED with a camera or purchasing specially tested LEDs, is performed by simply measuring the signal induced on each LED by light from other LEDs in the device or from an additional light source.

The disclosed embodiments include methods to set the color or color temperature produced by a group of LEDs during the manufacturing of a device such as a lamp, an LED display, or an LCD backlight, and maintaining such color or color temperature over the operating life of such a device. The methods involve measuring the intensity and wavelength of light produced by each LED within a group of LEDs and adjusting the amount of light generated by each LED to produce precise color and intensity from the group of LEDs.

Two methods that operate some of the LEDs in photovoltaic or photoconductive mode to measure the light intensity produced by other LEDs in the group are presented. The first method that uses an additional light source as a reference determines the light intensity emitted from each LED relative to such reference, while the second method determines the light intensity emitted from each LED relative to each other. As such, the first method can produce a precise color and intensity from each group of LEDs, while the second method can only produce a precise color.

Both intensity measurement methods typically comprise two steps and can be used to calibrate devices during both manufacturing and over lifetime. The first step of the first method illustrated in FIGS. 25A-D and the first step of the second method illustrated in FIG. 27A-D can be performed in a manufacturing environment on a special control device that has all LEDs manually adjusted to produce the desired light intensities. The results of the first step on such control device are then used in the second step of the first method illustrated in FIGS. 26A-D and the second step of the second method illustrated in FIGS. 28A-D on production devices to determine the actual emitted light intensities.

Both intensity measurement methods can also be used to maintain a precise color produced by a group of LEDs and uniform intensity from an array of groups of LEDs, for instance pixels in an LED display, LCD backlight, or LED lamp, over time. The first step of both methods is typically performed on a device after such device has been calibrated during manufacturing and the second step is performed in the field at periodic intervals. The reference light source for the first intensity measurement method can be ambient light.

Emission intensity is measured in all cases by measuring the photocurrent produced in the longest wavelength LED within the group of LEDs by light from the other LEDs and in the first method from an additional reference light source. For instance, in an LED array for an LED display or backlight, according to the example shown for the first method, the red LED in a pixel measures the light from the blue and green LEDs in the same pixel, and from the reference light source. Next, the red LED in an adjacent pixel measures the light from the first red LED and the reference light source. Such measured light can be reflected off a mirror for an LED display during manufacturing or off the waveguide or diffuser in an LED backlight for instance. In the field, such light can be scattered by the LED packages or enclosures or by any other means.

In the example shown for the second method, which includes two red LEDs and one white LED in an LED lamp for instance, a first red LED measures the light from a second red LED and from the white LED. Next, light from the second LED measures the light from the first LED and from the white LED. Both the first and second intensity measurement methods can be used for any groups of LEDs in any types of products with the difference between the methods being the presence or absence of a reference light source. The second method could be used in an LED display or backlight to produce precise color and uniform intensity from all pixels by daisy chaining the measurements sequentially across such LED array.

The example intensity measurement methods are divided into two steps which measure the differences in relative intensity between a known good measurement and the unknown measurement. For instance, during manufacturing, a control device with the desired output intensities is measured to determine what the relative photocurrents should be. Using the first method, the ratios of the photocurrent in a first LED produced by the light from the other LEDs over the photocurrent produced by the reference light source generate coefficients used for the second step. Provided the ratio of intensities from the reference light source in the first and second steps is known, the unknown LED intensities in the second step can be determined. Likewise, using the second method, the ratios of photocurrents induced on one LED by the two other LEDs in a calibrated control device generate coefficients used in the second step. In the second step, the difference in the ratios from the first step determines the difference in relative unknown intensities between the two LEDs.

When the first or second method is used to calibrate a device over time, the first step determines what ratios of photocurrents should be and over time the second step determines what they are. The change in such ratios determines the change in actual emission intensity. Since only ratios currents measured at one time are compared to ratios of currents at another time, any changes in operating conditions cancel out. For instance, such measurements are independent of temperature differences.

The method presented to measure emission wavelength illuminates each LED with two different wavelengths of lights, such as a light wavelength slightly above and below the anticipated peak emission wavelength range, and measures the resulting photocurrent. Since the responsivity of an LED drops off dramatically for incident wavelengths longer than the peak emission wavelength, the difference in induced photocurrents is directly related to the peak emission wavelength. FIGS. 31A-C provide a graphical illustration of LED responsivity as a function of incident wavelength and the resulting photocurrent differences.

Since LED emission wavelength does not vary significantly over time, such wavelength measurements can just be performed on a production line. As in the two emission intensity methods, such wavelength measurement should first be done on a control device with known emission intensity to calibrate the production test setup. Subsequent measurements of devices with unknown emission wavelengths, will be relative to the control device results.

Once the emission wavelengths and the emission intensity or relative emission intensity between a group of LEDs is known, color correction coefficients can be determined that adjust the emission intensity of light from each LED within a group of LEDs to produce a precise color and optionally a precise intensity from such group of LEDs. FIG. 29 illustrates hardware to implement the calibration methods. FIG. 30 illustrates color correction coefficients and hardware to correct for emission intensity variations, while FIG. 32 illustrates such coefficients and hardware to correct for both emission intensity and wavelength variations between the red, green, and blue LEDs associated with a pixel in an LED display or a triplet in an LCD backlight.

Although such calibration methods are appropriate for any devices that contain groups of LEDs, of particular interest are LCDs that use Field Sequential Color (FSC). FIG. 33 illustrates a simplified block diagram of a conventional LCD, while FIG. 34 illustrates such a diagram for a FSC LCD. While a conventional LCD has white backlight that is filtered into red, green, and blue components by special color filters, a FSC LCD eliminates the costly color filters and sequences each color component at three times the conventional frame rate or more. Such FSC LCDs require red, green, and blue backlights and as such are a primary application for the color calibration methods described herein.

The improved methods herein address problems associated with devices using groups of different colored LEDs directly or as backlights for illumination. Such calibration methods reduce the need for specially binned LEDs for the production of lamps, displays, or backlights, and maintain the color or color temperature of the light produced over the operating life of the device.

In one embodiment, the invention is a method for light calibration that includes providing a first LED, using the first LED to receive light from a light source, determining an emission characteristic from the first LED or from the light source based upon the light received by the first LED, and adjusting an emission characteristic of the first LED or the light source based upon the determined emission characteristic. Further, the determined emission characteristic can be intensity or wavelength or both, as desired.

In a further embodiment, the invention is a method for light calibration including providing a first LED, using the first LED to receive light from a light source, determining an emission characteristic from the first LED or from the light source based upon the light received by the first LED, and adjusting an emission characteristic of the first LED or the light source based upon the determined emission characteristic, where the determining step determines an intensity as the emission characteristic. Further, the method can include adjusting an output intensity of the first LED or the light source based upon the determined intensity emission characteristic. In a further embodiment, a second LED as the light source. Still further, the method can also include providing a third LED as an additional light source, using the first LED to also receive light emitted by the third LED, also determining an intensity emission characteristic for the third LED based upon the light received by the first LED from the third LED, and adjusting an output intensity of the first LED, the second LED, the third LED or any combination of the three LEDs based upon the determined intensity emission characteristics.

In another embodiment, the method can include measuring a ratio of photocurrents induced in the first LED by the second and third LEDs to determine the intensity emission characteristics for the second and third LEDs. In a further embodiment, the method can also include using the second LED to receive light emitted by the first LED, determining an intensity emission characteristic for the first LED based upon the light received by the second LED from the first LED, using the second LED to receive light emitted by the third LED, determining an intensity emission characteristic for the third LED based upon the light received by the second LED from the third LED, and adjusting an output intensity of the first LED, the second LED, the third LED or any combination of the three LEDs based upon the determined intensity emission characteristics. Still further, the method can include measuring a ratio of photocurrents induced in the first LED by the second and third LEDs and in the second LED by the first and third LEDs to determine the intensity emission characteristics. In a further embodiment, the method can include using a resistor connected across the first LED to produce a voltage from the photocurrent. Still further, a resistance of the resistor can be small enough such that the photocurrent times the resistance is substantially less than a turn on voltage of the first LED.

In a further embodiment, output intensities of the second and third LEDs were previously adjusted to produce desired output intensities. Still further, the output intensities of the second and third LEDs were previously adjusted using a separate control device having a plurality of LEDs with known output intensities. Still further, the method can include conducting the determining steps at a second time when the output intensities for the second and third LEDs may have changed to unknown intensities.

In an additional embodiment, the method can include comparing the ratio of photocurrents induced in the first LED by the second and third LEDs to a ratio of photocurrents induced on a first LED on a control device by a second LED and a third LED on the control device, the first, second and third LEDs on the control device having known output intensities. Still further, the method can include comparing a ratio of photocurrents induced on the first LED by the second and third LEDs at the second time to a ratio of photocurrents for known intensities.

In a further embodiment, the first, second, and third LEDs are a red LED, a red LED, and a white LED respectively. Still further, the method can include using the first, second, and third LEDs within an LED lamp.

In another embodiment, the method includes using the first, second, and third LEDs within an LCD backlight.

In further embodiments, the method can be configured for operation in different applications. In one embodiment, the method can include using the first LED within an LCD display. In another embodiment, the method can include using the first LED in an organic LED display. In another embodiment, the method can include using the first LED in a digital billboard. In another embodiment, the method can include using the first LED in a projector.

In another embodiment, the first, second, and third LEDs are a red LED, a red LED, and a green LED respectively. In a further embodiment, the method includes using a fourth blue LED as a light source, and using the first red LED to also determine an intensity emission characteristic for the fourth blue LED, wherein the second red LED, the third green LED and the fourth blue LED are located within a first pixel and wherein the first red LED is located in an adjacent pixel.

In another embodiment, the invention is a method for light calibration that includes providing a first LED, using the first LED to receive light from a light source, determining an emission characteristic from the first LED or from the light source based upon the light received by the first LED, and adjusting an emission characteristic of the first LED or the light source based upon the determined emission characteristic, and where the method also includes providing a second LED as the light source, providing a reference light source, and using the first LED to receive light from the second LED and the reference light source. Still further, the method can include measuring a ratio of photocurrents induced in the first LED by the second LED and the reference light source to determine the emission characteristic.

In a further embodiment, the output intensity of the second LED was previously adjusted to produce a desired output intensity. Still further, the output intensity of the second LED was previously adjusted using a separate control device having a plurality of LEDs with known output intensities. In a further embodiment, the determining step is conducted a second time when the output intensities for the second LED may have changed to an unknown intensity. Still further, the method can include comparing a desired ratio of photocurrents with the ratio of photocurrents induced on the first LED by the second LED and the reference light source.

In another embodiment, the invention is a method for light calibration that includes providing a first LED, using the first LED to receive light from a light source, determining an emission characteristic from the first LED or from the light source based upon the light received by the first LED, and adjusting an emission characteristic of the first LED or the light source based upon the determined emission characteristic, where the determining step determines a wavelength as the emission characteristic. Still further, the method can include determining a peak emission wavelength for the first LED or the light source based upon the determined wavelength emission characteristic. Still further, the method can include providing a reference light source as the light source. Still further, the method can include measuring photocurrent induced in the first LED by the reference light source.

In a further embodiment, the method includes using a resistor connected across the first LED to produce a voltage from the photocurrent. Still further, a resistance of the resistor is small enough such that the photocurrent times the resistance is substantially less than a turn on voltage of the first LED.

In a further embodiment, the method can include producing light with approximately a single wavelength with the reference light source. In one further embodiment, the single wavelength is longer than an emission wavelength of the first LED. In another further embodiment, the single wavelength is shorter than an emission wavelength of the first LED.

In another further embodiment, the method includes using the reference light source to produce light with approximately a first wavelength, measuring photocurrent induced in the first LED by the first wavelength light, using the reference light source to produce light with approximately a second wavelength different from the first wavelength, measuring photocurrent induced in the first LED by the second wavelength light, and determining a ratio of photocurrents induced in the first LED by the first and second wavelength lights. Still further, the method can include using two or more reference light sources to produce the different wavelength lights. In a further embodiment, the emission wavelength of the first LED is known. Still further, the method can include determining a relationship between emission wavelength and the ratio of photocurrents. Still further, the method can include providing a second LED, wherein the emission wavelength of the second LED is unknown. In a further embodiment, the method can include producing light with approximately the first wavelength with the reference light source, measuring photocurrent induced in the second LED by the first wavelength light, producing light with approximately the second wavelength with the reference light source, measuring photocurrent induced in the second LED by the second wavelength light, and determining a ratio of photocurrents induced in the second LED by the first and second wavelength lights wherein the unknown wavelength of the second LED is determined to be equal to the known wavelength of the first LED times the ratio of photocurrent induced in the first LED by the first and second wavelength lights divided by the ratio of photocurrent induced in the second LED by the first and second wavelength lights. Still further, the method can include using two or more reference light sources to produce the different wavelength lights.

In another embodiment, the invention is a system for light calibration that includes a first LED configured to receive light from a light source, and control circuitry configured to determine an emission characteristic associated with the first LED or the light source based upon light received by the first LED and configured to adjust an emission characteristic of the first LED or the light source based upon the determined emission characteristic. Further, the determined emission characteristic can be intensity or wavelength or both, as desired.

In another embodiment, the invention is a system for light calibration that includes a first LED configured to receive light from a light source, and control circuitry configured to determine an emission characteristic associated with the first LED or the light source based upon light received by the first LED and configured to adjust an emission characteristic of the first LED or the light source based upon the determined emission characteristic, wherein the determined emission characteristic is intensity. Still further, the control circuitry can be further configured to adjust an output intensity of the first LED or the light source based upon the determined intensity emission characteristic. In a further embodiment, the system also includes a second LED as the light source. Still further, the system can include a third LED, wherein the first LED is configured, to receive light from the second LED and the third LED, and wherein the control circuitry is further configured to determine an emission characteristic associated with the third LED and configured to adjust an output intensity of the first LED, the second LED, the third LED or any combination of the three LEDs based upon the determined intensity emission characteristics.

In another embodiment, the control circuitry is further configured to determine a ratio of photocurrents induced in the first LED by the second and third LEDs. Still further, the system can be configured such that the second LED is configured to receive light from the first LED and the third LED, and wherein the control circuitry is further configured to determine emission characteristics associated with the first and third LEDs based upon the light received by the second LED from the first and third LEDs, and wherein the control circuitry is further configured to adjust an output intensity of the first LED, the second LED, the third LED or any combination of the three LEDs based upon the determined intensity emission characteristics. Still further, the control circuitry can be further configured to determine a ratio of photocurrents induced in the second LED by the first and third LEDs. In a further embodiment, the system can include a resistor connected across the first LED where the resistor is configured to produce a voltage from the photocurrent. Still further, a resistance of the resistor can be small enough such that the photocurrent times the resistance is substantially less than a turn on voltage of the first LED.

In a further embodiment, the control circuitry can be configured to compare intensity emission characteristics for the second and third LEDs to desired intensity emissions characteristics that were previously determined. Still further, the control circuitry can be further configured to compare ratios of photocurrents induced on the first LED with ratios of photocurrents associated with desired intensity emission characteristics.

In a further embodiment, the first, second, and third LEDs are a red LED, a red LED, and a white LED respectively. Still further, the first, second, and third LEDs can reside in an LED lamp.

In another embodiment, the first, second, and third LEDs reside in an LCD backlight.

In further embodiments, the system can be configured for operation in different applications. In one embodiment, the first LED can reside in an LCD display. In another embodiment, the first LED can reside in an organic LED display. In another embodiment, the first LED can reside in a digital billboard. In another embodiment, the first LED can reside in a projector.

In another embodiment, the first, second, and third LEDs are a red LED, a red LED, and a green LED respectively. Still further, the system can include a fourth blue LED, wherein the first red LED is configured to receive light from the fourth blue LED, wherein the control circuitry is further configured to determine an intensity emission characteristic for the fourth blue LED, wherein the second red LED, the third green LED and the fourth blue LED are located with a first pixel and wherein the first red LED is located in an adjacent pixel.

In another embodiment, the invention is a system for light calibration that includes a first LED configured to receive light from a light source, and control circuitry configured to determine an emission characteristic associated with the first LED or the light source based upon light received by the first LED and configured to adjust an emission characteristic of the first LED or the light source based upon the determined emission characteristic, and where the system also includes a second LED as the light source and a reference light source, wherein the first LED is configured to receive light from the second LED and the reference light source. Still further, the control circuitry can be configured to measure a ratio of photocurrents induced in the first LED by the second LED and the reference light source. Still further the control circuitry can be configured to compare an intensity emission characteristic for the second LED to a desired intensity characteristic that was previously determined. Still further, the control circuitry can be further configured to compare a desired ratio of photocurrents with the ratio of photocurrents induced on the first LED by the second LED and the reference light source.

In another embodiment, the invention is a system for light calibration that includes a first LED configured to receive light from a light source, and control circuitry configured to determine an emission characteristic associated with the first LED or the light source based upon light received by the first LED and configured to adjust an emission characteristic of the first LED or the light source based upon the determined emission characteristic, wherein the determined emission characteristic is wavelength. Still further, the control circuitry can be further configured to determine a peak emission wavelength for the first LED or the light source based upon the determined wavelength emission characteristic. Still further, the light source can be at least one reference light source. Still further, the control circuitry can be configured to measure the photocurrent induced in the first LED by the reference light source.

In a further embodiment, the system can include a resistor connected across the first LED, the resistor being configured to produce a voltage from the photocurrent. Still further, a resistance of the resistor is small enough such that the photocurrent times the resistance is substantially less than a turn on voltage of the first LED.

In a further embodiment, the at least one reference light source can be configured to produce light with approximately a single wavelength. In a further embodiment, the single wavelength can be longer than an emission wavelength of the first LED. In another embodiment, the single wavelength is shorter than an emission wavelength of the first LED.

In another embodiment, the at least one reference light source can be configured to produce a first wavelength and to produce a second wavelength different from the first wavelength, and wherein the control circuitry is configured to measure photocurrents induced in the first LED by the first and second wavelength lights and to determine a ratio of photocurrents induced in the first LED by the first and second wavelength lights. Still further, the emission wavelength of the first LED can be known. In addition, the control circuitry can be further configured to determine a relationship between emission wavelength and the ratio of photocurrents. Still further, the system can include a second LED, wherein an emission wavelength of a second LED is unknown. Still further, the control circuitry can configured to measure photocurrents induced in the second LED by the first and second wavelength lights from the at least one reference light source and to determine a ratio of photocurrents induced in the second LED by the first and second wavelength lights, wherein an unknown wavelength of the second LED is determined to be equal to the known wavelength of the first LED times the ratio of photocurrent induced in the first LED by the first and second wavelength lights divided by the ratio of photocurrent induced in the second LED by the first and second wavelength lights.

In another embodiment, the invention is a controller for calibration of light sources that includes control circuitry configured to be coupled to a first LED and a second LED where the control circuitry is further being configured to determine an emission characteristic associated with the first LED or the second LED based upon light received by the first LED, and output driver circuitry configured to be coupled to the first LED and the second LED and configured to adjust an emission characteristic of the first LED or the second LED based upon the determined emission characteristic. Still further, the determined emission characteristic is intensity. Still further, the control circuitry can be further configured to adjust an output intensity of the first LED or the second LED based upon the determined intensity emission characteristic.

In a further embodiment, the system can include a third LED, wherein the control circuitry is further configured to determine an emission characteristic associated with the third LED based upon light received by the first LED from the third LED and configured to adjust an output intensity of the first LED, the second LED, the third LED or any combination of the three LEDs based upon the determined intensity emission characteristics. Still further, the control circuitry can be further configured to determine a ratio of photocurrents induced in the first LED by the second and third LEDs to determine the intensity emissions characteristics.

In a further embodiment, the second LED can be configured to receive light from the first LED and the third LED, and the control circuitry can be further configured to determine emission characteristics associated with the first and third LEDs based upon the light received by the second LED from the first and third LEDs, and wherein the control circuitry is further configured to adjust an output intensity of the first LED, the second LED, the third LED or any combination of the three LEDs based upon the determined intensity emission characteristics. Still further, the control circuitry can be further configured to determine a ratio of photocurrents induced in the second LED by the first and third LEDs.

In another embodiment, the invention is a controller for calibration of light sources that includes control circuitry configured to be coupled to a first LED where the control circuitry is configured to determine an emission characteristic associated with the first LED based upon light received by the first LED from one or more reference light sources, and output driver circuitry configured to be coupled to the first LED to adjust an emission characteristic of the first LED based upon the determined emission characteristic. Still further, the determined emission characteristic can be wavelength. In addition, the control circuitry can be configured to determine a peak emission wavelength for the first LED based upon the determined wavelength emission characteristic. In a further embodiment, the control circuitry can be configured to determine a ratio of photocurrents induced in the first LED based upon light having a first peak emission wavelength and based upon light having a second peak emission wavelength, the light being emitted by the one or more reference light sources and the first and second peak emissions wavelengths being different.

As described herein, other embodiments and variations can also be implemented, if desired, and related systems and methods can be utilized, as well.

DESCRIPTION OF THE DRAWINGS

Other objects and advantages will become apparent upon reading the following detailed descriptions of the different related embodiments and upon reference to the accompanying drawings. It is noted that a number of different related embodiments are described with respect to the drawings.

FIG. 26A-D illustrate a second step in an exemplary method for determining the optical power emitted from a group of LEDs using the photo-sensitivity of such LEDs and an additional light source.

FIG. 27A-D illustrate a first step in an exemplary method for determining the relative optical power emitted from a group of LEDs using the photo-sensitivity of such LEDs without an additional light source.

FIG. 71 is an exemplary block diagram for measuring optical power emitted from an LED.

FIG. 72 is an exemplary circuit diagram for measuring optical power emitted from an LED with another LED.

FIG. 73A-C illustrates an exemplary method for approximately determining the optical power emitted from a group of LEDs using the photo-sensitivity of such LEDs.

FIG. 74A-D illustrate an exemplary method determining the optical power emitted from a group of LEDs using a light source as a reference.

Figure 1:
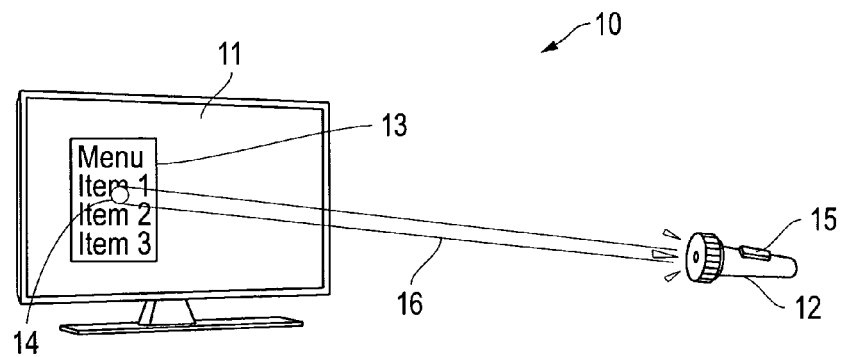
FIG. 1 (Pointer and Display System) is an exemplary system diagram of the display and pointer.

While the embodiments are susceptible to various modifications and alternative forms, specific embodiments thereof are shown by way of example in the drawings and will herein be described in detail. It should be understood, however, that the drawings and detailed description thereto are not intended to limit the inventions to the particular form disclosed, but on the contrary, the intention is to cover all modifications, equivalents and alternatives falling within the spirit and scope of the present embodiments.

DETAILED DESCRIPTION OF THE EMBODIMENTS

Various embodiments are described herein that utilize light emitting diodes (LEDs) for emitting light, for receiving light from light sources, for detecting light emissions and for various other purposes and applications. While the following eight embodiments describe different aspects for the use of LEDs, they are also related. As such, the disclosed embodiments can be combined and utilized with respect to each other as desired. For example, the calibration and detection systems and methods described with respect to the second, third, seventh and eighth embodiments can be utilized with the various illumination devices described herein with respect to all embodiments. It is also noted that the various disclosed embodiments can be utilized in a variety of applications, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications. It is also noted that as used herein "r" designations and subscripts typically refer to the color red, "g" designations and subscripts typically refer to the color green, "b" designations and subscripts typically refer to the color blue, and "w" designations and subscripts typically refer to the color white.

It is further noted that as used herein an illumination device is generally intended to include any of a wide variety of devices, systems or other apparatus or assemblies that produce light using one or more light sources, including light sources that are implemented using one or more LEDs. LEDs that can be utilized in the embodiments described herein include conventional LEDs, organic LEDs (OLEDs), and any other desired LED. The illumination devices can be implemented in any desired form and/or application including being used within display devices, LCDs, LCD backlights, digital billboards, organic LED displays, AMOLED (Active Matrix OLED) displays, LED lamps, lighting systems, lights within conventional socket connections, projection systems, portable projectors and/or any other desired application that utilizes light sources, including LED light sources, and LEDs and/or other light detectors to detect emitted light. As such, it should be understood that the embodiments described below provide example applications and implementations and should not be considered as limiting. Rather, the techniques, methods and structures described herein for emitting light, detecting light emissions and adjusting light emissions can be used in any desired device, system or application where light is emitted, detected or adjusted, particularly in combination with the use of LEDs for emitting light, detecting light emissions and/or adjusting light emissions. Further, integrated circuits and/or combinations of integrated circuits and other circuitry, whether discreet or integrated, can be used to implement the techniques, methods and structures described herein, as desired. The integrated circuits and/or other circuitry can be combined with light sources, such as LEDs, to form illumination devices for use with the techniques, methods and structures described herein for emitting light, detecting light emissions and adjusting light emissions. It is further noted that as described herein, an LED can be implemented as a discreet LED, an integrated LED, a set of serially connected LEDs, parallel sets of serially connected LEDs or other combinations of LEDs, as desired, depending upon the application and implementation desired.

It is further noted that an illumination device as used herein is generally intended to include any device or apparatus that emits light to illuminate an area or another object with visible light, for example, for purposes of being viewed or seen by human eyes, such as would be provided in or by a lamp, lighting system, display system, OLED panel, LCD panel, projector, billboard and/or any other device or apparatus that produces visible light for purposes of being viewed by human eyes or by some other viewing system as visible light. In this sense, a device or apparatus that uses light solely for communication purposes would likely not be an illumination device as generally used herein.

Example embodiments will now be described with respect to the drawings. The first embodiment describes the use of the techniques, methods and structures described herein with respect to display devices and optical pointing systems. The second embodiment describes the use of the techniques, methods and structures described herein with respect to calibration of display systems. The third embodiment describes the use of the techniques, methods and structures described herein with respect to LED calibration. The fourth embodiment describes the use of the techniques, methods and structures described herein with respect to various illumination devices. The fifth embodiment describes the use of the techniques, methods and structures described herein with respect to intelligent LED lights. The sixth embodiment describes the use of the techniques, methods and structures described herein with respect to synchronization of visible light communications. The seventh embodiment describes the use of the techniques, methods and structures described herein with respect to calibration of broad spectrum light emitters including white light emitters. And the eighth embodiment provides a alternative description of techniques, methods and structures for LED calibration. As noted above, these embodiments can be used alone or in combination with each other, as desired, to take advantage of the techniques, methods and structures described herein for emitting light, detecting light emissions, and adjusting light emissions, particularly using LEDs.

It is further noted that the operational blocks and circuitry shown and described with respect to the block diagrams depicted herein, for example, in FIGS. 3, 7, 8, 11, 15, 18, 19, 20, 21, 22, 23, 29, 30, 32, 36, 37, 38, 41, 42, 43 45, 46, 53, 57, 58, 59, 61, 62, 77, 78 and 80, can be implemented using any desired circuitry including integrated circuitry, non-integrated circuitry or a combination of integrated and non-integrated circuitry, as desired. Further, it is noted that programmable or programmed circuitry, such as digital signal processors (DSPs), microprocessors, microcontrollers and/or other programmable or programmed circuitry, can also be used with respect to these blocks. Further, software, firmware or other code can be utilized along with this circuitry to implement the functionality as described herein, if desired.

First Embodiment

Display and optical pointer systems and related methods are disclosed that utilize LEDs in a display device to respond to optical signals from optical pointing devices. Various embodiments are described with respect to the drawings below. Other features and variations can also be implemented, if desired, and related systems and methods can be utilized, as well.

In part, the disclosed embodiments relate to displays with arrays of LEDs and associated pointing devices that communicate with individual LEDs in the arrays using visible light. The LED arrays can produce images directly as in LED billboards and sports arena scoreboards or can produce the backlight for LCD screens for instance. The pointing devices communicate with individual pixels or groups of pixels using a beam of light that may or may not be modulated with data, which is detected by the LEDs in the array that are exposed to the beam. Periodically, the LEDs in an array stop producing light and are configured with an associated driver device to detect light from the pointing device. Such a configuration enables the user to point and click at on screen displays much like a computer mouse.

One improved system, as described herein, uses an optical pointing device, such as a laser pointer or flashlight, to control a graphical user interface for instance, on an LCD display with LED backlights or a display made from an array of organic or conventional LEDs. As an image is scanned across such a display, there are times every frame when the LEDs are not producing light. During such light off times, the LEDs are used to detect the presence or absence of light from the optical pointing device. The graphics controller processes such information over a series of frames to detect a pattern of light from the pointing device illuminating a particular location on the display and takes the appropriate action. Such action could be among other things selecting an item in a menu, dragging and dropping an item, or popping up a menu.

The simplest pointing device could be a laser pointer or flashlight with a single on/off button. With a display playing a video or a television broadcast for instance, the display could pop up a main menu over part of the screen in response to a bright spot of light detected anywhere on the display. Once the spot is positioned over a particular item in the menu, such as change channel for a television, and then turned off and on again, the appropriate action could be taken. With a display, such as a billboard, advertising merchandise for instance, patterns of light on and off from a pointing device could cause the display to provide more information about a particular item. These are just some examples of interactions between a display and a pointing device, with many more possible.

With more sophisticated pointing devices and displays, data could be communicated from the pointing device to the display and potentially even from the display to pointing device. For instance, a laser pointer specially modified to produce light modulated with data could transmit personal information, such as an email address, to a display, such as a billboard. A user could instruct the display to send more information to an email address in this example. Again, this example is just one of many possible data communication applications.

The types of displays addressed herein include any that use LEDs for illumination, but typically can be divided into three categories, Organic LED (OLED) displays, conventional LED displays, and liquid crystal displays (LCDs) with LED backlighting. OLED displays typically comprise a piece of glass with thin film transistors and LEDs made from organic compounds grown on one side to produce an array of pixels typically comprising red, green, blue, and white sub-pixels. Each sub-pixel typically has a current source made from the thin film transistors that is controlled by column and row drivers typically situated on two sides of the perimeter of the glass. The row drivers typically produce a logic level write signal to a row of pixels or sub-pixels while the column drivers produce an analog voltage corresponding to the desired sub-pixel current. Such voltage is typically stored on a capacitor in each pixel or sub-pixel.

Video images are typically displayed one row at a time as the row drivers sequence the write signals to the OLED array typically from the top to bottom of the array. Moving images are produced a series of still images or frames displayed over time. As one image is displayed one row at a time, the previous image is removed one row at a time. To prevent the well known visual effect called "motion blur". Every row of LEDs is turned off for a period of time, which removes the previous frame, before displaying a line of the current frame. A high speed snapshot of an OLED display properly designed to reduce motion blur will show a band of LED rows illuminated with the rest of the display is dark. The row drivers typically write to each row of pixels or sub-pixels twice per frame in order to turn the LEDs on and then off.

The spot on the display illuminated by the pointing device is detected one row at a time. According to one embodiment, the row drivers produce sense signals sequentially to each pixel or sub-pixel row at some offset from the rows producing light to prevent optical crosstalk from the rows producing light to the row detecting light. When a sense signal is active, each sub-pixel in the row can produce a current if the voltage induced across the associated LED by incident light is greater than a certain level, which can then be detected across the columns by current sense circuitry associated with the column drivers. The graphics controller monitors the current sense circuitry output for each row over a frame to determine the location of the illumination from the pointing device, and over many frames to determine the action to take.

Although OLED pixels typically comprise a number of different colored LEDs, such as red, green, blue, and white, typically only one color is used to detect the illumination from the pointing device. For instance, if a red laser pointer is used as the pointing device, the red sub-pixels in the display are used to detect the illumination. If a flashlight producing white light is the pointing device, the red or green sub-pixels in the display may be used to detect the illumination depending on the spectrum of the white light.

Displays made from conventional LEDs, which typically comprise of the element Gallium and are individually packaged, typically are very large and are used for billboards or video displays in sports stadiums. As with small OLED displays, each pixel typically comprises red, green, and blue sub-pixels, but typically do not have white sub-pixels. Each sub-pixel LED typically is driven by a current source from an LED driver IC (integrated circuit), which typically comprises a number of current sources associated with a number of sub-pixels. Such ICs can be serially connected together and through a network interface IC to a graphics controller, which produces the pixel data, receives the location of the illumination from the pointing device, and takes the appropriate action.

Each driver IC comprises a current source controlled by a pulse width modulator to produce light from each associated LED, and a comparator to detect light incident on each LED. Unlike the OLED display, each LED is driven with a fixed current for a variable amount time, instead of a variable current for fixed amount of time. The pulse width modulator associated with each LED receives a digital value from the graphics controller each frame and turns on the associated current source for a proportional amount of time. The maximum digital value corresponds to a maximum amount of time the current source can be on, which should be less than a frame period to prevent motion blur.

During the time between frames when the current source associated with a particular LED is guaranteed to be off, the illumination from the pointing device can be detected. If the voltage induced across the LED by incident light is greater than a certain value, the associated comparator output goes high indicating the presence of light from the pointing device. If the induced voltage is less than the certain amount, the comparator output is low indicating the absence of light. The state of all the comparator outputs is communicated back to the graphics controller for processing.

Like the OLED display, a conventional LED display is typically scanned one row or column at a time, which at any one time produces a band of illuminated LEDs across the display. The rest of the display is dark. To prevent optical crosstalk from LEDs producing light to LEDs detecting light, each LED driver IC typically samples the comparator outputs when the associated LEDs are located near the middle of the dark region.

Liquid crystal displays modulate the amount of light produced by a backlight to create an image on the screen. Backlights comprising LEDs typically come in one of two versions. For smaller displays on a laptop computer for instance, LEDs situated along one side of the display inject light into a diffuser that produces uniform white light across the display. For large screen televisions using LED backlights, the LEDs are typically arranged in an array, like the conventional LED display, behind the liquid crystal pixel array. The amount of light produced by each LED or group of LEDs can be adjusted per frame to increase the contrast ratio in a manner called "local dimming", which not possible for LCDs with fluorescent backlights or LED backlights situated along one side of the display.

LED backlights for LCDs typically comprise of either white LEDs, which are made from blue LEDs with a yellow phosphor coating, or a combination of red, green, and blue LEDs, for instance. One embodiment uses colored LEDs configured in an array, like a conventional LED display, for LCD backlighting.

A liquid crystal pixel array typically comprises a thin film transistor and capacitor associated with each liquid crystal sub-pixel. The transparency of the liquid crystal sub-pixel is determined by the voltage held on the capacitor and is controlled by the associated row and column drivers. Like the OLED display, the liquid crystal array is typically written one row at a time when the associated logic level write signal goes active. The analog voltages from the column drivers are then transferred on to the capacitors through the transistors in each pixel element in the row. Typically, this analog voltage is held for one frame period, until that row is programmed with data for the next frame.

To reduce motion blur, the backlight array can be scanned so that the display only produces light from any given row for a portion of a frame period. A band of light produced by the LED backlight array follows the updating of the liquid crystal rows by a fixed offset to allow the liquid crystal element time to settle. The LEDs in the backlight array can be connected to the same driver ICs described for conventional LED displays, which produce a fixed current for a variable amount of time to produce light from the LEDs and monitor the voltage induced across the LEDs by incident light to detect the illumination from the pointing device.

Just like the conventional LED display, the LED backlight array could detect light from the pointing device when each row of LEDs is not producing light. However, if the image being displayed is very dark, then the liquid crystal elements will block light both from and to the backlight. During such scenes, the LED array may not be able to detect the light from the pointing device. To improve this sensitivity, each liquid crystal row could be set to fully transparent for some period of time prior to being programmed with data for the next image, which would create a band of transparent liquid crystal following the band of light from the backlight with some fixed offset. Behind this transparent band, the LEDs, which are not producing light, could detect light from the pointing device. Such a system typically requires the liquid crystal array to be written twice as often or requires additional circuitry and signals in each pixel element, and could degrade the contrast ratio due to light leakage from the backlight through the transparent band.

One embodiment maintains high contrast ratio and lower liquid crystal update rates, prevents motion blur, and detects signals from the pointing device by inserting a short dark frame between image frames. At the end of each frame, the entire backlight is first turned off, and then the entire liquid crystal array is set to be fully transparent by enabling all row write signals simultaneously and holding all column data signals to the voltage associated with transparency. While the liquid crystal is transparent, the driver ICs monitor the voltage induced across the connected LEDs to detect illumination from the pointing device, and report the results to the graphics controller. Finally, the entire liquid crystal array is set to be opaque, by enabling all row write signals simultaneously and holding all column data signals to the voltage associated with opaque, just prior to scanning the next frame.

The improved display and pointer systems described herein address issues with displays using LEDs directly or as backlights for illumination. Bulky and confusing television remote controllers can be replaced by a simple laser pointer or flashlight, and advertiser's effectiveness can be improved by providing audiences an interactive experience.

As stated above, this first embodiment can also be used with the techniques, methods and structures described with respect to the other embodiments described herein. For example, the calibration and detection systems and methods described with respect to the second, third, seventh and eighth embodiments can be used with respect to the display systems and methods described in this first embodiment, as desired. Further, the various illumination devices, light sources, light detectors, displays, and applications and related systems and methods described herein can be used with respect to display systems and methods described in this first embodiment, as desired. Further, as stated above, the structures, techniques, systems and methods described with respect to this first embodiment can be used in the other embodiments described herein, and can be used in any desired lighting related application, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications.

Turning now to the drawings, FIG. 1 is one example of pointer and display system 10 that comprises the display 11 and pointer 12. Display 11 comprises light emitting diodes (LEDs) for image illumination either directly in the case of OLED or conventional LED displays, or backlighting in the case of Liquid Crystal Displays (LCDs). LEDs of preferentially different colors, for instance red, green, and blue, produce the wide gamut of colors typically necessary for accurate representation of images either directly in the case of OLED or LED displays, or modulated by an LCD.

Pointer 12 preferentially comprises a button 15 that when depressed causes pointer 12 to produce beam 16 and when released removes beam 16. Beam 16 is preferentially produced by a red laser pointer, but could be any color or combinations of colors including white. Also beam 16 could be produced by an LED or multiple LEDs, an incandescent flashlight, or any other possible source of light. When pointer 12 is aimed at display 11 and button 15 is depressed, beam 16 produces spot 14 on display 11. Display 11 detects spot 14 and preferentially produces interactive menu 13. By moving spot 14 around display 11 and depressing and releasing button 15 at appropriate times, system 10 can operate much a computer and a computer mouse.

Spot 14 is detected by display 11 preferentially during visually imperceptible times when the LEDs comprising the pixels or backlights are turned off. Beam 16 induces a voltage on those LEDs that are illuminated under spot 14 with the appropriate wavelength, which is detected and processed by the display. Sequences of button 15 clicks in combination with the location of spot 14 enable a user to pop up menus, navigate through a graphical user interface, and drag and drop items among many other things.

FIG. 1 is one example of many possible display and pointer systems 10. For example, pointer 12 can have multiple buttons or no buttons. Beam 16 could be computer generated and controlled for instance, and could be modulated with data to communicate more information to display 11. Display 11 could modulate light from individual pixels to communicate back to pointer 15, to another display 11, or some other electronic device.

Figure 2:
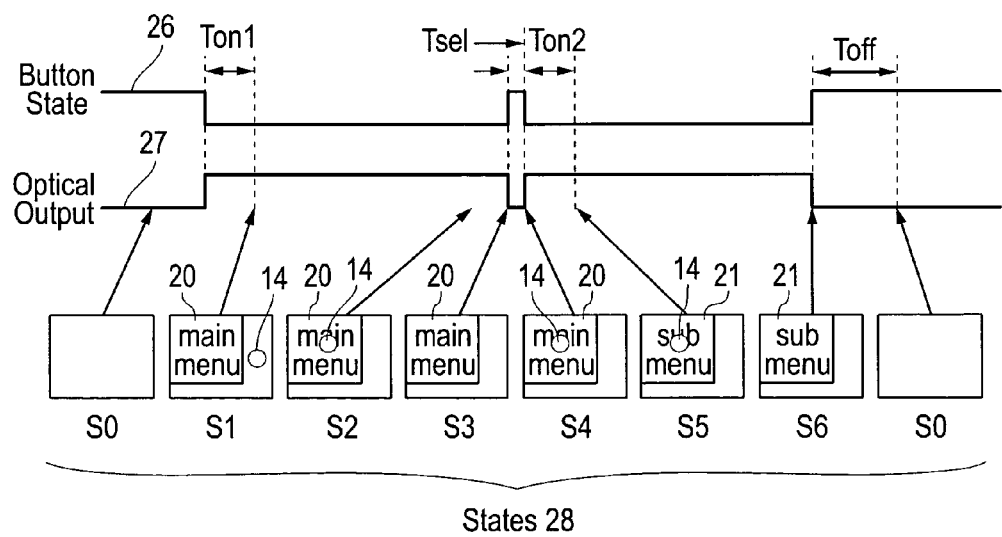
FIG. 2 (System Communication Protocol) is an exemplary system communication protocol.

FIG. 2 is an example of a simple communication protocol for system 10, which shows the button state 26 of button 15, the optical output state 27 of beam 16, and the states 28 of display 11 as a function of time. The high state of button 15 represents the button released, while the low state represents the button depressed. The high state of beam 16 represents light being produced by pointer 12, while the low state represents no light. Display 11 states S0 through S6 represent one of many possible temporal and spatial combinations of spot 14 to select an item from main menu 20.

Display 11 state S0 represents normal operation of the display, for instance, when displaying a video or a television broadcast. State S1 is entered time Ton1 after button 15 is depressed, which produces beam 16 and spot 14. In state S1, main menu 20 is overlaid on the video for instance, which is being played. State S2 illustrates when spot 14 is positioned by the user over the appropriate main menu 20 item to be selected. Display 11 enters state S3 when button 15 is released and beam 16 turns off. Provided button 15 is depressed and beam 16 is produced within time Tse1, display 11 enters state S4. Display 11 detects the short off time of beam 16 and responds time Ton2 later with sub-menu 21 for instance in state S5. In this example, items from sub-menu 21 are not needed and state S6 is entered when button 15 is released and beam 16 turns off. Time Toff later, display 11 returns to the normal operating state S0.

The example protocol illustrated in FIG. 2 is one of many possible different means to communicate or control display 11. For instance, button 15 could be double clicked to drag and drop items or different buttons could produce different codes or colors of light to indicate different things. As another possibility, pointer 12, another display 11, or another electronic devices could synchronize to the periodic light off periods and communicate high bandwidth data across display 11.

Figure 3:
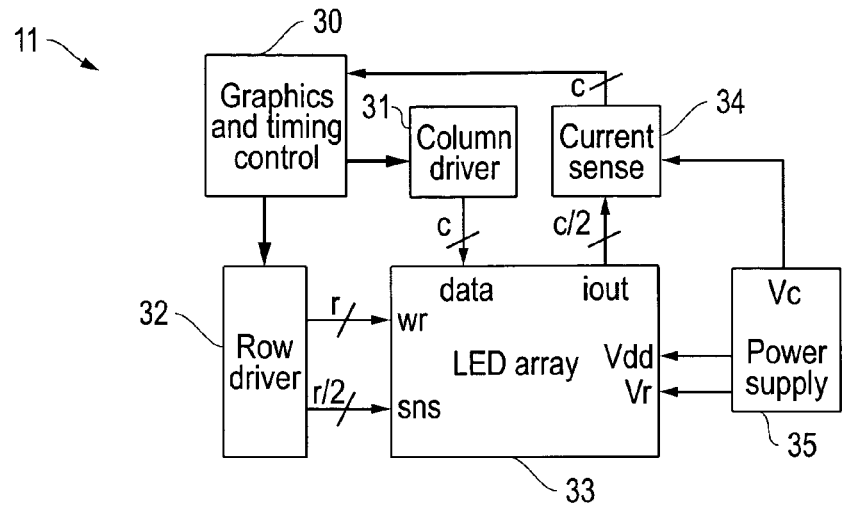
FIG. 3 (OLED Display Block Diagram) is an exemplary block diagram of an Organic LED (OLED) display.

FIG. 3 is an example block diagram of OLED display 11 comprising LED array 33 with R rows and C columns of sub-pixel LEDs typically arranged in pixels of one red, one green, one blue, and one white sub-pixel LED. LED array 33 comprises R/2 rows and C/2 columns of such sub-pixels. Each sub-pixel LED is configured to produce a certain amount of light by a combination of voltages on a particular WR (write) signal produced by row driver 32 and DATA signal produced by column driver 31. When a WR signal is high, the analog voltage on each DATA signal is programmed into the row of LEDs activated by the particular WR signal.

Power supply 35 produces the main power Vdd for LED array 33 and the reference voltages Vr and Vc for detecting spot 14 preferentially on red sub-pixels. When one of the SNS (sense) signals from row driver 32 goes high, the IOUT signals from the LED array 33 source current into current sense 34 for red sub-pixels in the row activated by a particular SNS signal when illuminated by spot 14. No current is present on the IOUT signals associated with red sub-pixels not illuminated by spot 14. Current sense 34 produces an SOUT logic level signal in response to each IOUT input, which are detected and processed by graphics and timing control circuitry 30. Graphics and timing control circuitry 30, which also produces the timing for row driver 32 and the data for column driver 31, combines the SOUT inputs with timing to determine precisely which sub-pixels are illuminated by spot 14.

FIG. 3 is just one of many possible block diagrams for display 11, which could be built using any one of a wide range of technologies including but not limited to discreet inorganic LED arrays or liquid crystals. Likewise, the block diagram for display 11 built with OLEDs could be substantially different. For instance, if LED array 33 comprised more complex pixel and sub-pixel circuitry, such sub-pixels could be calibrated by additional external circuitry to eliminate variations in LED light output and drive current, or multiplexed by a set of enable signals to reduce the sub-pixel circuitry. The block diagrams of such an LED display 11 would be substantially different.

Figure 4:
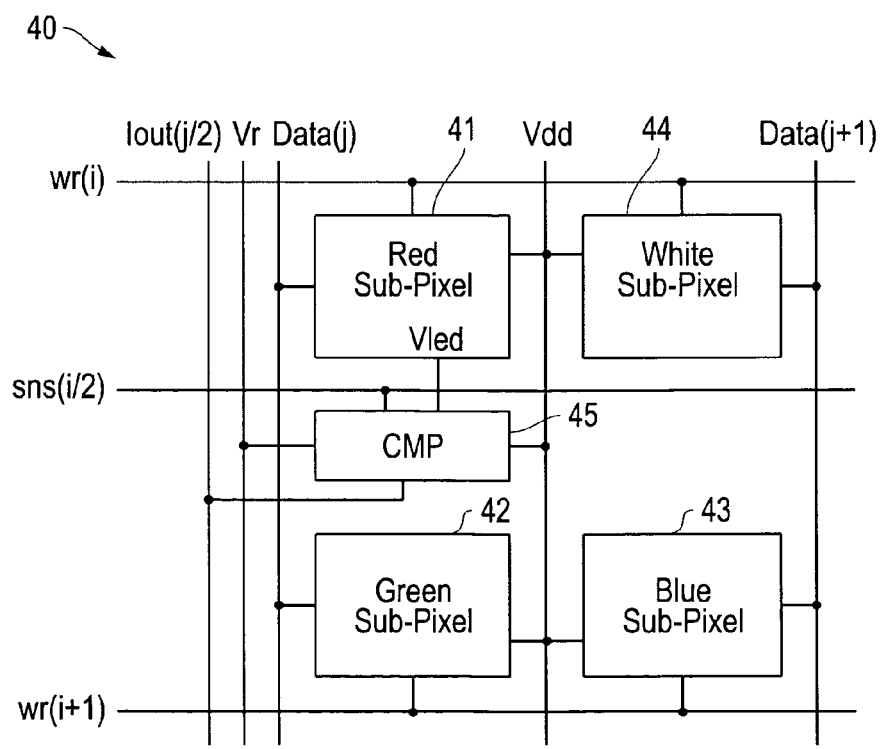
FIG. 4 (OLED Pixel Block Diagram) is an exemplary block diagram of an OLED pixel.

FIG. 4 is an example block diagram of OLED pixel 40 in LED array 33 referenced by row coordinates I and I+1, and column coordinates J and J+1, and comprising red sub-pixel 41, green sub-pixel 42, blue sub-pixel 43, white sub-pixel 44, and comparator 45. The circuitry in all sub-pixels is the same except the color of the included LED. Red sub-pixel 41 is different only in that the Vled signal is connected to comparator 45, which compares the voltage on the anode of the red LED to Vr and sources current to IOUT(j/2) when red sub-pixel 41 is illuminated by spot 14 and SNS(i/2) is active.

Signals WR(i) and DATA(j) program the light produced by red sub-pixel 41, signals WR(i) and DATA(j+1) program the light produced by white sub-pixel 44, signals WR(i+1) and DATA(j) program the light produced by green sub-pixel 42, and signals WR(i+1) and DATA(j+1) program the light produced by blue sub-pixel 43. All sub-pixels are powered by VDD.

FIG. 4 is just one of many possible pixel 40 block diagrams. For instance, any combinations of colors or just one color could be used. Additionally, LEDs of any or all colors could be used to detect one or more instances of spot 14, or one or more data communication light channels. All sub-pixels could be accessed by one WR signal and one DATA signal if two enable signals select between the sub-pixels.

Figure 5:
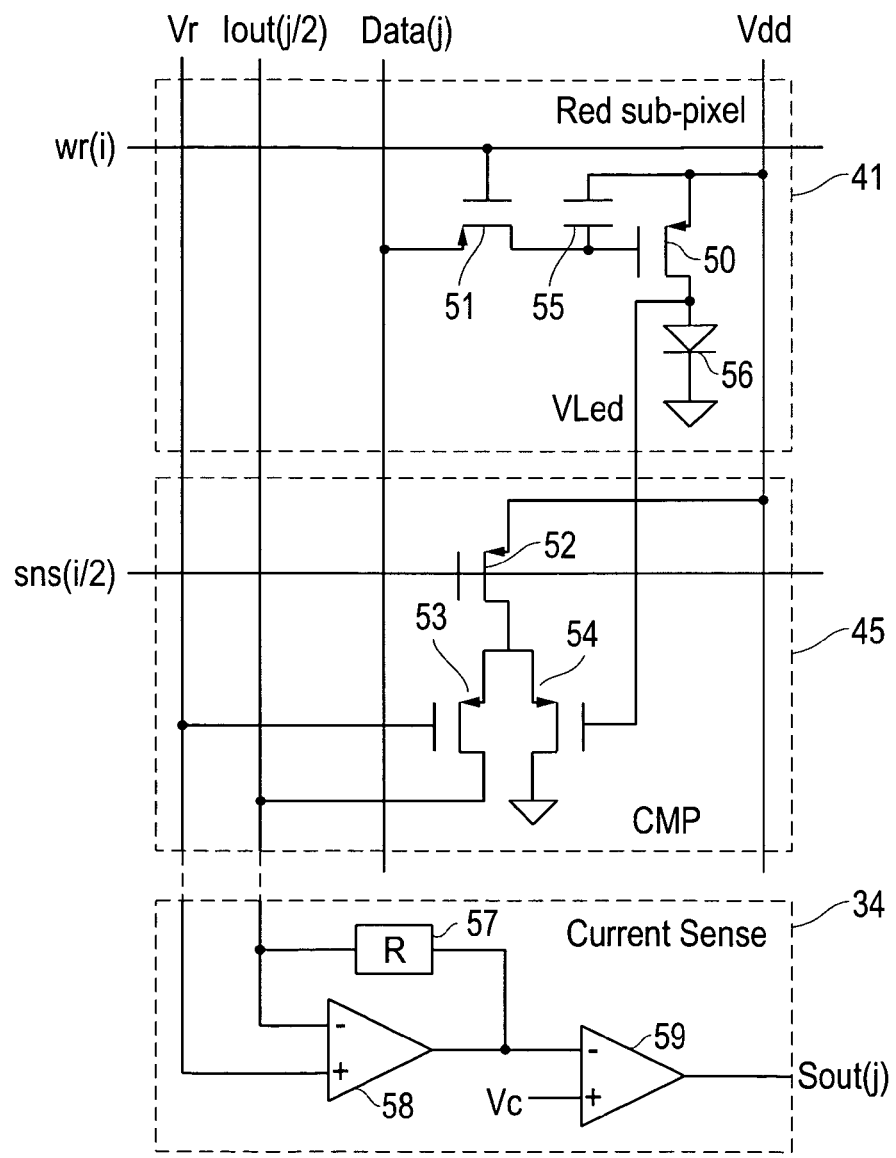
FIG. 5 (OLED Sub-pixel and Current Sense Circuit Diagrams) is an exemplary circuit diagram of the OLED sub-pixel and current sense circuits.

FIG. 5 is an example circuit diagram for red sub-pixel 41, comparator 45, and an individual current sense element in current sense 34 referenced by coordinate J. When producing light, LED 56 is driven by the current through transistor 50, which is set by the voltage stored on capacitor 55 and the gate of transistor 50. The voltage on capacitor 55 is set to the voltage on DATA(j) signal when WR(i) signal is high. When WR(i) goes low, capacitor 55 holds the voltage so that DATA (j) can be used to program the current in other rows of sub-pixels when other WR signals go high. All the sub-pixels connected to WR(i) are programmed simultaneously by all the DATA signals when WR(i) is high.

To detect light from spot 14, transistor 50 is first turned off by programming the voltage across capacitor 50 to zero volts or some value less than transistor 50 threshold voltage. Then SNS(i/2) signal goes low to produce a current through transistor 52, which is steered to ground through transistor 54 when the voltage across LED 56 is less than reference voltage Vr and to IOUT(j/2) through transistor 53 when the voltage across LED 56 is greater than Vr. SNS(i/2) is connected to transistor 52 in all red sub-pixels 41 in the I/2 row of LED array 33. VDD is connected to all sub-pixels and Vr is connected to comparator 45s in LED array 33. All components in pixel 40 are typically processed using thin film technology.

Current sourced by red sub-pixel 41 into current sense 34 element J is converted to a voltage by resistor 57 and amplifier 58, and such voltage is compared to reference voltage Vc through comparator 59. The voltage induced on LED 56 by spot 14 can vary from a few millivolts to a couple volts. Reference voltage Vr is set to a value high enough to prevent ambient light from causing comparator 45 to source current on IOUT, but low enough for display 11 to detect a spot 14 with low optical power. Voltage settings for Vr could be adjusted dynamically based on the ambient light level incident on display 11, but typically would reside in the range of 500 mV to 1V. Since the signal Vr is connected to the positive input terminal of amplifier 58, the voltage of the IOUT is held very close to Vr through feedback resistor 57. The output of amplifier 58 drops below reference voltage Vr when current is sourced by comparator 45. Reference voltage Vc is connected to the positive terminal of comparator 59. When the output of amplifier 58 drops below Vc, current sense 34 output SOUT (j) goes high. The reference voltage Vc should be set to be less than the reference voltage Vr by an amount sufficient to reject noise. Vc is typically about half Vr.

FIG. 5 is one of many possible circuit diagrams for sub-pixels and spot 14 detection. For instance, the sub-pixel circuitry could include the capability to calibrate out variations in transistor 50 threshold voltage or in LED 56 output light. Comparator 45 could include additional transistors to output a voltage instead of a current, or photo generated current instead of voltage from LED 56 could be detected. An additionally signal could be used to turn off the current into LED 56 instead of using the WR(i) signal. Many other circuit configurations are possible.

Figure 6:
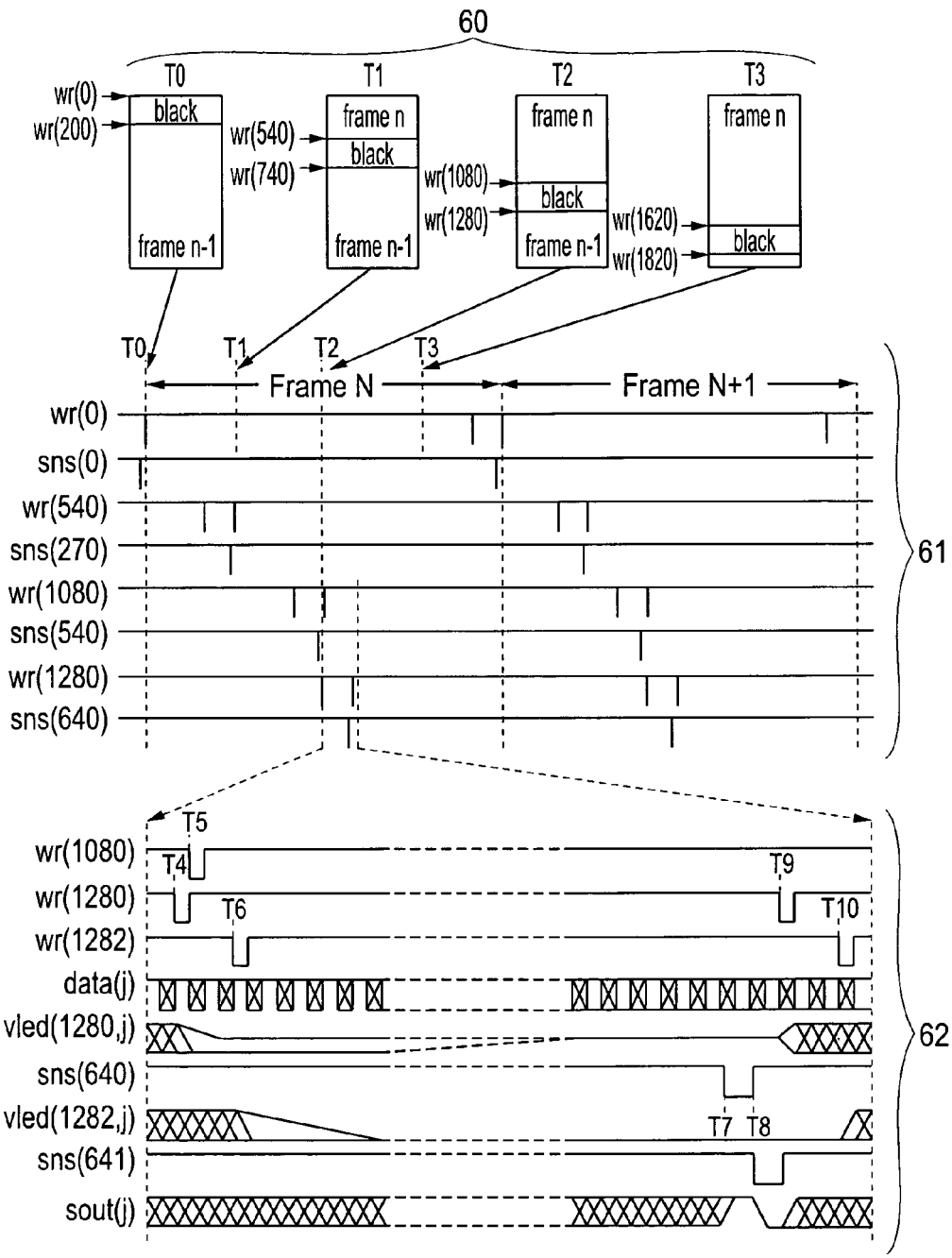
FIG. 6 (OLED Display Timing) is an exemplary OLED display timing diagram.

FIG. 6 is an example illustration of display 11 timing for a High Definition (HD) TV with 1080 rows of pixels that shows how images are scanned and spot 14 is detected. FIG. 6 includes four snapshots 60 of display 11 at times T0, T1, T2, and T3 within one frame period. A frame is a single image in a sequence that produces a video or motion picture and a frame period is the time from the start of presentation of a first frame to the start of presentation of a second frame. Below the snapshots 60 are detailed timing diagrams 61 for the input and output signals for a red sub-pixel 41 that is illuminated with coordinates (1080,j) and not illuminated with coordinates (1082,j).

At time T0, frame N begins to be displayed with WR(0) going high and DATA(j) signals containing the analog voltages corresponding to the desired output light power from each sub-pixel in the first row of sub-pixels in LED array 33. Just prior to WR(0) going high, WR(200) went high with all DATA(j) signals shorted to VDD to turn off all LEDs in all sub-pixels in row 200. The box labeled "black" and shown in snapshot 60 at T0 between WR(0) and WR(200), at T1 between WR(540) and WR(740), at T2 between WR(1080) and WR(1280) and at T3 between WR(1620) and WR(1820), represent a region of display 11 that is emitting no light. It is in this region, which repetitively travels down display 11 as shown, that spot 14 is detected. At T0, frame N−1 is still displayed below the dark region starting with row 201.

Time T1 occurs one quarter of a frame period after the start of frame N at which time only the top 25% of frame N is displayed. WR(740) went high to clear another line of frame N−1 and WR(540) went high to display another line of frame N. At time T2, the top half frame N is displayed with WR(1080) going high to display another line of frame N and with WR(1280) going high to clear another line of frame N−1. At time T3, three quarters of frame N is displayed with WR(1620) going high to display another line of frame N and with WR (1820) going high to clear another line of frame N−1.

The timing diagram 61 illustrates the state of the write and sense signal pairs WR(0) and SNS(0), WR(540) and SNS (270), WR(1080) and SNS(540), and WR(1280) and SNS (640) as a function of time over two frame periods, N and N+1. As shown in FIG. 4, each pixel 40 has 2 input write signals WR(i) and WR(i+1) and one input sense signal SNS (i/2). Detailed timing diagram 62 expands the region in time from T2 when WR(1280) clears a line of frame N−1 to the time when WR(1280) goes low again to display another line of frame N.

At time T4 in detailed timing diagram 62, WR(1280) goes low while all DATA(j) signals are high, which turns the light off from any sub-pixel in row 1280 by discharging capacitor 55 and turning transistor 50 off. The voltages across the red LEDs in the red sub-pixels 41 connected to WR(1280) prior to WR(1280) going high is determined by the currents sourced by transistor 50 in each of the red sub-pixels 41 and can be anywhere from 0 to 2 or 3 volts. Detailed timing diagram 62 illustrates the voltage across one particular red LED that is illuminated by spot 14. Prior to WR(1280) going high, Vled(1280,j) can be anywhere from 0 to 2 or 3 v. When WR(1280) goes high, the voltage relatively slowly drifts towards and intermediate value determined by the optical power of spot 14.

At time T5, WR(1280) returns high and WR(1080) goes low with the DATA(j) being driven by column driver 31 with the analog voltages to be programmed into the sub-pixels in row 1080. At time T6, WR(1282) goes low with all DATA(j) signals high, which turns off the current to all of the red sub-pixels 41, in the next row of pixels 40 below the row connected to WR(1280). Detailed timing diagram 62 also illustrates the voltage across the red LED in a particular red sub-pixel 41 connected to WR(1282) that is not illuminated by spot 14. Vled(1282,j) goes low shortly after WR(1282) goes high.

At time T7, sense signal SNS(640), which is connected to the same row of pixels 40 as WR(1280), goes low. This turns comparator 45 on, which compares Vled(1280,j) to the reference voltage Vr. Since Vled(1280,j) is at an intermediate voltage and assuming Vr is properly set below this intermediate voltage, SOUT(j) from current sense 34 goes high. At time T8, SNS(640) goes high and SNS(641) goes low, which turns comparator 45 off in the pixel 40 row connected to WR(1280) and on in the pixel row 40 connected to WR(1282). Vled(1282,j) is compared to Vr and since Vled (1282,j) is low, SOUT(j) will go low.

At time T9, WR(1280) goes low again, but this time with the DATA(j) signals driven to levels by column driver 31 appropriate to display the red sub-pixel 41 and the white sub-pixel 44 in the 640$^{th}$ line of the image in frame N. Vled (1280,j) changes accordingly. At time T10, WR(1282) goes low with the DATA(j) signals driven to levels by column driver 31 appropriate to display the red sub-pixel 41 and the white sub-pixel 44 in the 641$^{st}$ line of the image in frame N. Vled(1282,j) changes accordingly.

The time between WR(1280) going low the first time at T4 and the second time at T9 is equal to the time it takes to display 100 pixel 40 rows of the image in frame N. Since this example illustrates the timing for an HD display with 1080 rows, the time from T4 to T9 is equal to about 10% of the frame period. At a 60 Hz frame rate, this time is about 1.7 mSec, which is sufficient for Vled(1280,K) to reach its final value.

Timing diagram 61 and detailed timing diagram 62 only show a small subset of the signals in an OLED display 11 since there are thousands of such signals. In particular WR(1281) is not shown since it is not connected to a red sub-pixel 41 and therefore not involved is detecting spot 14.

FIG. 6 illustrates one of many possibilities for OLED display 11 timing. Since the block and circuit diagrams could be substantially different from FIGS. 3, 4, and 5, the associated signal's could be substantially different from those shown in FIG. 6 and consequently the timing diagrams would be completely different. For the block and circuit diagrams shown in FIGS. 3, 4, and 5, the timing shown in FIG. could also be significantly different. For instance, the time from T4 to T9 could shorter or much longer, or the sequencing of the WR(i) signals could clear multiple lines of the previous frame and then write multiple lines of the current frame.

Figure 7:
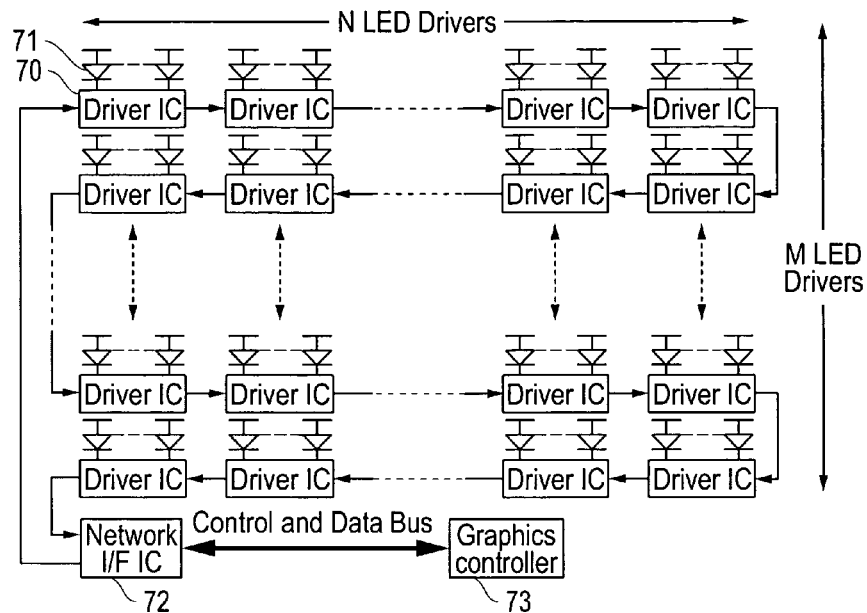
FIG. 7 (LED Display Architecture) is an exemplary LED display architecture.

FIG. 7 is an example architectural diagram for display 11 that uses conventional discreet semiconductor LEDs, which comprises an array LED driver ICs 70 with associated LEDs 71 connected serially to each other and to a network interface (I/F) IC 72. Network interface IC 72 connects to graphics controller 73 through control and data busses. The array in this example has N columns and M rows of driver ICs 70 each connected to P LEDs 71. With P equal to 16 and three LEDs per pixel, N and M would equal 120 and 3240 respectively for an ED display with 1920×1080 resolution. For a standard 48 foot by 14 foot bill board with 3 LEDs per pixel, and P equal to 16, N would equal 48 and M would equal 672.

LED's 71 could all be the same color or could be divided between red, green, and blue for instance. For an RGB display, the different colors could be arranged in different ways. One example is to organize the display in groups of 3 rows with each row in each group being a different color.

Graphics controller 73 produces the data to be displayed digitally, which is forwarded to network interface IC 72. Network interface IC 72 serializes the data, which is sent through the chain driver ICs 70 in a time division multiplexed data frame. Each driver IC is assigned specific time slots from which image data is received and information about spot 14 is sent. The data frame repeats at the video frame rate, which enables each driver IC 70 to update the drive current to each LED 71 and to report the presence of spot 14 to graphics controller 73 every video frame. Graphics controller 73 processes the responses from all driver ICs 72 to determine the precise spot 14 location and takes the appropriate action.

FIG. 7 is one of many possible architectural diagrams. For instance, each driver IC 70 could be connected directly to graphics controller 73 through a multiplexer either serially or in parallel. The LED drivers could be made from discreet components instead of driver IC 70. The data for the LED drivers could even be communicated with analog voltages instead of digital values.

Figure 8:
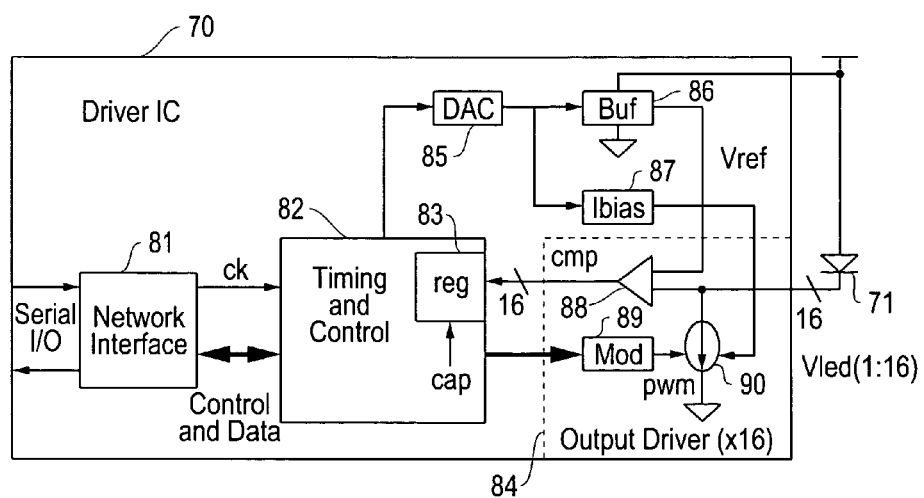
FIG. 8 (Driver IC Block Diagram) is an exemplary LED driver IC block diagram.

FIG. 8 is an example block diagram for driver IC 70, which in this example drives sixteen LEDs 71 and comprises network interface 81, timing and control circuitry 82, sixteen output drivers 84, digital to analog converter (DAC) 85, buffer amplifier 86, and current bias 87. Timing and control circuitry 82 further comprises register 83. Output driver 84 further comprises pulse width modulator 89, current source 90, and comparator 88.

Network interface 81 accepts serial input data from upstream and produces serial data for downstream driver ICs 70 as shown in FIG. 7. Network interface 81 further recovers the clock (CK) from the data, and detects and synchronizes to the input data frame timing. Most received serial data is retransmitted, however, data in the assigned timeslots are forwarded to timing and control circuitry 82. Information about the presence or absence of spot 14 among other things is produced by timing and control circuitry 82 and forwarded to network interface 81 for transmission in the assigned timeslots from which LED 71 illumination data was removed.

Timing and control circuitry 82 manages the functionality of driver IC 70. Illumination data for LEDs 71 is buffered, processed, delayed, and forwarded at the appropriate time to the sixteen output drivers 84. Timing and control circuitry 82 also provides the appropriate digital values at the appropriate times for DAC 85 to produce, together with buffer 86 and ibias 87, the voltage reference signal VREF and the bias current IBIAS used by comparator 88 and current source 90 respectively. Register 83 is also clocked at the appropriate time by the capture (CAP) signal to store the sixteen comparator 88 outputs (CMP).

Output driver 84 produces pulse width modulated current to LED 71 and monitors the LED 71 voltage induced by incident light from spot 14 for instance. Modulator 89 receives a digital number from timing and control circuitry 82 and produces a logic level signal (PWM) that turns current source 90 on and off. The frequency of PWM is typically equal to the serial data frame and the video frame rate with the duty cycle related to the digital value from timing and control circuitry 82. Current source 90 produces current proportional to IBIAS during the time that PWM is high that is drawn through LED 71 to produce light.

The maximum duty cycle of PWM is set by the maximum value of the number from timing and control circuitry 82, and is typically some fraction of a video frame period, for instance one quarter. Once this maximum amount of time has passed from the start of a pulse on PWM, timing and control circuitry 82 changes the value provided to DAC 85 to produce VREF and generates a pulse on CAP to store the sixteen comparator 88 outputs in register 83 some time later. If spot 14, for instance, is illuminating one of the LEDs 71, that LED 71 will generate a voltage that is greater than VREF, which causes the CMP output from the associated comparator 88 to go high. An LED 71 that is not illuminated will not generate a voltage greater than VREF, which will cause the CMP output from the associated comparator 88 to be low.

FIG. 8 is just one example of many possible driver IC 70 block diagrams. For instance, network interface 81 would not be needed if each driver IC 70 in FIG. 7 were directly connected to graphics controller 73. With the serial configuration shown in FIG. 7, network interface 81 would not need to recover a clock from data if another input was used to accept a clock input. Likewise, if a frame clock input was provided, network interface 81 would not need to synchronize to the serial input frame timing. Additionally, each output driver 84 could include a current DAC instead of modulator 89 and current source 90. Such a DAC would provide a variable amount of current for a fixed amount of time instead of a fixed current for a variable amount of time. Also spot 14 could be detected by measuring the LED 71 current induced by spot 14 instead of LED 71 voltage.

Figure 9:
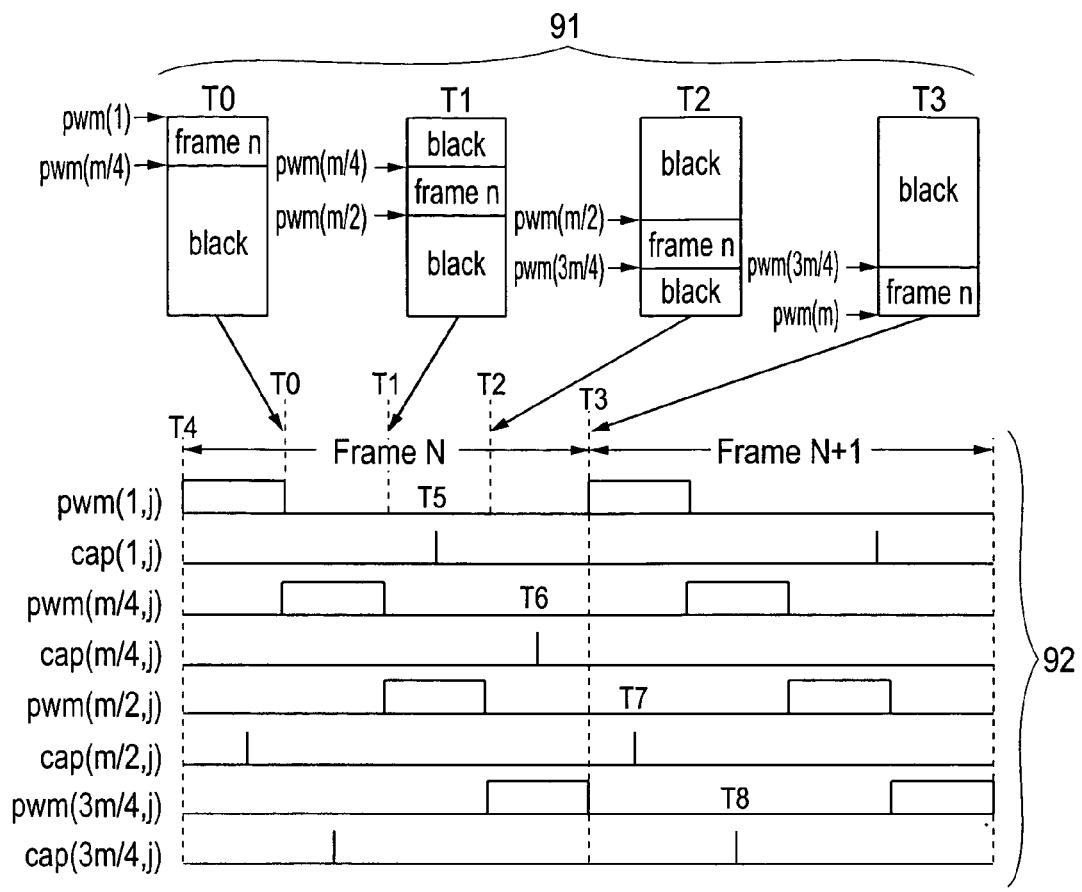
FIG. 9 (LED Display Timing) is an exemplary LED display timing diagram.

FIG. 9 illustrates an example for the timing of an LED display 11 using conventional discreet semiconductor LEDs, which includes snapshots 91 and timing diagram 92. Snapshots 91 illustrate the state of display 11 at four different times, T0, T1, T2, and T3 within one video frame N. The region labeled "frame n" of each snapshot represents the image and the region labeled "black" of each snapshot represents rows that are not producing light. For example, at T0 only rows 1 to M/4 are producing light; at T1 only rows M/4 to M/2 are producing light, at T2 only rows M/2 to 3M/4 are producing light, and at T3 only rows 3M/4 to m are producing light.

Time T0 occurs one quarter of the way through frame N with the top one quarter of the image displayed. At T0 all the PWM signals in all driver ICs 70 in the M/4$^{th}$ row are just turning on and all the PWM signals in all the driver ICs 70 in the first row are guaranteed to be off. Most of the PWM signals in the first row will be off before T0 due to modulated brightness, but T0 is the first time all PWM signals in such row are guaranteed to be off.

Time T1 occurs one half of the way through frame N with the second quarter of the image displayed from row M/4 to M/2. Time T2 occurs three quarters of the way through frame N with the third quarter of the image displayed. Time T3 occurs at the end of frame N with the bottom quarter of the image displayed. At times between those that the snapshots 91 represent, one quarter of the image will be displayed in this example, but will be located at different positions on the display 11. The quarter displayed progresses from the top of the display to the bottom during a frame period.

Timing diagram 92 illustrates possible timing of PWM and CAP signals in driver ICs 70 in four different rows, 1, M/4, M/2, and 3M/4, which are located at the top, and one quarter, one half, and three quarters of the way down display 11. The index J indicates all columns in such row. At time T4, which is the beginning of frame N, the PWM signals in the first row of driver ICs 70 turn on. By T0 all such signals are guaranteed to be off. At time T5, which is equally far apart from T0 and the end of frame N at T3, the CAP signals in all driver ICs 70 in the first row are pulsed to capture the CMP signals output from comparators 88. Such timing of CAP relative to PWM minimizes optical coupling from LEDs that are on from interfering with spot 14 detection.

Times T6, T7, and T8 illustrate possible times to pulse CAP in driver ICs 70 one quarter, one half, and three quarters of the way down display 11. The pulse on the CAP signals progresses down display 11 following the section of the image being displayed by three eighths of the display.

FIG. 9 illustrates one of many possible LED display diagrams. For instance, the amount of time LEDs 71 in any one are off can be substantially shorter or longer, and the time when LEDs 71 are sampled for spot 14 detection can vary as well. Rows as well columns can also be scanned so that only one driver IC 70 turns on at a time, instead of an entire row. Display 11 can be scanned on a column basis instead of a row basis, or not at all. The entire image can be flashed on and then off. If driver IC 70 uses variable current for fixed amounts of time instead of fixed current for variable amounts of time the PWM signals that enable the current to LEDs 71 would all be high for a fixed amount of time instead of a variable amount as shown in timing diagram 92.

Figure 10:
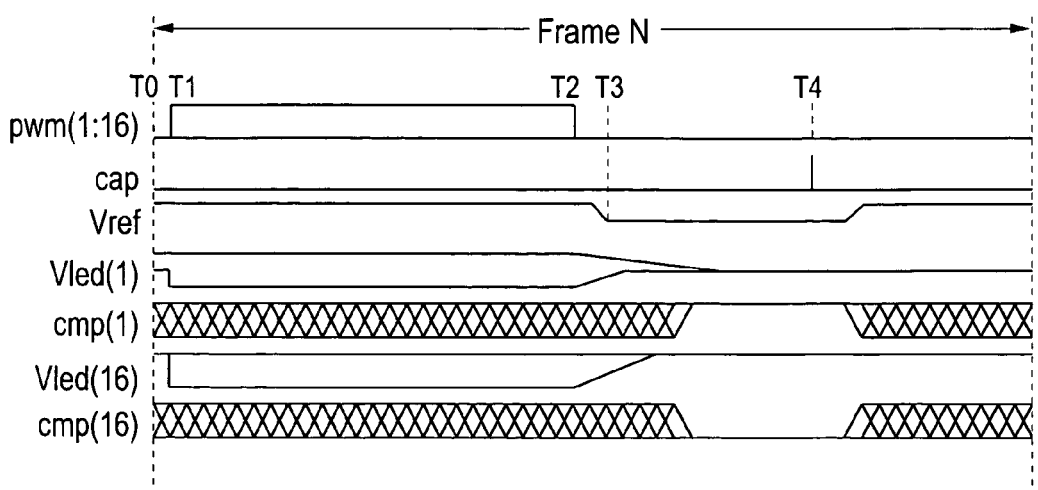
FIG. 10 (LED Driver IC Timing) is an exemplary LED driver IC timing diagram.

FIG. 10 illustrates an example timing diagram for the signals within one driver IC 70 located in a row near the top of display 11, which is partially illuminated by spot 14. In this example driver IC 70 has 16 output drivers 84 connected to sixteen LEDs 71. The first LED 71 is illuminated by spot 14 and the sixteenth is not. At time T0, frame N begins. At time T1, the PWM signals go active. At time T2, all PWM signals are guaranteed to be low and the current sources 90 are guaranteed to be off. The VLED(1) signal associated with the first LED 71 and output driver 84 in driver IC 70, which is illuminated by spot 14 moves towards the voltage induced by the incident light. VLED(16) simply goes high since the associated LED 71 is not illuminated.

At time T3, timing and control circuitry 82 loads DAC 85 with the appropriate value for VREF. By the time T4, all VLED signals and VREF have stabilized. CAP is pulsed by timing and control circuitry 82 and comparator 88 outputs CMP are sampled. Such information is communicated to graphics controller 73, which determines spot 14 location and takes the appropriate action.

FIG. 10 is just one example of many possible driver IC 70 timing diagrams. Output driver 84 may not have a pulse width modulator, so the PWM signals would be different. The time that CAP is pulsed could be different and does not necessarily need to exist. If comparator 88 is replaced by analog to digital converter (ADC), the stream of digital sample values can be analyzed by a processor. VREF could be a fixed value or a variable value controlled by a dedicated DAC.

Figure 11:
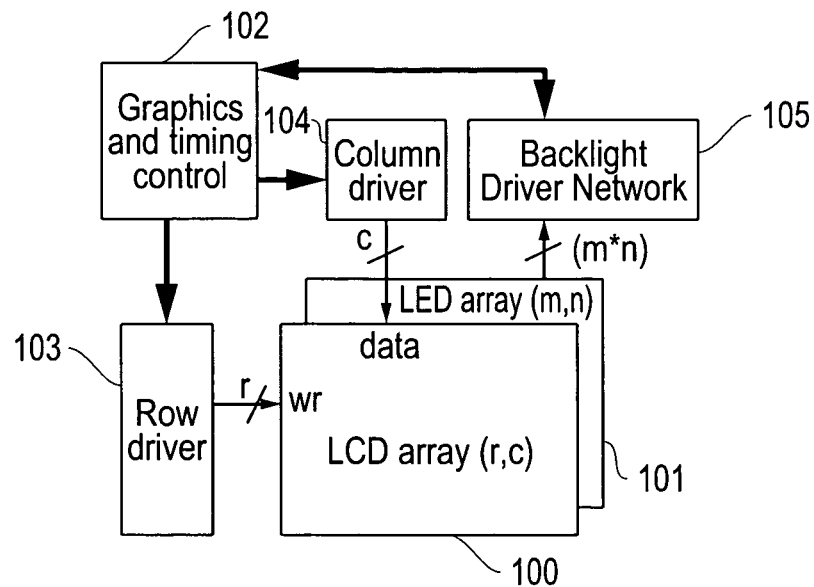
FIG. 11 (LCD Display with LED Backlight Block Diagram) is an exemplary LCD with LED backlight block diagram.

FIG. 11 is an example block diagram of display 11 implemented with a liquid crystal display (LCD) and an LED backlight, which comprises LCD array 100, LED array 101, graphics and timing controller 102, row driver 103, column driver 104, and backlight driver network 105. In this example, LCD array 100 has R rows and C columns of elements with row driver 103 producing R number of WR signals and column driver 104 producing C number of DATA signals. Graphics and timing control circuitry 102 provide data and timing to both row driver 103 and column driver 104 in a similar manner to an OLED display as described in FIG. 3.

In this example, LED array 101 comprises M rows and N columns of LEDs driven by backlight driver network 105, which comprises a number of LED driver ICs connected together as in the LED display illustrated in FIG. 7. LCD array 100 comprises pixel elements that control the amount of light that can pass through. LED array 101 produces the light that is selectively passed through LCD array 100. Both LCD array 100 and LED array 101 can be scanned to minimize motion blur. Between frames, all elements of LED array 101 are turned off and all elements of LCD array 100 are made transparent so that spot 14 can be detected by LED array 101 in combination with backlight driver network 105 and graphics and timing control circuitry 102.

FIG. 11 is just one of many possible block diagrams for display 11 based on LCD and LED backlighting technology. For instance, all LED elements in LED array 101 could be directly connected to graphics and timing control circuitry 102 through a multiplexer instead of backlight driver network 105.

Figure 12:
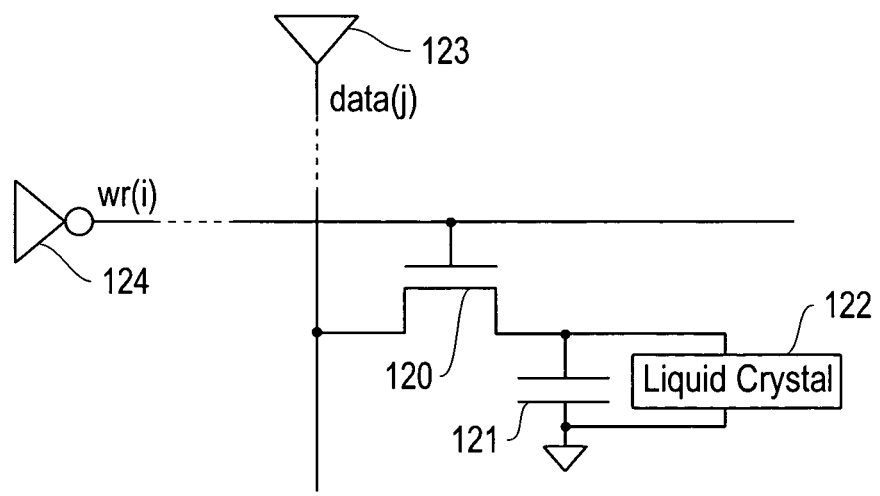
FIG. 12 (LCD Pixel and Driver Circuit Diagram) is an exemplary LCD pixel and driver circuit diagram.

FIG. 12 is an example circuit diagram for the LCD pixel element in LCD array 100 and the associated row driver 103 and column driver 104, which comprises transistor 120, capacitor 121, liquid crystal 122, buffer amplifier 123, and inverter 124. Such pixel element is repeated horizontally C times and vertically R times to produce LCD array 100, with each row of pixel elements controlled by a WR signal from an inverter 124 in row driver 103 and each column of pixel elements connected to a single DATA signal from buffer amplifier 123 in column driver 104.

The transparency of liquid crystal 122 is controlled by the voltage across capacitor 121, which is set by driving DATA(j) with the desired voltage and then pulsing WR(i) high to make transistor 120 conductive. When WR(i) is high, capacitor 121 is charged to the voltage on DATA(J), which is driven by buffer amplifier 123.

FIG. 12 is just one of many possible LCD array 100, row driver 103, and column driver 104 circuit diagrams. For instance, some pixel elements contain multiple transistor to compensate for transistor 120 variations and speed up the write process.

Figure 13:
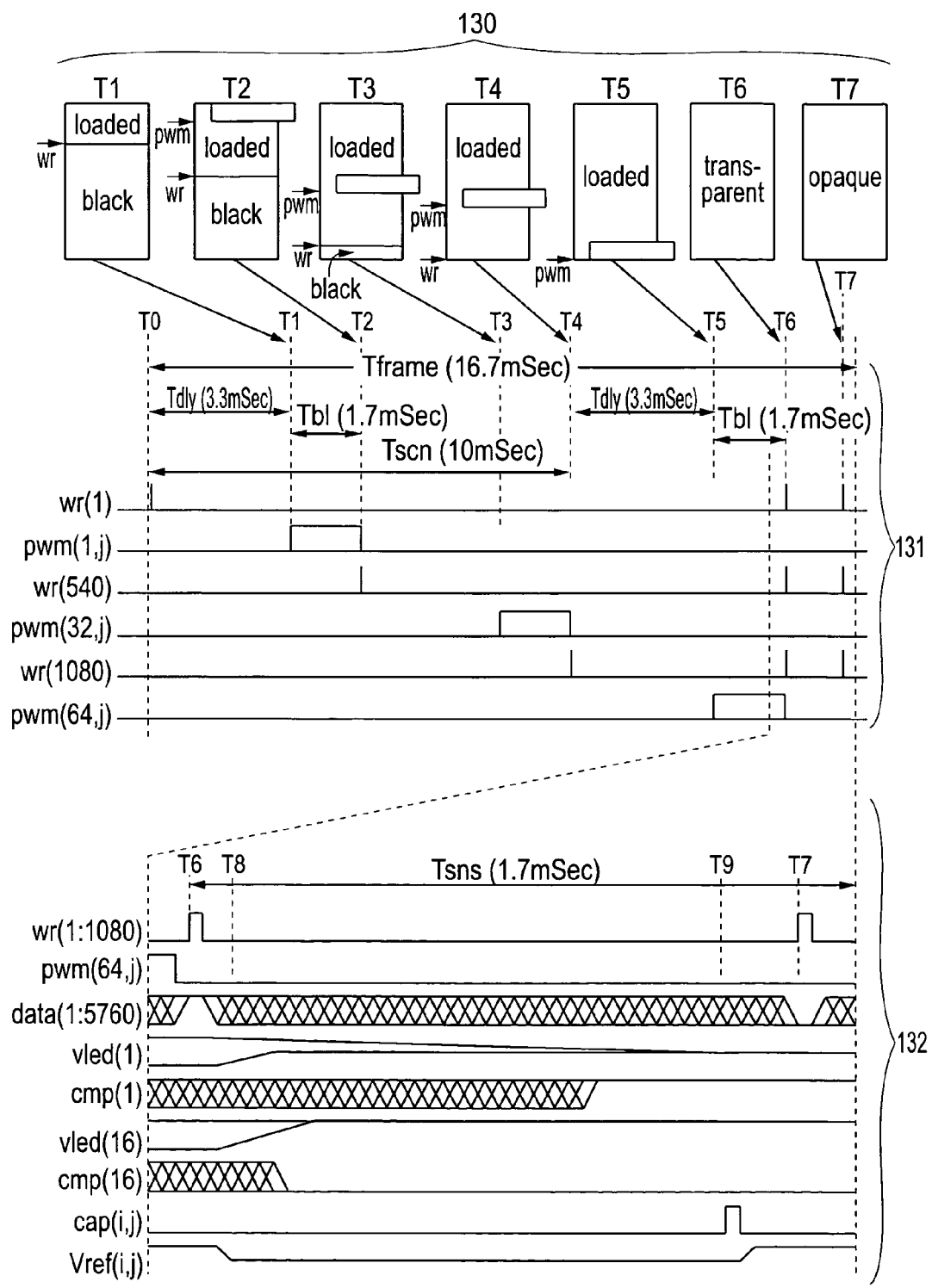
FIG. 13 (LCD and Backlight Timing) is an exemplary LCD and backlight timing illustration.

FIG. 13 is an example illustration of display 11 timing for a 60 Hz High Definition (HD) TV with 1080 rows of pixels, which shows how the image and backlight are scanned, and spot 14 is detected. The backlight in this example comprises 64 rows of LEDs 71. FIG. 13 includes seven snapshots 130 of display 11 at times T1, T2, T3, T4, T5, T6, and T7 within one frame period. Below the snapshots 130 is timing diagram 131 for the WR signals to LCD array 100 and the PWM signals in driver IC 70 in backlight driver network 105. Below timing diagram 131 is detailed timing diagram 132 that illustrates the last ten percent of a frame, which is when spot 14 is detected, in expanded detail. Detailed timing diagram 132 illustrates the signals inside driver IC 70 for an LED 71 that is illuminated by spot 14, VLED(1), and for an LED 71 that is not illuminated, VLED(16).

A frame starts at time T0, with image data written to the top row of LCD array 100 by WR(1) pulsed high. At time T1, as shown in snapshots 130, a top portion of display 11 represented by the region labeled "loaded" has been loaded with image data, and a bottom portion represented by the region labeled "black" has not been loaded with image data. At times T2 through T5, the regions labeled "loaded" also represent regions that have been loaded with image data, and the regions labeled "black" also represent regions that have not been loaded with data. At time T1, the first row of the LED array 101 is also turned on by PWM(1,j) going high. The index J represents all the PWM signals in a row, which in this case is the first row. The time from T0 to T1 represented by Tdly is 3.3 mSec in this example and is typically necessary for liquid crystal 122 to stabilize after being written and before being illuminated by LEDs 71.

At time T2, WR(540) is pulsed high, which indicates that the top half of the image has been loaded into LCD array 100. At this time the LEDs 71 in the first row of LED array 101 are also turned off as PWM(1,j) goes low. The offset non-labeled box in snapshots 130 at times T2 through T5 represents the region of the LED array 101 that is emitting light. The box is offset to represent that these rows are also loaded with image data. The time from T1 to T2 represented by Tbl is 1.7 mSec in this example and is the length of time each row of LED array 101 is turned on.

At time T3, the illuminated region of LED array 101 reaches the center of display 11 with PWM(32,j) going high. At time T4, the last row of LCD array 100 is loaded with data completing the image scan, which began at time T0. The time between T0 and T4 represented by Tscn is 10 mSec in this example. After an additional Tdly of 3.3 mSec, the illuminated region of LED array 100 reaches the bottom of display 11 with PWM(64,j) going high at time T5. After another Tbl time of 1.7 mSec, LED array 101 is completely turned off with PWM(64,j) going low at time T6.

At time T6, all pixel elements of LCD array 100 are configured to be transparent by setting all DATA signals to the level that makes liquid crystal 122 transparent, which is high in this example, and simultaneously pulsing all WR signals. While LCD array 100 is clear, spot 14 can be detected by backlight driver network 105. After sufficient time for such detection, LCD array 100 is made opaque at time T7 by setting all DATA signals to the level that makes liquid crystal 122 opaque, which is low in this example, and simultaneously pulsing all WR signals a second time.

Detailed timing diagram 132 is an expanded version of the time from T6 to T7 and shows the relevant signals of driver IC 70 for detecting spot 14. Just prior to T6, PWM(64,j) goes low, which turns LED array 100 completely off. At T6, all WR signals represented by WR(1:1080) pulses while all DATA signals represented by DATA(1:5760) are high, which clears LCD array 100. There are 5760 DATA signals in this example, which provides 1920 signals for each color component. At time T6, the voltage across the LED 71 that is illuminated by spot 14, which is represented by signal VLED(1) begins to drift toward an intermediate level, while the voltage of signal VLED connected to an LED 71 that is not illuminated, which is represented by VLED(16), goes high since LED 71 is connected to VDD.

At time T8, timing and control circuitry 82 in every driver IC 70 in backlight driver network 105 updates DAC 85 with the appropriate value to generate a proper Vref. Vref in all driver ICs 70 is represented by Vref(i,j). Some time after Vref is properly set, CMP(16) stabilizes at a low level indicating no spot 14 and CMP(1) stabilizes at a high level indicating the presence of spot 14. At time T9, the CAP signal in all driver ICs 70 in backlight driver network 105 represented by CAP (i,j) pulses, which stores the state of the CMP signals in register 83. Such spot 14 information is communicated to graphics and timing control circuitry 102, which takes the appropriate action. At time T7, all WR signals represented by WR(1:1080) pulse while all DATA signals represented by DATA(1:5760) are low, which makes LCD array 100 opaque in this example. The time from T6 to the end of the frame can be an additional Tsns of 1.7 mSec.

FIG. 13 illustrates just one of many possible timing diagrams for display 11 built using LCD with LED backlighting technology. LCD array 100 and LED array 101 can be scanned many different ways. Additionally, LED array 101 may be flashed instead of scanned, with all flashes being the same color or sequenced through the color components, such as red, green, and blue. The timing diagrams for the different scanning or flashing methods could be substantially different from FIG. 13.

Numerous variations and modifications will become apparent to those skilled in the art once the above disclosure is fully appreciated.

Second Embodiment

Display calibration systems and related methods are also disclosed that use the photo-sensitivity of LEDs to correct for variations between LEDs during initial production and over lifetime for display systems. Various embodiments are described with respect to the drawings below. Other features and variations can also be implemented, if desired, and related systems and methods can be utilized, as well.

In part, the disclosed embodiments relate to displays including arrays of LEDs that use the photo-sensitivity of the LEDs to correct for variations between LEDs during initial production and over lifetime of such a display. Such LED arrays can produce images directly as in LED billboards and sports arena scoreboards, and smaller Organic LED (OLED) displays, or can produce the backlight for LCD screens for instance. Variations in LED brightness and color can be compensated for in order for such a display to have uniform color and brightness. Such compensation, which is typically done in prior systems by measuring the optical output power of each individual LED or purchasing specially tested LEDs, is performed in the embodiments described below by simply measuring the signal induced on each LED by uniform incident light.

In one improved embodiment, the system infers the optical output power and optionally also the peak wavelength produced by each LED in an LED array for LED billboards and stadium displays for instance, or LCD backlighting, by measuring the photo-sensitivity of each such LED, comparing such sensitivity to the photo-sensitivity of the other LEDs in such array, and adjusting such LED drive current correction factors accordingly. Such correction factors can be initially generated during production of such LED array by measuring each such LED optical output power and peak wavelength directly, for instance, or by inferring each such LED optical output power and peak wavelength from photo-sensitivity and other measurements.

LEDs not only produce light with a specific peak wavelength when forward biased, but also forward bias when illuminated with light at or above such peak wavelength. The electrical power produced by a fixed incident optical power decreases with decreasing incident wavelength with the maximum power produced by incident light with a wavelength near such peak emission wavelength. Incident wavelengths above such peak emission wavelength produce roughly no electrical power in such LED. At a specific temperature, the relationship between voltage and current induced across a properly illuminated LED depends on the amount of illumination, the bandgap voltage of the semiconductor, and the resistive load placed across the LED. As the bandgap voltage of the semiconductor increases, the open circuit voltage (Voc) increases and the short circuit current (Isc) decreases. Since peak emission wavelength decreases with increasing bandgap voltage, the ratio of Voc to Isc can be measured to get an indication of wavelength variations between LEDs in an LED array.

The amount of light produced by different LEDs within a manufacturing lot or between lots when driven with a fixed current varies primarily due to differences in the optical path, such as transparency or alignment, and differences in the extent of imperfections in the structure of the light emitting region of the LED. Likewise, such differences similarly affect the photo-sensitivity of such LED when properly illuminated. Consequently, photo-sensitivity parameters, such as Voc and Isc, can be monitored to infer the amount of light that such LED will produce when driven with current.

Wavelength and output power from individual LEDs in an LED array can be compensated by correction coefficients to produce uniform intensity and color across such an array. Such correction coefficients determined during manufacturing of such an LED array by the methods described above, by directly measuring the intensity and wavelength of the light produced by each LED, or any other method, can be stored in memory in such a display. Likewise, photo-sensitivity parameters, such as Voc and Isc, produced in response to a light source with fixed parameters, can also be stored in such memory. Periodically, during the life of such a display, the LED array can be illuminated with a light source with the same or different parameters as the initial light source, the photo-sensitivity parameters can be measured, and differences between the initial and new photo-sensitivity parameter values can be used to modify the correction coefficients to correct for any additional shift in illumination from LEDs in such an LED array.

The light source used to calibrate an LED array during initial production can be direct or diffuse sunlight, a lamp that mimics the spectrum of sunlight, or any light source with a spectrum sufficient to generate reliably measurable photosensitivity parameters from LEDs of each color. To re-calibrate a large LED billboard or stadium display, for instance, the same light source with the same intensity can be used to measure the photo-sensitivity parameters under the exact same condition as when such a display was manufactured. Any shift in any photo-sensitivity parameter can be used directly to update corresponding correction coefficients. If precisely controlling the light source intensity is not possible, then comparing changes in one LED relative to the others enables uniform display intensity and color to be recreated. The user could simply manually adjust overall brightness.

For consumer devices such as an LCD television, calibration with a precise light source may not be possible. A close approximation could be diffuse sunlight, but the spectrum of sunlight varies with time day and year, and location. Additionally, such a device could be in an enclosed room with artificial lighting. In such a case, uniformity across LEDs of each color component can be produced, but the relative intensity between color components may not. The user in this case could manually adjust both overall brightness and hue to the desired levels.

The improved display calibration systems and related methods described herein address calibration issues for displays using arrays of LEDs directly or as backlights for illumination. And the calibration systems and related methods described herein greatly reduce or eliminate the need for teams of specially trained and equipped people to keep LED billboards and stadium displays calibrated during operation over time.

As stated above, this second embodiment can also be used with the techniques, methods and structures described with respect to the other embodiments described herein. For example, the calibration and detection systems and methods described with respect to this embodiment can be used within the other described embodiments, as desired. Further, the various illumination devices, light sources, light detectors, displays, and applications and related systems and methods described herein can be used with respect to calibration and detection systems and methods described in this second embodiment, as desired. Further, as stated above, the structures, techniques, systems and methods described with respect to this second embodiment can be used in the other embodiments described herein, and can be used in any desired lighting related application, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications.

Figure 14:
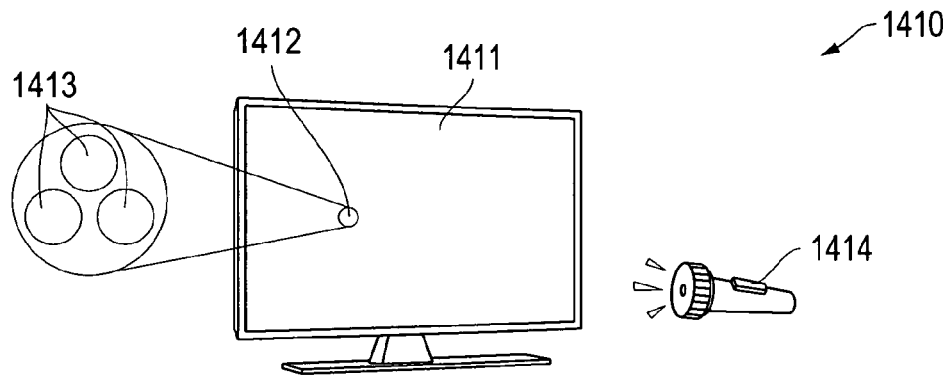
FIG. 14 (Display Calibration System) is an exemplary system diagram of the display calibration system.

Turning now to the drawings, FIG. 14 is one example of display calibration system 1410 that comprises the display 1411 and light source 1414. Display 1411 comprises an array of light emitting diodes (LEDs) arranged as pixels 1412 for image illumination either directly in the case of OLED or conventional LED displays, or backlighting in the case of Liquid Crystal Displays (LCDs). Pixel 1412 preferentially comprises different color sub-pixels 1413, for instance red, green, and blue, to produce the wide gamut of colors typically necessary for accurate representation of images either directly in the case of OLED or LED displays, or modulated as in an LCD. Sub-pixel 1413 comprises an LED.

Light source 1414 can be direct or diffuse sunlight, or artificial light from a lamp with a precise emitted light spectrum. During the manufacturing of display 1411, light source 1414 illuminates display 1411 uniformly to calibrate the intensity and wavelength of light emitted from each pixel 1412 and to measure and store photo-sensitivity parameters such as Voc and Isc, or to simply measure and store photo-sensitivity parameters in which case the intensity and wavelength of all pixels 1412 are calibrated by some other means such as measuring the light produced by each such pixel and adjusting some compensation coefficients accordingly. After some period of use, preferentially the same light source 1414 again illuminates display 1411 and the photo-sensitivity parameters of the LED comprising each sub-pixel 1413, such as Voc and Isc, are again measured and preferentially compared to those stored during the manufacturing of such display 1411. Any shift in such photo-sensitivity parameters or preferentially any difference in shift of such parameters in one pixel 1412 relative to preferentially the average shift in all pixels 1412 causes such compensation coefficients to be adjusted inversely proportional in such one pixel 1412.

If the Isc of the LED comprising a red sub-pixel 1413 for instance, decreases by more than the average decrease of all red sub-pixels 1413, such red sub-pixel compensation coefficients are increased to produce more current to such red sub-pixel 1413 by an amount preferentially inversely proportional to the percentage difference in the Isc change between such red sub-pixel 1413 and the average Isc change from all red sub-pixels 1413 in display 1411. Since the intensity of illumination on display 1411 from light source 1414 is relatively difficult to control from manufacturing time to such re-calibration time, any change in compensation coefficients for red sub-pixels 1413 for instance, is preferentially normalized to the average Isc from all red sub-pixels 1413.

FIG. 14 is one example of many possible display calibration systems 1410. For example, pixel 1412 could comprise more or less sub-pixels 1413 and such sub-pixels 1413 could comprise more or less different colored LEDs including just one color. Display 1411 could be an LCD, an OLED display, or a conventional LED display or just portions of such displays. Light source 1414 could be a single light source or many light sources with the same or different spectrums.

Figure 15:
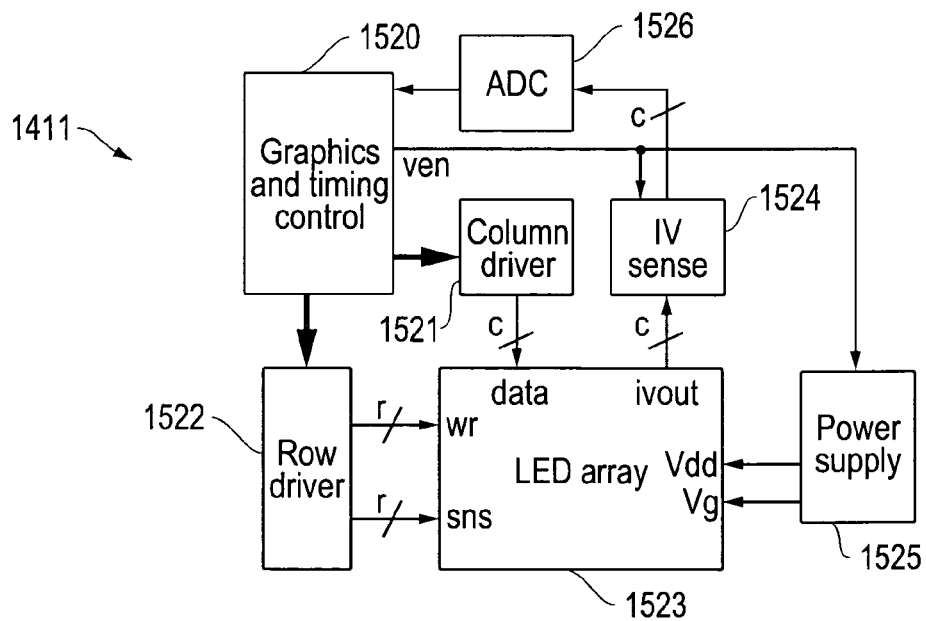
FIG. 15 (OLED Display Block Diagram) is an exemplary block diagram of an OLED display.

FIG. 15 is an example block diagram of OLED display 1411 comprising LED array 1523 with R rows and C columns of sub-pixels 1413 typically arranged in pixels 1412 of one red, one green, one blue, and one white sub-pixel LED. LED array 1523 comprises R/2 rows and C/2 columns of such sub-pixels 1413. Each sub-pixel 1413 is configured to produce a certain amount of light by a combination of voltages on a particular WR (write) signal produced by row driver 1522 and DATA signal produced by column driver 1521. When a WR signal is high, the analog voltage on each DATA signal is programmed into the row of sub-pixels 1413 activated by the particular WR signal.

Power supply 1525 produces the main power Vdd and the ground Vg for LED array 1523. The voltage on such Vg signal is equal to zero volts during normal operation and during the Voc measurement of each sub-pixel 1413, and is elevated slightly above display 1411 ground during Isc measurements.

During calibration, graphics and timing control circuitry 1520 sequences row driver 1522 through rows of LED array 1523 by pulsing each SNS (sense) signal high. When one of the SNS signals from row driver 1522 goes high, the IVOUT signals from the LED array 1523 source current or voltage into IV sense 1524 for sub-pixels 1413 in the row activated by a particular SNS signal. Depending on the state of the voltage mode enable signal Ven, IV sense 1524 either will pass the voltages on the IVOUT signals to ADC 1526 or will short the IVOUT signals to Vg, convert the resulting currents to voltages, and forward the resulting voltages to ADC 1526. ADC 1526 together with timing information from graphics and timing control circuitry 1520 sequentially converts the voltages forwarded by N sense 1524 to digital values, which are forwarded to graphics and timing control circuitry 1520 for processing.

Graphics and timing control circuitry 1520 can receive Voc and Isc, and other calibration information from sub-pixels 1413, and can compare such information with previously stored such values to determine any changes necessary to correction coefficients. Graphics and timing control circuitry 1520 can use such correction coefficients to adjust the voltages programmed into sub-pixels 1413 to compensate for variations in light output from each sub-pixel 1413 relative to other sub-pixels 1413.

FIG. 15 is just one of many possible block diagrams for display 1411, which could be built using any one of a wide range of technologies including but not limited to discreet inorganic LED arrays or liquid crystals. Likewise, the block diagram for display 1411 built with OLEDs could be substantially different. For instance, with additionally circuitry in sub-pixels 1413, the SNS signals or the IVOUT signals could be eliminated, by using the WR and DATA signals during calibration. Additionally, the Vg could simply be system ground provided IV sense 1524 circuitry was different.

Figure 16:
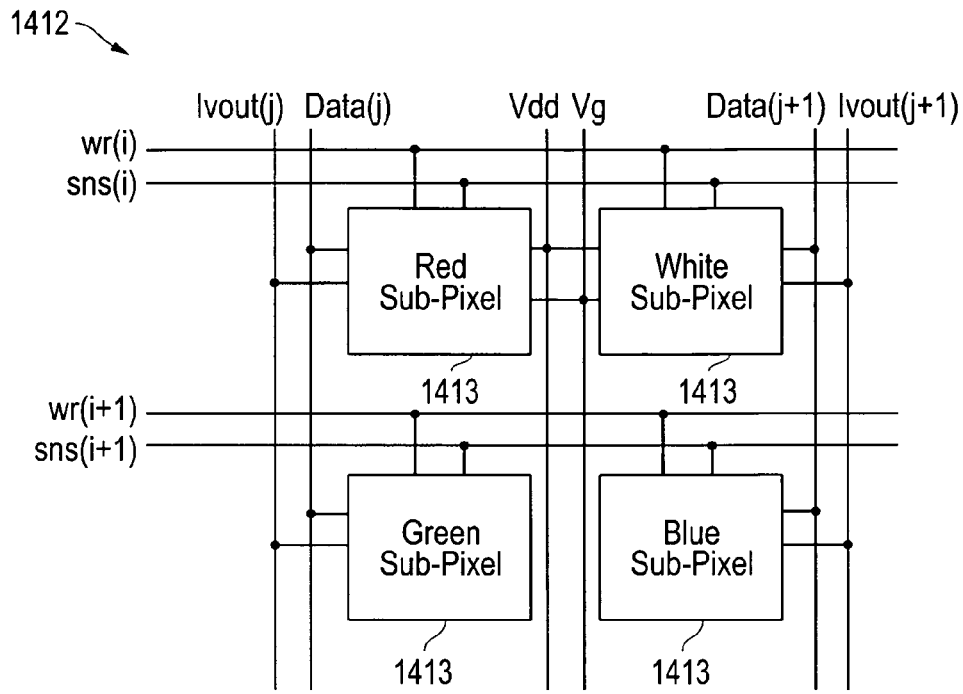
FIG. 16 (OLED Pixel Block Diagram) is an exemplary block diagram of an OLED pixel.

FIG. 16 is an example block diagram of OLED pixel 1412 in LED array 1523 referenced by row coordinates I and I+1, and column coordinates J and J+1, and comprising red, green, blue, and white sub-pixels 1413. The circuitry in all sub-pixels is the same except the color of the included LED.

Signals WR(i) and DATA(j) program the light produced by red sub-pixel 1413, signals WR(i) and DATA(j+1) program the light produced by white sub-pixel 1413, signals WR(i+1) and DATA(j) program the light produced by green sub-pixel 1413, and signals WR(i+1) and DATA(j+1) program the light produced by blue sub-pixel 1413. All sub-pixels are powered by the voltage difference between Vdd and Vg.

FIG. 16 is just one of many possible pixel 1412 block diagrams. For instance, any combinations of colors or just one color could be used. Additionally, all sub-pixels could be accessed by one WR signal and one DATA signal if two enable signals select between the sub-pixels.

Figure 17:
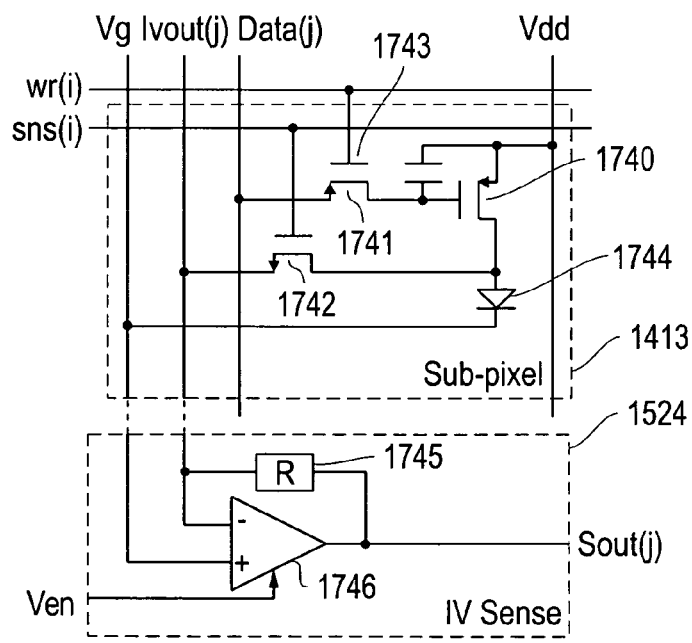
FIG. 17 (OLED Sub-pixel and Current Sense Circuit Diagrams) illustrates exemplary OLED sub-pixel and current sense circuit diagrams.

FIG. 17 is an example circuit diagram for sub-pixel 1413 and an individual current and voltage sense element in IV sense 1524 referenced by coordinate J. When producing light, LED 1744 is driven by the current through transistor 1740, which is set by the voltage stored on capacitor 1743 and the gate of transistor 1740. The voltage on capacitor 1743 is set to the voltage on DATA(j) signal when WR(i) signal is low. When WR(i) goes high, capacitor 1743 holds the voltage so that DATA(j) can be used to program the current in other rows of sub-pixels 1413 when other WR signals go low. All the sub-pixels 1413 connected to WR(i) are programmed simultaneously by all the DATA signals when WR(i) is low.

When SNS(i) goes high, the Voc and Isc induced across LED 1744 by incident light can be measured by IV sense 1524, after capacitor 1743 is discharged by setting WR(i) low and DATA(j) high. Voc is measured when graphics and timing control circuitry 1520 sets the Ven signal high, which tri-states the output of amplifier 1746 and causes power supply 1525 to hold Vg at zero volts. The voltage on IVOUT(j) passes through resistor 1745 and to the high impedance input of ADC 1526, which converts such voltage to a digital value and forwards such value to graphics and timing control circuitry 1520.

Isc is measured when graphics and timing control circuitry 1520 sets the Ven signal low, which enables amplifier 1746 and forces the voltage on IVOUT(j) to the voltage on Vg. The resulting current flows through resistor 1745 producing a voltage on Sout(j) proportional to the Isc induced on LED 1744 by incident light. Since the voltage on Sout(j) is lower than that on Vg and IVOUT(j), the negative supply for IV sense 1524 and ADC 1526 is set to be lower than Vg. Power supply 1525 can raise the voltage on Vg to some small voltage, such as one volt above the negative supply, for instance ground, for display 1411.

Although not associated with photo-sensitivity of LED 1744, characteristics of transistor 1740 can be measured by such sub-pixel 1413, IV sense 1524, and ADC 1526 circuitry, and compensated by graphics and timing control circuitry 1520. After a voltage is programmed across capacitor 1743, the corresponding current produced by transistor 1740 can be measured when SNS(i) high and Ven is low. The voltage on IVOUT(j) is forced to the voltage on Vg by amplifier 1746 and resistor 1745 with the resulting current flowing through resistor 1745, which produces a voltage on SOUT(j) proportional to transistor 1740 current. Such voltage can be digitized by ADC 1526 and processed by graphics and timing control circuitry 1520, which can compensate for variations between transistors 1740 in all sub-pixels 1413.

FIG. 17 is one of many possible circuit diagrams for sub-pixels 1413 and IV sense 1524. For instance, sub-pixel 1413 could include additional circuitry to compensate for transistor 1740 variations without involving graphics and timing control circuitry 1520. Additionally, to detect LED 1744 Voc and Isc in response to incident light, sub-pixel 1413 could include more complex circuitry to buffer such signals prior to leaving such sub-pixel 1413.

Figure 18:
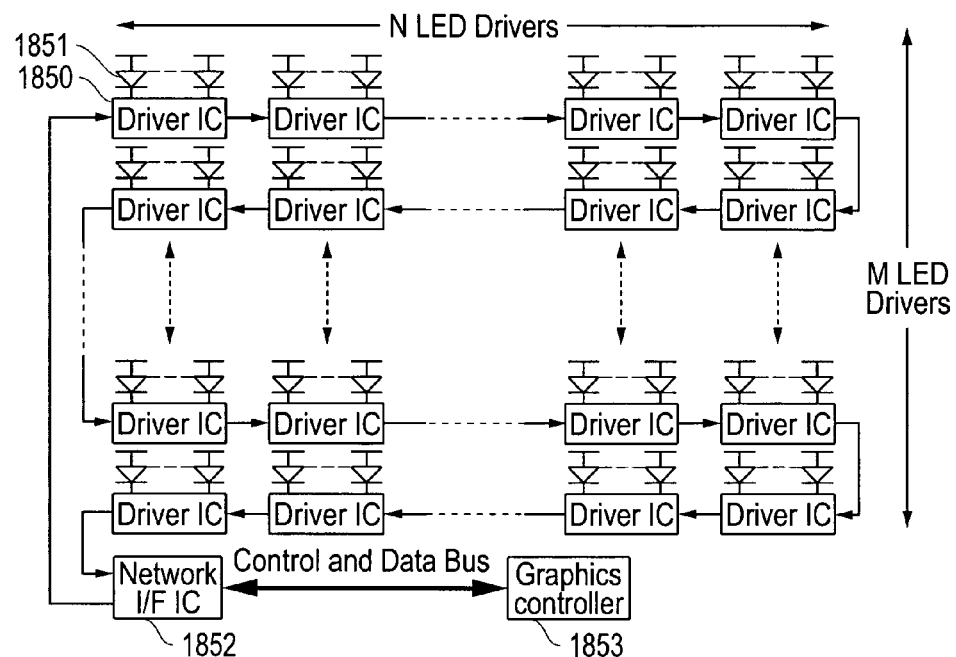
FIG. 18 (LED Display Architecture) is an exemplary LED display architecture.

FIG. 18 is an example architectural diagram for display 1411 that uses conventional discreet semiconductor LEDs, which comprises an array of LED driver ICs 1850 with associated LEDs 1851 connected serially to each other and to a network interface (I/F) IC 1852. Network interface IC 1852 connects to graphics controller 1853 through control and data busses. The array in this example has N columns and M rows of driver ICs 1850 each connected to P LEDs 1851. With P equal to 16 and three LEDs per pixel, N and M would equal 120 and 3240 respectively for an HD display with 1920×1080 resolution. For a standard 48 foot by 14 foot bill board with 3 LEDs per pixel, and P equal to 16, N would equal 48 and M would equal 672.

LED's 1851 could all be the same color or could be divided between red, green, and blue for instance. For an RGB display, the different colors could be arranged in different ways. One example is to organize the display in groups of 3 rows with each row in each group being a different color.

Graphics controller 1853 produces the data to be displayed digitally, which is forwarded to network interface IC 1852. Network interface IC 1852 serializes the data, which is sent through the chain of driver ICs 1850 in a time division multiplexed data frame. Each driver IC 1850 is assigned specific time slots from which image data is received and calibration information can be sent. The data frame repeats at the video frame rate, which enables each driver IC 1850 to update the drive current to each LED 1851.

Driver IC 1850 can further process the data to be displayed with correction coefficients that adjust the drive current to each LED 1851 such that brightness and color are uniform across display 1411. Such correction coefficients can be stored in graphics controller 1853, downloaded through network interface IC 1852 to driver ICs 1850 each time display 1411 is turned on, and updated periodically by graphics controller 1853. Such correction coefficients can be created and updated periodically over the life of display 1411 by graphics controller 1853 using individual LED photo-sensitivity parameters such Voc and Isc measured by driver ICs 1850 on commands from graphics controller 1853, for instance.

FIG. 18 is one of many possible architectural diagrams. For instance, each driver IC 1850 could be connected directly to graphics controller 1853 through a multiplexer either serially or in parallel. The LED drivers could be made from discreet components instead of driver IC 1850. The data for the LED drivers could even be communicated with analog voltages instead of digital values. Additionally, the creation and updating of correction coefficients could be performed by driver IC 1850, or processing of the data to be displayed with correction coefficients could be performed by graphics controller 1853 for instance.

Figure 19:
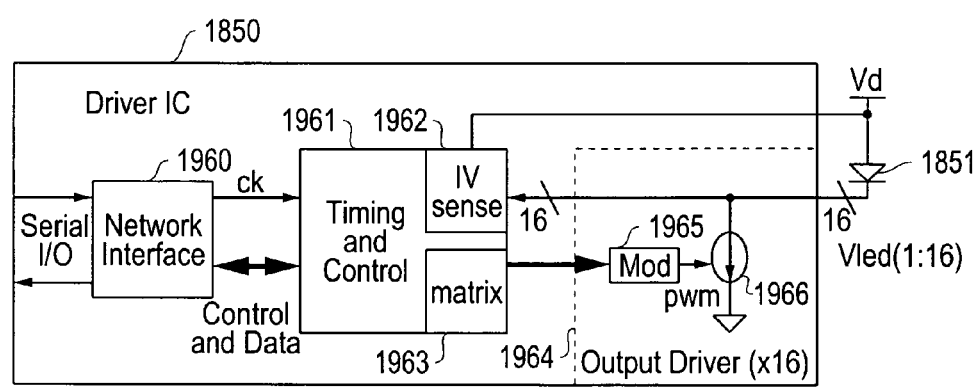
FIG. 19 (Driver IC Block Diagram) is an exemplary driver IC block diagram.

FIG. 19 is an example block diagram for driver IC 1850, which in this example drives sixteen LEDs 1851 and comprises network interface 1960, timing and control circuitry 1961, and sixteen output drivers 1964. Timing and control circuitry 1961 further comprises IV sense block 1962 and correction matrix 1963. Output driver 1964 further comprises pulse width modulator 1965, and current source 1966.

Network interface 1960 accepts serial input data from upstream and produces serial data for downstream driver ICs 1850 as shown in FIG. 18. Network interface 1960 further recovers the clock (CK) from the data, and detects and synchronizes to the input data frame timing. Most received serial data is retransmitted, however, data in the assigned timeslots are forwarded to timing and control circuitry 1961. Calibration information, such Voc and Isc, among other things is produced by timing and control circuitry 1961 and forwarded to network interface 1960 for transmission in the assigned timeslots from which LED 1851 illumination data was removed.

Timing and control circuitry 1961 manages the functionality of driver IC 1850. Illumination data for LEDs 1851 is buffered, processed, delayed, and forwarded at the appropriate time to the sixteen output drivers 1964. Such processing can include among other things adjustment of the illumination data to compensate for variations between LEDs to produce uniform brightness and color across display 1411. Matrix 1963 can comprise correction coefficients that when combined with the illumination data produce the data forwarded to output drivers 1964, which have pulse width modulators 1965 that produce logic level signals that turn current sources 1966 on and off to LEDs 1851. The frequency of such PWM signals is typically equal to the serial data frame rate and the video frame rate with the duty cycle related to the digital value from matrix 1963.

Timing and control circuitry 1961 has access to both terminals of all 16, in this example, LEDs connected to driver IC 1850 through IV sense block 1962, which among other things can measure Voc and Isc produced across LEDs 1851 in response to incident light. The anodes of all sixteen LEDs in this example can be tied together to a single supply voltage Vd, or can be connected to different supply voltages. In the case all sixteen LEDs 1851 are of one color, all anodes preferentially would be connected together. In the case such sixteen LEDs 1851 are of different colors, each such different color LED 1851 would preferentially be connected to each such different supply voltage.

FIG. 19 is just one example of many possible driver IC 1850 block diagrams. For instance, network interface 1960 would not be needed if each driver IC 1850 in FIG. 18 were directly connected to graphics controller 1853. With the serial configuration shown in FIG. 18, network interface 1960 would not need to recover a clock from data if another input was used to accept a clock input. Likewise, if a frame clock input was provided, network interface 1960 would not need to synchronize to the serial input frame timing. Additionally, the function of matrix 1963 could be performed by graphics controller 53, which would eliminate the need for such matrix 1963 in driver IC 1850. Modulator 1965 would not be needed if LEDs 1851 were driven with variable current for fixed amount of times, for instance.

Figure 20:
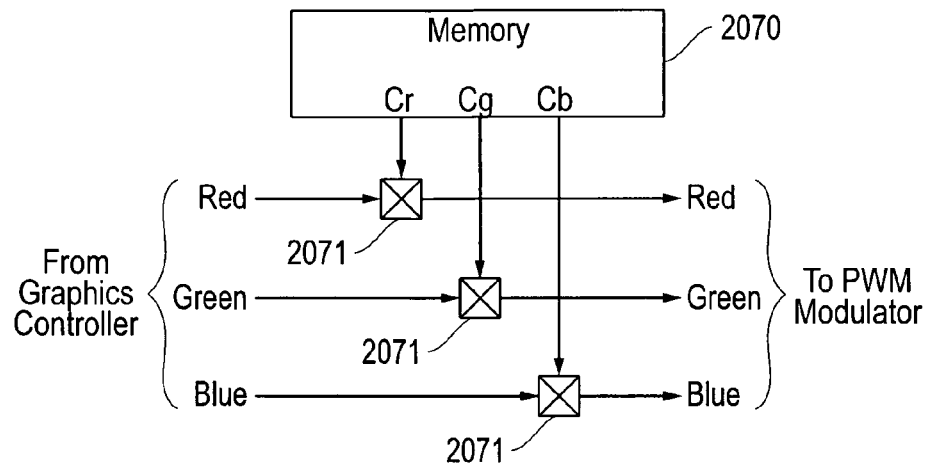
FIG. 20 (Intensity Correction Matrix Block Diagram) is an exemplary intensity correction matrix block diagram.

FIG. 20 is an example block diagram of correction matrix 1963 that can correct for variations in light intensity produced by a pixel 1412 comprising red, green, and blue LEDs 1851 to produce relatively uniform brightness and color across a display 1411. Matrix 1963 comprises memory 2070 that can store correction coefficients Cr, Cg, and Cb, which are combined by multipliers 2071 with the red, green, and blue illumination data respectively from graphics controller 1853 to produce the illumination data forwarded to modulators 1965 controlling red, green, and blue LEDs 1851 respectively. Such correction coefficients are typically relatively large, which produce adjustments in the illumination data to compensate for variations between LEDs 1851.

Memory 2070 can be made from SRAM, DRAM, FLASH, registers, or any other form of read-writable semiconductor memory. Such correction coefficients periodically can be modified by graphics controller 1853, driver IC 1850, or any other processing element in display 1411 to adjust for changes in LED 1851 characteristics for instance over temperature or lifetime. Typically, such correction coefficients are downloaded into memory 2070 from graphics processor 1853 every time display 1411 is turned on. Such correction coefficients are typically modified to compensate for LED 1851 aging effects by graphics controller 1853 or driver IC 1850 after some fixed number of hours of use, after every use, or on demand.

Multipliers 2071 scale the illumination data from graphics controller 1853 by multiplying each color component by the corresponding correction coefficient. Such multiplication can be performed by discreet hardware in bit parallel or bit serial form, in an embedded microcontroller, or by any other means. Preferentially, one hardware multiplier comprising a shifter and an adder performs all three multiplications each video frame. As such, FIG. 20 is just one of many possible block diagrams for correction matrix 1963.

Figure 21:
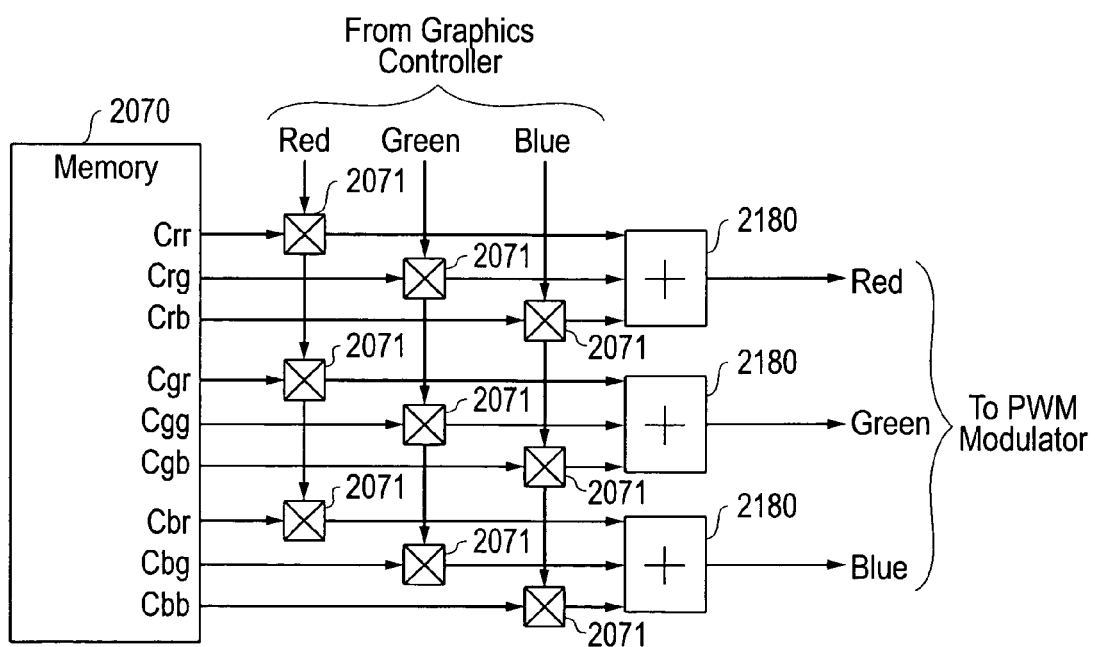
FIG. 21 (Intensity and Wavelength Correction Matrix Block Diagram) is an exemplary intensity and wavelength correction matrix block diagram.

FIG. 21 is an example block diagram for correction matrix 1963 that can correct for variations in both light intensity and wavelength produced by a pixel 1412 comprising red, green, and blue LEDs 1851 to produce uniform brightness and color across a display 1411. Matrix 1963 comprises memory 2070 that can store nine correction coefficients with three such coefficients for each color component produced. Coefficients Crr, Cgg, and Cbb would typically be effectively the same as Cr, Cg, and Cb from FIG. 20 to adjust for intensity variations in LEDs 1851, while the remaining coefficients (Crg, Crb, Cgr, Cgb, Cbr, Cbg) compensate for wavelength variations.

For instance, if the red illumination data from graphics controller 1853 was intended for an LED 1851 with a wavelength of 650 nm and the connected LED 1851 wavelength was exactly 650 nm, coefficients Cgr and Cbr would be zero and Crr would be close to one. If such connected LED 1851 wavelength was 640 nm and had the same intensity as the just previous example, Crr would be slightly smaller than in the just previous example and Cgr and Cbr would be non-zero, which would produce some light from such green and blue LEDs 1851. The wavelength of the combination of light from such red, green, and blue LEDs 1851 would be perceived the same as mono-chromatic light from a single red LED 1851 emitting at precisely 650 nm.

Memory 2070 and multipliers 2071 can operate and be implemented as described for FIG. 20. Adder 2180 sums the multiplication results from the three connected multipliers 2071 to produce the illumination data forwarded to modulators 1965. Such adders 2080 can be implemented in hardware or software, or be performed bit parallel or bit serial. Preferentially, such three adders 2080 are implemented with common bit serial hardware that performs such three additions sequentially each video frame. As such FIG. 21 is just one of many possible intensity and wavelength correction matrix 1963 block diagrams.

Figure 22:
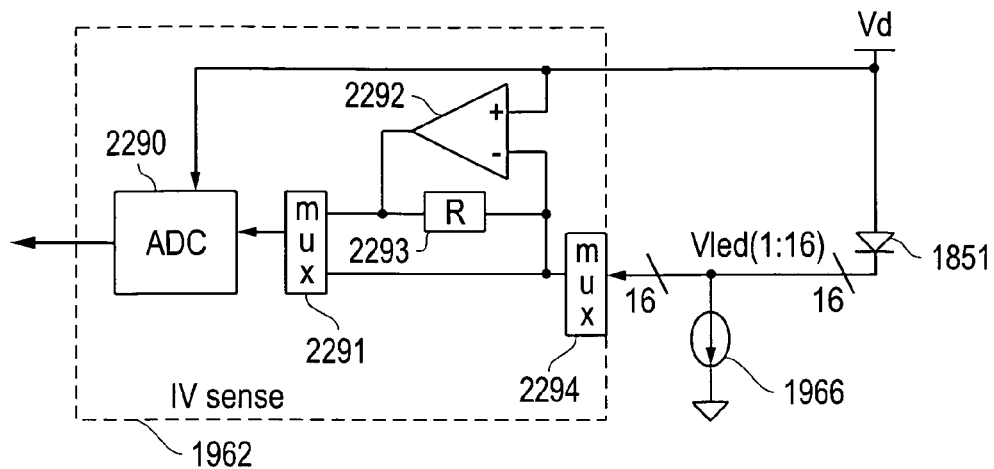
FIG. 22 (IV Sense Block Diagram) is an exemplary current and voltage sense block diagram.

FIG. 22 is an example block diagram of IV sense block 1962 in timing and control block 1961 of driver IC 1850, which can measure LED 1851 photo-sensitivity parameters, such as Voc and Isc, when current source 1966 is off. Following the example in FIG. 18, the anodes of sixteen LEDs 1851 represented by the signals Vled(1:16) are connected to multiplexer 2294 with one such Vled signal selected to pass through. Such output of multiplexer 2294 is connected to an input of multiplexer 2291 and to the negative terminal of amplifier 2292 and resistor 2293. Such multiplexers 2291 and 2294 comprise switches that connect input to output and allow current to flow in both directions for the selected input. The output of amplifier 2292 is also connected to multiplexer 2291 the output of which is connected to analog to digital converter (ADC) 2290.

Amplifier 2292 and resistor 2293 form a trans-impedance amplifier which forces the anode of the LED 1851 selected by multiplexer 2294 to the same voltage as signal Vd, which is connected to the positive terminal of amplifier 2292. The resulting current flows through resistor 2293 producing a voltage proportional to the selected LED 1851 short circuit current Isc, which can be digitized by ADC 2290 if selected by multiplexer 2291. Alternatively, the open circuit voltage Voc of the LED 1851 selected by multiplexer 2294 can be digitized by ADC 2290 if multiplexer 2291 selects such signal. The power supply for N sense block 1962 is made to be higher than Vd since the output of amplifier 2292 may go higher than Vd.

FIG. 22 is just one of many possible block diagrams for circuitry to measure photo-sensitivity parameters of LEDs 1851. For instance, a range of LED 1851 current and voltage characteristic could be measured by controlling the positive input to amplifier 2292 with a digital to analog converter (DAC). If each LED 1851 had a dedicated IV sense block 1962, no multiplexer 2294 would be needed. Additionally, Voc could be measured by adjusting the voltage on the positive terminal of amplifier 2292 until no current flows through resistor 2293. Further, switched capacitor and sample and hold techniques could be implemented which would have a completely different architecture.

Figure 23:
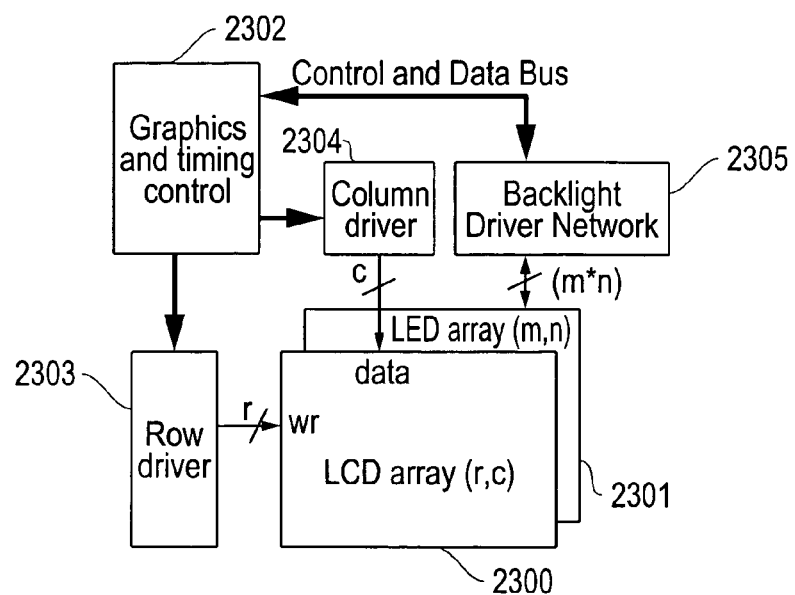
FIG. 23 (LCD Display with LED Backlight Block Diagram) is an exemplary LCD display with LED backlight block diagram.

FIG. 23 is an example block diagram of display 1411 implemented with a liquid crystal display (LCD) and an LED backlight, which comprises LCD array 2300, LED array 2301, graphics and timing control circuitry 2302, row driver 2303, column driver 2304, and backlight driver network 2305. In this example, LCD array 2300 has R rows and C columns of elements with row driver 2303 producing R number of WR signals and column driver 2304 producing C number of DATA signals. Graphics and timing control circuitry 2302 provide data and timing to both row driver 2303 and column driver 2304 in a similar manner to an OLED display as described in FIG. 15.

In this example, LED array 2301 comprises M rows and N columns of LEDs driven by backlight driver network 2305, which comprises a number of LED driver ICs connected together as in the LED display illustrated in FIG. 18. LCD array 2300 comprises pixel elements that control the amount of light that can pass through. LED array 2301 produces the light that is selectively passed through LCD array 2300. When photo-sensitivity parameters, such as Voc and Isc of LEDs 1851 in LED array 2301 are measured, row driver 2303 and column driver 2304 configure LCD array 2300 to be transparent.

FIG. 23 is just one of many possible block diagrams for display 1411 based on LCD and LED backlighting technology. For instance, all LED elements in LED array 2301 could be directly connected to graphics and timing control circuitry 2302 through a multiplexer instead of backlight driver network 2305.

Figure 24:
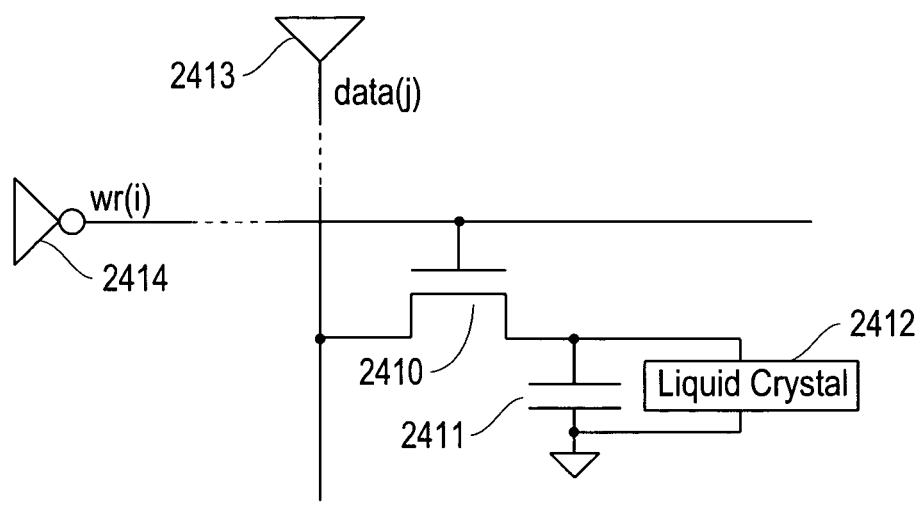
FIG. 24 (LCD Pixel and Driver Circuit Diagram) is an exemplary LCD pixel and driver circuit diagram.

FIG. 24 is an example circuit diagram for the LCD pixel element in LCD array 2300 and the associated row driver 2303 and column driver 2304, which comprises transistor 2410, capacitor 2411, liquid crystal 2412, buffer amplifier 2413, and inverter 2414. Such pixel element is repeated horizontally C times and vertically R times to produce LCD array 2300, with each row of pixel elements controlled by a WR signal from an inverter 2414 in row driver 2303 and each column of pixel elements connected to a single DATA signal from buffer amplifier 2413 in column driver 2304.

The transparency of liquid crystal 2412 is controlled by the voltage across capacitor 2411, which is set by driving DATA (j) with the desired voltage and then pulsing WR(i) high to make transistor 2410 conductive. When WR(i) is high, capacitor 2411 is charged to the voltage on DATA(J), which is driven by buffer amplifier 2413. When photo-sensitivity parameters, such as Voc and Isc of LEDs 1851 in LED array 2301 are measured, liquid crystal 2412 for every pixel element in LCD array 2300 is made transparent by preferentially setting all WR signals high simultaneously and setting the voltage on all DATA signals to the value that makes liquid crystal 2412 transparent.

FIG. 24 is just one of many possible LCD array 2300, row driver 2303, and column driver 2304 circuit diagrams. For instance, some pixel elements contain multiple transistors to compensate for transistor 2410 variations and speed up the write process.

Numerous variations and modifications will become apparent to those skilled in the art once the above disclosure is fully appreciated.

Third Embodiment

LED calibration systems and related methods are also disclosed that use the photo-sensitivity of LEDs to correct for variations between LEDs during initial production and over the lifetime of systems using LEDs. Various embodiments are described with respect to the drawings below. Other features and variations can also be implemented, if desired, and related systems and methods can be utilized, as well.

In part, the disclosed embodiments relate to using the photo-sensitivity of an LED to determine emission parameters such as intensity and wavelength. Applications for the disclosed embodiments include solid state lamps, LCD backlights, and LED displays for instance. Variations in LED brightness and wavelength should be compensated for in order for such devices to have uniform color and brightness. Such compensation, which is typically done by measuring the optical output of each individual LED with a camera or purchasing specially tested LEDs, is performed by simply measuring the signal induced on each LED by light from other LEDs in the device or from an additional light source.

The disclosed embodiments include methods to set the color or color temperature produced by a group of LEDs during the manufacturing of a device such as a lamp, an LED display, or an LCD backlight, and maintaining such color or color temperature over the operating life of such a device. The methods involve measuring the intensity and wavelength of light produced by each LED within a group of LEDs and adjusting the amount of light generated by each LED to produce precise color and intensity from the group of LEDs.

Two methods that operate some of the LEDs in photovoltaic or photoconductive mode to measure the light intensity produced by other LEDs in the group are presented. The first method that uses an additional light source as a reference determines the light intensity emitted from each LED relative to such reference, while the second method determines the light intensity emitted from each LED relative to each other. As such, the first method can produce a precise color and intensity from each group of LEDs, while the second method can only produce a precise color.

Both intensity measurement methods typically comprise two steps and can be used to calibrate devices during both manufacturing and over lifetime. The first step of the first method illustrated in FIGS. 25A-D and the first step of the second method illustrated in FIG. 27A-D can be performed in a manufacturing environment on a special control device that has all LEDs manually adjusted to produce the desired light intensities. The results of the first step on such control device are then used in the second step of the first method illustrated in FIGS. 26A-D and the second step of the second method illustrated in FIGS. 28A-D on production devices to determine the actual emitted light intensities.

Both intensity measurement methods can also be used to maintain a precise color produced by a group of LEDs and uniform intensity from an array of groups of LEDs, for instance pixels in an LED display, LCD backlight, or LED lamp, over time. The first step of both methods is typically performed on a device after such device has been calibrated during manufacturing and the second step is performed in the field at periodic intervals. The reference light source for the first intensity measurement method can be ambient light.

Emission intensity is measured in all cases by measuring the photocurrent produced in the longest wavelength LED within the group of LEDs by light from the other LEDs and in the first method from an additional reference light source. For instance, in an LED array for an LED display or backlight, according to the example shown for the first method, the red LED in a pixel measures the light from the blue and green LEDs in the same pixel, and from the reference light source. Next, the red LED in an adjacent pixel measures the light from the first red LED and the reference light source. Such measured light can be reflected off a mirror for an LED display during manufacturing or off the waveguide or diffuser in an LED backlight for instance. In the field, such light can be scattered by the LED packages or enclosures or by any other means.

In the example shown for the second method, which includes two red LEDs and one white LED in an LED lamp for instance, a first red LED measures the light from a second red LED and from the white LED. Next, light from the second LED measures the light from the first LED and from the white LED. Both the first and second intensity measurement methods can be used for any groups of LEDs in any types of products with the difference between the methods being the presence or absence of a reference light source. The second method could be used in an LED display or backlight to produce precise color and uniform intensity from all pixels by daisy chaining the measurements sequentially across such LED array.

The example intensity measurement methods are divided into two steps which measure the differences in relative intensity between a known good measurement and the unknown measurement. For instance, during manufacturing, a control device with the desired output intensities is measured to determine what the relative photocurrents should be. Using the first method, the ratios of the photocurrent in a first LED produced by the light from the other LEDs over the photocurrent produced by the reference light source generate coefficients used for the second step. Provided the ratio of intensities from the reference light source in the first and second steps is known, the unknown LED intensities in the second step can be determined. Likewise, using the second method, the ratios of photocurrents induced on one LED by the two other LEDs in a calibrated control device generate coefficients used in the second step. In the second step, the difference in the ratios from the first step determines the difference in relative unknown intensities between the two LEDs.

When the first or second method is used to calibrate a device over time, the first step determines what ratios of photocurrents should be and over time the second step determines what they are. The change in such ratios determines the change in actual emission intensity. Since only ratios of currents measured at one time are compared to ratios of currents at another time, any changes in operating conditions cancel out. For instance, such measurements are independent of temperature differences.

Figures 31A, 31B, 31C:
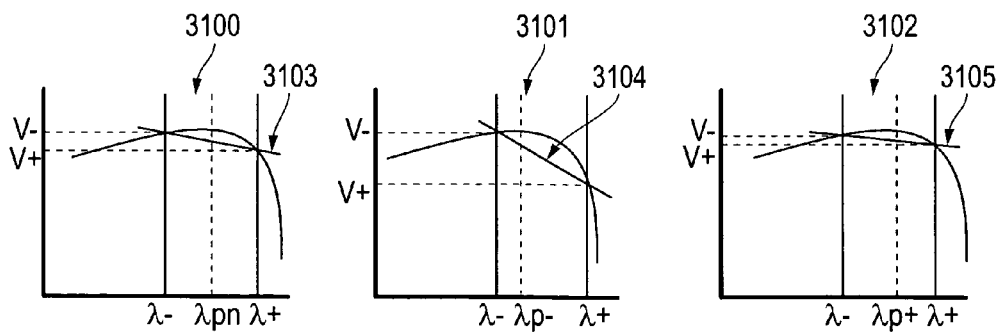
FIG. 31A-C illustrate an exemplary method to determine the peak emission wavelength of light produced by an LED by measuring the photo-sensitivity of the LED.

The method presented to measure emission wavelength illuminates each LED with two different wavelengths of lights, such as a light wavelength slightly above and below the anticipated peak emission wavelength range, and measures the resulting photocurrent. Since the responsivity of an LED drops off dramatically for incident wavelengths longer than the peak emission wavelength, the difference in induced photocurrents is directly related to the peak emission wavelength. FIGS. 31A-C provide a graphical illustration of LED responsivity as a function of incident wavelength and the resulting photocurrent differences.

Since LED emission wavelength does not vary significantly over time, such wavelength measurements can just be performed on a production line. As in the two emission intensity methods, such wavelength measurement should first be done on a control device with known emission intensity to calibrate the production test setup. Subsequent measurements of devices with unknown emission wavelengths, will be relative to the control device results.

Figure 29:
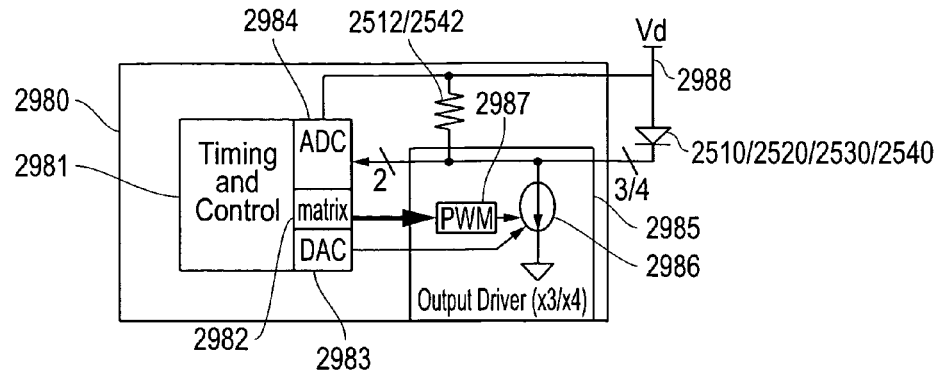
FIG. 29 is an exemplary block diagram for circuitry to implement the methods illustrated in FIGS. 25A-D, 26A-D, 27A-D and 28A-D.
Figure 30:
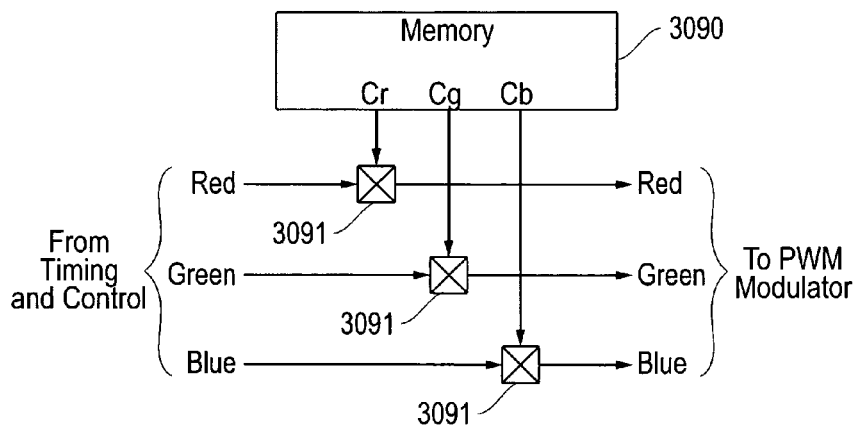
FIG. 30 is an exemplary block diagram a color correction matrix that compensates for LED intensity variations.
Figure 32:
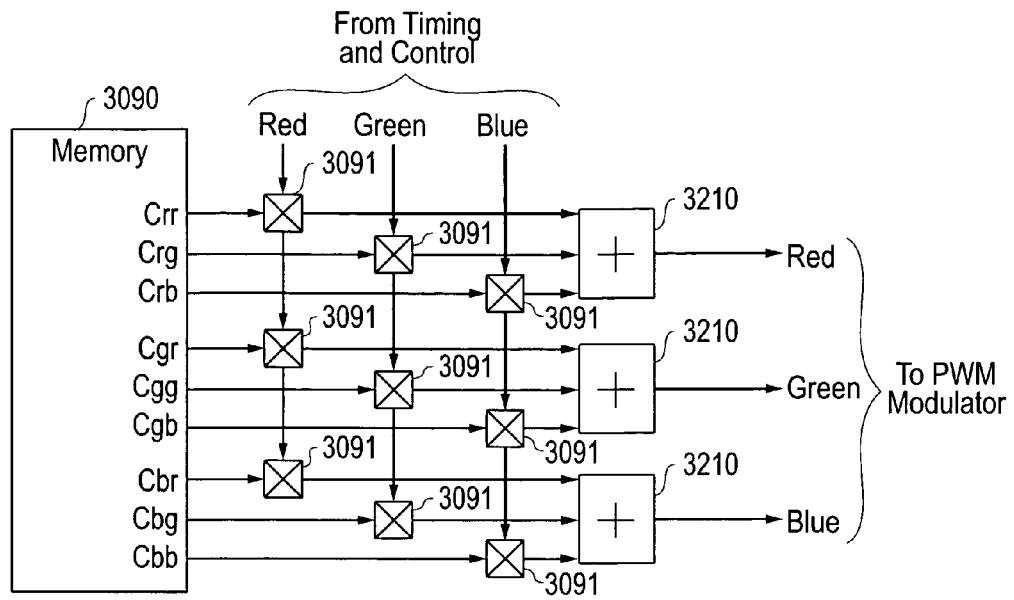
FIG. 32 is an exemplary block diagram for a color correction matrix that compensates for LED intensity and wavelength variations.

Once the emission wavelengths and the emission intensity or relative emission intensity between a group of LEDs is known, color correction coefficients can be determined that adjust the emission intensity of light from each LED within a group of LEDs to produce a precise color and optionally a precise intensity from such group of LEDs. FIG. 29 illustrates hardware to implement the calibration methods. FIG. 30 illustrates color correction coefficients and hardware to correct for emission intensity variations, while FIG. 32 illustrates such coefficients and hardware to correct for both emission intensity and wavelength variations between the red, green, and blue LEDs associated with a pixel in an LED display or a triplet in an LCD backlight.

Figure 33:
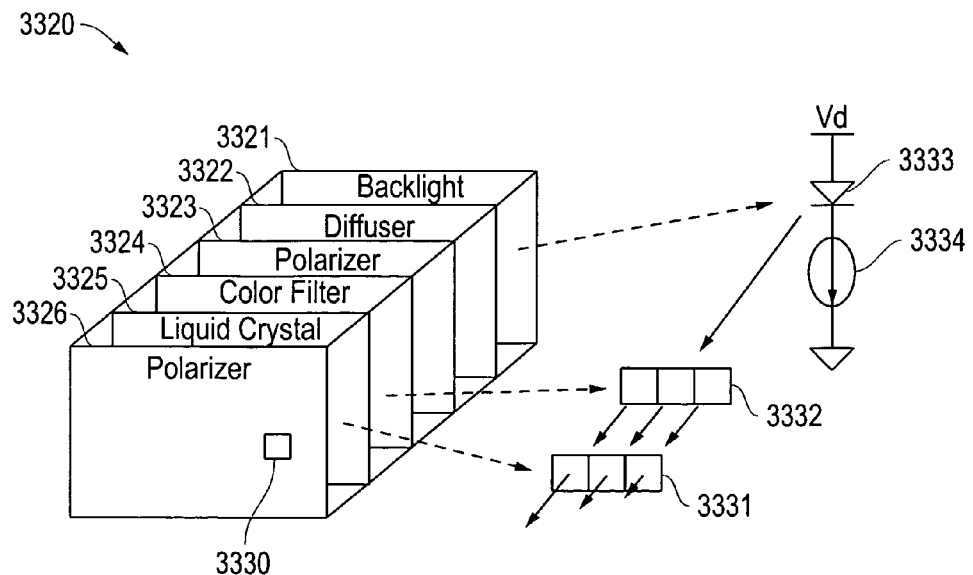
FIG. 33 is a simplified example block diagram for a typical LCD.
Figure 34:
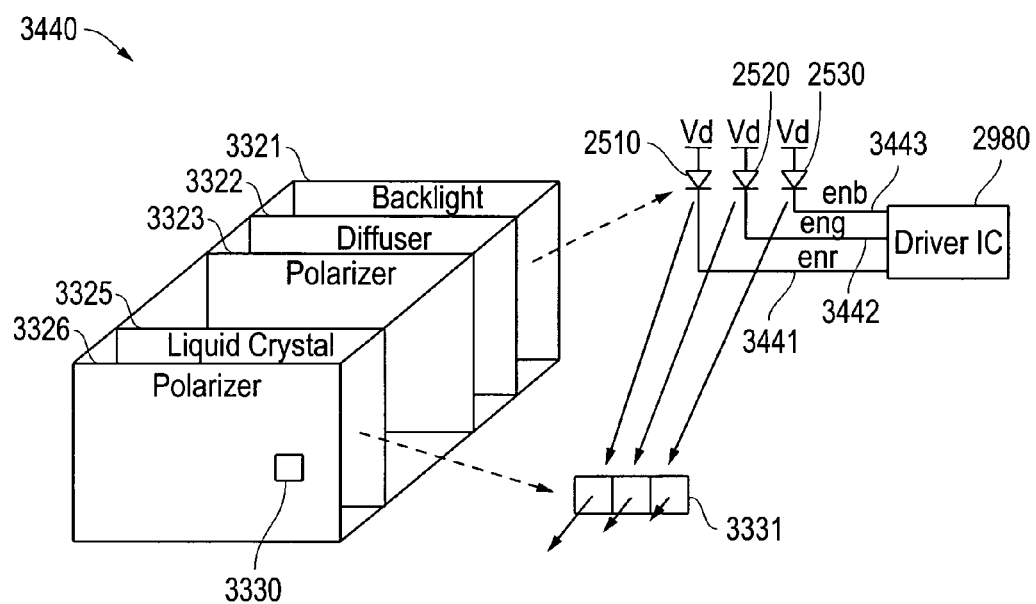
FIG. 34 is a simplified example block diagram for a Field Sequential Color (FSC) LCD.

Although such calibration methods are appropriate for any devices that contain groups of LEDs, of particular interest are LCDs that use Field Sequential Color (FSC). FIG. 33 illustrates a simplified block diagram of a conventional LCD, while FIG. 34 illustrates such a diagram for a FSC LCD. While a conventional LCD has white backlight that is filtered into red, green, and blue components by special color filters, a FSC LCD eliminates the costly color filters and sequences each color component at three times the conventional frame rate or more. Such FSC LCDs require red, green, and blue backlights and as such are a primary application for the color calibration methods described herein.

The improved methods herein address problems associated with devices using groups of different colored LEDs directly or as backlights for illumination. Such calibration methods reduce the need for specially binned LEDs for the production of lamps, displays, or backlights, and maintain the color or color temperature of the light produced over the operating life of the device.

As stated above, this third embodiment can also be used with the techniques, methods and structures described with respect to the other embodiments described herein. For example, the calibration and detection systems and methods described with respect to this embodiment can be used within the other described embodiments, as desired. Further, the various illumination devices, light sources, light detectors, displays, and applications and related systems and methods described herein can be used with respect to calibration and detection systems and methods described in this third embodiment, as desired. Further, as stated above, the structures, techniques, systems and methods described with respect to this third embodiment can be used in the other embodiments described herein, and can be used in any desired lighting related application, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications.

Turning now to the drawings, FIGS. 25A-D in association with FIGS. 26A-D illustrate one possible method for calibrating the intensity of light produced by each LED within a group of LEDs to produce a specific blended color. Such group of LEDs could be any combination of colors, but as an example comprise red, green, and blue LEDs. Specifically, in such example, LEDs 2510, 2520, and 2530 could comprise the red, green, and blue light sources respectively in an LED display pixel or LCD backlight triplet. LED 2540 comprises the red light source in an adjacent LED display pixel or backlight triplet.

FIGS. 25A-D illustrate the first step in such calibration method, which can be performed on one special device comprising such group of LEDs that is representative of many such devices produced on a manufacturing line for instance. Alternatively, such first step could be performed on a device that is to be re-calibrated some time later using the second step in such calibration method illustrated in FIGS. 26A-D.

The following equations are associated with FIGS. 25A-D. In particular, equations 1 and 2 are associated with FIG. 25A. Equations 3A and 3B are associated with FIG. 25B. Equations 4A and 4B are associated with FIG. 25C. And equations 5A and 5B are associated with FIG. 25D.

$$V_{r0n} = E_0 R_{r0} \quad [\text{EQ. 1}]$$

$$V_{r1n} = E_0 R_{r1} \quad [\text{EQ. 2}]$$

$$V_{r0gn} = E_{gd} R_{r0} C_{r0g} = E_{gd}(V_{r0n}/E_0)C_{r0g} \quad [\text{EQ. 3A}]$$

$$C_{r0g} = (V_{r0gn}/V_{r0n})(E_0/E_{gd}) \quad [\text{EQ. 3B}]$$

$$V_{r0bn} = E_{bd} R_{r0} C_{r0b} = E_{bd}(V_{r0n}/E_0)C_{r0b} \quad [\text{EQ. 4A}]$$

$$C_{r0b} = (V_{r0bn}/V_{r0n})(E_0/E_{bd}) \quad [\text{EQ. 4B}]$$

$$V_{r1r0n} = E_{r0d} R_{r1} C_{r1r0} = E_{r0d}(V_{r1n}/E_0)C_{r1r0} \quad [\text{EQ. 5A}]$$

$$C_{r1r0} = (V_{r1r0n}/V_{r1n})(E_0/E_{r0d}) \quad [\text{EQ. 5B}]$$

Figure 25A:
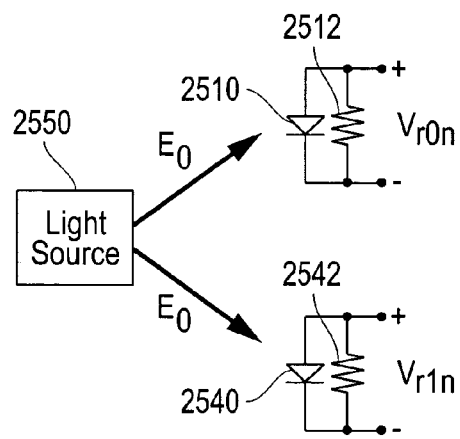
FIGS. 25A-D illustrate a first step in an exemplary method for determining the optical power emitted from a group of LEDs using the photo-sensitivity of such LEDs and an additional light source.
Figure 25B:
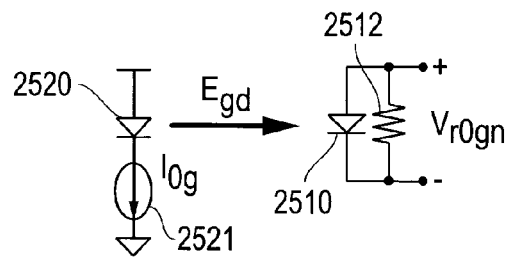
Figure 25C:
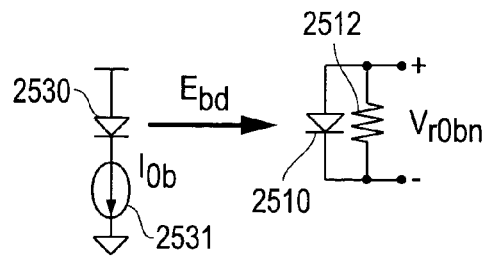
Figure 25D:
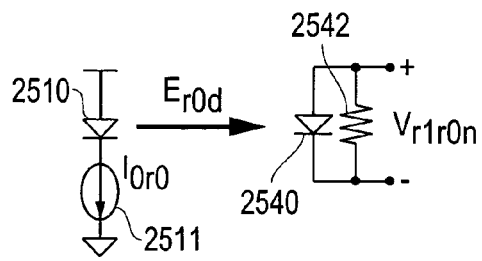

The light emitted from LEDs 2510 (red), 2520 (green), and 2530 (blue) is adjusted by varying current sources 2511, 2521, and 2531 to produce the desired light intensities $E_{gd}$, $E_{bd}$, and $E_{r0d}$ from the green, blue, and red LEDs 2520, 2530, and 2510 respectively as shown in FIGS. 25B-D. Light source 2550 is adjusted to produce a fixed intensity $E_0$, which illuminates LEDs 2510 and 2540, induces photocurrents proportional to incident light intensity, and produces the nominal voltages $V_{r0n}$ and $V_{r1n}$ across resistors 2512 and 2542 respectively as shown in FIG. 25A. Likewise, LEDs 2520 and 2530 illuminate LED 2510 as shown in FIGS. 25B-C and LED 2510 illuminates LED 2540 as shown in FIG. 25D to produce the nominal voltages $V_{r0gn}$, $V_{r0bn}$ and $V_{r1r0n}$ respectively across resistors 2512 and 2542. Preferably, the resistance of resistors 2512 and 2542 should be small enough such that the induced voltages do not significantly forward bias LEDs 2510 and 2540.

The responsivities $R_{r0}$ and $R_{r1}$ of LEDs 2510 and 2540 to incident light from light source 2550 as shown in equations 1 and 2 respectively are equal to the ratios of the induced voltages $V_{r0n}$ and $V_{r1n}$ over the incident light intensity E0. As shown in equations 3A-B, the voltage $V_{r0gn}$ induced across resistor 2512 by light from LED 2520 is equal to the light intensity $E_{gd}$ times such responsivity $R_{r0}$ times a correction coefficient $C_{r0g}$. Likewise, as shown in equations 4A-B, the voltage $V_{r0bn}$ induced across resistor 2512 by light from LED 2530 is equal to the light intensity $E_{bd}$ times such responsivity $R_{r0}$ times the correction factor $C_{r0b}$. Such correction factors $C_{r0g}$ and $C_{r0b}$ take into account differences in emitted light wavelength and optical attenuation between light from light source 2550, LED 2520, and LED 2530 and incident on LED 2510. For instance, light source 2550 could produce red light while LED 2520 and 2530 produce green and blue respectively. Additionally, light source 2550 could shine directly on LED 2510 while light from LEDs 2520 and 2530 could be indirect since such LEDs could be mounted adjacent to each other. Alternatively, light from LEDs 2510, 2520, and 2530 could be reflected by a mirror in the case of an LED display or by a light diffusion film in the case of an LCD backlight. As shown in equation 3B, when equation 3A is combined with equation 1, such correction coefficient $C_{r0g}$ is equal to the ratio of the measured voltages $V_{r0gn}$ over $V_{r0n}$ times the ratio of the known light intensities $E_0$ over $E_{gd}$. Likewise, when equation 1 is substituted into equation 4A, $C_{r0b}$ is expressed as a function of measured voltages and known light intensities as shown in equation 4B.

As in equations 3A-B and 4A-B, equations 5A-B relate the nominal voltage $V_{r1r0n}$ induced across resistor 2542 by light from LED 2510 with the desired intensity $E_{r0d}$. Substituting equation 2 into equation 5A results in the correction factor $C_{r1r0}$ being expressed as a function of measured voltages and known light intensities as shown in equation 5B.

With known values for such correction coefficients from a device, such as an LED display or LCD backlight, with emitted intensities adjusted to the desired values, the color point of such devices can be adjusted to a fixed point on a manufacturing line and maintained in the field following the second step in the calibration process illustrated in FIGS. 26A-D. The procedure illustrated in FIGS. 26A-D is performed on a different device with LEDs 2510, 2520, and 2530 emitting unknown intensities $E_{r0}$, $E_g$, and $E_b$ respectively and light source 2550 emitting either the same or known intensity on a manufacturing line for instance or an unknown intensity in the field from ambient light for instance.

The following equations are associated with FIGS. 26A-D. In particular, equations 6 and 7 are associated with FIG. 26A. Equations 8A, 8B and 8C are associated with FIG. 26B. Equations 9A, 9B and 9C are associated with FIG. 26C. And equations 10A, 10B and 10C are associated with FIG. 26D.

$V_{r0} = E_1 R_{r0}$ [EQ. 6]

$V_{r1} = E_1 R_{r1}$ [EQ. 7]

$V_{r0g} = E_g R_{r0} C_{r0g} = E_g (V_{r0}/E_1) C_{r0g}$ [EQ. 8A]

$V_{r0g} = E_g (V_{r0}/E_1)(V_{r0gn}/V_{r0n})(E_o/E_{gd})$ [EQ. 8B]

$E_g/E_{gd} = (V_{r0g}/V_{r0})(V_{r0n}/V_{r0gn})(E_1/E_o)$ [EQ. 8C]

$V_{r0b} = E_b R_{r0} C_{r0b} = E_b (V_{r0}/E_1) C_{r0b}$ [EQ. 9A]

$V_{r0b} = E_b (V_{r0}/E_1)(V_{r0bn}/V_{r0n})(E_o/E_{bd})$ [EQ. 9B]

$E_b/E_{bd} = (V_{r0b}/V_{r0})(V_{r0n}/V_{r0bn})(E_1/E_o)$ [EQ. 9C]

$V_{r1r0} = E_{r0} R_{r1} C_{r1r0} = E_{r0}(V_{r1}/E_1) C_{r1r0}$ [EQ. 10A]

$V_{r1r0} = E_{r0}(V_{r1}/E_1)(V_{r1r0n}/V_{r1n})(E_o/E_{r0d})$ [EQ. 10B]

$E_{r0}/E_{r0d} = (V_{r1r0}/V_{r1})(V_{r1n}/V_{r1r0n})(E_1/E_o)$ [EQ. 10C]

Equations 6 and 7 relate the responsivities $R_{r0}$ and $R_{r1}$ of LEDs 2510 and 2540 respectively to the intensity E1 emitted by light source 2550. Equation 8A shows the voltage $V_{r0g}$ induced across resistor 2512 by the unknown light intensity $E_g$ from LED 2520 being equal to $E_g$ times $R_{r0}$ times the correction coefficient $C_{r0g}$. Substituting equation 6 into equation 8A and replacing $C_{r0g}$ with equation 3 results in the ratio of the actual emitted intensity $E_g$ over the desired emitted intensity $E_{gd}$ equal to the ratio of the measured voltages $V_{r0g}$ over $V_{r0}$ times the ratio of the nominal voltages $V_{r0n}$ over $V_{r0gn}$ measured as illustrated in FIGS. 25A-D times the ratio of intensities $E_1$ over $E_o$ emitted by light source 2550, as shown in equations 8B an 8C. Likewise, equations 9A-C and 10A-C express the ratios of the unknown intensities $E_b$ and $E_{r0}$ over the desired intensities $E_{bd}$ and $E_{r0d}$ respectively as a function of measured voltages and known light intensities emitted from light source 2550.

Since the light intensity produced by an LED changes over time, a device such as an LED display or an LCD backlight with red, green, and blue LEDs, should be re-calibrated after some time to maintain the precise color calibrated during production of such device. In such a field re-calibration light source 2550 may be daylight or office ambient light of unknown intensity. In such cases, the ratio E1 over E0 is unknown but is the same for equations 8A-C, 9A-C, and 10A-C so the relative intensity of light produced by LEDs 2510, 2520, and 2530, and consequently the color can be maintained. Likewise, the intensity of light produced by all such pixels or backlight triplets can be kept uniform since the ratio of E1 over E0 should be the same for all such pixels or triplets.

FIGS. 27A-D in association with FIGS. 28A-D illustrate a method of calibrating the light produced by a group of LEDs 2510, 2520, and 2540 to produce a fixed color similar to such method illustrated in FIGS. 25A-D and 26A-D but without the reference light source 2550. In the method illustrated in FIGS. 27A-D and 28A-D the relative intensity of light produced by each LED can be controlled but not the absolute intensity of the group of LEDs 2510, 2520, and 2540. In this example, LEDs 2510 and 2540 are shown to be red, while LED 2520 is shown to be a white LED. An example application for such a group of LEDs is a lamp emitting white light with a low color temperature similar to that of an incandescent light bulb.

The following equations are associated with FIGS. 27A-D. In particular, equations 11, 12, 13A and 13B are associated, with FIGS. 27A-B. And equations 14, 15, 16A and 16B are associated with FIGS. 27C-D.

$V_{r0wn} = E_{wd} R_{r0} C_{r0w}$ [EQ. 11]

$V_{r0r1n} = E_{r1d} R_{r0} C_{r0r1}$ [EQ. 12]

$V_{r0wn}/V_{r0r1n} = (E_{wd}/E_{r1d})(C_{r0w}/C_{r0r1})$ [EQ. 13A]

$C_{r0w}/C_{r0r1} = (V_{r0wn}/V_{r0r1n})(E_{r1d}/E_{wd})$ [EQ. 13B]

$V_{r1wn} = E_{wd} R_{r1} C_{r1w}$ [EQ. 14]

$V_{r1r0n} = E_{r0d} R_{r1} C_{r1r0}$ [EQ. 15]

$V_{r1wn}/V_{r1r0n} = (E_{wd}/E_{r0d})(C_{r1w}/C_{r1r0})$ [EQ. 16A]

$C_{r1w}/C_{r1r0} = (V_{r1wn}/V_{r1r0n})(E_{r0d}/E_{wd})$ [EQ. 16B]

The following equations are associated with FIGS. 28A-D. In particular, equations 17, 18, 19A and 19B are associated with FIGS. 28A-B. And equations 20, 21, 22A, 22B and 23 are associated with FIGS. 28C-D.

$V_{r0w} = E_w R_{r0} C_{r0w}$ [EQ. 17]

$V_{r0r1} = E_{r1} R_{r0} C_{r0r1}$ [EQ. 18]

$V_{r0r1}/V_{r0w} = (E_{r1}/E_w)(C_{r0r1}/C_{r0w})$ [EQ. 19A]

$E_{r1}/E_w = (V_{r0r1}/V_{r0w})(C_{r0w}/C_{r0r1}) = (V_{r0r1}/V_{r0w})(V_{r0wn}/V_{r0r1n})(E_{r1d}/E_{wd})$ [EQ. 19B]

$V_{r1w} = E_w R_{r1} C_{r1w}$ [EQ. 20]

$V_{r1r0} = E_{r0} R_1 C_{r1r0}$ [EQ. 21]

$V_{r1r0}/V_{r1w} = (E_{r0}/E_w)(C_{r1r0}/C_{r1w})$ [EQ. 22A]

$E_{r0}/E_w = (V_{r1r0}/V_{r1w})(C_{r1w}/C_{r1r0}) = (V_{r1r0}/V_{r1w})(V_{r1wn}/V_{r1r0n})(E_{r0d}/E_{wd})$ [EQ. 22B]

$E_{r0}/E_{r1} = (E_{r0}/E_w)/(E_{r1}/E_w)$ [EQ. 23]

The first step in such calibration method as shown in FIGS. 27A-D is to adjust current sources 2511, 2521, and 2541 to produce the desired light intensities $E_{r0d}$, $E_{wd}$, and $E_{r1d}$ from LEDs 2510, 2520, and 2540 respectively as shown in FIGS. 27A-D. Then the light from LED 2520 and LED 2540 are measured by LED 2510, which produce the nominal voltages $V_{r0wn}$ and $V_{r0r1n}$ respectively across resistor 2512 as shown in FIGS. 27A and 27B. Equations 11 and 12 illustrate the relationship between such voltages, emitted powers, responsivity, and correction factors. Equations 13A-B take the ratio of equation 11 over 12 to produce the ratio of correction coefficients $C_{r0w}$ over $C_{r0r1}$ expressed as a function of the ratio of nominal voltages $V_{r0wn}$ over $V_{r0r1n}$ times the ratio of desired emission intensities $E_{r1d}$ over $E_{wd}$.

Next the light from LEDs 2520 and 2510 are measured by LED 2540, which produce the nominal voltages $V_{r0wn}$ and $V_{r0r1n}$ respectively across resistor 2542 as shown in FIGS. 27C and 27D. Equations 14 and 15 relate such voltages to emitted powers, responsivity, and correction factors. Equations 16A-B take the ratio of equation 14 over 15 to produce the ratio of correction coefficients $C_{r1w}$ over $C_{r1r0}$. Once such ratios of correction coefficients are known, the relative intensities of light produced by similar such devices on a manufacturing line can be determined and adjusted to produce a desired color. Likewise, such devices can be re-calibrated in the field after use to maintain the desired color.

Figure 28A:
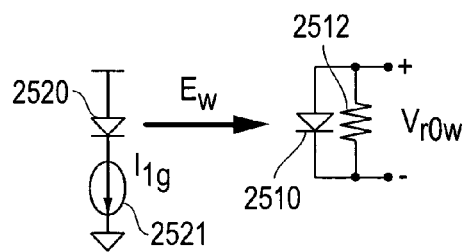
FIG. 28A-D illustrate a second step an exemplary method for determining the relative optical power emitted from a group of LEDs using the photo-sensitivity of such LEDs without an additional light source.
Figure 28B:
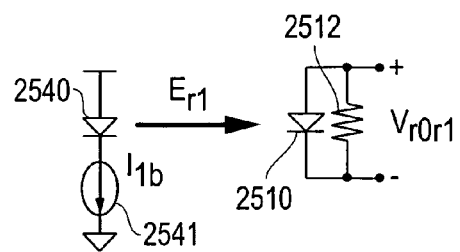
Figure 28C:
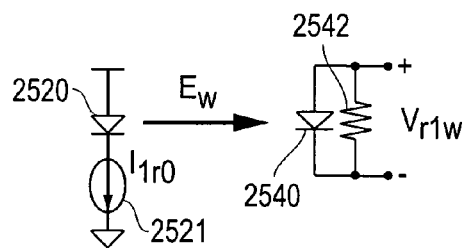
Figure 28D:
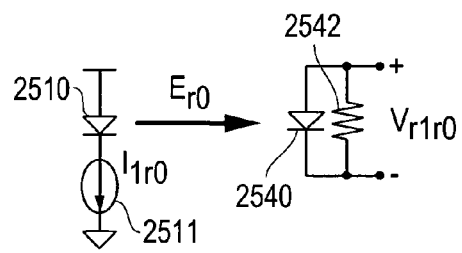

FIGS. 28A-D illustrate the second step in the method to calibrate color without a reference light source. In such second step, LEDs 2520 and 2540 sequentially illuminate LED 2510 with unknown light intensities $E_w$ and $E_n$ respectively, which produce voltages $V_{r0w}$ and $V_{r0r1}$ respectively across resistor 2512 as shown in FIGS. 28A and 28B. Equations 17 and 18 relate the induced voltages $V_{r0w}$ and $V_{r0r1}$ to the emitted powers $E_w$ and $E_{r1}$ the responsivity $R_{r0}$, and the correction coefficients $C_{r0w}$ and $C_{r0r1}$ respectively. Equations 19A-B take the ratio of equation 18 over 17 and substitutes equation 13B for the ratio of correction coefficients $C_{r0w}$ over $C_{r0r1}$ to express the ratio of emitted intensities $E_{r1}$ over $E_w$ as a function of measured voltages and desired emitted intensities.

Next, LEDs 2520 and 2510 sequentially illuminate LED 2540 with unknown light intensities $E_w$ and $E_{r0}$ respectively, which produce voltages $V_{r1w}$ and $V_{r1r0}$ respectively across resistor 2542 as shown in FIGS. 28A-D. Equations 20 and 21 relate the induced voltages $V_{r1w}$ and $V_{r1r0}$ to the emitted powers $E_w$ and $E_{r0}$, the responsivity $R_{r1}$, and the correction coefficients $C_{r1w}$ and $C_{r1r0}$ respectively. Equations 22A-B take the ratio of equation 21 over 20 and substitutes equation 16B for the ratio of correction coefficients $C_{r1w}$ over $C_{r1r0}$ to express the ratio of emitted intensities $E_{r0}$ over $E_w$ as a function of measured voltages and desired emitted intensities. Equation 23 expresses the ratio of $E_{r0}$ over $E_{r1}$ as the ratio of equation 22B over equation 19B. Once such relative intensities emitted from each LED 2510, 2520, and 2540 are known, such intensities can be adjusted to produce the desired color.

FIGS. 25A-D, 26A-D, 27A-D and 28A-D illustrate just two of many possible methods for calibrating the color point emitted from a group of different colored LEDs using such LEDs as photo-detectors. Any number of LEDs in some cases from two to many more can be calibrated using such methods or other methods. Any color LEDs can be used provided the LEDs used as photo-detectors measure the light produced by LEDs with roughly equal or shorter wavelengths. Although FIGS. 25A-D and 26A-D use red, green, and blue LEDs common in LED panels and increasingly in LED backlights, such method is equally appropriate for a lamp or any other type of illumination or display device including Organic LEDs (OLEDs). Although FIGS. 27A-D and 28A-D use white and red LEDs in a lamp as an example, such calibration method is equally appropriate for an LED display, backlight, or any other type of illumination device including OLEDs. Such methods could be performed on a manufacturing line to ensure consistent color of devices or could be performed on the same device over time to maintain color.

FIG. 29 is an example block diagram for circuitry that can implement the methods illustrated in FIGS. 25A-D, 26A-D, 27A-D and 28A-D which comprises integrated circuit (IC) 2980, LEDs 2510, 2520, 2540, and optionally 2530, and resistors 2512 and 2542. Integrated circuit (IC) 2980 further comprises timing and control circuitry 2981, coefficient matrix 2982, digital to analog converter (DAC) 2983, analog to digital converter (ADC) 2984, and three or four output drivers 2985 for producing currents for LEDs 2510, 2520, 2530 (optional) and 2540, depending upon whether optional LED 2530 is included. Output drivers 2985 further comprise of pulse width modulators 2987 and current sources 2986.

Timing and control circuitry 2981 manages the functionality of driver IC 2980. Illumination data for LEDs 2510, 2520, 2530, and 2540 is either hardwired into timing and control circuitry 2981 or is communicated to timing and control circuitry 2981 through some means, and is forwarded at the appropriate time to the color correction matrix 2982. Color correction matrix 2982 can, among other things, adjust the illumination data for LEDs 2510, 2520, 2530 and 2540 to compensate for variations between LEDs to produce uniform brightness and color across a display or from a lamp. Matrix 2982 can comprise correction coefficients that when combined with the illumination data produce the data forwarded to output drivers 2985, which have pulse width modulators 2987 that produce logic level signals that turn current sources 2986 on and off to LEDs 2510, 2520, 2530, and 2540.

ADC 2984 has access to both terminals of LEDs 2510 and 2540 and can, among other things, measure the voltage produced across resistors 2512 and 2542 in response to light incident on LEDs 2510 and 2540. The anodes of all three or four LEDs in this example, depending upon whether optional LED 2530 is used, can be tied together to a single supply voltage Vd 2988, or can be connected to different supply voltages. In the case all LEDs 2510, 2520, 2530 (optional), and 2540 are of one color, all anodes preferentially would be connected together. In the case such LEDs 2510, 2520, 2530 (optional), and 2540 are of different colors, each such different color LED 2510, 2520, 2530 (optional), and 2540 would preferentially be connected to each such different supply voltage.

FIG. 29 is just one example of many possible driver IC 2980 block diagrams. For instance PWM 2987 would not be needed if LEDs 2510, 2520, 2530, and 2540 were driven with variable current for fixed amount of times. Resistors 2512 and 2542 would not be needed if ADC 2984 measured open circuit voltage, short circuit current, or some other combination of current and voltage from LEDs 2510 and 2540. DAC 2983 could be a fixed current source if variable currents were not desired. Color correction matrix 2982 could reside elsewhere in a device.

FIG. 30 is an example block diagram of correction matrix 2982 that can correct for variations in light intensity produced by a combination of red, green, and blue LEDs 2510, 2520, and 2530 to produce relatively uniform brightness and color across a display for from a lamp. Matrix 82 comprises memory 3090 that can store correction coefficients $C_r$, $C_g$, and $C_b$, which are combined by multipliers, 3091 with the red, green, and blue, for instance, illumination data respectively from timing and control circuitry 2981 to produce the illumination data forwarded to modulators 2987 controlling red, green, and blue LEDs 2510, 2520, and 2530 respectively. Such correction coefficients are typically relatively large, which produce adjustments in the illumination data to compensate for variations between LEDs 2510, 2520, and 2530.

Memory 3090 can be made from SRAM, DRAM, FLASH, registers, or any other form of read-writable semiconductor memory. Such correction coefficients periodically can be modified by driver IC 2980 or any other processing element in a display or lamp for instance to adjust for changes in LEDs 2510, 2520, and 2530 characteristics for instance over temperature or lifetime.

Multipliers 3091 scale the illumination data from timing and control circuitry 2981 by multiplying each color component by the corresponding correction coefficient. Such multiplication can be performed by discreet hardware in bit parallel or bit serial form, in an embedded microcontroller, or by any other means. Preferentially, one hardware multiplier comprising a shifter and an adder performs all three multiplications. As such, FIG. 30 is just one of many possible block diagrams for correction matrix 2982. Likewise, correction matrix 2982 could reside elsewhere in a device, such as software in a graphics controller.

FIGS. 31A-C illustrate one possible method to determine the peak emission wavelength $\lambda_p$ from an LED by determining such LED's photosensitivity as a function of the wavelength of light incident on such LED. Such measurement system could comprise light source 2550, LED 2510 and resistor 2512 as illustrated in FIGS. 25A-D, with the wavelength of light emitted by light source 2550 switched between wavelengths $\lambda_-$ and $\lambda_+$ that are slightly shorter and longer respectively than the expected peak emission wavelength $\lambda_p$ of LED 2510.

Plot 3100 in FIG. 31A represents the photosensitivity of LED 2510 with a nominal peak emission wavelength $\lambda_{pn}$ as a function of incident wavelength with the vertical axis representing the voltage induced across resistor 2512. At wavelengths longer than $\lambda_{pn}$, the photosensitivity reduces significantly, while at wavelengths shorter than $\lambda_{pn}$, the photosensitivity reduces linearly with wavelength. Also shown is incident light with wavelength $\lambda_-$ producing voltage $V_-$ across resistor 2512 and incident light with wavelength producing voltage $V_+$ across resistor 2512. Line 3103 connecting the points $(\lambda_-, V_-)$ and $(\lambda_+, V_+)$ has a slope M= $(V_--V_+)/(\lambda_--\lambda_+)$.

Plot 3101 in FIG. 31B illustrates the photosensitivity of an LED 2510 with a peak emission wavelength $\lambda_{p-}$ that is slightly shorter than the nominal peak emission wavelength $\lambda_{pn}$. When such an LED 2510 is illuminated by light source 2550 with wavelengths $\lambda_-$ and $\lambda_+$, voltages $V_-$ and $V_+$ respectively are generated across resistor 2512. The difference in voltage between such $V_-$ and $V_+$ is greater for such LED 2510 with peak emission wavelength $\lambda_{p-}$ that is slightly shorter than the nominal peak emission wavelength $\lambda_{pn}$ than for such LED 2510 with the nominal peak emission wavelength $\lambda_{pn}$. Additionally, the slope M of line 3104 is more negative for the LED 2510 emitting the peak wavelength than for the LED 2510 emitting the nominal peak wavelength $\lambda_{pn}$.

Plot 3102 in FIG. 31C illustrates the photosensitivity of an LED 2510 with a peak emission wavelength $\lambda_{p+}$ that is slightly longer than the nominal peak emission wavelength $\lambda_{pn}$. When such an LED 2510 is illuminated by light source 2550 with wavelengths $\lambda_-$ and $\lambda_-$, voltages $V_-$ and $V_+$ respectively are generated across resistor 2512. The difference in voltage between such $V_-$ and $V_+$ is smaller for such LED 2510 with peak emission wavelength $\lambda_{p+}$ that is slightly longer than the nominal peak emission wavelength $\lambda_{pn}$ than for such LED 2510 with the nominal peak emission wavelength $\lambda_{pn}$. Additionally, the slope M of line 3105 is less negative for the LED 2510 emitting the peak wavelength $\lambda_+$, than for the LED 2510 emitting the nominal peak wavelength $\lambda_{pn}$.

Since the slopes of lines 3103, 3104, and 3105 in FIGS. 31A, 31B and 31C are directly related to the peak emission wavelength of LED 2510, such slopes can be used to determine such peak emission wavelengths. For instance, such relationship could be linear. FIGS. 31A-C illustrate one of many possible methods to determine the peak emission wavelength of light produced by an LED by measuring the photosensitivity of such LED. For instance, LED light induced current could be measured instead of voltage or some other combination of current and voltage could be measured. Additionally, light with broader spectrums of light could induce such voltages or currents instead of the mono-chromatic sources illustrated in FIGS. 31A-C.

FIG. 32 is an example block diagram for correction matrix 2982 that can correct for variations in both light intensity and wavelength produced by a combination of red, green, and blue LEDs 2510, 2520, and 2530 for instance to produce uniform brightness and color from an array of LEDs. Matrix 2982 comprises memory 3090 that can store nine correction coefficients with three such coefficients for each color component produced. Coefficients $C_{rr}$, $C_{gg}$, and $C_{bb}$ would typically be effectively the same as $C_r$, $C_g$, and $C_b$ from FIG. 30 to adjust for intensity variations in LEDs 2510, 2520, and 2530, while the remaining coefficients (Crg, Crb, Cgr, Cgb, Cbr, Cbg) compensate for wavelength variations.

For instance, if the red illumination data from timing and control circuitry 2981 was intended for an LED 2510 with a wavelength of 650 nm and the connected LED 2510 wavelength was exactly 650 nm, coefficients $C_{gr}$ and $C_{br}$ would be zero and $C_{rr}$ would be close to one. If such connected LED 2510 wavelength was 660 nm and had the same intensity as the just previous example, $C_{rr}$ would be slightly smaller than in the just previous example and $C_{gr}$ and $C_{br}$ would be non-zero, which would produce some light from such green and blue LEDs 2520 and 2530 respectively. The combination of light from such red, green, and blue LEDs 2510, 2520, and 2530 would be perceived the same as if the red LED 2510 emitted at 650 nm.

Memory 3090 and multipliers 3091 can operate and be implemented as described for FIG. 6. Adder 3210 sums the multiplication results from the three connected multipliers 3091 to produce the illumination data forwarded to modulators 2987. Such adders 3210 can be implemented in hardware or software, or be performed bit parallel or bit serial. FIG. 32 is just one of many possible intensity and wavelength correction matrix 2982 block diagrams.

FIG. 33 is an example simplified block diagram of an LCD display comprising of backlight 3321, diffuser 3322, polarizers 3323 and 3326, color filter 3324, and liquid crystal array 3325. Image pixel 3330 is expanded to illustrate liquid crystal sub-pixel elements 3331, which modulate the amount of red, green, and blue light from color filter pixel element 3332, to produce a particular color and intensity from such image pixel 3330. The backlight 3321 produces white light from one or many light sources, such as LED 3333, that is made uniform across the display by diffuser 3322. Polarizer 3323 only lets a particular polarization of light through to color filter 3324, which produces red, green, and blue light. Liquid crystal array 3325 selectively rotates the polarization of such light, which is then filtered by polarizer 3326 to produce a color image of pixels 3330. Backlight 3321 typically comprises one or more white LEDs 3333, but could comprise a color calibrated combination of red, green, and blue LEDs.

FIG. 34 is an example simplified block diagram of LCD 3440 that eliminates color filter 3324 by sequencing the red, green, and blue colors through a single liquid crystal pixel element 3331 three times as fast as LCD 3320. Such a display is commonly called a Field Sequential Color (FSC) LCD, which costs significantly less than and consumes much less power than LCD 3320, because the color filter is eliminated. Since the red, green, and blue colors are typically sequenced, white LED 3333 is replaced by red, green, and blue LEDs 2510, 2520, and 2530. Current source 3334 is replaced with driver IC 2980 that sequentially enables LEDs 2510, 2520, and 2530 by sequentially sinking current through the enable signals enr 3441, eng 3442, and enb 3443 respectively. To establish and maintain a precise average color produced by the combination of light from LEDs 2510, 2520, and 2530, the methods illustrated in FIGS. 25A-D, 26A-D, 27A-D, 28A-D, and 31A-C can be performed by driver IC 2980 or other circuitry.

Numerous variations and modifications will become apparent to those skilled in the art once the above disclosure is fully appreciated.

Fourth Embodiment

Illumination devices and related systems and methods are disclosed that can be used for LCD (Liquid Crystal Display) backlights, LED lamps, or other applications. The illumination devices can include a photo detector, such as a photodiode or an LED or other light detecting device, and one or more LEDs of different colors. A related method can be implemented using these illumination devices to maintain precise color produced by the blended emissions from such LEDs. Other methods, systems and applications for these illumination devices can also be implemented, as desired. One application for the illumination devices is backlighting for FSC (Field Sequential Color) LCDs (Liquid Crystal Displays). FSC LCDs temporally mix the colors in an image by sequentially loading the red, green, and blue pixel data of an image in the panel and flashing the different colors of an RGB backlight. Precise and uniform color temperature across such a display can be advantageously maintained by continually monitoring ratios of photo currents induced by the different colored LEDs in each illumination device as each color is flashed. Various embodiments are described with respect to the drawings below. Other features and variations can also be implemented, if desired, and related systems and methods can be utilized, as well.

As described further below, example embodiments for illumination devices are disclosed that include LEDs with different emission wavelengths and a photo detector. In addition, a method is disclosed to maintain a precise color and intensity emitted from the combination of LEDs in the illumination device. The disclosed embodiments, for example, can be used for LCDs using FSC in which typically only one color LED from a group of red, green, and blue LEDs emit light at any one time. Such embodiments can also be used for conventional LCD backlights and LED lamps in which all the LEDs typically emit at the same time, but periodically sequence the colors for measurement. The embodiments can also be used in other systems and applications, if desired.

In one embodiment, as further described below, a photo detector in a illumination device including red, green, and blue LEDs can be used to monitor (e.g., continually, periodically, etc.) the intensity of light produced by each color LED. A controller, such as a controller integrated circuit (IC), for example, can then use the intensity measurements to maintain the fixed blended color and intensity produced by the LEDs. One method that can be performed by the controller IC to control color includes comparing ratios of signals induced in the photo detector by the different colored LEDs to desired ratios, for example, as described herein with respect to the third and seventh embodiments. Desired ratios can be determined, for example, during manufacturing of the illumination device or the display. It is noted that the photo detector can be any light detecting device including but not limited to a silicon photodiode, a discreet LED, a light detecting LED or a light detecting LED integrated on the same die as one of the light emitting LEDs. As such, in the discussions below addressing the use of photodiodes, it is understood that other light detectors can be used instead of the photodiode, including a discreet LED, a light detecting LED, a light detecting LED integrated on the same die as one of the light emitting LEDs or some other light detecting device.

Although the intensity control process could be performed continually as in the color control process, preferentially intensity control can also be performed periodically in response to a user command or power up. Other control timing could also be applied if desired. Because the human eye is much more sensitive to variations in color than in intensity, small intensity variations can typically be tolerated by the human eye.

Although one primary application for the invention is backlights for FSC LCDs, many other applications such as solid state lighting and conventional LCDs could also benefit from the disclosed embodiments. For example, combining, a photo detector, such as a photodiode or an LED or other light detecting device, with different colored LEDs, including white, in the same package enables the light produced by each such LED to be accurately measured even in the presence of significant ambient light or light from LEDs in adjacent packages. In one embodiment, a photodiode enables the temperature of the package and consequently the LEDs to be easily and accurately measured using well known techniques that inject currents into such photodiode, measure forward voltages, and calculate temperature from the results. With such measurements, the color and intensity of the light produced by such an illumination device can be accurately controlled using the methods described herein for any application. The ratio of photo currents can be used to control the relative intensity and consequently the color of light produced by the device and the absolute photo current compensated for temperature can be used to control the total intensity produced by the device.

While the embodiments described herein are applicable to a broad range of applications, it is noted, however, that the disclosed embodiments are particularly useful for FSC LCD backlights, because the colors are sequenced and as such the photo detector (e.g. photodiode, LED, etc.) can monitor the light produced by each LED in the illumination device without requiring modifications to the display timing or optics.

As stated above, this fourth embodiment can also be used with the techniques, methods and structures described with respect to the other embodiments described herein. For example, the calibration and detection systems and methods described with respect to the second, third, seventh and eighth embodiments can be used with respect to the systems and methods described in this fourth embodiment, as desired. Further, the various illumination devices, light sources, light detectors, displays, and applications and related systems and methods described herein can be used with respect to systems and methods described in this fourth embodiment, as desired. Further, as stated above, the structures, techniques, systems and methods described with respect to this fourth embodiment can be used in the other embodiments described herein, and can be used in any desired lighting related application, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications.

Figure 35:
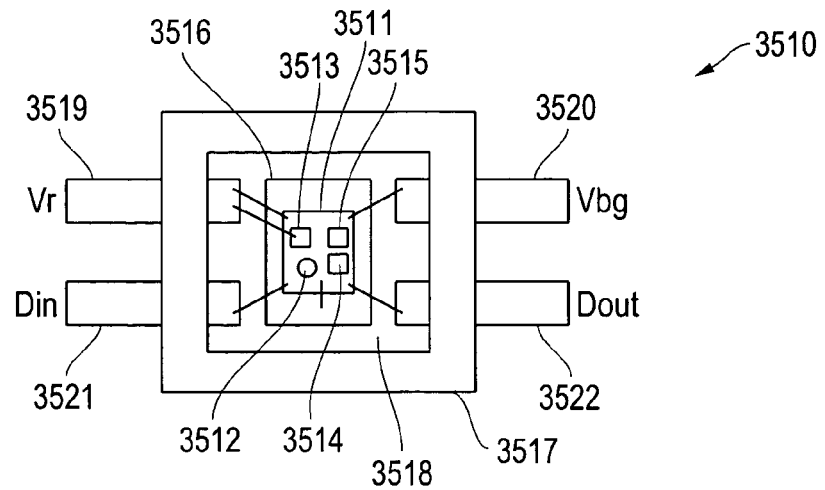
FIG. 35 is a mechanical drawing of an illumination device that uses a silicon photodiode, or other light detecting device, integrated into an LED controller to measure the light produced by red, green, and blue LEDs.
Figure 40:
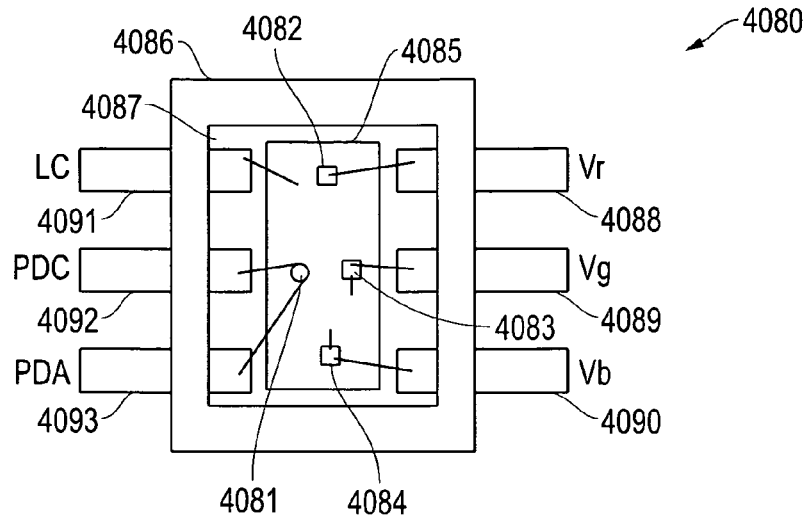
FIG. 40 is a mechanical drawing of an illumination device that uses a discreet silicon photodiode, or other light detecting device, to measure the light produced by red, green, and blue LEDs.

As described below, in some embodiments, the illumination device can include one or more colored LEDs, such as a red LED, a green LED, and a blue LED, and a silicon photodiode or other photo detector (e.g., LED, etc.) packaged together as shown in FIGS. 35 and 40. FIG. 35 illustrates the preferential illumination device which includes a photo detector, such as a silicon photodiode or other light detecting device, integrated on the controller IC illustrated in FIG. 36 that measures such LED output light and temperature, and performs a method to maintain precise color and intensity produced by such LEDs. FIG. 40 illustrates an alternative illumination device including a photo detector, such as a discreet silicon photodiode or other light detecting device, that is used to measure LED output light and illumination device temperature. The external controller IC illustrated, in FIG. 41 can be used to implement a color and intensity control method for any number of illumination devices. Although the discussions below primarily use a silicon photodiode as the photo detector, it is again noted that the photo detector can be any light detecting device including but not limited to a silicon photodiode, a discreet LED, a light detecting LED or a light detecting LED integrated on the same die as one of the light emitting LEDs.

Figure 37:
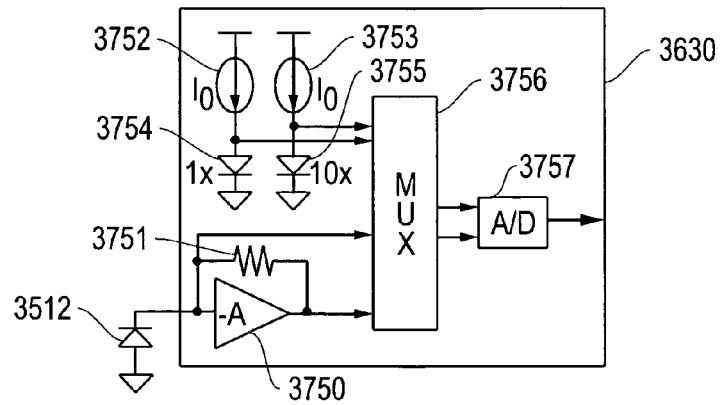
FIG. 37 is a block diagram of exemplary temperature and photodiode current measurement circuitry using an integrated photodiode.
Figure 38:
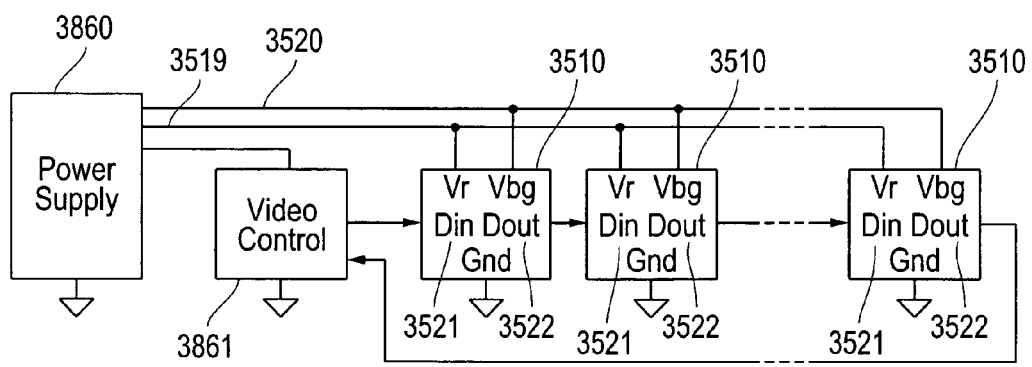
FIG. 38 is an exemplary connection diagram for multiple illumination devices with integrated photodiodes in a display backlight.
Figure 39:
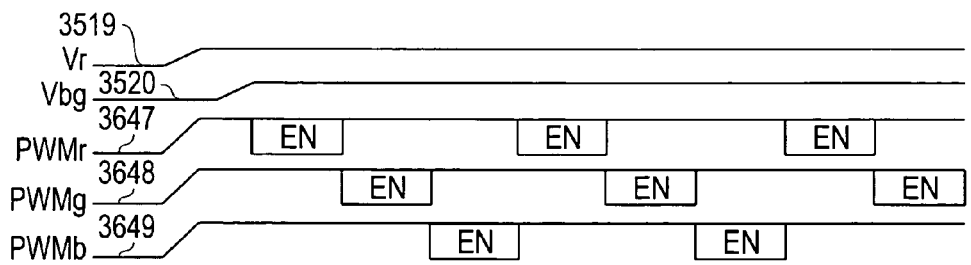
FIG. 39 depicts a timing diagram for the power supplies to and the light output from an illumination device with an integrated photodiode.
Figure 42:
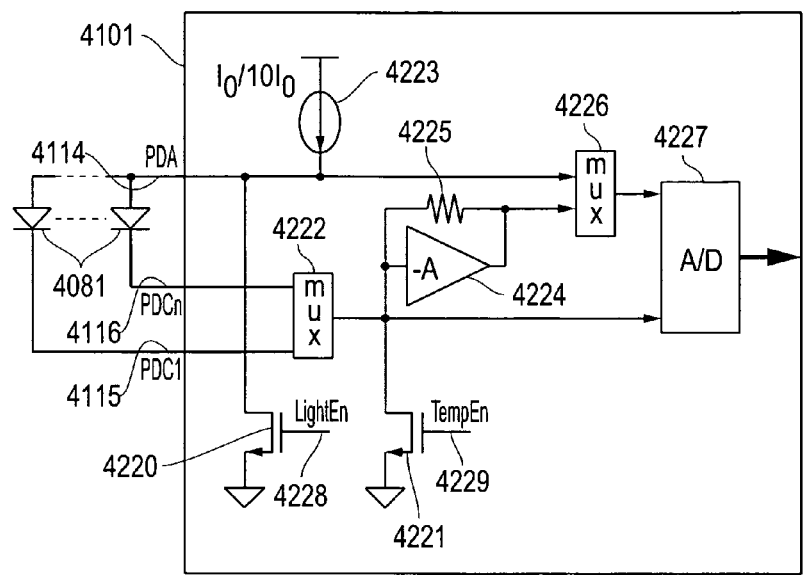
FIG. 42 is a block diagram of exemplary temperature and photodiode current measurement circuitry using a discreet photodiode.
Figure 43:
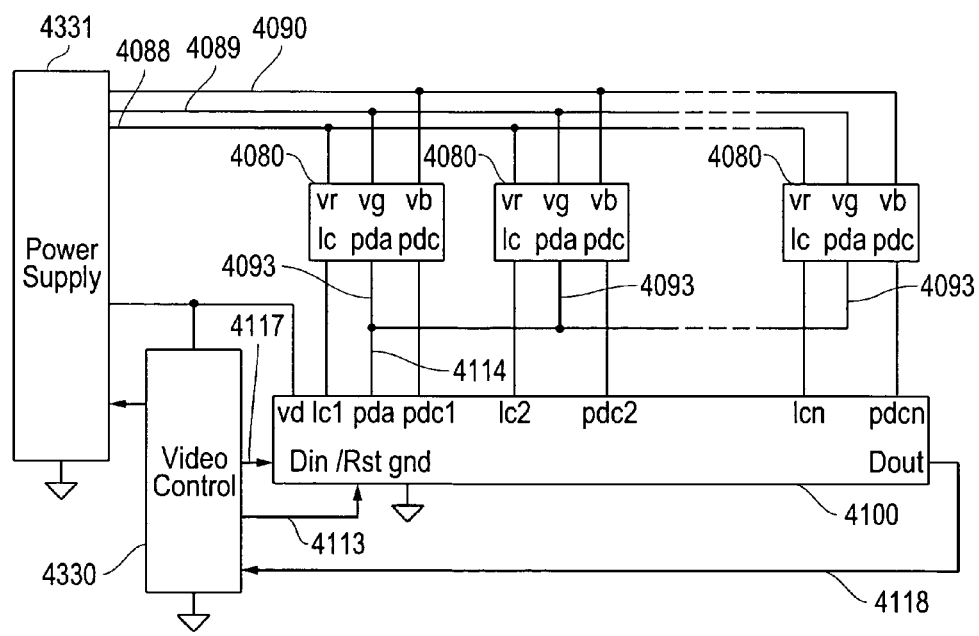
FIG. 43 is an exemplary connection diagram for multiple illumination devices with discreet photodiodes in a display backlight.
Figure 44:
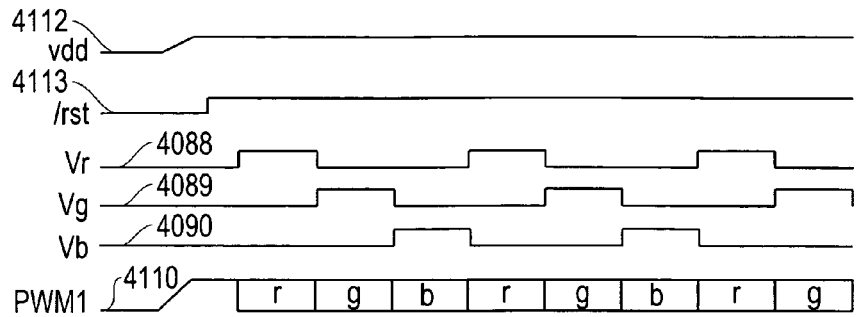
FIG. 44 depicts a timing diagram for the power supplies to and the light output from an illumination device with a discreet photodiode.

FIGS. 37, 38, and 39 illustrate possible photodiode current and temperature measurement circuitry, simplified system connection diagram, and timing diagram respectively for the preferential illumination device comprising the photodiode integrated on the controller IC. Likewise, FIGS. 42, 43, and 44 illustrate the same for the illumination device comprising the discreet photodiode. Because an LCD backlight typically needs many illumination devices to provide uniform and sufficient brightness across the display, the system connection diagrams illustrate how such illumination devices can be connected together and to the controller IC in the case of the illumination device comprising a discreet photodiode.

Because an LCD backlight typically has many illumination devices, packaging the photodiode with each set of red, green, and blue LEDs helps to minimize the affect light from adjacent LEDs has on the photodiode current induced in a first illumination device by LEDs in such first illumination device. Further, the illumination device package can include an opaque body to block the direct light between adjacent illumination devices and clear plastic fill to allow light to be emitted directly into a display waveguide or diffuser. Some light from adjacent illumination devices can scatter from such waveguide or diffuser into such first illumination device, but provided the photodiode resides in the illumination device the amount of such scattered light is typically sufficiently small to not affect the measurement.

As shown in the example timing diagrams illustrated in FIGS. 39 and 44, only one color of the red, green, and blue LEDs are emitting at one time in the backlight for an FSC LCD, which enables the photodiode in each illumination device to continually measure the light produced by each such LED. Additionally because scattered light from adjacent illumination devices is sufficiently small, the light produced by all the LEDs in all the illumination devices in an FSC LCD backlight can be measured simultaneously without requiring modifications to the display timing and without special waveguides necessary with conventional RGB backlights. Timing diagrams for other applications, such as conventional LCD backlighting or LED lamps for general illumination, are not shown, but would preferentially have all LEDs emitting simultaneously most of the time. Periodically, each color LED would emit independently for measurement.

Figure 36:
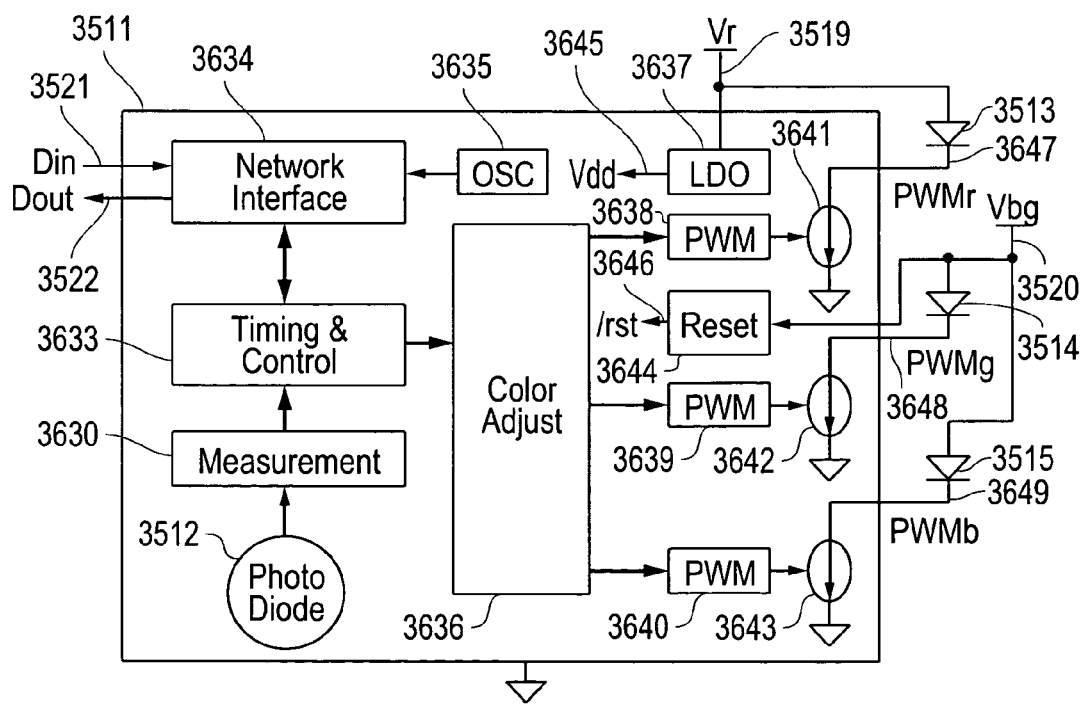
FIG. 36 is a block diagram of an exemplary LED controller with integrated photodiode.

FIGS. 39 and 44 also illustrate two different approaches for driving the LEDs in the illumination devices, which reduce the number of package pins required when using an integrated photodiode and a discreet photodiode respectively. As shown in FIG. 36, the power supply for the red LED also provides power for the controller IC. Because the forward voltages for green and blue LEDs are typically similar, the power supply for both such LEDs is shown to be the same. Additionally, as shown in FIG. 39, such green and blue LED power supply preferentially goes high after such red LED power supply, which generates a reset pulse on the controller IC.

Figure 41:
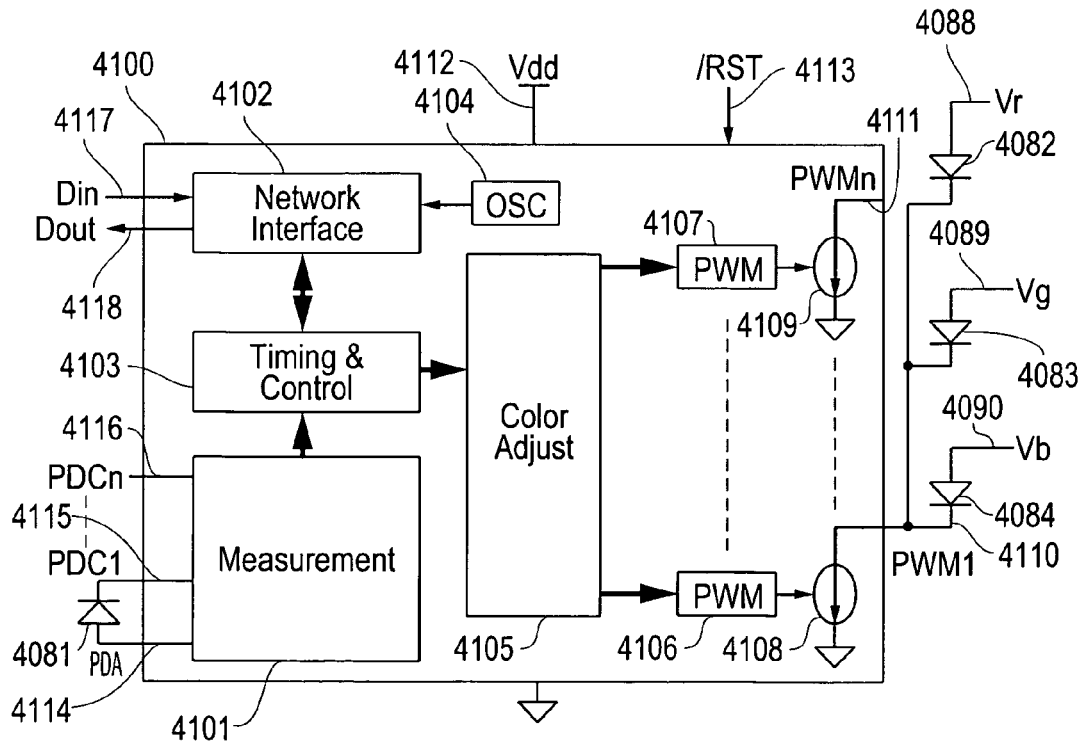
FIG. 41 is a block diagram of an exemplary LED controller that uses a discreet photodiode to measure the light from LEDs.

As shown in FIG. 41, the power supplies for the red, green, and blue LEDs are separate, but all three cathodes are connected to one pin on the controller IC. As shown in FIG. 44, such LED power supplies sequentially turn on with only one being high at one time. As such, one LED driver on the controller IC can be used to drive all three LEDs in one illumination device.

Figure 45:
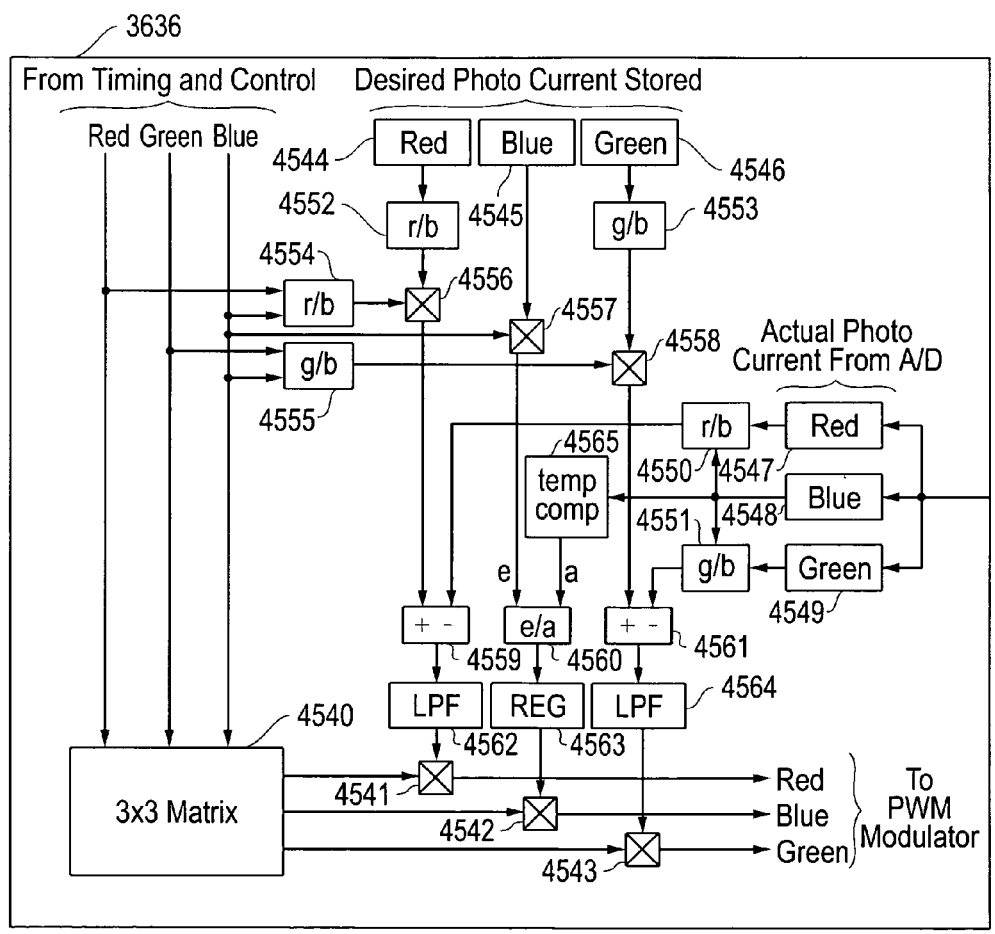
FIG. 45 is a block diagram for exemplary color adjustment circuitry.

FIG. 45 illustrates possible circuitry in a controller IC to implement the LED color and intensity control method for the illumination device, which can include three steps or processes that include factory calibration, color control, and/or intensity control, if desired.

During factory calibration, which would occur at the time an illumination device or a backlight or display is manufactured, the intensity and wavelength of the red, green, and blue LEDs of each illumination device can be measured, coefficients to compensate for such variations can be generated, and the temperature and the photodiode current induced by each LED when producing the desired amount of light can be measured. Such correction coefficients, photodiode currents, and temperature measurements can then be stored in a corresponding controller IC, if such IC has non-volatile memory, and used directly, or they can be stored in some common memory for all illumination devices in a display and loaded each time such display powers up for instance.

During normal operation, the color produced by the combination of light from the red, green, and blue LEDs can be precisely maintained by comparing the ratios of photodiode currents induced by the LEDs in an illumination device to the ratio of the desired photodiode currents measured during factory calibration. Because the intensity of light produced by the blue LED remains relatively constant over temperature, the color control process can use the photocurrent induced by the blue LED as a reference. The photodiode currents induced by the red and green LEDs can be divided by the photodiode current induced by the blue LEDs to produce both the actual measured ratios of red over blue and green over blue and the factory desired ratios of red over blue and green over blue. The differences between the actual ratios and the desired ratios can then be low pass filtered before adjusting the average drive current to the red and green LEDs. The color control process can then compare ratios of photodiode currents to cancel any measurement variations that occur over operating conditions such as temperature and power supply voltage and over lifetime. Because the color of light produced by a combination of different colored LEDs is determined by the relative intensity produced by each such LED, comparing ratios of photodiode currents is well suited for the color control process.

To maintain a relatively precise intensity produced by the illumination device, the intensity control process can be configured to compare the measured photodiode current induced by the blue LED during operation to the desired photodiode current induced by the blue LED measured during factory calibration. Because such measured photodiode current can vary with temperature, the temperature of the photodiode, which should be nearly the same as the LEDs in the same package, is also measured and the measured photodiode current can be compensated appropriately before being compared to the desired photodiode current. The difference between the temperature compensated and the desired photodiode currents can be stored in a register, which adjusts the average blue LED drive current accordingly.

Turning now to the drawings, FIG. 35 illustrates an illumination device 3510 that comprises an integrated circuit 3511 with a photo detector 3512 and three LEDs, one for each of the colors red 3513, green 3514, and blue 3515. The photo detector 3512 can be, for example, a silicon photodiode, and the discussions below primarily use a photodiode as the photo detector. However, as indicated above, the photo detector 3512 can also be any other light detecting device, as desired. The package encapsulating the IC and LEDs comprises a four pin leadframe 3516, an opaque plastic body 3517, and a clear plastic fill 3518 that allows light from the LEDs to emit vertically from the package. The leadframe 3516 comprises four pins for the signals Vr 3519, Vbg 3520, Din 3521, and Dout 3522. The signal Vr 3519 provides the power to the red LED 3513 and the controller IC 3511, the signal Vbg 3520 provides the power to the green LED 3514 and the blue LED 3515, and the Din 21 and Dout 22 signals communicate data and control information into and status from the controller IC 11. The backside of the illumination device is a commonly used exposed pad that provides good thermal conduction to a printed circuit board and an electrical ground connection. It is also noted that on an integrated circuit, if desired, the silicon photodiode can be implemented as a diffused junction between a P-type substrate and an N-type diffusion layer. Further, if desired, the silicon photodiode can also be implemented as a diffused junction between an N-type substrate and a P-type diffusion later.

During calibration for some applications and during normal operation for FSC LCD backlighting applications, the integrated circuit 3511 sequentially provides current to the different colored LEDs, which results in only one LED producing light at a time. The silicon photodiode 3512 and associated detection circuitry continually monitor the light produced by each LED. Control circuitry adjusts the average current provided to each LED to maintain a precise illumination intensity and color. The blue LED 3515 and green LED 3514 typically have two surface contacts and are shown to be flip chip mounted to the integrated circuit 3511. The red LED 3513 typically has one surface contact and one backside contact and is shown to be attached directly to the integrated circuit 3511 with the top surface contact wire bonded to Vr 3519.

FIG. 35 is one of many possible illumination devices that combine an LED controller IC 3511 with an integrated photo detector, such as a silicon photodiode or other light detecting device, and a set of different colored LEDs in the same package. The example illustrated in FIG. 35 shows a combination of red, green, and blue LEDs, but such illumination device could comprise any color LEDs including the combination of white and red LEDs for general lighting or conventional LCD backlighting applications. The illumination device 3510 is also shown to have four pins and a backside contact for ground, but could have a wide variety of pin combinations. The LEDs are also shown to be attached directly to the integrated circuit 3511, but could be attached in a variety of ways including being mounted to the leadframe 3516 or to some other form of substrate and wire bonding to the IC 3511. Further, as noted above, the photo detector depicted as a photodiode can be any light detecting device, as desired, including but not limited to a silicon photodiode, a discreet LED, a light detecting LED or a light detecting LED integrated on the same die as one of the light emitting LEDs.

FIG. 36 illustrates a possible LED controller IC 3511 that provides the drive current to the red 3513, green 3514, and blue 3515 LEDs and monitors the light produced by such LEDs and measures the illumination device 3510 temperature using the silicon photodiode 3512 and measurement block 3630. Network interface 3634 receives illumination and control data from signal Din 3521 and produces status information on signal Dout 3522. Such illumination data can adjust the intensity and optionally the color of light produced by each illumination device 3510 to support local dimming. Oscillator 3635 provides a reference clock to network interface 3634, which can recover a clock from the data received on Din 3521 that can be used to clock the rest of integrated circuit 3511. Timing and control circuitry 3633 uses the recovered clock to manage the operation and functionality of integrated circuit 3511.

The color adjustment circuitry 3636 performs the tasks necessary to maintain precise LED illumination intensity and color produced by the LEDs. Such tasks include monitoring the current produced by the photodiode and adjusting the digital values forwarded to the pulse width modulators 3638, 3639, and 3640 that control the amount of time that current sources 3641, 3642, and 3643 draw current through signals PWMr (red) 3647, PWMg (green) 3648, and PWMb (blue) 3649 that are connected to LEDs 3513, 3514, and 3515 respectively. Also shown is low dropout (LDO) regulator 3637 producing the power supply VDD 3645 for IC 3511 from Vr 3519 and reset circuitry 3644 producing the master reset signal /RST 3646 for IC 3511 from Vbg 3520. Example voltage values for Vr 3519, Vbg 3520, and VDD 3645 could be 2.5 v, 3.5 v, and 1.8 v respectively.

FIG. 36 is one of many possible block diagrams for a controller IC comprising a photodiode or other light detecting device, such as an LED, and producing the drive current to any number of LEDs. For instance, the illumination intensity produced by such LEDs could be controlled by adjusting the current produced by current sources instead of controlling the amount of time such current sources are producing current using pulse width modulators. Additionally, the control and data signals into and out of the controller IC could be completely different. For instance, illumination data and control data could have separate input pins. Likewise, a clock could be input with data instead of recovering a clock from the data.

FIG. 37 is illustrates a possible block diagram for measurement block 3630 contained within control IC 3511. In this example, amplifier 3750 is configured as a trans-impedance amplifier that forces the current produced by photodiode 3512 through resistor 3751 with amplifier 3750 maintaining a relative fixed voltage on the photodiode cathode. The voltage developed across resistor 3751 is forwarded to mux 3756 and ADC 3757.

The temperature sensor comprises current sources 3752 and 3753 sourcing current $I_0$ into diodes 3754 and 3755. Diode 3755 comprises ten diodes with the same physical and electrical characteristics at diode 3754 connected in parallel to produce a diode 3755 with ten times the area as diode 3754. The voltage difference between the anodes of diodes 3754 and 3755 is proportional to absolute temperature and is forwarded to ADC 3757 through mux 3756.

FIG. 37 is one of many possible block diagrams for measurement block 3630. For instance, temperature could be measured by forcing two different currents in the forward biasing direction through photodiode 3512 and measuring the differences in the resulting two voltages. The polarity of photodiode 3512 could be reversed and an amplifier could be configured to force zero volts across photodiode 3512. Additionally, amplifier 3750 could be eliminated and resistor 3751 could be connected across photodiode 3512 to produce a voltage proportional to the current produced by photodiode 3512. As such, FIG. 37 is just one example of many possible block diagrams for photocurrent and temperature measurement.

FIG. 38 illustrates a possible connection diagram for multiple illumination devices with integrated photodiodes in a display backlight. Illumination devices 3510 illustrate a group of any number of instances of illumination device 3510 that are serially connected together by connecting the Dout signal 3522 of one illumination device 3510 to the Din signal 3521 of the next serially connected illumination device 3510. The Dout signal 3522 of the last illumination device 3510 is connected to video controller 3861, which also provides the Din signal 3521 to the first illumination device 3510 and completes a communication ring between video controller 3861 and all the illumination devices. Video controller 3861 can produce the illumination intensity and color data for each illumination device 3510 and can control and monitor the functionality of all such devices.

Power supply 3860 provides the Vr 3519 and Vbg 3520 power supplies to the red, and the green and blue LEDs respectively for all the illumination devices 3510. Such power supplies can be static or can be switched as illustrated in FIG. 39. Power supply 3860 is also shown to provide power to video controller 3861, which typically would be a fixed voltage.

In a display backlight, illumination devices 3510 can be connected serially along one or more edges of a liquid crystal panel in a so called edge lit LCD or in an array behind the liquid crystal panel in a so called direct lit LCD. In edge lit LCDs and in some direct lit LCDs, the illumination devices should provide uniform intensity and color behind the liquid crystal panel, with the pixels in the panel producing the image by letting more or less different colored light through. Some direct lit LCDs implement local dimming in which the brightness and sometimes color of each illumination device 3510 or groups of illumination devices can be controlled uniquely for each image frame.

FIG. 38 is one of many possible connection diagrams for illumination devices 3510 in a display. For instance, video controller 3861 could connect to multiple chains of illumination devices 3510. Additionally video controller 3861 could be a graphics or an I/O controller for instance. Chains of illumination devices could be any number including just one. The Vr 3519 and Vbg 3520 power supplies could be connected or separated as shown or could be completely different with different illumination device pinouts. Likewise, connections diagrams in LED lamp or other applications could be implemented differently, as desired.

FIG. 39 illustrates one of many possible timing diagrams for the power supplies Vr 3519 and Vbg 3520, and the LED current source outputs PWMr (red) 3647, PWMg (green) 3648, and PWMb (blue) 3649 in an FSC LCD backlight. During start up, Vr 3519 goes high first and then Vbg 3520 goes high, which enables reset generator 3644 in controller IC 3511 to produce a valid /RST signal 3646 to start controller IC 3511 operating from a known state. Controller IC 3511 then drives the red 3513, green 3514, and blue 3515 LEDs sequentially by enabling each corresponding PWM and current source. When such PWM signal is shown to be high, no current is drawn through the corresponding LED and no light is produced by that LED. When such PWM signal is shown to be enabled (labeled EN in drawing), the corresponding PWM is enabled and pulsing current through each such LED.

Because only one color LED is emitting at one time, photodiode 3512 can monitor the light produced by each such LED on a continual basis and controller IC 3511 can continually adjust the drive current produced for each such LED to maintain a precise color point and intensity.

The sequencing of the light colors shown in FIG. 39 are appropriate for FSC LCDs among other applications, which mix the red, green, and blue pixel data in time as opposed to in space. Conventional LCDs have a white backlight and colors filters that produce the red, green, and blue light for each pixel, which comprises liquid crystal sub-pixel elements for each color. The red, green, and blue pixel data then allows different amounts of light through each red, green, and blue sub-pixel. FSC LCDs have one liquid crystal pixel element that operates at least three times as fast to allow each color to be presented sequentially, which is mixed temporally by the eye.

FIG. 39 is one of many possible timing diagrams for power supplies and LED drive signals. For conventional displays and lamps, for instance, all LEDs would typically produce light at the same time to generate the necessary white light. A different timing diagram could be used to enable the photodiode 3512 to monitor the light produced by each such LEDs. For FSC LEDs, to reduce visual artifacts such as color breakup, the sequence of the different colored LEDs could be different. For instance, the color sequence could repeat over a number of video frames instead of just one as shown. Additionally, methods such as so called stenciling reduce color breakup by inserting a fourth field with all three colors illuminated between each set of red, green, and blue fields. For both conventional and FSC displays, the timing of both the power supply and LED drive signals could be significantly different. FIG. 39 is just one example.

FIG. 40 illustrates an illumination device 4080 that includes a photo detector 4081 and three LEDs, one for each of the colors red 4082, green 4083, and blue 4084 as in illumination device 3510 but does not include a controller IC 3511. The photo detector 4081 can be, for example, a silicon photodiode, and the discussions below primarily use a photodiode as the photo detector. However, as indicated above, the photo detector 4081 can also be any light detecting device including but not limited to a silicon photodiode, a discreet LED, a light detecting LED or a light detecting LED integrated on the same die as one of the light emitting LEDs. As such, in some embodiments, the photo detector 4081 can be implemented as a light detecting LED integrated on the same die as one or more of the light emitting LEDs, if desired. The package encapsulating such photo detector and LEDs comprises a six pin leadframe 4085, an opaque plastic body 4086, and a clear plastic fill 4087 that allows light from the LEDs to emit vertically from the package. The leadframe 4085 comprises six pins for the signals Vr 4088, Vg 4089, and Vb 4090 that connect to the anodes of such red, green, and blue LEDs respectively, and for the signals LC 4091, PDC 4092, and PDA 4093. The LC signal 4091 connects to the cathodes of all such LEDs, and PDC 4092 and PDA 4093 connect to the photodiode 4081 cathode and anode respectively. The backside of the illumination device 4080 should remain electrically isolated in this example.

The photodiode 4081, and the green 4083 and blue 4084 LEDs can have both contacts on the top side of each such die with all anodes wire bonded directly to the corresponding pins. The LED cathodes are down bonded to the lead frame which is then wire bonded to the LC 4091 pin. The surface anode connection on photodiode 4081 is wire bonded to the PDC 4093 pin. The red LED 4082 is shown to have a surface contact for the anode that is wire bonded to the Vr 4088 pin and a backside contact for the cathode that is electrically and mechanically connected to the lead frame.

FIG. 40 is one of many possible illumination devices 4080 that comprise LEDs and a photo detector to monitor the relative output power of each LED to maintain a precise color point and intensity. For instance, illumination device could comprise more or less LEDs or additional photo detectors. The cathodes of the LEDs could have dedicated pins instead of being connected together as shown or all the anodes could be common with the cathodes pinned out separately. The photodiode cathode or anode could share a common connection with one or more LEDs. The package could be mechanically completely different. The pins could be surface mount or through hole for instance. Further, as noted above, the photo detector depicted as a photodiode can be any light detecting device, as desired, including but not limited to a silicon photodiode, a discreet LED, a light detecting LED or a light detecting LED integrated on the same die as one of the light emitting LEDs.

FIG. 41 illustrates a possible LED controller IC 4100 that resides outside the illumination device and provides the drive current to the red 4082, green 4083, and blue 4084 LEDs and monitors the light produced by such LEDs and the temperature using the photodiode 4081 and measurement block 4101. Such controller IC 4100 connects to N number of illumination devices 4080 and maintains the proper illumination color and intensity produced by all connected illumination devices 4080 over operating conditions and lifetime. In this example, all the PDA 4093 signals from illumination devices 4080 are tied together to the PDA 4114 pin of controller IC 4100. Each illumination device PDC 4092 pin is connected to a unique PDC pin on controller IC 4100 labeled PDC1 4115 through PDCn 4116.

Network interface 4102, timing and control circuitry 4103, oscillator 4104, and color adjust block 4105 should be very similar or identical to such blocks comprising controller IC 3511. Likewise, PWM blocks 4106 through 4107 and current sources 4108 through 4109 should be very similar or identical to such blocks comprising controller IC 3511. The primary differences between controller IC 3511 and controller IC 4100 include measurement block 4101, the number of LEDs that can be driven, and the timing of how the LEDs are driven. The cathodes of all three LEDs 4082, 4083, and 4084 of an illumination device 4080 are connected to one current source 4108 through signal PWM1 4110. Up to N illumination devices 4080 can be connected to the N current sources identical to current source 4108 with current source 4109 connected to signal PWMn 4111 representing the connection to the Nth illumination device 4080. The LDO 3637 and reset circuitry 3644 shown in controller IC 3511 are replaced with input pins VDD 4112 and /RST 4113. Din 4117 and Dout 4118 have similar functionality to Din 3521 and Dout 3522 on Controller IC 3511.

FIG. 41 is one of many possible block diagrams for a controller IC connecting to and controlling an illumination device 4080 comprising a photodiode or other light detecting device, such as an LED, and LEDs in which the photodiode or other light detecting device, such as an LED, monitors the amount of light produced by such LEDs. For instance the controller IC could have LED driver circuitry for each color LED individually instead of controlling all three LEDs with one driver. If illumination device 4080 comprised a different number of LEDs, then controller IC 4100 would connect to that number of LEDs in each illumination device.

FIG. 42 is one possible block diagram for the measurement block 4101 that measures the photodiode 4081 current produced by LEDs 4082, 4083, and 4084 in all connected illumination devices 4100 and that uses such photodiodes 4081 to measure the temperature in each such connected illumination device 4080. When LightEn signal 4228, which is controls switch 4220, is high and TempEn signal 4229, which controls switch 4221, is low, measurement block 4101 is configured to measure current in photodiodes 4081 by shorting the photodiode 4081 anodes to ground and letting the selected photodiode 4081 cathode be controlled by amplifier 4224. The current in the selected photodiode 4081 is forced through resistor 4225 producing a voltage which is forwarded through mux 4226 to ADC 4227.

When LightEn signal 4228 is low and TempEn signal 4229 is high, measurement block 4101 is configured to measure the temperature of the photodiode in the selected illumination device 4080 by shorting the cathode of the selected photodiode 4081 to ground and forcing different currents from current source 4223 through the selected photodiode. Current source 4223 supplies two different currents, $I_0$ and ten times $I_0$, through the photodiode 4081 selected by mux 4222 and mux 4226 forwards the resulting voltages to ADC 4227. The difference in the two resulting voltages is proportional to absolute temperature.

FIG. 42 is one of many possible block diagrams for measurement block 4101. As described for FIG. 37, the current induced in the photodiodes by the LEDs can be measured in a variety of ways. Likewise, the temperature can be measured in a variety ways. For instance, two photodiodes of different sizes could reside in the illumination device 4080 and the voltage difference when applying the same current to both photodiodes can be measured.

FIG. 43 illustrates a possible connection diagram for multiple illumination devices with discreet photodiodes in a display backlight. Multiple instances of illumination device 4080 are connected to the N number of LED drivers and photodiode measurement blocks on one controller IC 4100. Power Supply 4331 provides the Vr 4088, Vg 4089, and Vb 4090 to all the illumination devices 4080 and provides a fixed power supply to the video controller 4330 and the VDD 4112 power supply for the controller IC 4100. The video controller 4330 provides the Din 4117 and /RST 4113 signals to and accepts the Dout 4118 signal from the controller IC 4100. The PDA 4093 signals from all the illumination devices 4080 are connected to the PDA 4114 pin of the controller IC 4100.

As described for FIG. 38, illumination devices 4080 can reside along the edges of an edge lit LCD or in an array behind the liquid crystal panel in a direct lit LCD. The video controller 4130 can communicate illumination data for each illumination device and can manage the controller IC 4100. Since the cathode of all the LEDs 4082, 4083, and 4084 are connected together to one driver on controller IC 4100, such connection diagram only allows the intensity of light from color LED to be controlled. Each color component is controlled individually by enabling the Vr 4088, Vg 4089, and Vb 4090 power supplies one at a time.

FIG. 43 is one of many possible connection diagrams for illumination devices 4080 and controller IC 4100. In displays that require more illumination devices than one controller IC 4100 can support, multiple controller ICs 4100 can be serially connected through network interface 4102 or video controller 4330 can connect directly to multiple controller ICs 4100. For conventional displays, illumination device 4080 and controller IC 4100 could be configured to enable all LED colors to be emitting simultaneously by tripling the number of drivers and the connection diagram would differ accordingly.

FIG. 44 illustrates one of many possible timing diagrams for the power supplies VDD 4112, Vr 4088, Vg 4089, and Vb 4090, the /RST signal 4113, and the LED current source output PWM1 4110 in an FSC LCD backlight. During start up, VDD 4112 goes high first and then /RST 4113 goes high, which starts controller IC 4100 operating from a known state. Controller IC 4100 then signals to video controller 4330 and power supply 4331 to begin sequencing the LED power supplies Vr 4088, Vg 4089, and Vb 4090. While each such LED power supply is high, controller IC 4100 drives the appropriate average current through each such LED. For instance, when Vr 4088 is high, controller IC 4100 forwards the appropriate illumination information for the red LED 4082 to the PWM 4106 and current source 4108 to produce that appropriate light intensity from the red LED. Since the power supplies, Vg 4089 and Vb 4090, to the green 4083 and blue 4084 LEDs are low during this time, no current flows through such LEDs and no light is produced.

Because only one color LED is emitting at one time, photodiode 4081 or other light detecting device, such as an LED, can monitor the light produced by each such LED on a continual basis and controller IC 4100 can continually adjust the drive current produced for each such LED to maintain a precise color point and intensity. Measurement block 4101 sequentially and repetitively monitors the photodiodes 4081 connected to pins PDC1 4115 through PDCn 4116.

FIG. 44 is one of many possible timing diagrams for power supplies and LED drive signals in an FSC display. For instance, the color sequence could be different for different video frames and repeat over a number of video frames instead of just one as shown. FIG. 44 is just one example. Likewise, timing diagrams in conventional displays or LED lamps could be implemented similarly or in a different manner, if desired. In such applications, the illumination device package could provide independent pins for the LED cathodes so that all LEDs could be emit simultaneously for some period of time and independently when emitted power is measured. Other techniques could also be implemented if desired.

FIG. 45 is illustrates a possible block diagram for the color adjustment block 3636 in controller IC 3511, which is essentially repeated N times in the color adjust block 4105 in controller IC 4100. For simplicity the remainder of this discussion will reference only illumination device 3510 and not illumination device 4080 and controller IC 4100; however, the discussion is also applicable to these other embodiments. Further, for simplicity, this discussion assumes that a photodiode is being used as the photo detector. However, as indicated above, the photo detector could be any light detecting device including but not limited to a silicon photodiode, a discreet LED, a light detecting LED or a light detecting LED integrated on the same die as one of the light emitting LEDs, as desired.

Color adjustment block 3636 receives the intensity data for the red 3513, green 3514, and blue 3515 LEDs from timing and control circuitry 3633, adjusts such values in matrix 4540, and forwards them to PWMs 3638, 3639, and 3640. Matrix 4540 comprises coefficients determined during manufacturing of illumination device 3510 that are used to compensate for variations in LED intensity and wavelength to produce the desired color and intensity from the combination of red 3513, green 3514, and blue 3515 LEDs at one temperature. The proper light color is maintained during normal operation by continually comparing the ratio of currents induced in photodiode 3512 by the red 3513 and green 3514 LEDs over the current induced in photodiode 3512 by the blue 3515 LED to the desired ratios of such current determined during manufacturing, and adjusting the values forwarded to PWMs 3638 and 3639 through feedback loops that include multipliers 4541 and 4543. The proper average intensity of light produced by the combination of red 3513, green 3514, and blue 3515 LEDs is controlled periodically by comparing the temperature adjusted current induced in photodiode 3512 by blue 3515 LED to the desired such current determined during manufacturing, and adjusting the value forwarded to PWM 3640 with multiplier 4542.

During the manufacturing of illumination device 3510 when the coefficients for matrix 4540 are determined, the currents induced in photodiode 3512 by each LED 3513, 3514, and 3515 are measured and stored in registers 4544, 4546, and 4545 respectively. Likewise, the temperature is measured and saved. During operation, the photodiode currents induced by the red 3513, green 3514, and blue 3515 LEDs are continually measured, digitized and stored in registers 4547, 4549, and 4548 respectively. The ratios of actual photodiode currents induced by the red LED 3513 and green LED 3514 over such current induced by the blue LED 3515 are determined by dividers 4550 and 4551 respectively. Such ratios of actual photodiode currents are compared to the ratios of such desired photodiode currents determined during manufacturing and produced by dividers 4552 and 4553. Since the photodiode currents measured during manufacturing corresponded to particular intensity data from timing and control circuitry 3633, dividers 4554 and 4555, and multipliers 4556 and 4558 adjust the ratio of such desired photodiode currents prior to be compared to the output of dividers 4550 and 4551 by adders 4559 and 4561. The differences between the desired photodiode current and actual photodiode current ratios determined by adders 4559 and 4561 are filtered by low pass filters 4562 and 4564 respectively prior to being applied to multipliers 4541 and 4543 respectively. Low pass filters (LPFs) 4562 and 4564 are configured to ensure that the feedback loop is stable.

Color adjustment block 3636 references the photodiode current induced by the red LED 3513 and the green LED 3514 to the blue LED 3515 because the intensity of light produced by blue typically varies very little over temperature. Color adjustment block 3636 compares ratios of photodiode currents instead of individual photodiode currents because the photodiode response varies over temperature and other conditions. By comparing ratios of photodiode currents measured at the same time, any such variations cancel out and precise color can be maintained.

As blue LED 3515 ages, the light intensity produced for a given average drive current changes. Color adjustment block 3636 typically compensates for such changes in the blue LED once in a while, for instance during power up or on command, but could continually compensate. During such compensation, the actual photodiode current induced by blue LED 3515 is measured by measurement unit 3630 and the results are stored in register 4548. Measurement unit 3630 also measures the temperature, the results of which temperature compensation block 4565 uses to scale the actual photodiode current to the temperature during manufacturing when the desired photodiode current stored in register 4545 was measured. Multiplier 4557 scales the output from register 4545 by the blue data from timing and control circuitry 3633, divider 4560 produces the ratio of multiplier 4557 output over the output from temperature compensation block 4565, and the result of which is stored in register 4563. Multiplier 4542 adjusts the blue output from matrix 4540 prior to forwarding to PWM 3640.

FIG. 45 is one of many block diagrams for a color adjustment block 3636 that maintains precise color and intensity of light produced by an illumination device 3510. Although color is preferentially controlled by comparing a ratio of photodiode currents induced by different colored LEDs at one time, for instance during manufacturing, to the ratio of photodiode currents induced by the same LEDs at a different time, color could be controlled by comparing actual photodiode currents to desired photocurrents. Such preferential color and intensity control circuitry could be implemented in many different forms including software. The functionality illustrated in FIG. 45 does not compensate for variations in LED emission wavelength, which could be done by adjusting the coefficients in matrix 4540. Likewise, the intensity adjustment performed by multipliers 4541, 4542, and 4543 could be done by adjusting the coefficients in matrix 4540.

Figure 46:
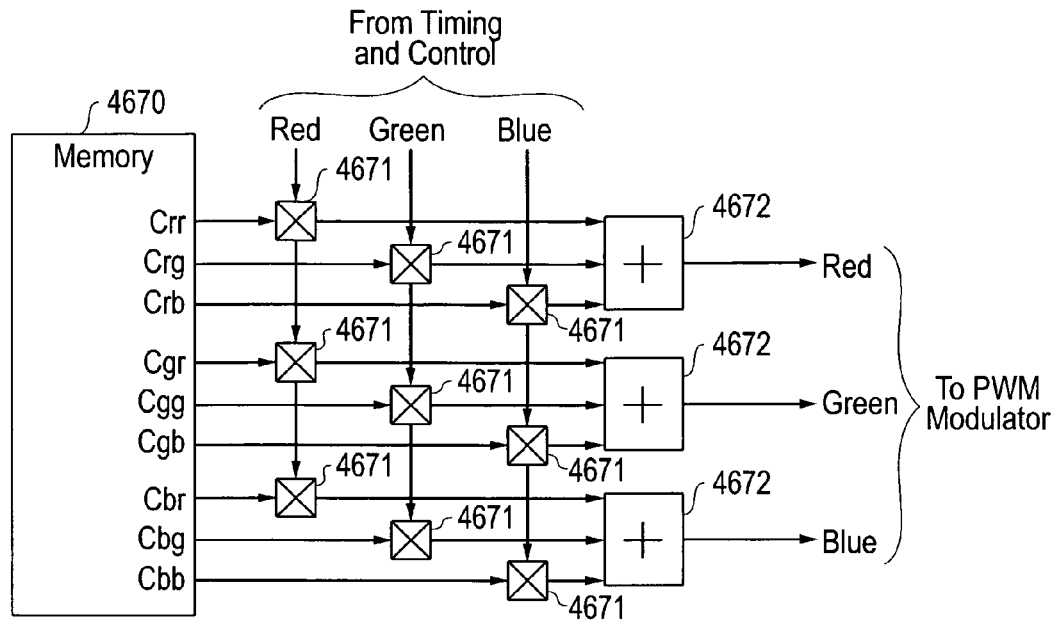
FIG. 46 is a block diagram for exemplary matrix multiplication circuitry.

FIG. 46 is an example block diagram for matrix 4540 that can correct for variations in both light intensity and wavelength produced by a combination of red, green, and blue LEDs 3513, 3514, and 3515 for instance to produce uniform brightness and color from an array of LEDs. Matrix 4540 comprises memory 4670 that can store nine correction coefficients with three such coefficients for each color component produced. Coefficients Crr, Cgg, and Cbb would typically adjust for intensity variations in LEDs 3513, 3514, and 3515, while the remaining coefficients (Crg, Crb, Cgr, Cgb, Cbr, Cbg) compensate for wavelength variations.

Memory 4670 can comprise SRAM, DRAM, FLASH, registers, or any other form of read-writable semiconductor memory. Such correction coefficients are typically determined during manufacturing and remain unchanged during operation, however, such coefficients could be periodically modified by controller IC 3511 or any other processing element in a display or lamp for instance to adjust for changes in LEDs 3513, 3514, and 3515 characteristics for instance over temperature or lifetime. If memory 4670 does not comprise non-volatile memory such as FLASH, the correction coefficients should be loaded into such memory when powered up.

Multipliers 4671 scale the illumination data from timing and control circuitry 3633 by multiplying each color component by the corresponding correction coefficient. Such multiplication can be performed by discreet hardware in bit parallel or bit serial form, in an embedded microcontroller, or by any other means. Preferentially, one hardware multiplier comprising a shifter and an adder performs all nine multiplications. Adder 4672 sums the multiplication results from the three connected multipliers 4671 to produce the illumination data forwarded to modulators 3638, 3639, and 3640. Such adders 4672 can be implemented in hardware or software, or be performed bit parallel or bit serial.

FIG. 46 is just one of many possible block diagrams for correction matrix 4540. Likewise, correction matrix 4540 could reside elsewhere in a display, such as software in a graphics controller.

Figure 47:
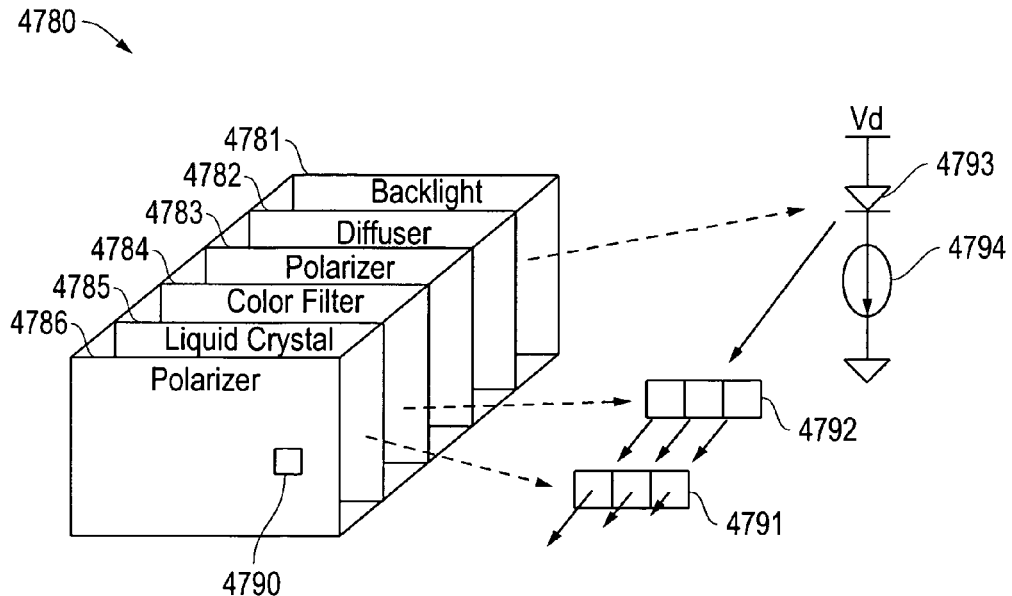
FIG. 47 is a simplified example block diagram for a typical LCD.

FIG. 47 is an example simplified block diagram of an LCD display 4780 comprising of backlight 4781, diffuser 4782, polarizers 4783 and 4786, color filter 4784, and liquid crystal array 4785. Image pixel 4790 is expanded to illustrate liquid crystal sub-pixel elements 4791, which modulate the amount of red, green, and blue light from color filter pixel element 4792, to produce a particular color and intensity from such image pixel 4790. The backlight 4791 produces white light from one or many light sources, such as LED 4793, that is made uniform across the display by diffuser 4782. Polarizer 4783 only lets a particular polarization of light through to color filter 4784, which produces red, green, and blue light. Liquid crystal array 4785 selectively rotates the polarization of such light, which is then filtered by polarizer 4786 to produce a color image of pixels 4790. Backlight 4781 typically comprises one or more white LEDs 4793, but could comprise a color calibrated combination of red, green, and blue LEDs.

Figure 48:
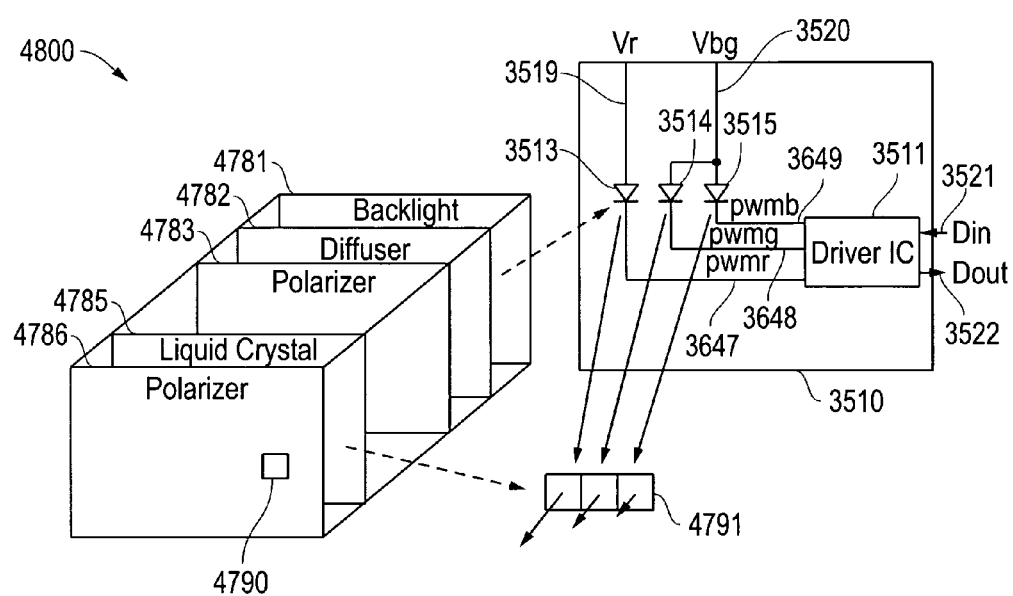
FIG. 48 is a simplified example block diagram for a Field Sequential Color (FSC) LCD.

FIG. 48 is an example simplified block diagram of FSC LCD 4800 that eliminates color filter 4784 by sequencing the red, green, and blue colors through a single liquid crystal pixel element 4791 typically three times as fast as LCD 4780. Such a display typically costs significantly less than and consumes much less power than LCD 4780, because the color filter is eliminated. Since the red, green, and blue colors must be sequenced, white LED 4793 is replaced by red, green, and blue LEDs 3513, 3514, and 3515 in illumination device 3510. Current source 4794 is replaced with driver IC 3511 that sequentially enables LEDs 3513, 3514, and 3515 by sequentially sinking current through the PWM signals PWMr (red) 3647, PWMg (green) 3648, and PWMb (blue) 3649 respectively. To establish and maintain a precise average color and intensity produced by the combination of light from LEDs 3513, 3514, and 3515, illumination device 3510 can comprise the circuitry and implement the methods described herein. Illumination device 3510 illustrated in FIG. 48 illuminates many pixels 4791.

Numerous variations and modifications will become apparent to those skilled in the art once the above disclosure is fully appreciated.

Fifth Embodiment

In certain exemplary embodiments, an improved illumination device uses the components in an LED lamp to perform a variety of functions for very low cost. The LEDs that produce light can be periodically turned off momentarily, for example, for a duration that the human eye cannot perceive, in order for the lamp to receive commands optically. The optically transmitted commands can be sent to the lamp, for example, using a remote control device. The illumination device can use the LEDs that are currently off to receive the data and then configure the light accordingly, or to measure light. Such light can be ambient light for a photosensor function, or light from other LEDs in the illumination device to adjust the color mix. Various embodiments are described with respect to the drawings below. Other features and variations can also be implemented, if desired, and related systems and methods can be utilized, as well.

In certain exemplary embodiments, an illumination device uses LEDs to produce light and to provide bi-directional communication to a controller that implements power saving features not possible with conventional lighting. The illumination device, for example, can be programmed with modulated light from a remote controller to turn on and off, to adjust brightness or color, and to turn on or off in response to changes in ambient light or timer count values. The LEDs that produce the illumination during normal operation are periodically used to receive modulated light from a controller during short intervals undetectable by the human eye. In response to a command from the remote controller, the illumination device can produce light modulated with data. Additionally, when the remote controller is turned off and is exposed to sunlight, the LEDs in the controller can provide a trickle charge current to maintain full battery power.

In certain aspects, the invention provides a system of an intelligent illumination device and, in some cases, a remote controller. The illumination device, which is typically connected to an AC mains power supply, can receive commands from the remote controller, which is typically battery powered, via light. The remote controller then programs the lamp for timer or photosensitive operation. For instance, at dusk the lamp could turn on and then go off, the light could come on when power is switched on and goes off a fixed time later, the light could come on and go off at fixed times, or the light could come on at dusk and off at dawn. Dimming could also be enabled or disabled, or could be automatically adjusted based ambient light.

When turned on, the illumination device periodically turns off the LEDs to determine if any commands are being sent or to measure ambient light. The remote control synchronizes to these momentary "light off" periods and sends a command if directed by the user. The commands can be on/off, dim, timer, photo cell, color, etc. When the light is turned off by the remote, ac power is still active. The device goes into a low power mode. When the remote turns the light on, the incident light can power the LEDs and enable the light to turn on. The light can also be turned off by removing AC power and turned on by turning AC power on. Cycling power in a certain sequence can reset the light to a default state.

In certain embodiments, the illumination device uses the photosensitive LEDs (i.e., the red LEDs) to detect received data or DC light during the intervals when the light output is momentarily turned off. For multi-colored light, the illumination device can use a chain of the longest wavelength LEDs (i.e., the red LEDs) to detect the output power of the other colors. With two chains of the longest wavelength LEDs, each chain can measure the output power of the other, thereby enabling a feedback loop to control the output power of each color and the blended color mix.

Once the illumination device (i.e., the "lamp") is installed in an existing socket that may or may not be connected to a dimming switch, the illumination device can be dimmed by the remote controller. The remote controller sends commands to increment or decrement the output light level during the short "off" periods. The dimming function can be performed by pulse width modulating the LED drive current at a switching frequency preferably locked to the switching regulator frequency or by simply adjusting the LED drive current.

If photosensing is enabled, during the short light off periods, the longest wavelength LED chain can be used to measure ambient light. To do so, the LEDs may be configured in photovoltaic mode, and produce a voltage proportional to incident light. If the voltage is above a level specified through a command, the lamp can turn off in response. If the voltage drops back below the specified level, the lamp can turn on. Such a mechanism enables the light to turn on at night and off during the day. In combination with a timer, the light can turn on at dusk and off after a specified amount of time.

When the timer is enabled, the lamp can turn on and off at different times of day or turn off after a specified amount of time after being turned on. The lamp can be turned on by remote control, by power being applied through a switch, or by the photosensor function. In a mains connected application, the timer is synchronized to the AC frequency for a precise frequency reference.

When powered by a battery, the photosensitive LED chains can provide trickle current to re-charge the battery. A chain of 30 red LEDs (e.g., in the CREE lamp) can produce nearly 1 mW of power that can keep a re-chargeable battery charged in applications, such as emergency lights, that are not used often. For applications such as solar-powered, off-grid systems that are common in the developing world, the charging capability of the lamp can augment that of the solar panel.

As stated above, this fifth embodiment can also be used with the techniques, methods and structures described with respect to the other embodiments described herein. For example, the calibration and detection systems and methods described with respect to the second, third, seventh and eighth embodiments can be used with respect to the intelligent LED lights described in this fifth embodiment. Further, the communication techniques described with respect to this fifth embodiment can be used with respect to the other embodiments, if desired.

Figures 49, 50:
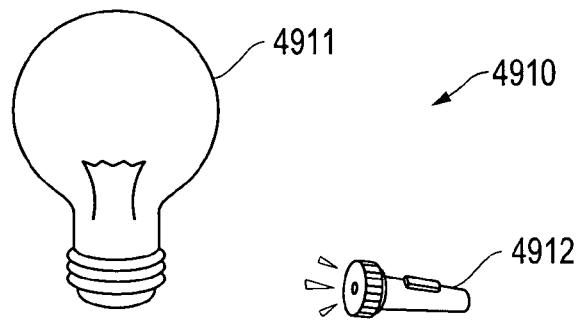
FIG. 49 an exemplary system diagram of an illumination device and a remote controller.
FIG. 50 is an exemplary list of functions performable by an exemplary illumination device.

Turning now to the drawings, FIG. 49 is one example of an intelligent illumination device system 4910 that comprises the illumination device 4911 and the remote controller 4912. The remote controller 4912 is preferably battery powered like a flashlight or TV remote control and is used to program the illumination device 4911 with modulated light. When the illumination device 4911 is powered preferably by the AC mains of an electrical socket (e.g., an Edison base socket), the illumination device 4911 can be controlled by the remote controller 4912. When the illumination device 4911 is enabled to produce light (i.e., "turned on" or "producing light"), the illumination device 4911 briefly and periodically stops emitting light to detect commands from the remote controller 4912 or ambient light from the environment, or to calibrate colors in a multi-colored illumination device 4911. When the illumination device 4911 is powered by the AC mains, but is not enabled to produce light (i.e., "turned off"), the illumination device enters a low power state. Commands from the remote controller 4912 can still be detected by the illumination device 4911 in this state. The illumination device 4911 responds to the remote controller 4912 by momentarily producing light modulated with data. To reset the illumination device 4911 to a default state, power to the illumination device 4911 is cycled in a specific sequence.

FIG. 49 is just one example of many possible intelligent illumination device systems. For example, the illumination device 4911 could be powered with a battery or the remote controller 4912 could be powered by the AC mains. In another example, if the illumination device is programmed when it is designed or produced, no remote controller 4912 is needed. Examples of pre-programmed devices include pre-configured night lights, and lights that automatically turn of perhaps 1 hour (or other delay) after being turned on. In such case, the functionality of the illumination device may be reduced.

In another example, light from the remote controller 4912 could power an un-powered illumination device 4911 with light while programming. For instance, a consumer could buy a light bulb replacement including this remote controller. The consumer could then hold the bulb to the remote and configure it to turn off 35 minutes after being turned on, then take the programmed bulb and screw in a socket somewhere. Without this self-powered variant, the bulb would need to be screwed into an energized socket in order to program it, which may be possible, but still perhaps less convenient.

In a further example, the remote controller battery could be charged by sunlight or ambient light when not in use. Additionally, multiple illumination devices 4911 could communicate with each other. For example, various governments have recently introduced mandates that certain buildings must have intelligent lights that automatically turn on and off based on whether or not people are present. Some large lighting companies provide systems consisting of lamps with motion detectors and 900 MHz RF transceivers. When one lamp in a room detects motion, it tells the rest of the lights to turn on. The two main issues with this approach are: (1) the lights are expensive, and (2) the RF signal passes through walls to other rooms with no people. The devices described herein could communicate with each other via light which: (1) does not require the expense of the RF circuitry, and (2) does not go through walls. Additionally, functions like dimming or color control could benefit from lamps communicating with each other. For example, a user could program one lamp, and that lamp then reconfigures the other lamps. Additional applications could be security where two lamps constantly communicate with each other. If an intruder passes between them and momentarily blocks the light, the lamps detect this and broadcast info to other lamps in the building in sort of a daisy chain way to a central security system.

FIG. 50 provides Table 2 that includes an example list of commands 5014 for the illumination device 4911 that enable the remote controller 4912 to turn the illumination device 4911 on and off, adjust the output power, and change the color to one of three different settings. Additionally, the illumination device 4911 can be configured to automatically turn on in response to a time of day counter reaching a particular count or ambient light dropping below a certain level, and to automatically turn off after a timer reaching a particular count from when the illumination device 4911 is turned on or ambient light rising above certain level. In this example, the color mix is always automatically measured and adjusted to a specific setting. The example set of commands 5014 can use 4 bits to produce hex codes 5013.

Preferably, the hex codes 5013 are preceded by a synchronization pattern and followed by parity to produce an 8 bit transfer sequence. Additionally, the commands that set a time must be followed with the actual time. Since there are 1440 minutes in a day, a time with one minute resolution requires 11 bits, which could be sent in two successive transfers after the command.

Table 2 is just one example of many possible sets of commands 5014 and hex codes 5013. For instance, in a multi-color light each individual component could be dimmed or color calibration could be enabled and disabled. As another example the time of day counter could count days of the week as well. The illumination device 4911 could have a subset of these functions or could have a variety of other functions such as strobing or continuous color variation. Additionally, illumination device 4911 status and register contents could be read. Further, the assignment of hex codes 5013 to commands 5014 could be completely different and could contain more or less bits depending on the number of commands 5014.

Figure 51:
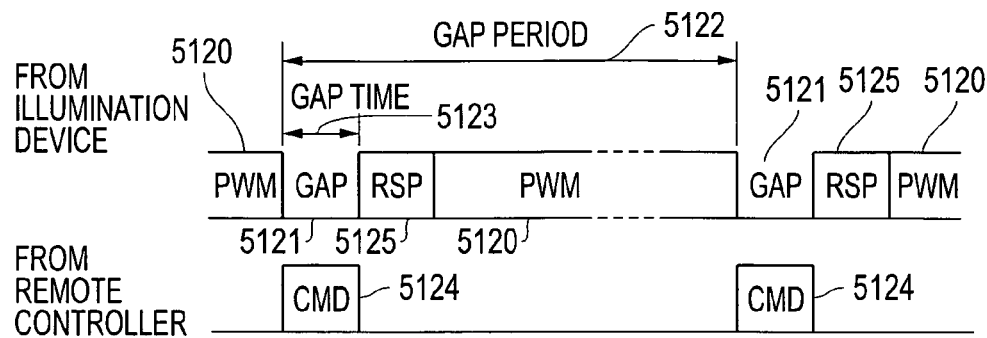
FIG. 51 is an exemplary timing diagram of data communication between the illumination device and the remote controller.

FIG. 51 is an example timing diagram for communicating commands 5014 between the illumination device 4911 and the remote controller 4912 when the illumination device 4911 is producing light. Pulse width modulated light PWM 5120 from the illumination device 4911 is periodically interrupted by gaps 5121 when no light is produced. The gap period 5122 in this example is one second. The gap time 5123 is equal to one half the mains period or 8.33 mSec at 60 Hz. The remote controller 4912 synchronizes to gaps 5121 in the PWM 5120 light from the illumination device 4911 and can send commands CMD 5124 during gaps 5121. When a CMD 5124 is sent from the remote controller 4912 and is properly received by the illumination device 4911, the illumination device 4911 provides a response RSP 5125 immediately after CMD 5124. The remote controller 4912 may preferably be narrowly focused (much like a flashlight) to assist a user in directing the remote commands to a particular illumination device in a room with multiple such illumination devices. The user could see the light beam and shine it directly on one light. This would focus light from the remote on the illumination device and light from the illumination device on the detector in the remote.

In this example, the light from the illumination device 4911 is pulse width modulated at 16 times the mains frequency or 960 Hz for 60 Hz AC, to enable dimming without changing LED wavelengths. At full brightness, the off time is very short or non-existent and at low light levels, the on time is short. The frequency of the pulses stays fixed. To prevent the remote controller 4912 from losing synchronization with the illumination device 4911, the last pulse from the illumination device 4911 before a gap 5121 is preferably not reduced below a minimum width that the remote controller 4912 can detect.

In another example, the one second gap period 5122 can be shortened to 200 msec for instance, after the illumination device 4911 and remote controller 4912 communicate a first CMD 5124 so that successive commands can be communicated faster. This may be important for dimming since there may be many power level steps between low and high power. Once the remote controller 4912 stops sending commands, the gap period 5122 widens back to one second intervals.

When the illumination device 4911 is not producing light, the remote controller 4912 does not detect gaps 5121 and can send commands CMD 5124 at any time. The protocol shown in FIG. 51 remains the same except that the illumination device 4911 is not outputting PWM 5120 light before and after the transaction.

During gaps 5121 when commands CMD 5124 are not sent or when the illumination device 4911 is not producing light, the illumination device 4911 can measure ambient light. The ambient light level is subtracted from the received light when commands CMD 5124 are sent and is used to determine when to turn the illumination device 4911 on or off when photosensor functionality is enabled. More specifically, when the illumination device is receiving commands, the background or ambient light produces a DC offset in the optically induced voltage across the LEDs (or photodiode). This DC offset can be eliminated by measuring the optically induced voltage during gaps 5121 when no commands are sent, and subtracting it from the induced voltage when receiving commands. Alternatively, the receiver in the illumination device can high pass filter the induced voltage to remove the DC offset. Since the data rate is low, the receiver may use a digital filter for DC blocking (and equalization). If the DC offset is known prior to receiving a command, the initial state of the digital filter can be set accordingly, and reduce the settling time. When photosensor functionality is enabled, ambient light is measured during gaps 5121 when the illumination device is producing light, and measured all the time when not producing light.

Additionally, in a multi-color illumination device 4911, the intensity of each individual color can be measured during gaps 5121 or when the illumination device 4911 is not producing light. For instance, when the illumination device 4911 is turned on, the illumination device 4911 can briefly measure the intensity of each color before producing the desired light. Then periodically as the illumination device warms up for instance, the color components can be measured during gaps 5121.

FIG. 51 is just one example of many possible timing diagrams. The gap period 5122 and gap time 5123 could be substantially different depending on the applications. The response RSP 5125 can be sent at different times or not at all. The commands CMD 5124 could even be sent during the off times of the PWM cycle and responses RSP 5125 could be variations in PWM duty cycle. To provide additional error protection, commands CMD 5124 could be repeated one or more times before taking affect. Many different timing diagrams and communication protocols could be implemented. For an illumination device 4911 that is powered by the light from the remote controller 4912 instead of a battery or AC mains, the protocol can include significant illumination durations in order to store sufficient charge on a capacitor for instance to power the illumination device 4911 and to communicate data.

Figure 52:
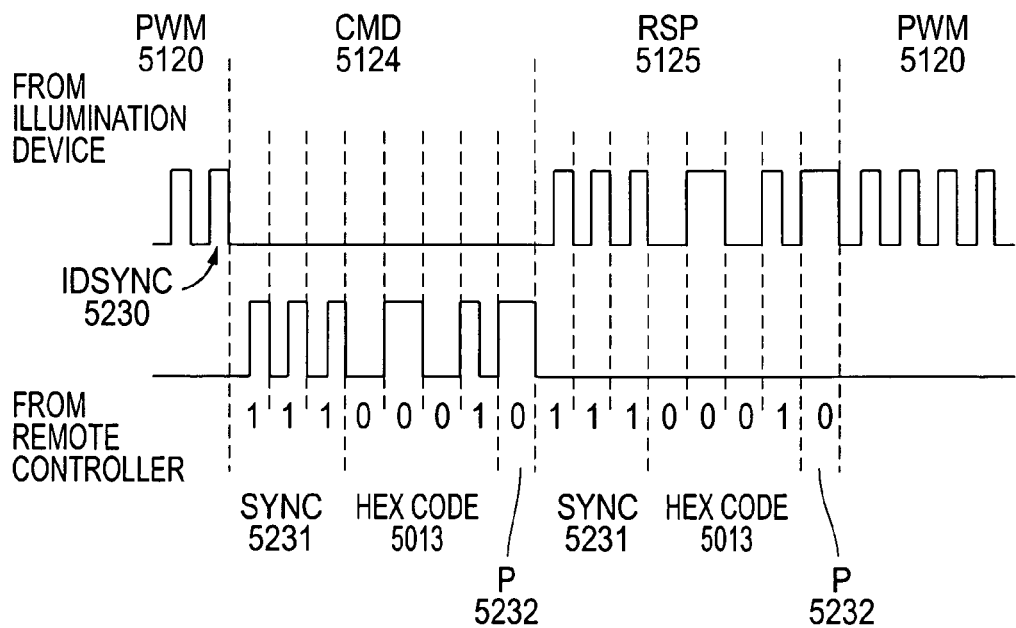
FIG. 52 is an exemplary timing diagram of the bit timing and coding scheme for transferring data between the illumination device and the remote controller.

FIG. 52 is an example timing diagram illustrating the bit level communication between the illumination device 4911 and the remote controller 4912 when the illumination device 4911 is producing light. Communication begins with the illumination device 4911 stopping the PWM 5120 output. The illumination device synchronization IDSYNC 5230 pulse is the last PWM pulse produced by the illumination device 4911 prior to a gap 5121. The width of IDSYNC 5230 is greater than the minimum pulse width detectable by the remote controller 4912. Other synchronization sequences, such as short series of pulses, may also be produced before each gap 5121. The CMD 5124 from the remote controller 4912 comprises a synchronization pattern SYNC 5231 of 3 ones, a hex code 5013, and an even parity bit P 5232 that are biphase encoded. In this example, the command 5014 is "light off". If the illumination device 4911 receives the CMD 5124 properly, the response RSP 5125 comprises the same biphase encoded SYNC 5231, hex code 5013, and parity P 5232 that comprised the CMD 5124.

When the illumination device 4911 is not producing light, the protocol shown in FIG. 52 remains the same except that the illumination device is not outputting PWM 5120 light (nor IDSYNC 5230) before and after the transaction.

FIG. 52 is just one example of many possible bit timing diagrams. Instead of biphase encoding, the protocol could use any one of many well known coding schemes such 4b5b, 8b10b, or NRZ. The SYNC 5231 could have a wide variety of lengths and sequences including none at all. The hex codes 5013 could have more or less bits and parity P 5232 could be even or odd, more than one bit, or none at all. CRC codes could be used for error detection. For an illumination device 4911 that is powered by light from the remote controller 4912, the protocol could be substantially different. In particular, it may be necessary to transmit data one bit at a time from the illumination device 4911 to the remote controller 4912 with the remote controller 4912 emitting light to re-charge a capacitor on the illumination device 4911 for instance between bits sent from the illumination device 4911. Useful transceiver techniques for so doing are described in U.S. patent application Ser. No. 12/360,467 filed Jan. 27, 2009 by David J. Knapp and entitled "Fault Tolerant Network Utilizing Bi-Directional Point-to-Point Communications Links Between Nodes," and in U.S. patent application Ser. No. 12/584,143, filed Sep. 1, 2009 by David J. Knapp and entitled "Optical Communication Device, Method and System," each of which is hereby incorporated by reference in its entirety.

Figure 53:
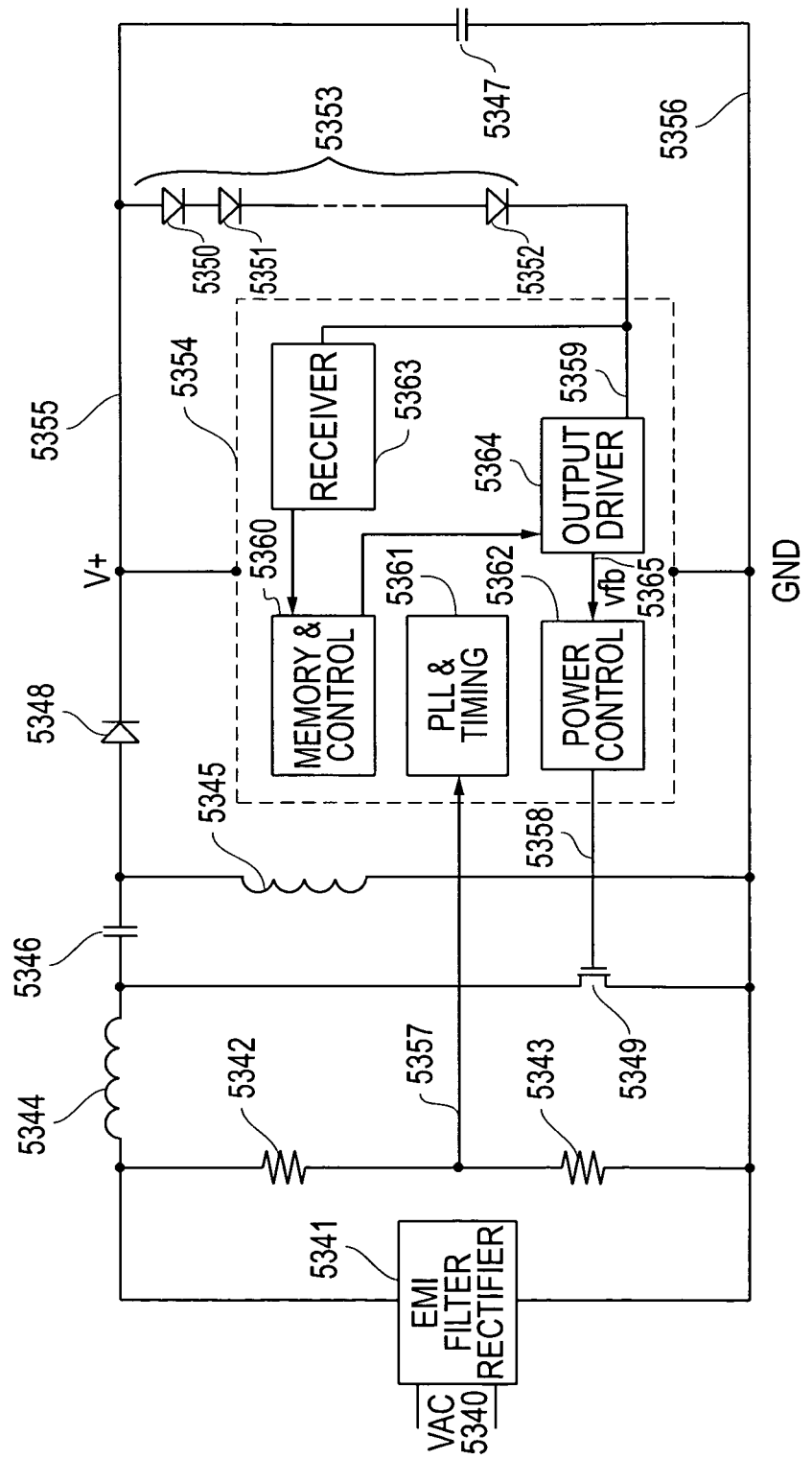
FIG. 53 is an exemplary illumination device block diagram.

FIG. 53 is an example block diagram for an exemplary illumination device 4911 that comprises an EMI filter and rectifier 5341, an AC to DC converter, a voltage divider, an integrated circuit IC 5354, and the LED chain 5353. The EMI filter and rectifier 5341 produces a full wave rectified version of the AC mains VAC 5340, and minimizes both transient disturbances on the mains from affecting the rectified power, and switching noise in the illumination device 4911 from affecting the mains. The voltage divider comprises resistors R 5342 and R 5343 and produces signal S 5357 that is a reduced voltage version of the rectified mains signal for IC 5354. The AC to DC converter includes inductors 5344 and 5345 (also referred to herein as inductors L 5344 and L 5345), capacitors 5346 and 5347 (also "capacitors C 5346 and C 5347"), diode 5348 (also "diode D 5348"), the N-channel switch transistor 5349 (also "switch N 5349"), and the power controller 5362 on integrated circuit 5354 (IC 5354). This example shows LED chain 5353 comprising of LED 5350, LED 5351, and LEDn 5352, with the dashed line between LED 5352 and LEDn 5353 indicating that LED chain 5353 can include many LEDs. This architecture is typical for monochrome light or white light produced by blue LEDs with a phosphor coating. A multi-color illumination device typically would have separate LED chains for each color.

IC 5354 includes memory and control 5360, PLL and timing 5361, power control 5362, receiver 5363, and output driver 5364. Memory and control 5360 includes non-volatile memory for storing configuration information, such as enabling the timer or photo-sensor, and volatile (or non-volatile) memory for settings such as dimming. Memory and control 5360 also includes logic that manages the transfer of data with the remote controller 4912, produces the pulse width modulated (PWM) LED drive signal S 5359, and implements the timers and state machines that control the overall function of IC 5354 and the illumination device 4911.

PLL and timing 5361 includes a phase locked loop that produces a high frequency clock that is phase locked to S 5357 when the illumination device is powered. The voltage divider comprising of R 5342 and R 5343 provides a low voltage version of the rectified mains voltage S 5357 that does not exceed the voltage rating of IC 5354 and that the PLL locks to. All other circuitry on IC 5354 is synchronized to the PLL and timing 5361 outputs (not shown).

PLL and timing 5361 enables the illumination device 4911 to maintain a precise time base for time of day timer functionality by locking to the mains frequency. Likewise, gap period 5122 and gap time 5123 can be precisely aligned to VAC 5340 timing. Such timing could enable multiple illumination devices 4911 to synchronize and communicate directly between each other with light. For example, multiple illumination devices (i.e., "IDs") can sync to each other by first looking for GAPS (e.g., gaps 5121) just before producing light. If proper GAPs are found, the illumination device syncs to them. If no gaps are found, there is nothing to sync to and the illumination device effectively becomes a timing master that other illumination devices lock to when turned on. Such an illumination device preferably should also be able to detect if sync is lost and to re-lock. It is further noted that additional embodiments for illumination devices and systems as well as for visible light communication systems and methods are also described with respect to the fourth and sixth embodiments described herein. It is further noted that display related systems and methods, display calibration systems and methods, and LED calibration systems and methods are also described with respect to the first, second, third, seventh and eighth embodiments described herein.

When VAC 5340 is turned off, capacitor C 5347 can maintain power to IC 5354 for some period of time. If VAC 5340 is turned off and on within this time, IC 5354 can remain powered. To reset the illumination device 11 to a default state, VAC 5340 can be turned off and on a number of times for specified amounts of time. For instance, the reset sequence could be 3 short off and on intervals, followed by 3 longer off and on intervals, and followed finally by 3 more short off and on intervals. PLL and timing 5361 monitors signal S 5357, signals IC 5354 to enter a low power state when signal S 5357 stays low, and measures the time between short VAC 5340 off and on periods. When PLL and timing 5361 detects the proper VAC 5340 off and on sequence, IC 5354 is reset to a default state.

Power control 5362, together with the external components inductors L 5344 and L 5345, capacitors C 5346 and C 5347, diode D 5348, and switch N 5349, and current sensing feedback from output driver 5364, implement the AC-to-DC converter function. The configuration implemented is the well known Single Ended Primary Inductor Converter (SEPIC). Switch N 5349 is turned on and off by power control 5362 at a relatively high frequency such as 1 MHz, with the duty cycle varying to produce the desired current through LED chain 5353. When switch N 5349 is closed, the current from L 5344 and L 5345 is pulled through switch N 5349 and charge stored on the capacitor C 5346 provides current to LED chain 5353. When switch N 5349 is open, the current through inductors L 5344 and L 5345 flows through the diode D 5348 and to LED chain 5353 and C 5347.

Power control 5362 compares voltage feedback signal Vfb 5365 from output driver 5364 to an internal reference voltage to produce an error signal that adjusts the duty cycle of the control signal S 5358 that is coupled to switch N 5349. The signal Vfb 5365 is produced by LED chain 5353 current flowing through a small resistor in output driver 5364 (not shown). When LED chain 5353 is turned off, Vfb 5365 becomes a divided down version of V+ 5355, which occurs when receiving data and during the PWM dimming off times. A control loop adjusts the feedback divider to maintain V+ 5355 at the same voltage as when LED chain 5353 is on.

When output driver 5364 turns the current to LED chain 5353 on or off, large voltage transients can occur on V+ 5355 before the power control 5362 can adjust to the new duty cycle of signal S 5358. When the LED chain 5353 current is turned off, V+ 5355 will go high until the duty cycle of S 5358 is reduced, and when the LED chain 5353 current is turned on, V+ 5355 will go low until the duty cycle of S 5358 is increased. To minimize such transients, power control 5362 receives information from memory and control 5360 in advance of when such changes will occur and adjusts S 5358 duty cycle the instant such a change is needed. Just prior to the output driver 5364 turning the LED chain 5353 current off, power control 5362 measures S 5358 duty cycle and stores the result. This duty cycle is restored instantly the next time LED chain 5353 current is turned off to prevent V+ 5355 from spiking high. Likewise, the S 5358 duty cycle is measured when the LED current is turned on, and the result is stored, and then restored to prevent V+ 5355 from spiking low.

Output driver 5364 turns LED chain 5353 current on and off with a switch connected to ground (not shown). Current flows from V+ 5355 to ground through LED chain 5353 and the switch, when the switch is on, and no current flows when the switch is off. A small resistor in series with the switch produces Vfb 5365 when the switch is on. When the switch is on, a control loop compares the output of a variable voltage divider from V+ 5355 to Vfb 5365 and adjusts the divider until the output equals Vfb 5365. When the LED chain 5353 current is turned off, the V+ 5355 voltage divider loop is also turned off and the voltage divider remains fixed. While the LED chain 5353 current is off, this divided version of V+ 5355 is forwarded to power control 5362 through Vfb 5365.

Receiver 5363 can receive data from the remote controller 4912, when the LED chain 5353 current is turned off by output driver 5364. Modulated light from remote controller 4912 is converted to a voltage signal S 5359 by LED chain 5353, which operates in photo-voltaic mode as in a solar panel. Receiver 5363 high pass filters S 5359 to block the DC content from ambient light and to cancel the low bandwidth of the photo-voltaic LED chain 5353. Such bandwidth typically supports up to 1 k bits per second (1 kbps), but with the proper equalization filter the data rate can be increased by 10 times or more. To support the protocol in FIGS. 51 and 52, 2 kbps are needed. Receiver 5363 comprises an A/D converter and a digital filter to equalize signal S 5359. Timing recovery is not needed since the data is sent from the remote controller 4912 synchronously to the AC mains frequency that IC 5354 is locked to. The output of the digital filter is simply sampled at the appropriate times.

When the illumination device 4911 is not producing light, the remote controller 4912 detects the absence of gaps 5121. Since the remote controller 4912 is not synchronized to the gaps 5121 from the illumination device 4911, and since the remote controller 4912 is battery powered, data from the remote controller 4912 is asynchronous to the timing in the illumination device 4911. Provided the remote controller 4912 has a precise oscillator, such as a quartz crystal, the remote controller 4912 and the illumination device reference clocks will typically be within a couple hundred parts per million of each other. The illumination device 4911 resets a timer clocked at high frequency on the falling edge of the third SYNC 5231 pulse and uses this timer to sample received data and produce transmitted data. The drift between the two reference clocks over the 16 msec period of one transfer is insignificant.

The illumination device 4911 measures ambient light during gaps 5121, and also when the illumination device 4911 is not producing light, by measuring the average voltage of signal S 5359 with the A/D converter in receiver 5363. The A/D converter should be architected to have small DC errors, such as the well known chopper stabilization architecture, to measure very low light levels.

FIG. 53 is just one example of many possible illumination device 4911 block diagrams. For example, an illumination device 4911 architecture for multi-colored light could comprise of an LED chain 5353 and output driver 5364 for each component color. Example color combinations could comprise of red, green, and blue, or of red, yellow, green, and blue, or of red and white. During gaps 5121, and also when the illumination device 4911 is not producing light, the lower light frequency LEDs can measure the light intensity of each other and of the higher light frequency LEDs. For instance, in a red and white illumination device, during gaps 5121 for instance, the white LED chain could produce light and the red LED chain could be connected to the receiver and could measure the light power. If the red LEDs are organized in two separate chains with separate output drivers, during gaps 5121 for instance, one red LED chain could measure the light power of the other. By measuring the light power from each LED chain, the illumination device could adjust the current to the different LED chains to maintain a specific color point for instance over LED variations, temperature variations, and LED lifetime. A single receiver 5363 could be shared and connected at different times to different LED chains, or multiple receivers 5363 could be implemented.

Another example illumination device 4911 block diagram for an illumination device that can be powered by the remote controller 4912 during configuration could comprise a second very low power receiver. The second receiver could be powered by an LED chain receiving modulated light and could store configuration information in non-volatile memory. The average voltage induced across the LED chain by light is typically significantly lower than the voltage necessary to produce light from the same LED chain. The induced voltage could be stored across capacitor C 5347 and a smaller segment of the LED chain 5353 could be connected to output driver 5364 to emit responses to the remote controller 4912. The communication protocol to configure an illumination device 4911 when not powered could be different from FIG. 51 to enable capacitor C 5347 to be re-charged after each emitted light pulse. Useful techniques for so doing are described in the aforementioned U.S. application Ser. No. 12/360,467 and No. 12/584,143.

The block diagram for an illumination device 4911 that is powered by a battery instead of the AC mains would have a battery and potentially a different type of switching power supply such as the well known buck, boost, boost buck, or flyback. With a re-chargeable battery, ambient light or sunlight incident on the LEDs could produce power to re-charge the battery. A block diagram for such an illumination device 4911 could have a second power control 5362 that manages the battery charger. An illumination device powered by the AC mains could also have any of a wide variety of different AC-DC converters, such as the boost buck or flyback. Such an illumination device could also have a back up re-chargeable battery that enables the illumination device to maintain the time of day counter when power goes off. The timing for the illumination device 4911 could also be based on a local crystal oscillator instead the mains frequency for instance.

As a further example, the block diagram for an illumination device that uses a silicon photodiode instead of LEDs for instance for receiving data would have the receiver 5363 connected to the photodiode instead of LED chain 5353. Such architectures would be particularly useful for illumination devices that only use phosphor coated white LEDs that do not operate well in photo-voltaic mode. The silicon photodiode could receive commands 5124 from the remote controller 4912, measure ambient light, and measure emitted light from the LED chain.

Multiple illumination devices could also communicate with each other. In this example, an illumination device 4911 could execute a protocol to synchronize to other illumination devices and to arbitrate for transmission bandwidth. When turned on, an illumination device 4911 could monitor the ambient light, search for gaps 5121 with the proper gap period 5122 and gap time 5123, and synchronize to the gaps 5121 if found. If all the illumination devices are connected to the AC mains, then very precise synchronization is possible. Illumination devices could arbitrate for bandwidth according any one of many well known arbitration protocols. For instance, if two illumination devices transmit at the same time, both illumination devices detect the collision and wait a random amount of time before trying to communicate again. As another possibility, a CMD 5124 could include a priority code that indicates in the case of a collision, which illumination device stops transmitting.

As used herein, an illumination device is assumed to produce a general light, usually of a human-perceivable nature, but possibly infrared or some other wavelength. An illumination device enabled to produce light (i.e., "turned on") may be thought of as being set to an "on-state" (i.e., having its illumination state set to an on-state), even though, as described above, there may be very short periods of time during which the light source is momentarily turned "off" and is not actually emitting light, such as during the gaps, and during the off-times in a PWM signal. The on-state and off-state of the illumination device should be clear in the context described above and not confused with the on and off status of the actual light source.

An illumination device may be set to an on-state or off-state by any of several events, such as application/removal of power to the illumination device (such as by energizing the light socket into which the illumination device is inserted), by a timer event, by ambient light control, and by a remote command.

Exemplary block diagrams are depicted herein. However, other block partitionings of an illumination device may be provided. As used herein, an illumination device attribute may represent an operational state or a configuration parameter of the illumination device. Examples include the illumination state, timer settings, delay settings, color settings for each of one or more light sources within the illumination device, photosensing mode settings, dimmer settings, time-of-day, etc.

Numerous variations and modifications will become apparent to those skilled in the art once the above disclosure is fully appreciated.

Sixth Embodiment

Systems and methods for visible light communication are disclosed. In part, illumination devices and related systems and methods are disclosed that can be used for general illumination, lighting control systems, or other applications. The illumination devices utilize one or more synchronized timing signals to synchronize, preferentially to the AC mains, so as to produce time division multiplexed channels in which control information can be communicated optically by the same light source that is producing illumination. Such illumination devices preferentially comprise LEDs for producing illumination, transmitting data, detecting ambient light, and receiving data, however, other light sources and detectors can be used. The physical layer for such communication can be used with a variety of protocols, such as ZigBee, from the Media ACcess (MAC) layer and higher. Various embodiments are described with respect to the drawings below. Other features and variations can also be implemented, if desired, and related systems and methods can be utilized, as well.

In certain embodiments, the visible light communication techniques described herein can be used in combination with existing electronics for LED lights to implement a variety of advantageous lighting control systems and features, such as remote control, daylight harvesting, scheduling, and occupancy sensing in the light are possible at very little additional cost. These lighting control systems further allow a plurality of illumination devices to communicate with each other, remote controllers, and a central controller. Further, the techniques described herein could also be used by a single illumination device and controller, or other devices and applications, as desired. In particular, an AC mains powered controller with a light source that is normally off could communicate information, such as dimming level and color settings, to one or more LED lamps. In contrast with the techniques described herein, control of conventional lighting is typically performed by separate electronic units that communicate with each other over wires or radios, which add cost and complexity.

Illumination devices described herein preferentially comprise phase locked loops (PLLs) that phase lock to the AC mains and produce the synchronized timing signals for operating the devices. Since other illumination devices in the lighting systems for instance phase lock to the same AC mains signal, all such devices have precisely the same internal timing. With such synchronized timing, communication channels can be formed during which all devices can communicate. Likewise, since the bit level timing of data communication within such channels is precisely synchronized, data recovery within a receiver is substantially easier since the received data timing is known.

A communication channel is a timeslot that preferentially spans a fraction of an AC mains period (16.67 mSec for 60 Hz) during which all the members of a group of devices stop producing illumination. Higher layers in a communication protocol, such as ZigBee, can dynamically assign individual devices to communicate on different channels. During such timeslots information can be communicated optically between such members when one member produces light modulated with data. During such timeslots when data is not being communicated, ambient light can be measured for daylight harvesting applications and for improving receiver sensitivity.

Preferentially, the illumination devices comprise LEDs for illumination and for transmitting and receiving data to minimize cost and maximize receiver sensitivity. Because white LEDs that comprise a blue LED covered with a phosphor have poor sensitivity to received light, preferentially the illumination devices comprise LEDs with different colors to produce the desired white light. Possible combinations include white and red, or red, yellow, green, and blue, but could include any combination or even a single color provided at least one LED in the illumination device is preferably not phosphor coated. Preferentially, the illumination devices comprise red LEDs for best receiver sensitivity. The additional cost of controlling multicolored LEDs can be reduced or eliminated in lamps that combine the systems and methods described herein with those described in additional embodiments as described herein for calibrating devices using LEDs such as those described herein with respect to the second embodiment, the third embodiment, the seventh embodiment and the eighth embodiment. These embodiments describe in part techniques to precisely control the color of light produced by combinations of different colored LEDs, such as white and red, or red, yellow, green, and blue, and can do so without the need for additional photo-detectors or temperature sensors thereby making such implementations more cost effective.

The messages in a communication channel are preferentially sent a few bytes at a time in successive timeslots over a complete physical layer data frame. Such a data frame comprises a MAC layer data frame superseded by additional physical layer information with most of the physical layer data frame scrambled by well known methods to remove DC content. The MAC layer data frame can conform to any protocol including ZigBee.

The systems and methods disclosed herein address problems with prior systems in part by providing physical layers for lighting control systems for reduced costs and/or relatively insignificant additional costs. Advantageously, the illumination devices and other devices in the lighting system described herein can communicate using the devices already needed for illumination.

As stated above, this sixth embodiment can also be used with the techniques, methods and structures described with respect to the other embodiments described herein. For example, the calibration and detection, systems and methods described with respect to the second, third, seventh and eighth embodiments can be used with respect to the visible light communication systems and methods described in this sixth embodiment. Further, the communication and synchronization techniques described with respect to this sixth embodiment can be used with respect to the other embodiments, if desired.

Figure 54:
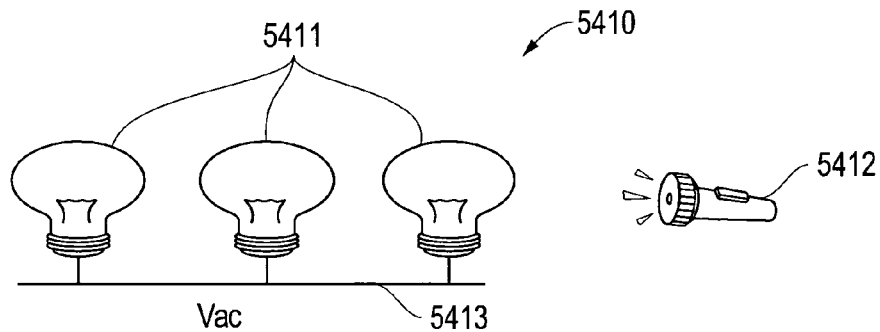
FIG. 54 is an exemplary diagram of a lighting system comprising illumination devices and remote controller.

Turning now to the drawings, FIG. 54 is one example of a lighting system 5410 comprising illumination devices 5411, AC mains 5413, and optionally remote controller 5412 that uses visible light for both illumination and communication. The illumination devices 5411 preferentially comprise LEDs to produce light for both lighting and communicating, and are preferentially connected and synchronized to the AC mains 5413. Timing circuits in the illumination devices 5411 lock to the AC mains 5413 frequency and produce periodic intervals during which all illumination devices 5411 do not emit light for illumination and may communicate data. The periodic interval rate is sufficiently high for humans to simply perceive continuously light. The data communicated preferentially comprises information to control the illumination devices, but could comprise any digital information.

Optional remote controller 5412 can be AC mains 5413 or battery powered and preferentially comprises at least one LED for producing visible light to communicate with the illumination devices 5411. If remote controller 5412 is AC mains powered, timing circuits lock to the AC mains 5413, which synchronizes remote controller 5412 with the illumination devices 5411 and enables optical communication. If remote controller 5412 is not connected to the AC mains 5413, remote controller 5412 monitors the light produced by illumination devices 5411 and locks to the periodic light off intervals to enable communication. If the illumination devices are turned off and are not producing light, remote controller 5412 can communicate with illumination devices 5411 anytime.

The network protocol stack for communicating information, with the exception of the physical layer, preferentially follows the well known Zigbee standard, but could follow many different protocols. While the Zigbee physical layer can use multiple different radio frequency communication channels, the embodiments described herein can communicate over multiple visible light communication channels that are shifted in time relative to each other and the AC mains signal. Both physical layers can interface to the Zigbee Media ACcess or MAC layer.

FIG. 54 is just one example of a lighting system using visible light for synchronous communication. For instance, any number of illumination devices 5411 could be supported. Some illumination devices 5411 could be AC mains 5413 powered, while others are battery powered. More or less remote controllers 5412 could be supported. A variety of other AC mains 5413 or battery powered devices such as switches, dimmers, appliances, and even computers could communicate under the techniques described herein. Likewise, illumination and other devices could synchronize in many different ways. For instance a dedicated wire, RF channel, or some other communication channel could provide such synchronization signal. Additionally, devices could synchronize to other devices already communicating by monitoring the light being produced by such other devices, and locking to communication gaps in such light.

Figure 55:
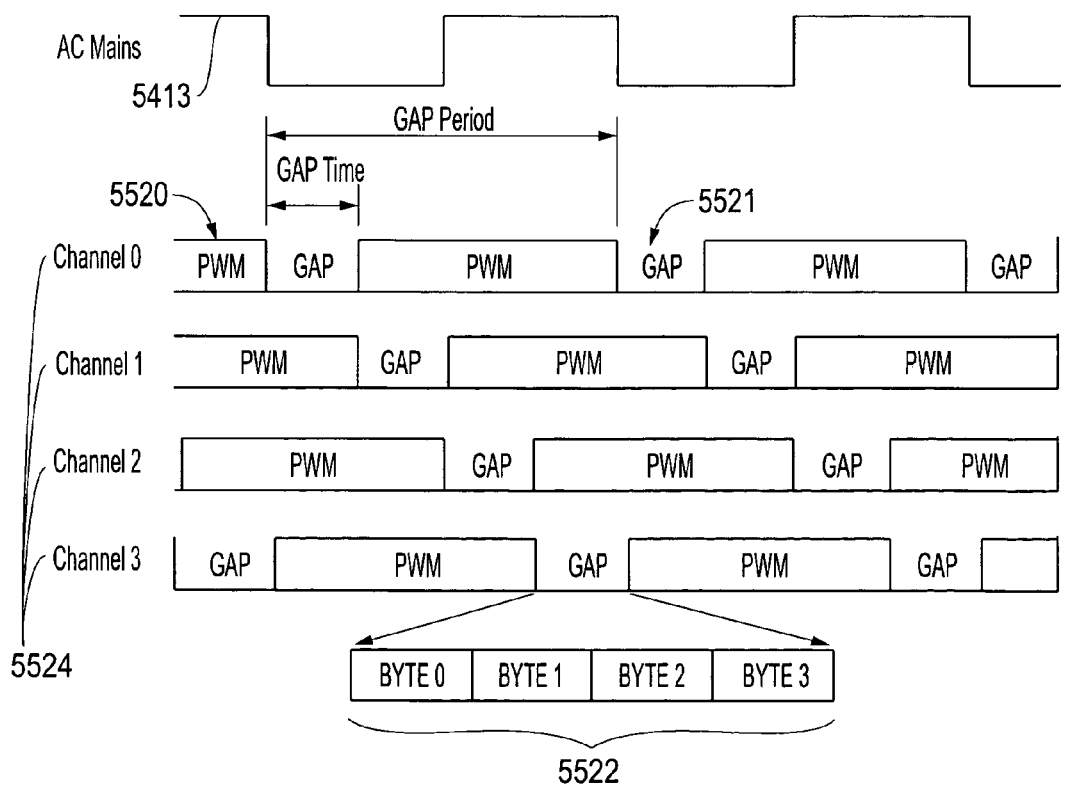
FIG. 55 is an exemplary timing diagram for communication within the light system.

FIG. 55 is an example timing diagram for communicating between illumination devices 5411 in lighting system 5410 that illustrates the relationship between the AC mains 5413 timing that is typically 50 or 60 Hz, four different communication channels 5524 labeled Channel 0 through Channel 3 that comprise PWM time 5520 and communication gap time 5521, and the gap timing that comprises four data bytes 5522 labeled BYTE 0 through BYTE 3. During PWM time 5520, illumination devices 5411 can produce light for illumination and during gap time 5521 illumination devices 5411 can communicate. In this example, channels 0 through 3 provide gap times 5521 that have different non-overlapping phases relative to the AC mains timing; which provide four independent communication channels.

The gap period for each channel 0 through 3 in this example is equal to one over the AC mains frequency and comprise alternating PWM 5520 and gap 5521 times. During PWM 5520 times, light from an illumination device 5411 can be on continually to produce a maximum brightness or Pulse Width Modulated (PWM) to produce less brightness. During the repetitive gap 5521 times, data can be sent from any device to any or all other devices. In this example, the gap time is one quarter of the AC mains 5413 period and enables four data bytes 5522 to be communicated at an instantaneous bit rate of 60 Hz times four times 32 or 7.68K bits per second and an average bit rate of 1.92K bits per second.

Higher layers in the Zigbee or other protocol stack select which channel is used for communication between which devices. For instance, a group of illumination devices 5411 that are physically located over a sufficiently wide area such that some illumination devices 5411 cannot communicate directly with each other can be divided into multiple groups of illumination devices 5411 with each group configured to communicate on a different communication channel. Communication between such groups could pass through an illumination device that communicates on two channels for instance.

FIG. 55 is just one of many possible timing diagrams for lighting system 5410. For instance, gaps 5521 could occur multiple times per AC mains 5413 period or once per multiple AC mains 5413 periods. The gap 5521 time could comprise a larger or smaller percentage of the AC mains 5413 period, and the number of bytes 5522 communicated within a gap 5521 time could be more or less than 4 including fractions of bytes. The number of channels could be more or less than 4 depending on the relationship between the gap 5521 time and period and the AC mains 5413 timing.

Figure 56:
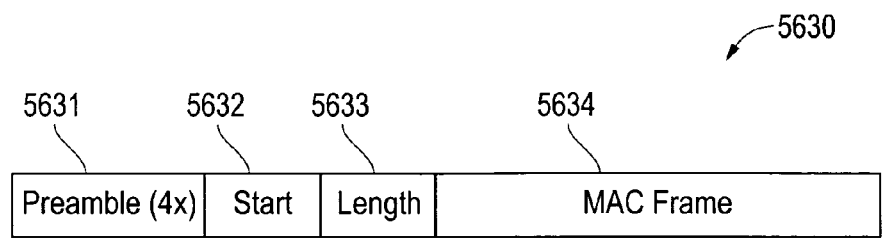
FIG. 56 is a diagram of an exemplary data frame for communicating data with the lighting system.

FIG. 56 illustrates the contents of data frame 5630 comprising a four byte preamble 5631, a start byte 5632, a frame length byte 5633, and up to 128 bytes of MAC frame 5634. Data frame 5630 conforms to the Zigbee physical layer specification and can be used to communicate information between devices in lighting system 5410. Data frame 5630 is sent according to the timing illustrated in FIG. 55 four bytes at a time in each gap 5521 until the entire data frame 5630 has been transmitted.

Preamble 5631 comprises four bytes of alternating ones and zeros that the receivers in all devices detect and adjust receiver parameters, such as gain, accordingly. The start byte 5632 is a unique code that all receivers detect and synchronize byte boundary timing to. The length byte 5633 identifies the length of the MAC frame 5634 in bytes. MAC frame 5634 contains data as defined by the Zigbee MAC layer specification.

FIG. 56 is one of many possible physical layer data frame 5630 formats. The preamble 5631, start 5632, and length 5633 could be completely different and still remain compatible with the Zigbee MAC layer specification provided that MAC frame 5634 is properly communicated from the MAC layer of a transmitting device to the MAC layer of receiving devices. To support different higher layer protocols even MAC frame 5634 could be completely different. Preamble 5631 may or may not be necessary with any MAC layer protocol depending on the capabilities of the receive circuitry.

Figure 57:
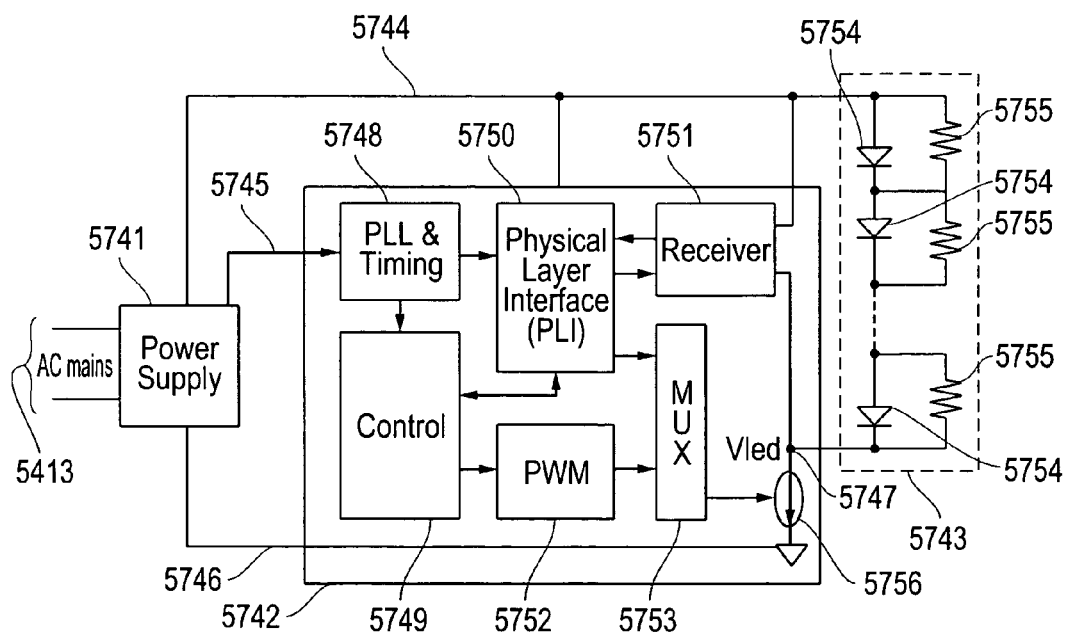
FIG. 57 is an exemplary block diagram of an illumination device.

FIG. 57 is an example block diagram for an illumination device 5411 that comprises power supply 5741, controller IC 5742, and LED chain 5743. LED chain 5743 preferentially comprises red LEDs 5754 connected in series with resistors 5755 connected in parallel with each red LED 5754. Typically, an illumination device 5411 would comprise additional chains of white LEDs for instance, but such chains are not shown for simplicity. As such, FIG. 57 as drawn is a block diagram for an illumination device 5411 that produces red light for instance.

Power supply 5741 accepts the AC mains 5413 and produces DC voltage 5744 that provides power for controller IC 5742 and LED chain 5743. The magnitude of DC voltage 5744 depends on the number of LEDs 5754 in LED chain 5743. Power supply 5741 also produces synchronization signal 5745 for controller IC 5742 to synchronize to. Signal 5745 preferentially is a low voltage version of the AC mains 5413 voltage that PLL and timing circuitry 5748 can accept and phase lock to.

Controller IC 5742 comprises PLL and timing circuitry 5748, control circuitry 5749, PLI (physical layer interface) 5750, receiver 5751, PWM 5752, mux 5753, and current source 5756. PLL and timing circuitry 5748 locks to the AC mains 5413 frequency and phase and produces the timing illustrated in FIG. 55. During PWM time 5520, mux 5753 enables PWM 5752 to control current source 5756, which can cause LED chain 5743 to produce illumination depending on the state of the PWM 5752 output. During gap time 5521, mux 5753 enables PLI 5750 to control current source 5756. When transmitting data 5522, PLI 5750 modulates current source 5756 with preferentially scrambled non return to zero (NRZ) data, and when not transmitting data 5522, PLI 5750 disables current source 5756.

Receiver 5751 monitors LED chain 5743 during gap times 5521 when PLI 5750 is not transmitting data and forwards recovered data if present to PLI 5750. PLI 5750 interfaces to control circuitry 5749, which implements the MAC layer protocol and higher layers used for illumination devices 5411 to communicate properly. When transmitting, PLI 5750 accept MAC frames 5634 from control circuitry 5749, generates preambles 5631, start bytes 5632, and length bytes 5633, scrambles the length bytes 5633 and MAC frames 5634 with well known techniques, and forwards the resulting data to current source 5756. Likewise when receiving, PLI 5750 accepts serial received data from receiver 5751, unscrambles the length bytes 5633 and MAC frames 5634, removes preambles 5631, start bytes 5632, and length bytes 5633, and forwards MAC frames 5634 to control circuitry 5749.

FIG. 57 is just one example of many possible illumination device 5411 block diagrams. For instance, preferentially illumination devices 5411 should comprise additional chains of different color LEDs such as white, or green and blue to produce white light. FIG. 57 does not show such chains for simplicity. Such additional chains would be enabled during PWM times 5520 and disabled during gap times 5521 when receiving data. When transmitting data, such additional chains would preferentially be modulated with the same data as LED chain 5743.

Additionally, receiver 5751 could be connected to a silicon photodiode or other optical sensing device for receiving data. FIG. 57 preferentially illustrates LED chain 5743 sensing received light since such LEDs are used to produce illumination as well. PWM 5752 can be, removed if illumination device 5411 does not need to be dimmable. Control circuitry 5749 could reside somewhere else, for instance in an external microcontroller. Controller IC 5742 functionality could be implemented with various electronic components instead of a completely integrated solution.

Figure 58:
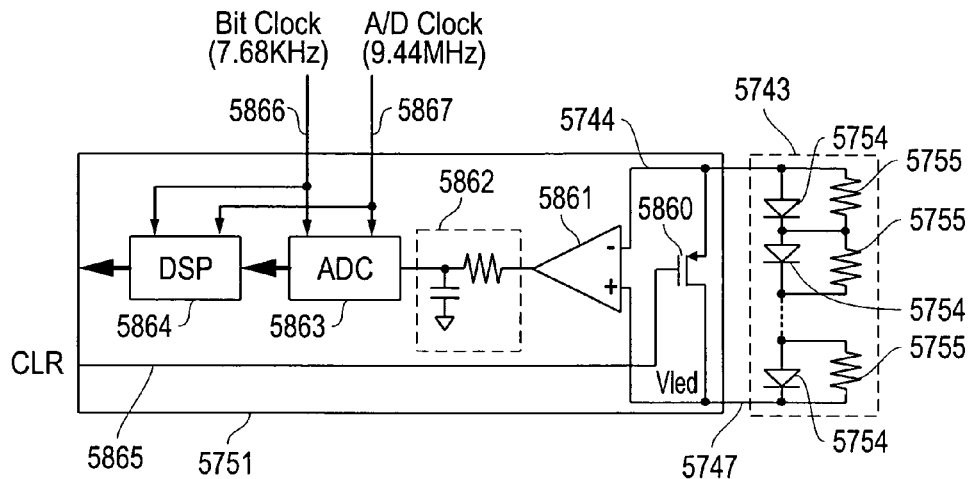
FIG. 58 is an exemplary block diagram for a receiver module within an illumination device.

FIG. 58 is one of many possible block diagrams for receiver 5751 that comprises switch 5860, amplifier 5861, low pass filter 5862, ADC 5863, and DSP 5864, and that interfaces with LED chain 5743. Light modulated with data and incident on LEDs 5754 induce current in each LED 5754 that flows in a loop through each resistor 5755. The voltages consequently induced across each resistor 5755 substantially sums to produce a larger voltage across signals 5744 and 5747, which is then further gained by amplifier 5861. Low pass filter 5862 substantially eliminates any noise or interference near and above the A/D Clock 5867 frequency that could alias into the signal bandwidth.

ADC 5863 preferentially has an over-sampling delta sigma architecture that samples the analog input at a high frequency, which is 9.44 MHz in this example, and low resolution, and then digitally low pass filters the result to produce high resolution samples at a substantially lower frequency, which is 7.68 kHz in this example. The high resolution ADC 5863 output preferentially is further processed by DSP, 5864 to increase channel bandwidth using well known decision feedback equalization techniques.

Switch 5860 is turned on when CLR 5865 goes low momentarily at the beginning of each gap period 5521 to short signals 5744 and 5747 together just prior to receiving data, which produces a low frequency affect on the received signal. DSP 5864 eliminates this and other low frequency affects such as from ambient light and 60 Hz interference, by preferentially monitoring and storing ADC 5863 output samples when no data is being received and subtracting average values of such samples from ADC 5863 results when receiving data. DSP 5864 alternatively could implement a high pass filter to remove such affects.

FIG. 58 is just one of many possible block diagrams for receiver 5751, which could receive data using a silicon photodiode instead of LED chain 5743. Amplifier 5861 could be configured as a trans-impedance amplifier to detect current instead of voltage from LED chain 5743. The ADC 5863 architecture could be well known FLASH or SAR or could be completely eliminated depending on the quality of the amplifier 5861 output. Likewise, DSP 5864 may or may not be needed depending on performance. Additionally, a variety of different channel equalization techniques could be implemented instead of decision feedback. As such FIG. 58 is just an example.

Figure 59:
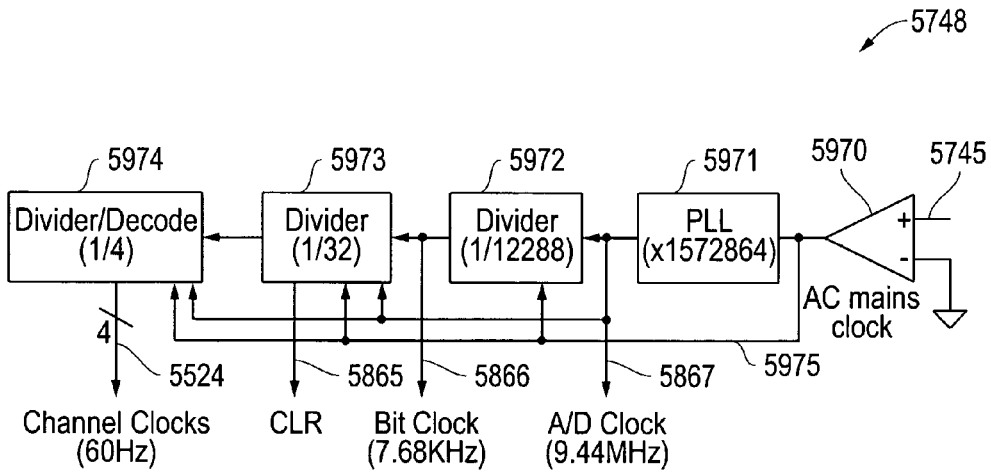
FIG. 59 is an exemplary block diagram for a PLL and timing module within an illumination device.

FIG. 59 is an example block diagram for PLL and timing circuitry 5748 that comprises comparator 5970, PLL 5971, dividers 5972 and 5973, and divider/decode 5974 and that produces the clocks synchronized to the AC mains 5413 used for controller IC 5442 to operate. Signal 5745 from power supply 5741 is converted to AC mains clock 5975 with a frequency and phase equal to the AC mains 5413 by comparator 5970. AC mains 5413 frequency is assumed to be 60 Hz in this example. AC mains clock 5975 frequency is multiplied by 1,572,864 by PLL 5971 to produce the A/D Clock 5867 with a frequency approximately equal to 9.44 MHz. A/D Clock 5867 is divided by 12288 by divider 5972 to produce bit clock 5866 with a frequency equal to 7.68 kHz, which is also precisely equal to the instantaneous bit rate of bytes 5522. Divider 5973 divides bit clock 5866 by 32 and also produces the pulsed signal CLR 5865. The output of divider 5973 is further divided by four and decoded by divider/decode 5974 to produce channel clocks 5524.

FIG. 59 illustrates one of many possible PLL and timing circuitry 5748 block diagrams that synchronizes the timing of controller IC 5742 to the AC mains 5413 frequency and phase. Depending on the architecture of controller IC 5742 as described previously PLL and timing circuitry 5748 could be completely different. For example, PLL 5971 could lock directly to the AC mains 5413 without comparator 5970.

Figure 60:
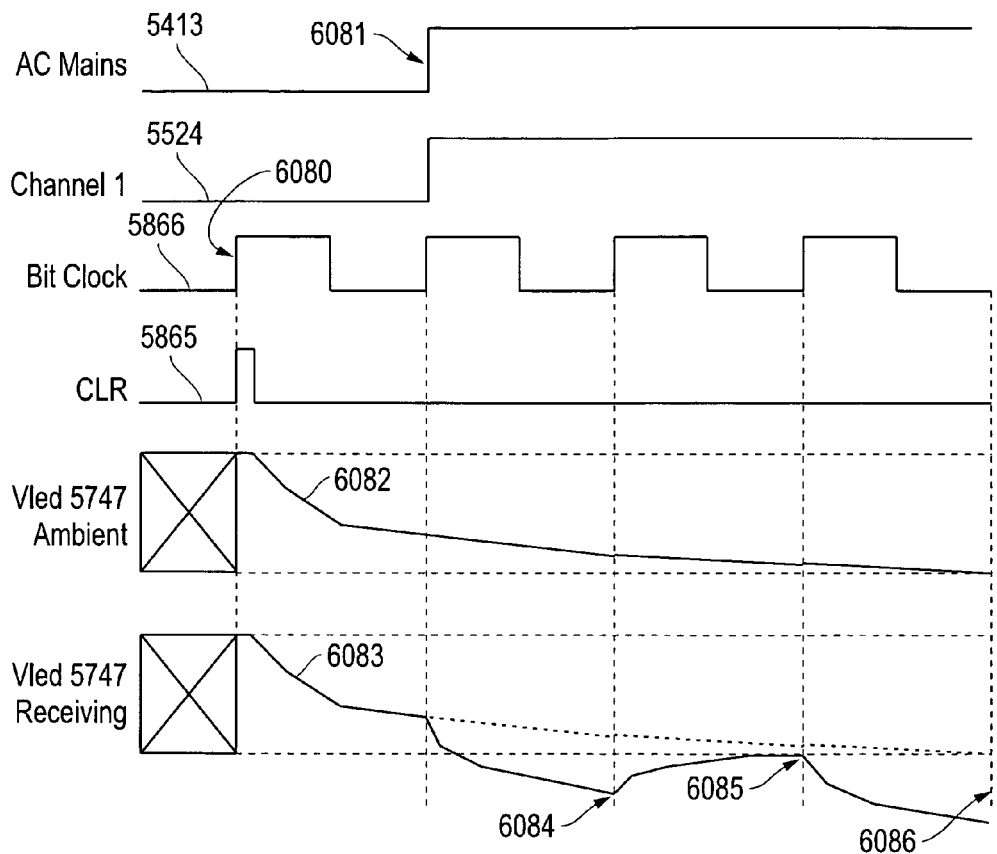
FIG. 60 is an exemplary detailed receive timing diagram.

FIG. 60 is an example diagram illustrating the timing of data being received at the beginning of a gap 5521 on channel one (1) 5524. In this example, the gap 5521 period is one bit clock 5866 longer than the total number of bits to be communicated within such gap 5521. The gap 5521 time starts at time 6080 when bit clock 5866 and CLR 5865 go high. Also at time 6080 mux 5753 switches control of current source 5756 to PLI 5750, which is configured to receive data in this example and consequently ensures that current source 5756 is disabled. Data bytes 5522 can begin to be communicated one bit at a time starting at time 6081 when AC mains clock 5413 and channel one 5524 clock go high.

Traces 6082 and 6083 represent the voltages on Vled 5747, which is the bottom of LED chain 5743, when received data is not present (Vled 5747 Ambient) and is present (Vled 5747 Receiving) respectively. When CLR 5865 is high, Vled 5747 is shorted to the power supply 5744. Just prior to CLR 5865 going high, current source 5756 may be enabled or disabled so the voltage on Vled 5747 is unknown. After CLR 5865 goes low ambient light induces a voltage across LED chain 5743, which causes traces 6082 and 6083 to drop exponentially. As shown on trace 6082, if no data is being received, the voltage on Vled 5747 may settle after many bit clock 5866 periods and could cause data errors when receiving data as shown on trace 6083. Consequently, DSP 5864 preferentially subtracts an averaged version of trace 6082 from Vled 5747 during gap 5521 times when data is being received.

Since illumination devices 5411 are synchronized to the same AC mains 5413 signal, the bit clocks 5866 in all such devices are also synchronized in both frequency and phase. Trace 6083 illustrates the voltage on Vled 5747 in a receiving illumination device 5411 when a second illumination device 5411 is sending the sequence beginning with one, zero, and one during the three bit clock 5866 periods after time 6081. A one in this example is represented by light being on which produces a lower voltage on Vled 5747 relative to power supply 5744. ADC 5863 samples Vled 5747 when bit clock 5866 goes high, which is precisely at the times 6084, 6085, and 6086 when Vled 5747 has the largest signal. If illumination devices 5411 were not synchronized to each other through the AC mains 5413 or other means, receiver 5751 in a receiving illumination device 5411 would need to recover a clock from the received signal Vled 5747 prior to recovering data, which would substantially increase the complexity of receiver 5751 and potentially degrade performance.

FIG. 60 is just one example of many possible timing diagrams. For instance, if receiver 5751 was connected to a dedicated silicon photodiode, CLR 5865 and switch 5860 would not be needed. Likewise, the gap 5521 period could have started at time 6081 instead of 6080 with or without a dedicated silicon photodiode. Depending on the data rate and sensitivity required for the application, traces 6082 and 6083 could be completely different. As such FIG. 60 is just one example.

Numerous variations and modifications will become apparent to those skilled in the art once the above disclosure is fully appreciated.

Seventh Embodiment

Systems and methods are also disclosed for light sources that use the photo-sensitivity of one or more colored LEDs to determine at least a portion of the emission spectrum of a white light source or other broad spectrum light emitter. As described herein, the white LED or other broad spectrum light emitter can be used as the light source, if desired, and the same one or more colored LEDs or different LEDs, if desired, can be used to emit light and to adjust a color point produced by the light source. Applications for the disclosed embodiments include but are not limited to general lighting, LCD backlighting, projectors, and direct emission displays such as OLEDs and digital billboards. Various embodiments are described with respect to the drawings below. Other features and variations can also be implemented, if desired, and related systems and methods can be utilized, as well.

One embodiment includes a method and system to set a precise color temperature produced by a substantially white light source, such as a phosphor coated blue LED, or some other broad spectrum light emitter, in combination with one or more colored or substantially mono-chromatic LEDs during the manufacturing of a device, such as an LED lamp, a display backlight, a projector, a digital billboard, or AMOLED (Active Matrix OLED) display, and to maintain such color temperature over the operating life of such a device. The method involves analyzing a portion of the spectrum of the white light source or broad spectrum light emitter using one or more colored LEDs as wavelength selective light sensors and then using such colored LEDs (or one or more additional different LEDs if desired) to emit light whereby adjusting the color of light produced by the combination of the white light source and the colored LEDs. These LEDs allow for the color point of the light source to be adjusted, as desired, based upon the measurements made with respect to portions of the spectrum of the broad spectrum light emitter. Embodiments further include a light source comprising a white light source and colored LEDs, which could be a pixel in a digital billboard or AMOLED, or the entire light source for a lamp, backlight, or projector, for instance.

The disclosed embodiments apply to any broad spectrum light emitter and/or substantially white light source and any number of colored LEDs. Of particular interest, however, and as described in more detail below, is the combination of red, green, blue, and white LEDs. In such example illustration, the red, green, and blue LEDs analyze the spectrum of light produced by the white LED by each LED operating as a different wavelength selective light detector. The blue LED measures the blue part of the spectrum, the green LED measures the green plus blue parts of the spectrum, and the red LED measures substantially the entire spectrum with emphasis on the red and green portions, of the white LED light source. Subsequent to such spectral analysis, the red, green, and blue LEDs emit light with intensities adjusted to produce a desired color point when combined with light produced by the white LED.

To reduce optical measurement errors due in particular to variations in LED responsiveness to incident light, further embodiments create ratios of signals induced on each LED by the white LED and other LEDs that are used to determine relative brightness of each LED to produce the desired color point. For instance and as described in one example herein, the brightness of the spectrum of the white LED filtered by the red, green, and blue LEDs is determined relative to the brightness of the blue LED. Additionally, the brightness of the green and red LEDs are determined relative to the brightness of the blue LED. All such relative brightness levels can then be compared to the desired relative brightness levels between the red, green, and blue LEDs and the three different spectral bands produced by the white LED, and the brightness of the red, green, and blue LEDs, and can be adjusted to produce the desired color point from all four LEDs.

Methods for using measured ratios of light are disclosed herein and also with respect to additional embodiments described herein, for example, with respect to the third embodiment. The disclosed embodiments include spectral analysis of a substantially white light to compensate for spectral variations in the emissions of such white light source. The methods described herein are associated with measuring ratios of emitted light, further comparing such ratios to desired ratios, and further adjusting the brightness produced by the LEDs in response to such ratios.

Specifically related to phosphor coated white LEDs, another aspect of the disclosed embodiments compensate for common variations between white LEDs during manufacturing and variations that occur over time in a particular LED. The amount of blue light produced by the blue LED that does not get absorbed by the phosphor relative to the amount of light emitted by the phosphor varies with phosphor thickness and uniformity during manufacturing and with phosphor degradation over time. With the methods described herein, the amount of blue light relative to the amount of phosphor converted light produced by the white LED can be determined and the amount of light produced by associated red, green, and blue LEDs or just red and green LEDs for instance can be adjusted to compensate for the difference in such ratio from a desired ratio.

The calibration methods and apparatus described herein address issues for devices using groups of different colored LEDs directly or as backlights for illumination. Such calibration methods reduce the need for specially binned LEDs for the production of lamps, displays, or backlights, and maintain the color or color temperature of the light produced over the operating life of the device.

As stated above, this seventh embodiment can also be used with the techniques, methods and structures described with respect to the other embodiments described herein. For example, the calibration and detection systems and methods described with respect to this embodiment can be used within the other described embodiments, as desired. Further, the various illumination devices, light sources, light detectors, displays, and applications and related systems and methods described herein can be used with respect to calibration and detection systems and methods described in this seventh embodiment, as desired. Further, as stated above, the structures, techniques, systems and methods described with respect to this seventh embodiment can be used in the other embodiments described herein, and can be used in any desired lighting related application, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications.

Figure 61:
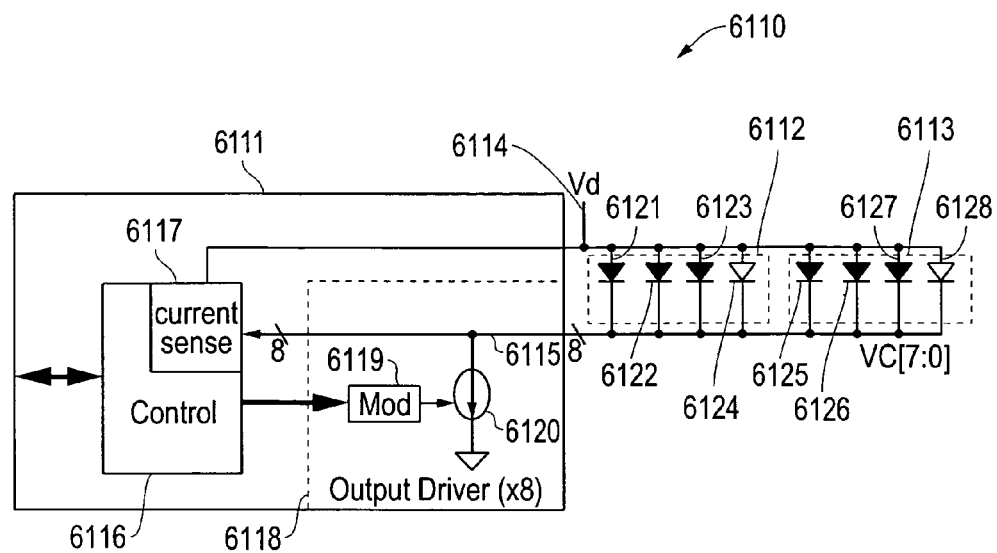
FIG. 61 is an exemplary block diagram for color calibration circuitry to set and maintain a precise color emitted by red, green, blue, and white LEDs.

Turning now to the drawings, FIG. 61 is an example block diagram for light source 6110 that uses a broad spectrum light emitter and multi-colored LEDs to produce a fixed blended color emitted by such light source. In this example, such broad spectrum light emitters are white LEDs 6124 and 6128 and the multi-colored LEDs are red LEDs 6121 and 6125, green LEDs 6122 and 6126, and blue LEDs 6123 and 6127, however, any type of emitter that produces substantially white light and any combination of different colored LEDs can be used. Such light source 6110 can be used in any application including but not limited to general lighting, LCD backlighting, projectors, and direct emission displays such as OLEDs and digital billboards. As such, a broad spectrum light emitter as used herein is generally meant to include any light emitter that includes one or more light sources that alone or together emit a spectrum of light across multiple color regions, such as two or more different colored light sources and/or a white light source. For example, a white LED that operates to produce white light would be a broad spectrum light emitter as used herein. As another example, a blue LED and a green LED that operate together to produce mixed blue/green light would also be a broad spectrum light emitter as used herein. Other combinations of different colored LEDs could also be used to simultaneously produce light across multiple color regions so as to operate as a broad spectrum light emitter. In short, a broad spectrum light emitter is one that simultaneously produces or emits light in multiple color regions.

In this example FIG. 61, light source 6110 comprises controller 6111 and RGBW (red, green, blue, white) LED packages 6112 and 6113. LED package 6112 comprises red LED 6121, green LED 6122, blue LED 6123, and white LED 6124. LED package 6113 comprises red LED 6125, green LED 6126, blue LED 6127, and white LED 6128. Such red, green, blue, and white LEDs are not necessarily combined in RGBW LED packages 6112 and 6113, however, since such packages are commonly available, for some applications such packages may be preferred.

Controller 6111 comprises eight output drivers 6118, control circuitry 6116, and current sense 6117 in this example FIG. 61. Each output driver 6118 comprises a current source 6120 and modulator 6119 that control the current to each LED 6121 through 6128 and optionally the duty cycle of such current to control the intensity of light produced by each such LED 6121 through 6128. Current sense 6117 can measure the photo-current induced in red LEDs 6121 and 6125, green LEDs 6122 and 6126, and blue LEDs 6123 and 6127 by the other LEDs 6121 through 6128 as described in FIGS. 66A-D, 67A-D, 68A-D and 69-A-D. The anodes of LEDs 6121 through 6128 are shown to be tied together and to the power supply Vd 6114. The cathodes of LEDs 6121 through 6128 are shown connected to signal bus VC[7:0] 6115, which connects each cathode to a different output driver 6118 and current sense 6117 input in controller 6111.

FIG. 61 is just one example of many possible block diagrams for light source 6110. For instance, any broad spectrum emitter in combination with any combination of different colored LEDs can be used. A broad spectrum emitter is generally meant to include an emitter that emits a spectrum of light across multiple color regions, such as a white light source. Additionally, any number of broad spectrum emitters and LEDs can be combined to produce light source 6110 with any emission power. When the broad spectrum light source is a white LED, any number of such white and colored LEDs can be connected in series or parallel, with any number of driver circuits. Controller 6111 can comprise a single or many integrated circuits and discreet components. Driver 6118 may or may not comprise modulator 6119, in which case, current sources 6120 would be adjusted to vary the intensity of light produced by each attached LED. Likewise, current sense 6117 could measure voltage instead of current or some combination of both. As such FIG. 61 is simply an example block diagram for light source 6110.

Figure 62:
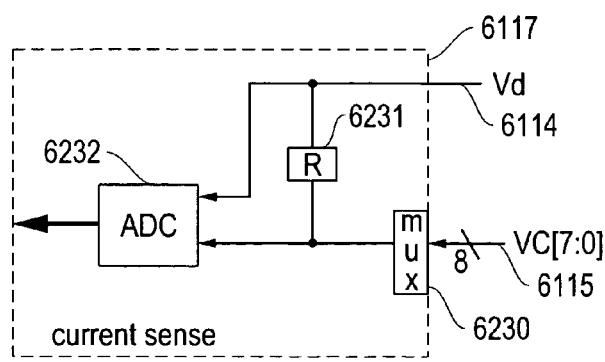
FIG. 62 is an exemplary block diagram for circuitry to sense photocurrents from the LEDs.

FIG. 62 is an example block diagram for current sense 6117, which comprises ADC (analog to digital converter) 6232, resistor (R) 6231, and multiplexer (mux) 6230. As shown in both FIG. 61 and FIG. 62, the inputs to current sense 6117 comprise Vd 6114, which is connected to the anodes of LEDs 6121 through 6128 in this example, and VC[7:0] 6115 signals that are connected to the cathodes of each LED 6121 through 6128. The output of ADC 6232 is forwarded to control circuitry 6116, which processes the information and controls drivers 6118. To measure the photocurrent induced on any LED 6121 through 6128, multiplexer 6230 passes the selected signal from VC[7:0] 6115 from the cathode of the selected LED to resistor 6231 and ADC 6232. Since Vd 6114 is connected to the opposite side of resistor 6231 and to the anode of the selected LED, any current induced in the selected LED passes through resistor 6231 and induces a small voltage, which is measured by ADC 6232. Preferably, the resistance of resistor 6231 should be selected to never produce a sufficiently high voltage when measuring photocurrent to forward bias the LED. For instance, a typical resistor value of 100 k ohms would produce a typical ADC 6231 input voltage of 10-100 mV.

FIG. 62 is just one example of many possible block diagrams for current sense 6117. For example, if resistor 6231 is removed, ADC 6232 could measure the open circuit voltage induced across each LED 6121 through 6128. Multiplexer 6230 is shown to select between all 8 LEDs, however, white LEDs 6124 and 6128 are typically not measured and consequently do not need to be connected to current sense 6117. Multiplexer 6230 is not needed at all if an ADC 6232 is connected directly to each LED cathode. As such, FIG. 62 is just one example of many possible current sense 6117 block diagrams.

Figure 63:
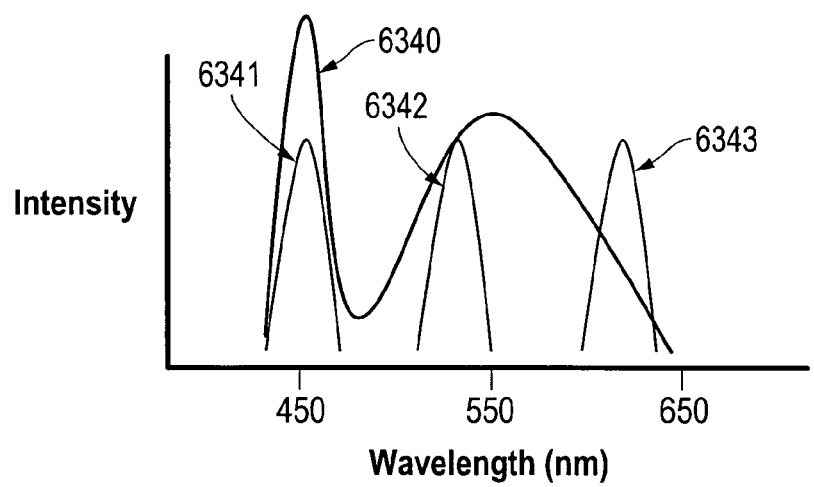
FIG. 63 illustrates exemplary emission spectra of red, green, blue, and white LEDs.

FIG. 63 is an illustration of exemplary emission spectra produced by red, green, blue, and white LEDs 6121 through 6128 in light source 6110. Emission spectrum 6340 illustrates one possible spectrum emitted by white LEDs 6124 and 6128. Since white LEDs typically comprise blue LEDs with a phosphor coating, the emission spectrum 6340 shows a peak around 450 nm, which is produced by the blue LED, and a much broader peak around 550 nm, which is produced by the phosphor. The blended spectrum appears as white light, however, the color or color temperature of such white light can vary substantially.

Emission spectrums 6341 (blue), 6342 (green), and 6343 (red) represent typical spectrums produced by blue LEDs 6123 and 6127, green LEDs 6122 and 6126, and red LEDs 6121 and 6125 respectively. Typical peak emission wavelengths are 450 nm for blue, 530 nm for green, and 625 nm for red, which are represented by the highest intensity points in emission spectra 6341 (blue), 6342 (green), and 6343 (red) respectively. The peak emission wavelength for green LEDs 6122 and 6126 typically is just shorter than the peak emission wavelength produced by the phosphor in white LEDs 6124 and 6128, while the peak emission wavelength for red LEDs 6121 and 6125 typically is longer than most of the optical power produced by white LEDs 6124 and 6128.

FIG. 63 is one example of many possible emission spectrums from the individual lighting elements in light source 6110. For instance, light source 6110 can have a broad spectrum emitter to typically produce white light that is not an LED. In such case, the emission spectrum typically would be substantially different from emission spectrum 6340. Likewise, light source 6110 may comprise more or less colored LEDs and such LEDs could be any color. As such the LEDs in light source 6110 could have more or less emission spectrums than spectrums 6341, 6342, and 6343 shown in FIG. 63, and each spectrum could have substantially different peak emission wavelengths and other spectral characteristics. FIG. 63 is just one example of many possible spectral plots.

Figure 64:
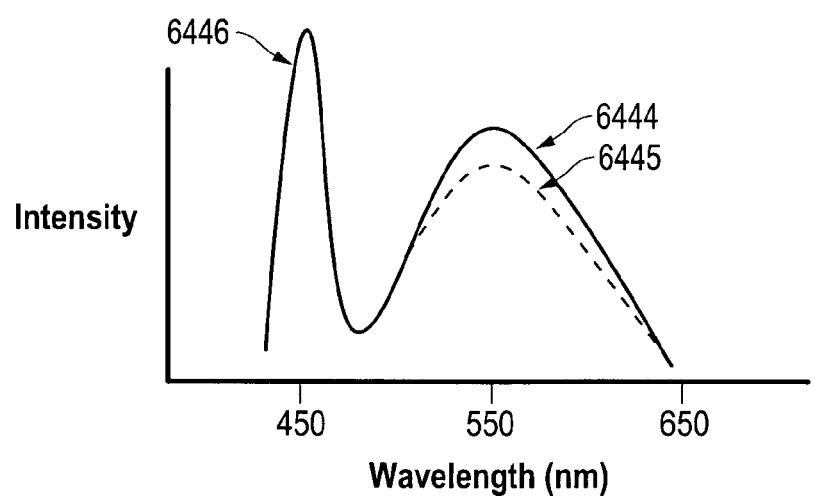
FIG. 64 illustrates exemplary differences in white LED emission spectrum.

FIG. 64 is illustrates two example emission spectrums from a white LED 6124 or 6128 that produce two different white color temperatures. In this example both emission spectrums are produced by a white LED 6124 or 6128 comprising of a phosphor converted blue LED. Such phosphor could be in contact with such blue LED or separated by some distance. The difference in the two spectrums could be produced by different phosphor thickness for two different LEDs at the end of a manufacturing line or could be produced by the same LED at two different times or at two different temperatures. LED phosphor coatings are well known to change characteristics over temperature and to degrade over time. Likewise, the optical power emitted by the blue LED in white LED 6124 or 6128 is also well known to change over operating conditions and lifetime. FIG. 64 is just one example of many possible differences in spectral emissions from two white LEDs or the same LED under different conditions.

FIG. 64 illustrates the spectral peak 6446 produced by such blue LED in white LED 6124 or 6128, and substantially broader spectral peaks 6444 and 6445 produced by such phosphors in white LED 6124 or 6128. In this example FIG. 64, spectral peak 6444 could represent the emissions produce by such phosphor in white LED 6124 or 6128 at the time it was manufactured, and lower spectral peak 6445 could represent the emissions produced by such phosphor in white LED 6124 or 6128 after some time. As such, the white color temperature of the light produced by white LED 6124 or 6128 is shown to change over time in this example.

Figure 65:
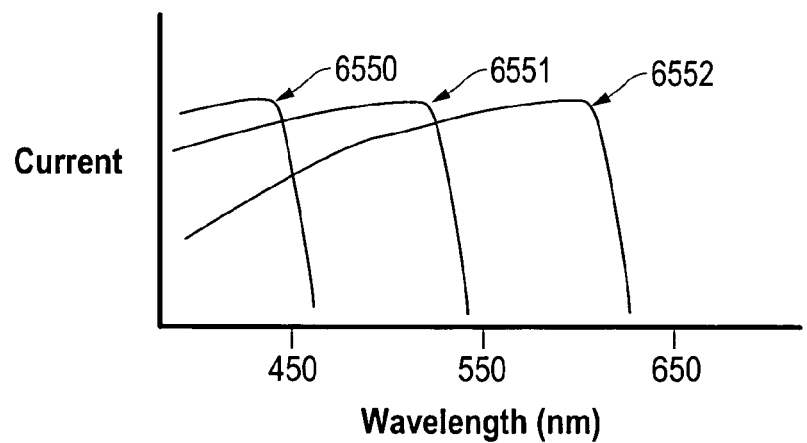
FIG. 65 illustrates exemplary spectral characteristics of red, green, and blue LEDs when operating as light detectors.

FIG. 65 is one example of the spectral responsiveness 6552 (red), 6551 (green), and 6550 (blue) of the red 6121 and 6125, green 6122 and 6126, and blue 6123 and 6127 LEDs in light source 6110 respectively. Spectral responsiveness is the relative amount of current induced on an LED by a fixed incident optical power as function of incident wavelength. As shown in this example FIG. 65, spectral responsiveness 6550 (blue), 6551 (green), and 6552 (red) illustrates that blue 6123 and 6127, green 6122 and 6126, and red 6121 and 6125 LEDs produce current in response to light with incident wavelengths roughly equal to or shorter than such blue, green, and red LED peak emission wavelengths as shown in emissions spectrums 6341 (blue), 6342 (green), and 6343 (red). As such, such red LEDs can detect light from such red, green, and blue LEDs, such green LEDs can detect light from such green and blue LEDs, and such blue LEDs can detect light from such blue LEDs. Likewise, such red, green, and blue LEDs can detect light from different parts or portions of a spectrum emitted by a broad spectrum light emitter as filtered by these LEDs, such as, for example, filtered portions of the spectrum 6340 from white LED 6124 or 6128 as shown in FIG. 63.

Since light source 6110 may comprise a different number of different colored LEDs, FIG. 65 illustrates the spectral responsiveness of just one example set of LEDs in light source 6110. Likewise, responsiveness 6550 (blue), 6551 (green), and 6552 (red) are just rough approximations for the spectral responsiveness of such blue, green, and red LEDs respectively. Actual responsiveness may vary substantially. As such, FIG. 65 is just one example.

The following equations are associated with FIGS. 66A-D. In particular, equation 24 is associated with FIGS. 66A-B. Equation 25 is associated with FIGS. 66C-D. And equation 26 provides a ratio using equations 24 and 25.

$$V_{b1w0} = E_{w0b} R_{b1} C_{b1w0} \qquad \text{[EQ. 24]}$$

$$V_{b1b0} = E_{b0} R_{b1} C_{b1b0} \qquad \text{[EQ. 25]}$$

$$E_{w0b}/E_{b0} = (V_{b1w0}/V_{b1b0}) C_0 \qquad \text{[EQ. 26]}$$

Figure 66A:
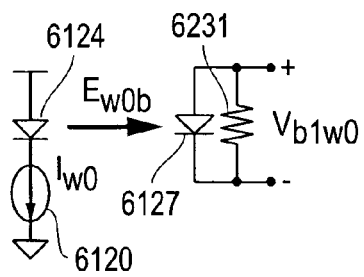
FIG. 66A-D illustrate an exemplary first step in an exemplary method to set and maintain a precise color emitted by red, green, blue, and white LEDs.
Figure 66B:
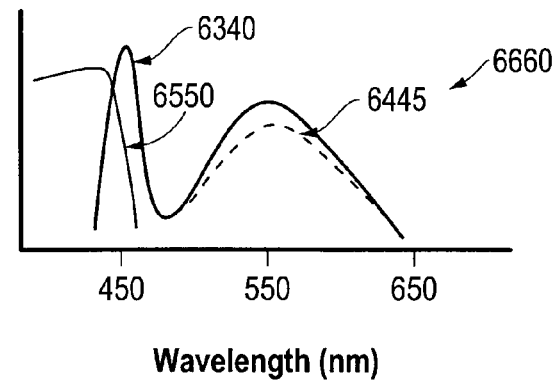
Figure 66C:
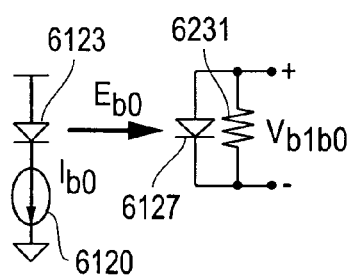
Figure 66D:
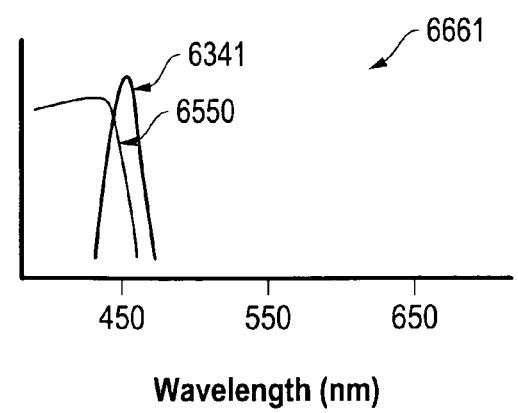

FIGS. 66A-D provide an exemplary first step in an exemplary method to set and maintain a precise color temperature produced by a combination of red, green, blue, and white LEDs 6121 through 6128 in light source 6110. In such first step, current induced in blue LED 6127 by white LEDs 6124 as shown in FIGS. 66A-B is compared to current induced in blue LED 6127 by blue LED 6123 as shown in FIGS. 66C-D. White LED 6124 is illuminated by producing current $I_{w0}$ in a current source 6120, and the current induced in blue LED 6127 is measured by connecting resistor 6231 across LED 6127 and measuring the resulting voltage $V_{b1w0}$ by ADC 6232. Equation 24 illustrates that the induced voltage $V_{b1w0}$ is equal to the power emitted by LED 6124 $E_{w0b}$ times the responsiveness $R_{b1}$ of LED 6127 times a constant Cb1w0. Spectral plot 6660 illustrates the responsiveness 6550 of blue LED 6127 superimposed on the spectrum 6340 of white LED 6124 along with the alternative phosphor produced spectrum 6445 that could result from white LED 6124 aging. As shown in spectral plot 6660 of FIG. 66B, the resulting current induced in blue LED 6127 by white LED 6124 should be independent of variations in the light produced by such phosphor.

Subsequently, blue LED 6123 is illuminated by producing current Ib0 in a current source 6120, and the current induced in blue LED 6127 is again measured by connecting resistor 6231 across LED 6127 and measuring the resulting voltage. Equation 25 illustrates that the induced voltage Vb1b0 is equal to the power emitted by LED 6123 Eb0 times the responsiveness Rb1 of LED 6127 times a constant Cb1b0. Spectral plot 6661 as shown in FIG. 66D illustrates the responsiveness 6550 of blue LED 6127 superimposed on the spectrum 6341 of blue LED 6123. As shown, a significant portion of the emitted power Eb0 induces current in LED 6127.

Equation 26 illustrates the result of dividing equation 24 by equation 25 and combining Cb1w0 and Cb1b0 to produce the constant C0. As shown in equation 26 and spectral plots 6660 and 6661, the ratio of the emitted powers Ew0b over Eb0 with wavelengths roughly shorter than 450 nm in this example is proportional to the ratios of the induced voltages Vb1w0 over Vb1b0. The responsiveness of blue LED 6127 cancels out.

The following equations are associated with FIGS. 67A-D. In particular, equation 27 is associated with FIGS. 67A-B. Equation 28 is associated with FIGS. 67C-D. And equation 29 provides a ratio using equations 27 and 28.

$$V_{g0w0} = E_{w0g} R_{g0} C_{g0w0} \qquad \text{[EQ. 27]}$$

$$V_{g0b0} = E_{b0} R_{g0} C_{g0b0} \qquad \text{[EQ. 28]}$$

$$E_{w0g}/E_{b0} = (V_{g0w0}/V_{g0b0}) C_1 \qquad \text{[EQ. 29]}$$

FIGS. 67A-D provide an exemplary second step in an exemplary method to set and maintain a precise color temperature produced by a combination of red, green, blue, and white LEDs 6121 through 6128. Such second step is identical to such first step illustrated in FIGS. 66A-D except that green LED 6122 is used to measure the light produced by white 6124 and blue 6123 LEDs. White 6124 and blue 6123 LEDs are again illuminated by producing currents Iw0 and Ib0 respectively in current sources 6120 respectively as shown in FIGS. 67A-B and 67C-D. The resulting voltages Vg0w0 and Vg0b0 induced by white 6124 and blue 6123 LEDs respectively on green LED 6122 are equal to the white LED 6124 emitted power Ew0g and the blue LED 6123 emitted power Eb0 times the green LED 6122 responsiveness times the constants as shown in equations 27 and 28.

Figure 67A:
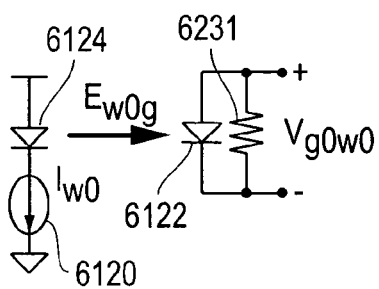
FIG. 67A-D illustrate an alternative exemplary first step in an exemplary method to set and maintain a precise color emitted by red, green, blue, and white LEDs.
Figure 67B:
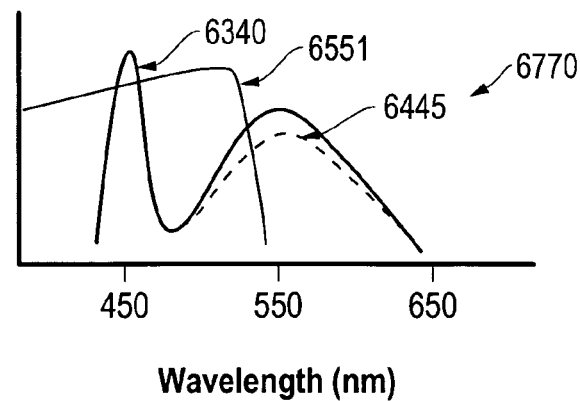
Figure 67C:
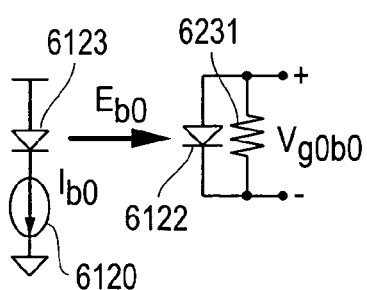
Figure 67D:
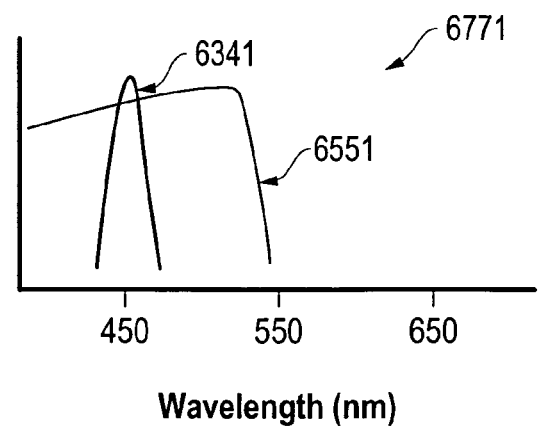

Equation 29 illustrates the result of dividing equation 27 by equation 28 which shows the ratio of the emitted powers Ew0g over Eb0 with wavelengths roughly shorter than 550 nm in this example is proportional to the ratios of the induced voltages Vg0w0 over Vg0b0. The responsiveness of green LED 6122 cancels out. Spectral plot 6770 as shown in FIG. 67B illustrates that light from the blue peak and some of the light from the phosphor converted peak induce current in green LED 6122, while spectral plot 6771 as shown in FIG. 67D illustrates that all the light from blue LED 6123 induces current in green LED 6122.

The following equations are associated with FIGS. 68A-F. In particular, equation 30 is associated with FIGS. 68A-B. Equation 31 is associated with FIGS. 67C-D. Equation 32 is associated with FIGS. 68E-F. And equations 33 and 34 provide ratios using equations 30, 31 and 32.

$$V_{r0w0} = E_{w0r} R_{r0} C_{r0w0} \qquad \text{[EQ. 30]}$$

$$V_{r0b0} = E_{b0} R_{r0} C_{r0b0} \qquad \text{[EQ. 31]}$$

$$V_{r0g0} = E_{g0} R_{r0} C_{r0g0} \qquad \text{[EQ. 32]}$$

$$E_{w0r}/E_{b0} = (V_{r0w0}/V_{r0b0}) C_2 \qquad \text{[EQ. 33]}$$

$$E_{g0}/E_{b0} = (V_{r0g0}/V_{r0b0}) C_3 \qquad \text{[EQ. 34]}$$

Figure 68A:
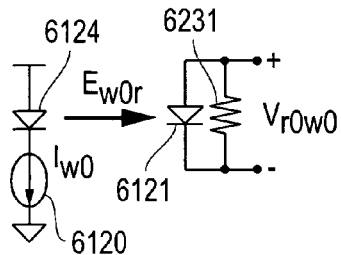
FIG. 68A-F illustrate an alternative exemplary second step in an exemplary method to set and maintain a precise color emitted by red, green, blue, and white LEDs.
Figure 68B:
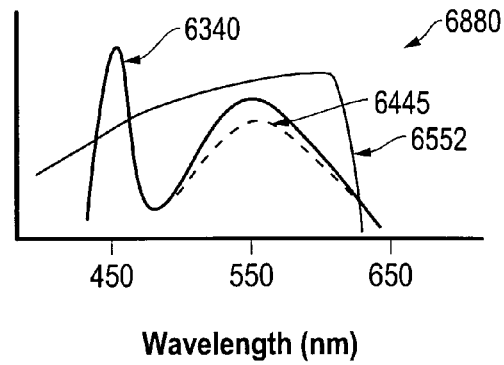
Figure 68C:
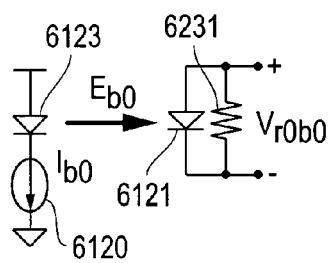
Figure 68D:
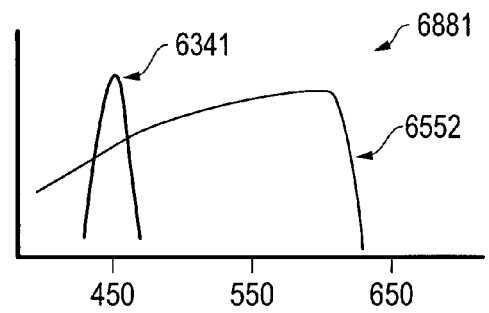
Figure 68E:
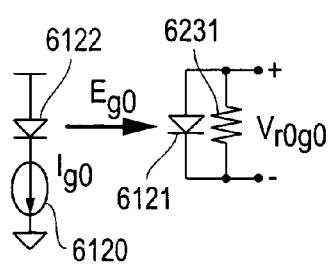

FIGS. 68A-F illustrate an exemplary third step in an exemplary method to set and maintain a precise color temperature produced by a combination of red, green, blue, and white LEDs 6121 through 6128. While the first step illustrated in FIGS. 66A-D determined the ratio of light produced by white LED 6124 over blue LED 6123 as filtered by blue LED 6127 and the second step illustrated in FIGS. 67A-D determined the ratio of light produced by the white LED 6124 over the blue LED 6123 as filtered by green LED 6122, the third step determines the ratio of light produced by white LED 6124 over blue LED 6123 as filtered by red LED 6121. Additionally in the third step, the ratio of light produced by green LED 6122 over blue LED 6123 is also determined by red LED 6121. White 6124, blue 6123, and green 6122 LEDs are illuminated by current sources 6120 producing currents Iw0, Ib0, and Ig0 as shown in FIGS. 68A, 68C and 68E, respectively. The voltages induced across red LED 6121 by white 6124, blue 6123, and green 6122 LEDs are Vr0w0, Vr0b0, and Vr0g0 respectively. Equations 30, 31, and 33 illustrate that such induced voltages Vr0w0, Vr0b0, and Vr0g0 are equal to the optical powers Ew0r, Eb0, and Eg0 produced by the white 6124, blue 6123, and green 6122 LEDs respectively times the responsiveness of red LED 6121 times constants. Equations 33 and 34 illustrate the division of equations 30 and 32 by equation 31 respectively and show that the ratio of optical power emitted by the white LED 6124 over the blue LED 6123 as filtered by the red LED 6121 is proportional to the ratio of Vr0w0 over Vr0b0, and that the ratio of optical power emitted by the green LED 6122 over the blue LED 6123 as filtered by the red LED 6121 is proportional to the ratio of Vr0g0 over Vr0b0.

Figure 68F:
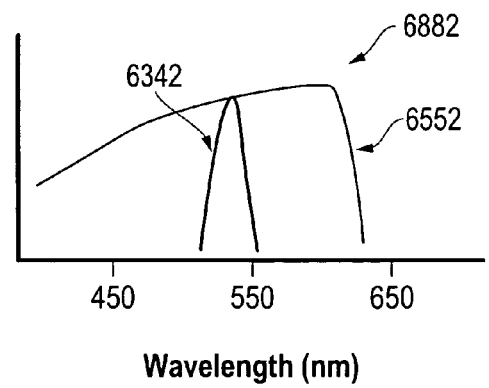

Spectral plot 6880 shown in FIG. 68B illustrates that red LED 6121 is responsive to nearly the complete emission spectrum of white LED 24 including nearly the complete spectral emission peak due to phosphor conversion, which means any change or degradation in phosphor efficiency will affect the current induced in red LED 6121 by white LED 6124. Spectral plot 6881 shown in FIG. 68D and spectral plot 6882 shown in FIG. 68F illustrate that red LED 6121 is also responsive to substantially the complete spectral emissions from blue 6123 and green 6122 LEDs, however, the responsiveness of red LED 6121 to blue LED 6123 is reduced.

The following equations are associated with FIGS. 69A-D. In particular, equation 35 is associated with FIGS. 69A-B. Equation 36 is associated with FIGS. 69C-D. And equation 37 provides a ratio using equations 35 and 36.

$$V_{r1g0} = E_{g0} R_{r1} C_{r1g0} \qquad [\text{EQ. 35}]$$

$$V_{r1r0} = E_{r0} R_{r1} C_{r1r0} \qquad [\text{EQ. 36}]$$

$$E_{g0}/E_{r0} = (V_{r1g0}/V_{r1r0}) C_4 \qquad [\text{EQ. 37}]$$

Figure 69A:
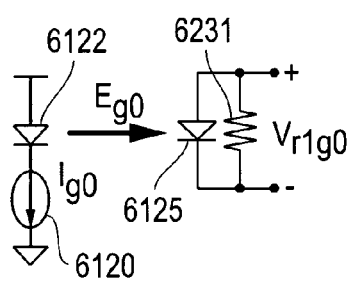
FIG. 69A-D illustrates an alternative exemplary third step in an exemplary method to set and maintain a precise color emitted by red, green, blue, and white LEDs.
Figure 69B:
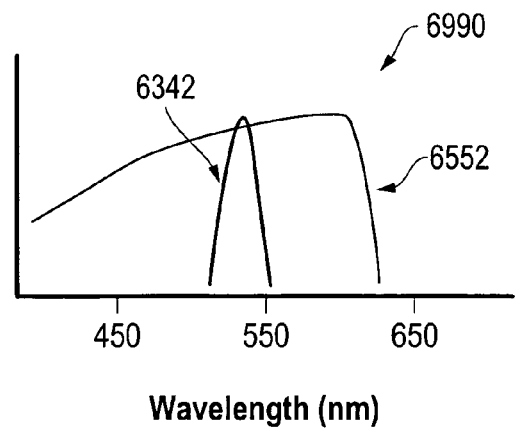
Figure 69C:
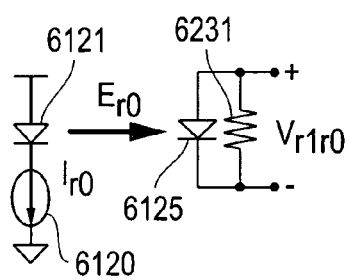
Figure 69D:
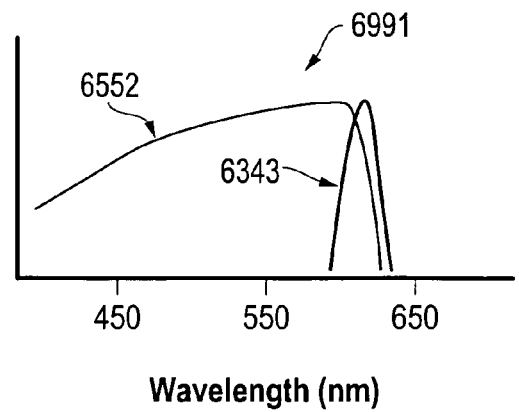

The fourth exemplary step in the exemplary method to set and maintain a precise color temperature produced by a combination of red, green, blue, and white LEDs 6121 through 6128, is illustrated in FIGS. 9A-D in which the ratio of currents induced in red LED 6125 by green LED 6122 over red LED 6121 is determined. Current sources 6120 illuminate green 6122 and red 6121 LEDs by producing currents Ig0 and Ir0 respectively, which induce voltages Vr1g0 and Vr1r0 respectively across red LED 6125, as shown in FIGS. 69A and 69C. Equations 35 and 36 illustrate that the voltages Vr1g0 and Vr1r0 are proportional to the green LED 6122 emitted power Eg0 and the red LED 6121 emitted power Er0 times the responsiveness of red LED 6125 Rr1 respectively. Equation 37 illustrates equation 35 divided by 36, which shows the ratio of Eg0 over Er0 to be proportional to the ratio of induced voltages Vr1g0 over Vr1g0. The responsiveness of red LED 6125 cancels out.

The following equations described with respect to FIGS. 66A-D, 67A-D, 68A-F and 69A-D can be used to represent how color matching can be achieved.

$$E_{w0b}/E_{b0} = (V_{b1w0}/V_{b1b0}) C_0 \qquad [\text{EQ. 26}]$$

$$E_{w0g}/E_{b0} = (V_{g0w0}/V_{g0b0}) C_1 \qquad [\text{EQ. 29}]$$

$$E_{w0r}/E_{b0} = (V_{r0w0}/V_{r0b0}) C_2 \qquad [\text{EQ. 33}]$$

$$E_{g0}/E_{b0} = (V_{r0g0}/V_{r0b0}) C_3 \qquad [\text{EQ. 34}]$$

$$E_{g0}/E_{r0} = (V_{r1g0}/V_{r1r0}) C_4 \qquad [\text{EQ. 37}]$$

$$E_{r0}/E_{b0} = (V_{r0g0}/V_{r0b0})(V_{r1r0}/V_{r1g0})(C_3/C_4) \qquad [\text{EQ. 38}]$$

$$E_{w0b}/E_{w0r} = (V_{b1w0}/V_{b1b0})(V_{r0b0}/V_{r0w0})(C_0/C_2) \qquad [\text{EQ. 39}]$$

$$E_{w0g}/E_{w0r} = (V_{g0w0}/V_{g0b0})(V_{r0b0}/N_{r0w0})(C_1/C_2) \qquad [\text{EQ. 40}]$$

In particular, equations 26, 29, 33, 34 and 37 that were described with respect to FIGS. 66A-D, 67A-D, 68A-F and 69A-D can be used to generate equations 38, 39 and 40. These equations provide an exemplary set of equations describing the exemplary method to set and maintain a precise color emitted by red, green, blue, and white LEDs. Equations 26, 29, 33, and 34 relate the optical power emitted by blue LED 6123 to the optical power emitted by white LED 6124 as filtered by blue 6127, green 6122, and red 6121 LEDs and by green LED 6122 respectively. Equation 38 divides equation 34 by equation 37 to relate the optical power emitted by blue LED 6123 to the optical power emitted by red LED 6121. Equations 26, 29, 33, 34, and 38 relate the emitted power of red 6121, green 6122, and three different filtered versions of white LED 6124 to the emitted power of blue LED 6123. Such ratios of optical power can be compared to desired ratios as described herein, for example, as described with respect to the third embodiment, and enable a precise color temperature light to be set and maintained by the combination of such red, green, blue, and white LEDs illustrated in this example. Switching LEDs 6121 through 6124 with LEDs 6125 through 6128 and repeating the steps illustrated in FIGS. 66A-D, 67A-D, 68A-F and 69A-D provides the ratios of optical power emitted by LEDs 6125 through 6128 to balance the color produced by all the LEDs in light source 6110 illustrated in this example light source and calibration method.

Equation 39 illustrates the ratio of equation 26 over equation 33, which shows the ratio of light produced by white LED 6124 over the spectrum detectable by blue LED 6127 divided by the light produced by white LED 6124 over the spectrum detectable by red LED 6121. Likewise, equation 40 illustrates the ratio of equation 29 over equation 33, which shows the ratio of light produced by white LED 6124 over the spectrum detectable by green LED 6122 divided by the light produced by white LED 6124 over the spectrum detectable by red LED 6121. Such ratios illustrated by equations 39 and 40 can also be compared to desired ratios as described herein, for example, as described with respect to the third embodiment, and the intensities of the red, green, and blue LEDs can be adjusted relative to the white LEDs to compensate for changes in the spectrum of the white LEDs at the end of a manufacturing line, and over operation conditions and lifetime.

Figure 70:
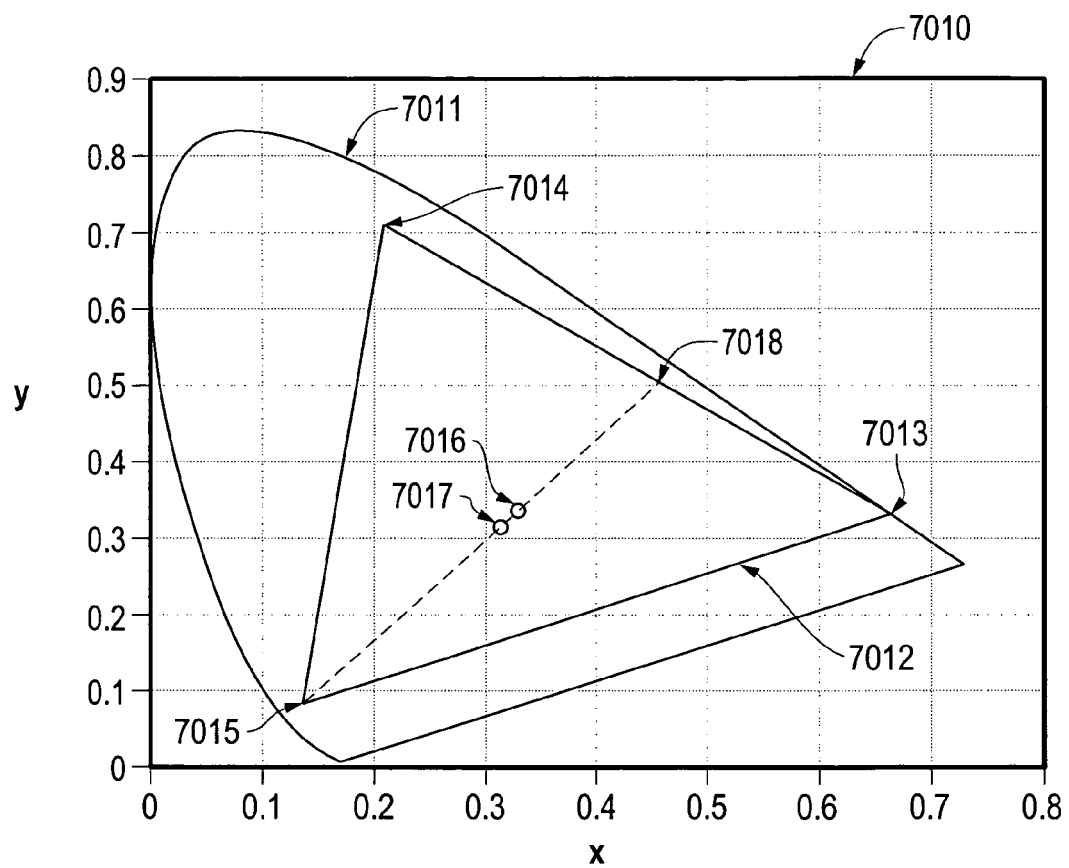
FIG. 70 is a color diagram illustrating an exemplary color adjustment step in the exemplary method to set and maintain a precise color emitted by red, green, blue, and white LEDs.

FIG. 70 illustrates the well known CIE 1931 Color Space diagram 7010 for the XY color space. The range of theoretically producible colors lie within the boundary 7011, and the range of actual colors producible by a combination of red, green, blue, and white LEDs 6121 through 6128 lie within the triangle 7012. In this example, the color points produced the red, green, and blue LEDs independently are the corners of the triangle labeled 7013, 7014, and 7015 respectively. In this example, the desired color point produced by the combination of the red, green, blue, and white LEDs 6121 through 6128 is identified as 7016, while in this example the actual color point at the time of calibration is identified at 7017.

Such difference in color points 7016 and 7017 represents the change that can occur as a phosphor based white LED ages for instance. As the phosphor degrades and converts less blue light to other wavelengths, such phosphor converted peak 6444 changes to peak 6445 from FIG. 64 relative to blue peak 6446 and the color point shifts from 7016 to 7017 as an example. Equation 39 then provides the actual ratio of the optical power in blue peak 6446 over approximately the optical power in phosphor converted peak 6445 at the time of calibration. Equation 39 also provides the desired ratio of the optical power in the blue peak 6446 over the same approximation of the optical power in phosphor converted peak 6444 at the time the device was manufactured. The ratio of such actual ratio divided by such desired ratio specifies how much relative optical power has shifted from the phosphor converted range of the white LED spectrum to the blue LED range of the white LED spectrum. Increasing the optical power produced by red LEDs 6121 and 6125 and green LEDs 6122 and 6126 in the proportion that produces color point 7018 by an amount determined by such ratio of such actual ratio over such desired ratio adjusts the color point produced by light source 6110 from the actual color 7017 back to the desired color point 7016.

Since typically the responsiveness of red LEDs 6121 and 6125 drops off rapidly with decreasing incident wavelength near typical blue LED emission wavelength, the current induced in red LEDs 6121 and 6125 by white LEDs 6124 and 6128 is dominated by the optical power in the phosphor converted range of a typical white LED. The small amount of current induced in red LEDs 6121 and 6125 by the blue LED range of the white LED spectrum is effectively removed from the calculation results by taking the ratio of such actual ratio over such desired ratio.

FIG. 70 and the associated preceding description illustrate just one example of how the systems and methods herein can be applied. There are many other possible applications including but not limited to calibrating to the color of light source 6110 at the end of a manufacturing line. In such case, such desired ratios can be measured from a control device that produces the desired color point and compared to the actual ratios measured on production devices. In such case, the actual color point could be in any relation to the desired color point with different combinations of additional red, green, and blue LED light needed to produce the desired color point. In another example, the color point of the white LED could be deliberately shifted to the green region of the color diagram with light source 10 comprising such white LEDs along with only blue and red LEDs. As such, green LEDs would not be needed since the blue and red LEDs could always measure and adjust the combined light from the greenish white LEDs, and blue and red LEDs to the desired color point. Likewise, the substantially white light source could be something other than an LED, in which case different combinations of LEDs may be needed. Further, more than three different colored LEDs, such red, green, blue, and amber, or red, green, blue, cyan, and magenta, or any other combination of colors could be used to analyze the spectral emissions of the broadband light source and compensate for variations to set and maintain a precise color point. As such FIGS. 61 through 70 illustrate just one example.

Numerous variations and modifications will become apparent to those skilled in the art once the above disclosure is fully appreciated.

Eighth Embodiment

It is noted that detailed discussions have been provided above for LED calibration systems and methods with respect to the third embodiment and the seventh embodiment. The following discussion with respect to LED calibration systems and methods is also provided as an alternative but related discussion of calibration systems and methods. This alternative discussion is not intended to change or alter the discussions above but is merely included as an additional discussion of possible calibration techniques, systems and methods.

LED calibration systems and related methods are disclosed that use the photo-sensitivity of LEDs to correct for variations between LEDs during initial production and over the lifetime of systems using LEDs. Various embodiments are described with respect to the drawings below. Other features and variations can also be implemented, if desired, and related systems and methods can be utilized, as well.

In part, the disclosed embodiments relate to groups of LEDs that use the photo-sensitivity of each other and an optional light source to determine the light intensity produced by each LED in such group and to adjust such intensity to create and maintain a precise color produced by the group of LEDs. Applications for the LED calibration systems and methods include solid state lamps, LCD backlights, and LED displays for instance. Variations in LED brightness and color should be compensated for in order for such devices to have uniform color and brightness. Such compensation, which is typically done by measuring the optical output power of each individual LED or purchasing specially tested LEDs, is performed by simply measuring the signal induced on each LED by light from other LEDs in the device or optionally from an additional light source.

The disclosed embodiments include a number of methods to set the color or color temperature produced by a group of LEDs during the manufacturing of a device such as a lamp, an LED display, or an LCD backlight, and maintaining such color or color temperature over the operating life of such a device. The methods operate some of the LEDs in photovoltaic or photoconductive mode to measure the light produced by other LEDs in the group and optionally from a light source, and adjust the light produced by each LED in such group of LEDs to produce a precise color or color temperature from such group.

The first method illustrated in FIG. 73A-C relies on the correlation between the light produced by an LED from a fixed current and the photocurrent produced by such LED from a fixed light intensity. Since such correlation is not perfect, such first method is an approximation. However, such first method is the simplest and although not limited to such is intended to enable a device with a combination of red, green, and blue LEDs with large intensity variations to self calibrate relatively close to a desired color or color temperature and output intensity during production and over operating life.

The second method illustrated in FIG. 74A-D uses the same basic mechanisms as the first method to produce a fixed color or color temperature and output intensity, but uses a light source with typically a known intensity as a reference and typically requires two LEDs in such group of LEDs to emit light of the same color. Such second method introduces an error factor between the light produced by an LED from a fixed current and the photocurrent produced from a fixed light intensity, and mathematically illustrates that such second method is independent of such error factor and as such is significantly more accurate than such first method. Although not limited to such, the second method is intended to be used during the manufacturing of a device to create a precise color or color temperature and overall light intensity produced by a group of different colored LEDs in a device, but can also be used over operating life provided a light source is available.

The third method illustrated in FIGS. 75A-F, although not limited to such, is intended to combine the results of the second method used during the manufacturing of a device comprising such group of LEDs with the first, second, or fourth methods used over the operating life of such device. Initial errors in the correlation between light produced by an LED from a fixed current and the photocurrent produced from a fixed light intensity are removed. Only changes in such errors over operating life introduce affect the color, color temperature, and light intensity produced by such group of LEDs in a device.

The fourth method illustrated in FIG. 76A-D uses the same basic mechanisms as the first and second methods, but is only capable of maintaining the color or color temperature of the light produced by a group of LEDs. Only the ratios of the emitted intensities can be determined so the overall emitted intensity is not precisely controlled. Although not limited to such, the fourth method is intended to be used over the operating life of such group of LEDs to maintain the color or color temperature of the light produced by such device. No external light source is needed, but typically two LEDs within the group of LEDs emit the same color light.

Figures 79A, 79B, 79C:
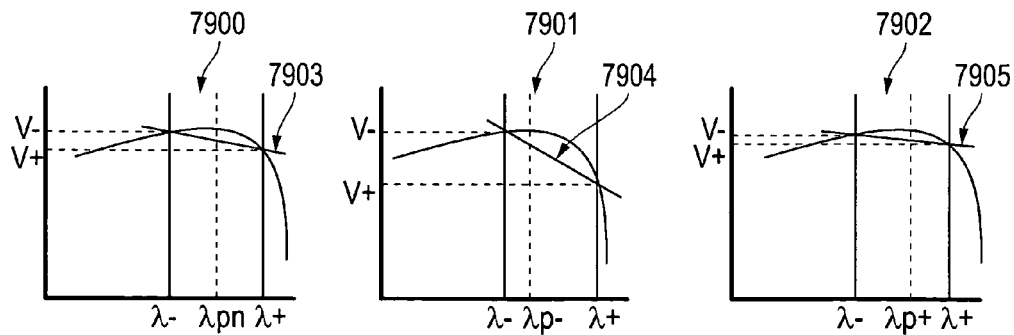
FIG. 79A-C illustrates an exemplary method to determine the peak emission wavelength of light produced by an LED by measuring the photo-sensitivity of the LED.

The fifth method illustrated in FIG. 79A-C uses the photosensitivity of an LED as a function of incident wavelength to determine the peak emission wavelength of such LED. A light source produces light with at least two different wavelengths typically just above and just below the expected peak emission wavelength range of such LED with the difference in induced photocurrents being directly related to the actual peak emission wavelength of such LED.

Once the relative intensity or both the relative intensity and wavelength of light produced by LEDs within a group of different colored LEDs are known, the color or color temperature of the combined light produced by such group of LEDs can be fixed, adjusted, and maintained over the operating life of such group of LEDs by adjusting the relative intensity of light produced by each such LED. A color correction matrix with coefficients determined by the calibration methods described herein can provide the compensated intensities to the driver circuitry for each such LED.

The second and fourth methods described in FIGS. 74A-D and 76A-D respectively typically require two LEDs within such group of LEDs to emit the same color light. For instance, a lamp or LCD backlight comprising red, green, and blue LEDs would have at least two independently controlled red LEDs or serially connected strings of red LEDs. As another example, a lamp with white and red LEDs, would also have two independently controlled red LEDs or serially connected strings of red LEDs. In an LED display or LCD backlight comprising arrays of pixels of red, green, and blue LEDs, such group of LEDs could comprise two red LEDs from two adjacent pixels, for instance. Such two red LEDs could be successively grouped together with each of the remaining two blue and two green LEDs, for instance, to determine the intensity or relative intensity produced by all the LEDs in both pixels. Additionally, a uniform light source, such as sunlight, could illuminate such arrays of pixels to enable the second method illustrated in FIG. 74A-D to produce uniform intensity across the array.

The methods address problems associated with devices using groups of different colored LEDs directly or as backlights for illumination. Such calibration methods reduce the need for specially binned LEDs for the production of lamps, displays, or backlights, and maintain the color or color temperature of the light produced over the operating life of the device.

As stated above, this eighth embodiment can also be used with the techniques, methods and structures described with respect to the other embodiments described herein. For example, the calibration and detection systems and methods described with respect to this embodiment can be used within the other described embodiments, if desired. Further, the various illumination devices, light sources, light detectors, displays, and applications and related systems and methods described herein can be used with respect to calibration and detection systems and methods described in this eighth embodiment, as desired. Further, as stated above, the structures, techniques, systems and methods described with respect to this eighth, embodiment can be used in the other embodiments described herein, and can be used in any desired lighting related application, including liquid crystal displays (LCDs), LCD backlights, digital billboards, organic LED displays, AMOLED (Active Matrix OLED) displays, LED lamps, lighting systems, lights within conventional socket connections, projection systems, portable projectors and/or other display, light or lighting related applications.

Turning now to the drawings, FIG. 71 is an example circuit for measuring the actual emitted optical power labeled $E_{a20}$ produced by LED 7120, which is driven by constant current source 7121 with the nominal current of $I_0$ amps. The actual emitted power is measured by optical power meter 7128. The following equation is associated with FIG. 71.

$$\text{Actual Emitted Power/Nominal Emitted Power} = E_{a20}/E_{n20} = E_{20} \quad \text{[EQ. 41]}$$

Equation 41 relates the actual optical power $E_{a20}$ emitted by LED 7120 to the nominal optical power $E_{n20}$ emitted by a group of LEDs representative of LED 7120. The nominal or desired emitted optical power $E_n$ can be any optical power but is typically the average or mean optical power produced by the group of LEDs representative of LED 7120. The ratio of the actual power emitted by LED 7120 over the nominal power emitted by the group of LEDs representative of LED 7120 is the result of equation 41 labeled $E_{20}$, which is independent of the current produced by current source 7121 and the optical losses between LED 7120 and optical power meter 7128 provided such conditions are the same during the optical power measurements for all LEDs within the group of LEDs representative of LED 7120 and including LED 7120.

The group of LEDs representative of LED 7120 can be a so called characterization lot for the LED 7120 design that is specifically manufactured to produce LEDs with emission characteristics representative of the range of emission characteristics anticipated during mass production of the LED 7120 design.

FIG. 72 is an example circuit that produces a voltage $V_{a30}$ induced across LED 7230 by the nominal optical power $E_{n20}$ described with FIG. 71 and emitted by LED 7120. LED 7120 is configured to emit the nominal optical power $E_{n20}$ as measured by optical power meter 7128 by adjusting the current produced by current source 7121 to an amount $I_t$. Provided the peak emission wavelength of LED 7230 is roughly equal to or longer than the peak emission wavelength of LED 7120, the light from LED 7120 induces a current in LED 7230 that produces the voltage $V_{a30}$ across resistor 7232 between the anode 7233 and cathode 7234 of LED 7230. The following equation is associated with FIG. 72.

$$\text{Actual Voltage/Nominal Voltage} = V_{a30}/V_{n3020} = V_{3020} \sim = E_{a30}/E_{n30} = E_{30} \quad \text{[EQ. 42]}$$

Equation 42 relates the actual voltage $V_{a30}$ produced by LED 7230 in response to the nominal emitted power $E_{n20}$ from LED 7120 to the nominal voltage $V_{n3020}$ produced by a group of LEDs representative of LED 7230 in response to the nominal emitted power $E_{a20}$. Among other things, since variations in the optical path between the LED active region and the surface of the LED package approximately equally affect light entering and leaving the LED and since variations in the quantum efficiency of the active region approximately equally affect the conversion of electric current to light and of light to electrical current, such ratio of voltages is approximately equal to the ratio of actual optical power $E_{a30}$ emitted by LED 7230 over the nominal optical power $E_{a30}$ emitted by a group of LEDs representative of LED 7230. Such ratio, which is the result of equation 7238 is called $E_{30}$ for LED 7230.

FIG. 73A-C illustrates a method using the relationship illustrated in FIG. 72 to determine the actual optical power produced by LEDs 7120, 7230, and 7340 relative to the nominal optical power produced by groups of LEDs representative of such LEDs 7120, 7230, and 7340. LEDs 7120, 7230, and 7340 could be any combination of colors or could be one color. Two common configurations include red, green, and blue, and red, red, and white for LEDs 7340, 7230, and 7120 respectively. In such method, LED 7120 illuminates both LED 7230 and LED 7340, and then LED 7230 illuminates LED 7340. From measurements of induced voltages $V_{a30}$ and $V_{a40}$, the ratio of actual optical power emitted to nominal optical power emitted can be calculated for each LED 7120, 7230, and 7340.

The following equations are associated with FIGS. 73A-C. In particular, equations 43A-B are associated with FIG. 73A. Equations 44A-B are associated with FIG. 73B. Equations 45A-B are associated with FIG. 73C. And equations 46-51 utilize the other equations.

$$V_{a30} \sim = (V_{n3020})(E_{30})(E_{20}) \quad [EQ.\ 43A]$$

$$V_{a30}/V_{n3020} = V_{3020} \sim = (E_{30})(E_{20}) \quad [EQ.\ 43B]$$

$$V_{a40} \sim = (V_{n4020})(E_{40})(E_{20}) \quad [EQ.\ 44A]$$

$$V_{a40}/V_{n4020} = V_{4020} \sim = (E_{40})(E_{20}) \quad [EQ.\ 44B]$$

$$V_{a40} \sim = (V_{n4030})(E_{30})(E_{40}) \quad [EQ.\ 45A]$$

$$V_{a40}/(V_{n4030}) = V_{4030} \sim = (E_{30})(E_{40}) \quad [EQ.\ 45B]$$

Rearranging 43B provides:

$$E_{20} \sim = (V_{3020})(E_{30}) \quad [EQ.\ 46]$$

Substituting 46 into 44B provides:

$$V_{4020} \sim = (E_{40})(V_{3020})/(E_{30})$$

$$E_{30} \sim = (E_{40})(V_{3020})/(V_{4020}) \quad [EQ.\ 47]$$

Substituting 47 into 45B provides:

$$V_{4030} \sim = (E_{40})(E_{40})(V_{3020})/(V_{4020})$$

$$(V_{4030})(V_{4020})/(V_{3020}) \sim = (E_{40})^2 \quad [EQ.\ 48]$$

$$E_{40} \sim = \text{square root}[(V_{4030})(V_{4020})/(V_{3020})] \quad [EQ.\ 49]$$

From 45B, $$E_{30} \sim = (V_{4030})/(E_{40}) \quad [EQ.\ 50]$$

From 44B $$E_{20} \sim = (V_{4020})/(E_{40}) \quad [EQ.\ 51]$$

Current source 7121 produces the nominal current $I_0$, which causes LED 7120 to emit optical power $E_{a20}$, which induces voltages $V_{a30}$ and $V_{a40}$ across resistors 7232 and 7342 respectively. Equations 43A-B relate $V_{a30}$ to the voltage $V_{n3020}$ induced on a group of LEDs representative of LED 7230 by the nominal power emitted an LED 7120 as shown in FIG. 73A. The actual voltage $V_{a30}$ approximately equals the nominal voltage $V_{n3020}$ scaled by the ratios of actual emitted power over nominal emitted power $E_{30}$ and $E_{20}$ for LED 7230 and LED 7120 respectively. The parameter $V_{3020}$ is defined as the ratio of the actual voltage $V_{a30}$ over the nominal voltage $V_{n3020}$.

Equations 44A-B and 45A-B are the same as equation 43A-B except that equations 44A-B are for light from LED 7120 incident on LED 7340 as shown in FIG. 73B and equations 45A-B are for light from LED 7230 produced by current source 7331 incident on LED 7340 as shown in FIG. 73C. Such three equations contain the three independent variables $E_{20}$, $E_{30}$, and $E_{40}$, which are solved for through equations 46-51. Equation 49 relates $E_{40}$ to the known parameters $V_{4030}$, $V_{4020}$, and $V_{3020}$. The calculated value for $E_{40}$ is then applied to equations 45 and 44 to form equations 50 and 51 that determine $E_{30}$ and $E_{20}$ respectively.

FIGS. 73A-C provide one of many possible methods to determine the intensity of light produced by a group of LEDs by measuring LED photosensitivity. For instance light induced current instead of voltage can be measured or some combination of current and voltage can be measured. When measuring light induced current, an LED can be reverse biased or short circuited for instance. The number of LEDs used to determine emitted power can be 2 provided both LEDs peak emission wavelengths are similar or more than 3. The color of the LEDs can be any combination of colors or one single color. The LEDs can be arranged side by side with scattered light detected by adjacent LEDs or with light reflected by a mirror for instance. The product comprising the LEDs can a lamp, a display, or display backlight for instance.

FIGS. 74A-D illustrate a more precise method to determine the intensity of light produced by LEDs 20, 30, and 40 which uses a fixed light source 60 as a known reference that eliminates variations in the relationship between LED emitted power and photosensitivity. In this example LEDs 30 and 40 have approximately equal peak emission wavelengths and LED 20 has a shorter peak emission wavelength.

The following equations are associated with FIGS. 74A-D. In particular, equations 52A-B and 53A-B are associated with FIG. 74A. Equations 54A-B are associated with FIG. 74B. Equations 55A-B are associated with FIG. 74C. Equations 58A-B are associated with FIG. 74D. And equations 56, 57 and 59 utilize the other equations.

$$V_{a30}/V_{n30} = V_{30} = (C_{30})(E_{a30}/E_{n30}) = C_{30}E_{30} \quad [EQ.\ 52A]$$

$$E_{30} = V_{30}/C_{30} \quad [EQ.\ 52B]$$

$$V_{a40}/V_{n40} = V_{40} = (C_{40})(E_{a40}/E_{n40}) = C_{40}E_{40} \quad [EQ.\ 53A]$$

$$E_{40} = V_{40}/C_{40} \quad [EQ.\ 53B]$$

$$V_{a30} = (V_{n3040})(C_{30})(E_{30})(E_{40}) \quad [EQ.\ 54A]$$

$$V_{a40}/V_{n3040} = V_{3040} = (C_{30})(E_{30})(E_{40}) \quad [EQ.\ 54B]$$

$$V_{a40} = (V_{n4030})(C_{40})(E_{40})(E_{30}) \quad [EQ.\ 55A]$$

$$V_{a40}/V_{n4030} = V_{4030} = (C_{40})(E_{40})(E_{30}) \quad [EQ.\ 55B]$$

Substituting 52B into 54B provides:

$$V_{3040} = (C_{30})(V_{30}/C_{30})(E_{40})$$

$$E_{40} = (V_{30})/(V_{3040}) \quad [EQ.\ 56]$$

Substituting 53B into 55B provides:

$$V_{4030} = (C_{40})(V_{40}/C_{40})(E_{30})$$

$$E_{30} = (V_{40})/(V_{4030}) \quad [EQ.\ 57]$$

$$V_{a30} = (V_{n3020})(C_{30})(E_{30})(E_{20}) \quad [EQ.\ 58A]$$

$$V_{a30}/V_{n3020} = V_{3020} = (C_{30})(E_{30})(E_{20}) \quad [EQ.\ 58B]$$

Substituting 52B into 58B provides $$V_{3020} = (V_{30})(E_{20})$$

$$E_{20} = V_{3020}/V_{30} \quad [EQ.\ 59]$$

Light source 7460 emits a fixed and known amount of light $E_1$ on LEDs 7230 and 7340, which induces voltages $V_{a30}$ and $V_{a40}$ across resistors 7232 and 7342 respectively. Equations 52A-B relate the ratio of actual voltage $V_{a30}$ over the nominal voltage $V_{n30}$ generated by a group of LEDs representative of LED 7230 in response to light source 7460 to the ratio of actual optical power $E_{a30}$ emitted by LED 7230 when driven with a fixed current over the nominal optical power $E_{n30}$ emitted by a group of LEDs representative of LED 7230 when driven with a fixed current as shown in FIG. 74A. Since the light power emitted by an LED is not perfectly correlated with the photosensitivity of such LED, equations 52A-B introduce a correction coefficient $C_{30}$ that precisely defines the relationship between such ratios. Equations 53A-B are the same as equations 52A-B except for LED 7340 instead of LED 7230 as shown in FIG. 74A.

After light source 7460 illuminates LEDs 7230 and 7340 for sufficient time to measure voltages $V_{a30}$ and $V_{a40}$, light source 7460 is turned off. Subsequently, LED 7340 is turned on using current source 7441 and illuminates LED 7230 with actual optical power $E_{a40}$, which induces the voltage $V_{a30}$ across resistor 7232 as shown in FIG. 74B. Equations 54A-B relate the ratio $V_{3040}$ of $V_{a30}$ over the nominal voltage $V_{n3040}$ generated by a group of LEDs representative of LED 7230 in response to a nominal optical power $E_{n40}$ emitted by a group of LEDs representative of LED 7340 to the ratios $E_{30}$ and $E_{40}$ of the actual optical power emitted by LEDs 7230 and 7340 when driven by fixed currents over the nominal optical power emitted by groups of LEDs representative of LEDs 7230 and 7340 when driven by the same such fixed current respectively. As in equations 52A-B, the constant $C_{30}$ determines the relationship between $V_{3040}$ and the product of $E_{30}$ and $E_{40}$.

Subsequent to LED 7340 illuminating LED 7230, LED 7230 then illuminates LED 7340 with actual output power $E_{a30}$, which induces the voltage $V_{a40}$ across resistor 7342 as shown in FIG. 74C. Equations 55A-B are the same as equations 54A-B except with LED 7230 and 7340 reversed. Substituting equation 52B into equation 54B yields equation 56 with $E_{40}$ expressed as a function of the measured values $V_{30}$ and $V_{3040}$. Likewise, substituting equation 53B into equation 55B yields equation 57 with $E_{30}$ expressed as a function of the measured values $V_{40}$ and $V_{4030}$.

Subsequent to determining the actual optical power emitted by LEDs 7230 and 7340, the actual optical power $E_{a20}$ emitted by LED 7120 can be determined by illuminating LED 7230 with light from LED 7120, which produces the voltage $V_{a30}$ across resistor 7232 as shown in FIG. 74D. Equations 58A-D are the same as equations 54A-B and 55A-B except with LEDs 7120 illuminating LED 7230 instead of LED 7340 illuminating LED 7230 and LED 7230 illuminating LED 7340 respectively. Substituting equation 52B into equation 58B yields equation 59 with $E_{20}$ determined by the ratio of $V_{3020}$ over $V_{30}$.

As in FIGS. 73A-C, FIGS. 74A-D represent one of many possible methods to determine the intensity of light produced by a group of LEDs by measuring LED photosensitivity. Light induced current instead of voltage can be measured or any combination of current and voltage can be measured to determine output intensity. The number of LEDs can be two or any number more than 2. The LEDs can be any combination of colors or any single color provided that two LEDs in the group have approximately the same peak emission wavelength that is approximately equal to or longer than the peak emission wavelength of the light source if monochromatic. Monochromatic or broad spectrum light sources can be used and multiple light sources with different spectrums can be used. The two LEDs with approximately equal peak emission wavelengths (the same color) can be two red LEDs from adjacent pixels in an RGB display or two strings of red LEDs in a lamp for instance.

Figure 75A:
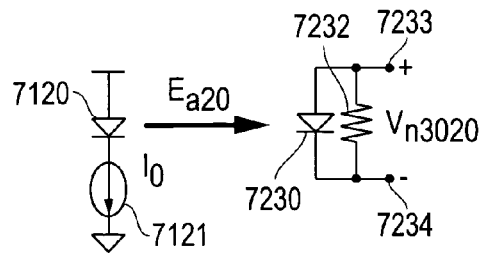
FIGS. 75A-F illustrate exemplary methods to improve the accuracy of the method illustrated in FIG. 3.
Figure 75C:
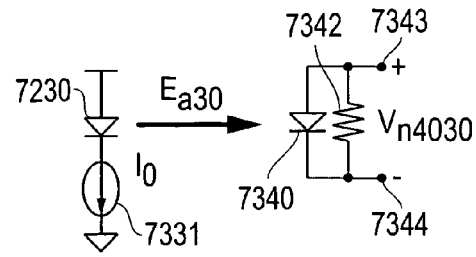
Figure 75B:
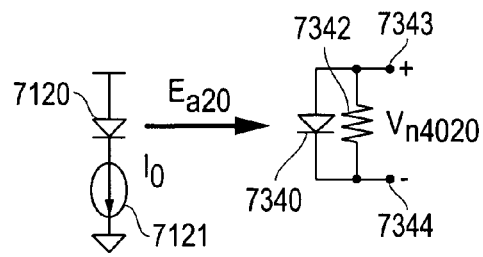
Figure 75D:
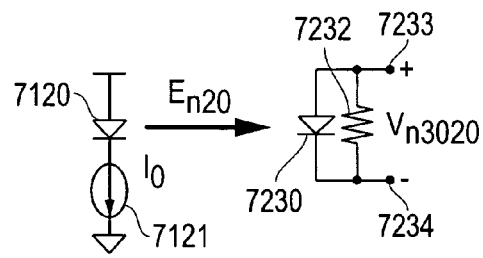
Figure 75F:
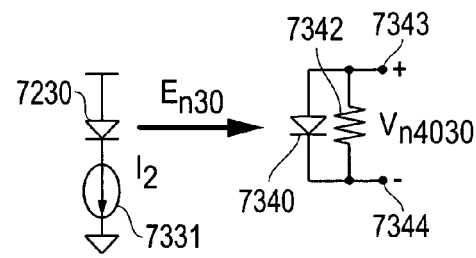
Figure 75E:
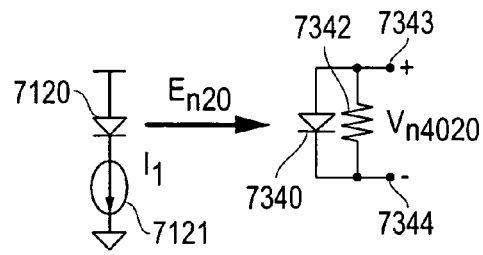

FIGS. 75A-C and FIGS. 75D-F in combination with the method illustrated in FIGS. 73A-C represent two possible methods of approximately determining the actual output power emitted by LEDs 7120, 7230, and 7340 over lifetime. Subsequent to intensity calibration during the manufacturing of a device comprising LEDs 7120, 7230, and 7340 using the method described in FIGS. 74A-D for instance, the voltages $V_{n3020}$, $V_{n4020}$, and $V_{n4030}$ are measured and stored in some form of non-volatile memory. According to the method illustrated in FIG. 75A-C, current sources 7121 and 7331 produce the nominal current $I_0$ used during the calibration method described in FIGS. 74A-D for instance, and according to the method illustrated in FIG. 75A-C, the current sources 7121 and 7331 are adjusted to output the nominal optical power. The color point and intensity of light produced by LEDs 7120, 7230, and 7340 are adjusted by turning such LEDs in FIG. 75A-C off for different percentages of time using commonly known pulse width modulating (PWM) techniques, while the color point and intensity of light produced by such LEDs in FIG. 75D-F are adjusted by changing the current produced by current sources 7121, 7331, and 7441.

After operating a device comprising LEDs 7120, 7230, and 7340 for some time, the actual optical output intensity from each such LED 7120, 7230 and 7340 may change and can be re-measured according to the method illustrated in FIG. 73A-C using the stored open circuit voltages $V_{n3020}$, $V_{n4020}$, and $V_{n4030}$ as the nominal voltages. Such method determines the change in emitted output intensity from the change in voltage, which is approximately proportional. Such measurements ideally should be performed when ambient light is small in comparison to the intensity of light produced by LEDs 7120 and 7230 and incident on LEDs 7230 and 7340. The intensity of such ambient light can be determined by measuring the open circuit voltage across any LED 7120, 7230, or 7340 when all LEDs 7120, 7230, and 7340 are turned off. In the presence of ambient light, the effects of such light can be removed by calculating the current induced by such ambient light and removing such current's affect on the measurements of $V_{3020}$, $V_{4020}$, and $V_{4030}$ illustrated in FIGS. 73A-C.

FIGS. 75A-C and 75D-F illustrate two of many possible methods of determining the change in optical power emitted by LEDs over lifetime by measuring the photosensitivity of such LEDs. For instance, the current induced by incident light can be measured instead of voltage. The number and configuration of such LEDs can be different from the three illustrated in FIGS. 75A-C and 75D-F, which represents a possible optical power measurement method for a combination of three red, green, and blue LEDs. For instance, two LEDs with approximately the same peak emission wavelength can measure each other's change in emission intensity. Additionally, a fixed intensity light could illuminate the LEDs and the LED emission intensity could be determined according to the method illustrated in FIGS. 74A-D for instance.

FIGS. 76A-D illustrate an example method of determining the relative intensity of light emitted by LEDs 7120, 7230, and 7340 where two such LEDs 7230 and 7340 have approximately equal peak emission wavelength and LED 7120 has a peak emission wavelength approximately equal to or shorter than that of LEDs 7230 and 7340. As an example, LEDs 7230 and 7340 could be red and LED 7120 could be white, green, or blue. As another example, in an array of red, green, and blue LED groups or pixels, the red LEDs of two adjacent groups or pixels of a red, green, and blue LED could be used as LEDs 7340 and 7230, and LED 7120 can sequentially be the two green and the two blue LEDs in such two adjacent groups or pixels used one at a time as LED 7120.

The following equations are associated with FIGS. 76A-D. In particular, equations 60 and 61 are associated with FIG.

76A. Equation 62 is associated with FIG. 76B. Equation 63 is associated with FIG. 76C. Equation 64 is associated with FIG. 76D. And equations 65, 66 and 67 utilize the other equations.

$$R_x = (C_x)(E_{ax}/E_{nx})$$ [EQ. 60]

$$V_{a30}/V_{n3040} = V_{3040} = (R_{30})(E_{40})$$ [EQ. 61]

$$V_{a40}/V_{n4030} = V_{4030} = (R_{40})(E_{30})$$ [EQ. 62]

$$V_{a30}/V_{n3020} = V_{3020} = (R_{30})(E_{20})$$ [EQ. 63]

$$V_{a40}/V_{n4020} = V_{4020} = (R_{40})(E_{20})$$ [EQ. 64]

Ratio of 61 over 63 provides:

$$V_{3040}/V_{3020} = (R_{30})(E_{40})/(R_{30})(E_{20}) = (E_{40})(E_{20})$$ [EQ. 65]

Ratio of 62 over 64 provides $$V_{4030}/V_{4020} = (R_{40})(E_{30})/(R_{40})(E_{20}) = (E_{30})(E_{20})$$ [EQ. 66]

Ratio of 65 over 66 provides:

$$(V_{3040}/V_{3020})/(V_{4030}/V_{4020}) = (E_{40}/E_{20})(E_{30}/E_{20})$$

$$(V_{3040})(V_{4020})/(V_{4030})(V_{3020}) = E_{40}/E_{30}$$ [EQ. 67]

Figure 76A:
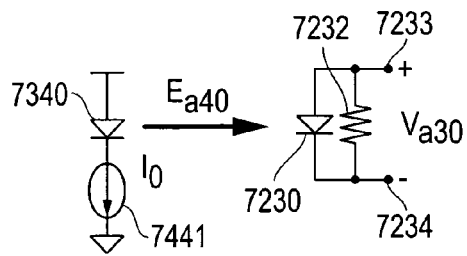
FIG. 76A-D illustrate an exemplary method to determine the optical power emitted from a group of LEDs relative to each other.
Figure 76B:
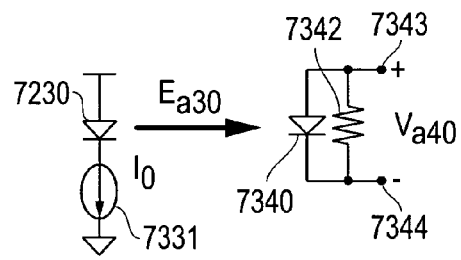
Figure 76C:
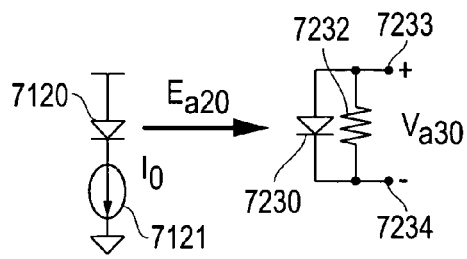
Figure 76D:
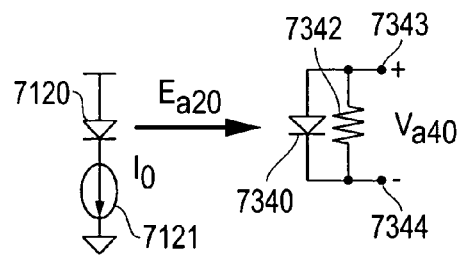

In such method, LED 7340 first illuminates LED 7230 as shown in FIG. 76A to create equation 61, which relates the ratio V3040 of voltage Va30 over the nominal Vn3040 produced when LED 7230 is illuminated with the nominal optical power to the ratio E40 of the actual emitted optical power Ea40 over such nominal optical power. The proportionality factor between V3040 and E40 is the normalized responsivity of LED 7230 defined as $R_{30}$ using the general responsivity equation set forth as equation 60. Subsequently, LED 7230 illuminates LED 7340 as shown in FIG. 76B and then LED 7120 illuminates both LEDs 7230 and 7340 as shown in FIGS. 76C and 76D to form equations 62, 63 and 64 respectively.

As shown in equation 65, the ratio of equation 61 over 63 provides the relative emitted power between LED 7340 and 7120. Likewise, equations 66 and 67 provide the relative power emitted power between LED 7230 and 7120, and between LED 7340 and 7230 respectively. Such equations provide the relative optical power emitted by all three LEDs from measurements of induced voltages so that compensation circuits can adjust the emitted intensity from each LED to produce a precise color or to maintain a fixed color over the lifetime of the LEDs.

Figure 77:
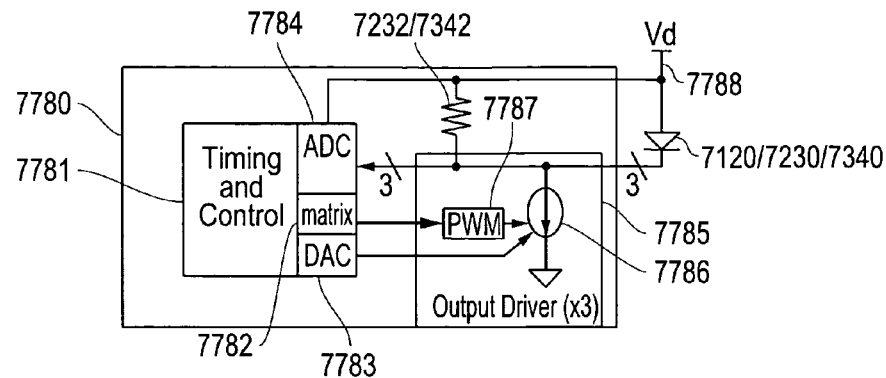
FIG. 77 is an exemplary block diagram for circuitry to implement the methods illustrated in FIGS. 73A-C, 74A-D, 75A-F, and 76A-D.

FIG. 77 is an example block diagram for circuitry that can implement the methods illustrated in FIGS. 73A-C, 74A-D, 75A-C, 75D-F, and 76A-D which comprises driver integrated circuit 7780, LEDs 7120, 7230, and 7340, and resistors 7232 and 7342. Integrated circuit 7780 further comprises timing and control circuitry 7781, coefficient matrix 7782, digital to analog converter (DAC) 7783, analog to digital converter (ADC) 7784, and three output drivers 7785 for producing currents for LEDs 7120, 7230 and 7340. Output drivers 7785 further comprise of pulse width modulators 7787 and current sources 7786.

Timing and control circuitry 7781 manages the functionality of driver IC 7780. Illumination data for LEDs 7120, 7230, and 7340 is either hardwired into timing and control circuitry 7781 or is communicated to timing and control circuitry 7781 through some means, and is forwarded at the appropriate time to the color correction matrix 7782. Color correction matrix 7782 can, among other things, adjust the illumination data for LEDs 7120, 7230, and 7340 to compensate for variations between LEDs to produce uniform brightness and color across a display or from a lamp. Matrix 7782 can comprise correction coefficients that when combined with the illumination data produce the data forwarded to output drivers 7785, which have pulse width modulators 7787 that produce logic level signals that turn current sources 7786 on and off to LEDs 7120, 7230, and 7340.

ADC 7784 has access to terminals of all 3, in this example, LEDs connected to driver IC 7780 and can, among other things, measure the voltage produced across resistors 7232 and 7342 in response to light incident on LEDs 7230 and 7340. The anodes of all three LEDs in this example can be tied together to a single supply voltage Vd 7788, or can be connected to different supply voltages. In the case all three LEDs 7120, 7230, and 7340 are of one color, all anodes preferentially would be connected together. In the case, such three LEDs 7120, 7230, and 7340 are of different colors, each such different color LED 7120, 7230, and 7340 would preferentially be connected to each such different supply voltage.

FIG. 77 is just one example of many possible driver IC 7780 block diagrams. For instance PWM 7787 would not be needed if LEDs 7120, 7230, and 7340 were driven with variable current for fixed amount of times. Resistors 7232 and 7342 would not be needed if ADC 7784 measured open circuit voltage, short circuit current, or some other combination of current and voltage from LEDs 7120, 7230, and 7340. DAC 7783 could be a fixed current source if variable currents were not desired.

Figure 78:
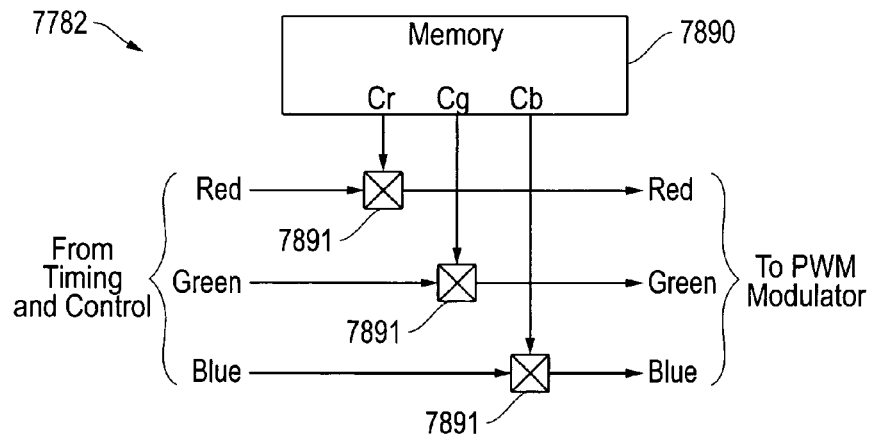
FIG. 78 is an exemplary block diagram a color correction matrix that compensated for LED intensity variations.

FIG. 78 is an example block diagram of correction matrix 7782 that can correct for variations in light intensity produced by a combination of red, green, and blue LEDs 7120, 7230, and 7340 to produce relatively uniform brightness and color across a display or from a lamp. Matrix 82 comprises memory 7890 that can store correction coefficients Cr, Cg, and Cb, which are combined by multipliers 7891 with the red, green, and blue, for instance, illumination data respectively from timing and control circuitry 7781 to produce the illumination data forwarded to modulators 7787 controlling red, green, and blue LEDs 7120, 7230, and 7340 respectively. Such correction coefficients are typically relatively large, which produce adjustments in the illumination data to compensate for variations between LEDs 7120, 7230, and 7340.

Memory 7890 can be made from SRAM, DRAM, FLASH, registers, or any other form of read-writable semiconductor memory. Such correction coefficients periodically can be modified by driver IC 7780 or any other processing element in a display or lamp for instance to adjust for changes in LEDs 7120, 7230, and 7340 characteristics for instance over temperature or lifetime.

Multipliers 7891 scale the illumination data from timing and control circuitry 7781 by multiplying each color component by the corresponding correction coefficient. Such multiplication can be performed by discreet hardware in bit parallel or bit serial form, in an embedded microcontroller, or by any other means. Preferentially, one hardware multiplier comprising a shifter and an adder performs all three multiplications. As such, FIG. 78 is just one of many possible block diagrams for correction matrix 7782.

FIGS. 79A-C illustrate one possible method to determine the peak emission wavelength $\lambda_p$ from an LED by determining such LED's photosensitivity as a function of the wavelength of light incident on such LED. Such measurement system could comprise light source 7460, LED 7230 and resistor 7232 as illustrated in FIG. 74A, with the wavelength of light emitted by light source 7460 switched between wavelengths $\lambda_-$ and $\lambda_+$ that are slightly shorter and longer respectively than the expected peak emission wavelength $\lambda_p$ of LED 7230.

Plot 7900 in FIG. 79A represents the photosensitivity of LED 7230 with a nominal peak emission wavelength $\lambda_{pn}$ as a function of incident wavelength with the vertical axis representing the voltage induced across resistor 7232. At wavelengths longer than $\lambda_{pn}$, the photosensitivity reduces significantly, while at wavelengths shorter than $\lambda_{pn}$, the photosensitivity reduces linearly with wavelength. Also shown is incident light with wavelength $\lambda_-$ producing voltage $V_-$ across resistor 7232 and incident light with wavelength $\lambda_+$ producing voltage $V_+$ across resistor 7232. Line 7903 connecting the points $(\lambda_-, V_-)$ and $(\lambda_+, V_+)$ has a slope $M=(V_- - V_+)/(\lambda_- - \lambda_+)$.

Plot 7901 in FIG. 79B illustrates the photosensitivity of an LED 7230 with a peak emission wavelength $\lambda_p$ that is slightly shorter than the nominal peak emission wavelength $\lambda_{pn}$. When such an LED 7230 is illuminated by light source 7460 with wavelengths $\lambda_-$ and $\lambda_+$, voltages $V_-$ and $V_+$ respectively are generated across resistor 7232. The difference in voltage between such $V_-$ and $V_+$ is greater for such LED 7230 with peak emission wavelength $\lambda_{p-}$ that is slightly shorter than the nominal peak emission wavelength than for such LED 7230 with the nominal peak emission wavelength $\lambda_{pn}$. Additionally, the slope M of line 7904 is more negative for the LED 7230 emitting the peak wavelength $\lambda_-$, than for the LED 7230 emitting the nominal peak wavelength $\lambda_{pn}$.

Plot 7902 in FIG. 79C illustrates the photosensitivity of an LED 7230 with a peak emission wavelength $\lambda_{p+}$ that is slightly longer than the nominal peak emission wavelength $\lambda_{pn}$. When such an LED 7230 is illuminated by light source 7460 with wavelengths $\lambda_-$ and $\lambda_+$, voltages $V_-$ and $V_+$ respectively are generated across resistor 32. The difference in voltage between such $V_-$ and $V_+$ is smaller for such LED 7230 with peak emission wavelength $\lambda_{p+}$ that is slightly longer than the nominal peak emission wavelength $\lambda_{pn}$ than for such LED 7230 with the nominal peak emission wavelength $\lambda_{pn}$. Additionally, the slope M of line 7905 is less negative for the LED 7230 emitting the peak wavelength $\lambda_+$, than for the LED 7230 emitting the nominal peak wavelength $\lambda_{pn}$.

Since the slopes of lines 7903, 7904, and 7905 are directly related to the peak emission wavelength of LED 7230, such slopes can be used to determine such peak emission wavelengths. FIGS. 79A-C illustrate one of many possible methods to determine the peak emission wavelength of light produced by an LED by measuring the photosensitivity of such LED. For instance, LED light induced current could be measured instead of voltage or some other combination of current and voltage could be measured. Additionally, light with broader spectrums of light could induce such voltages or currents instead of the mono-chromatic sources illustrated in FIG. 79.

Figure 80:
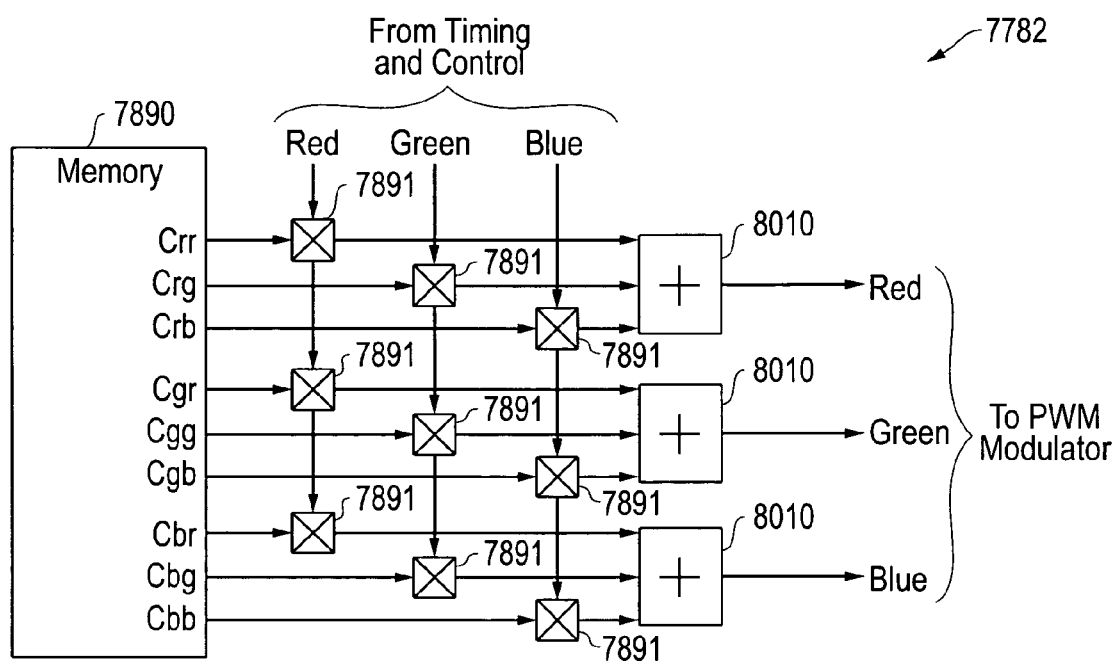
FIG. 80 is an exemplary block diagram for a color correction matrix that compensates for LED intensity and wavelength variations.

FIG. 80 is an example block diagram for correction matrix 7782 that can correct for variations in both light intensity and wavelength produced by a combination of red, green, and blue LEDs 7340, 7230, and 7120 for instance to produce uniform brightness and color from an array of LEDs. Matrix 7782 comprises memory 7890 that can store nine correction coefficients with three such coefficients for each color component produced. Coefficients Crr, Cgg, and Cbb would typically be effectively the same as Cr, Cg, and Cb from FIG. 78 to adjust for intensity variations in LEDs 7120, 7230, and 7340, while the remaining coefficients (Crg, Crb, Cgr, Cgb, Cbr, Cbg) compensate for wavelength variations.

For instance, if the red illumination data from timing and control circuitry 7781 was intended for an LED 7340 with a wavelength of 650 nm and the connected LED 7340 wavelength was exactly 650 nm, coefficients Cgr and Cbr would be zero and Crr would be close to one. If such connected LED 7340 wavelength was 640 nm and had the same intensity as the just previous example, Crr would be slightly smaller than in the just previous example and Cgr and Cbr would be non-zero, which would produce some light from such green and blue LEDs 7230 and 7120 respectively. The wavelength of the combination of light from such red, green, and blue LEDs 7340, 7230, and 7120 would be perceived the same as mono-chromatic light from a single red LED 7340 emitting at precisely 650 nm.

Memory 7890 and multipliers 7891 can operate and be implemented as described for FIG. 78. Adder 8010 sums the multiplication results from the three connected multipliers 7891 to produce the illumination data forwarded to modulators 7887. Such adders 8010 can be implemented in hardware or software, or be performed bit parallel or bit serial. FIG. 80 is just one of many possible intensity and wavelength correction matrix 7782 block diagrams.

Numerous variations and modifications will become apparent to those skilled in the art once the above disclosure is fully appreciated.

What is claimed is:

1. A method for calibrating light produced by a group of LEDs comprising at least a first LED and a second LED, the method comprising:
    configuring the first LED as a photo-detector to receive light emitted from the second LED and a light source during a first time;
    measuring a ratio of photocurrents induced in the first LED by the second LED and the light source during the first time to determine an emission intensity for the second LED and the light source;
    comparing the ratio of photocurrents to a ratio of photocurrents of known intensities to determine a change in emission intensity;
    calibrating light produced by the group of LEDs by adjusting the emission intensity of the first LED, the second LED, the light source, or any combination thereof based upon the determined change in emission intensity.

2. The method as recited in claim 1, further comprising configuring the first LED as a light emitter to emit light along with other LEDs in the group during a second time.

3. The method as recited in claim 1, further comprising adjusting the emission intensity of the second LED and the light source based upon the determined change in emission intensity.

4. The method as recited in claim 1, further comprising determining a peak emission wavelength of the first LED.

5. The method as recited in claim 4, further comprising determining a peak emission wavelength for the second LED and a peak emission wavelength for the light source based upon the determined peak emission wavelength of the first LED.

6. The method as recited in claim 4, wherein the light source is a reference light source not contained within the group of LEDs.

7. The method as recited in claim 6, further comprising measuring photocurrent induced in the first LED by the reference light source.

8. The method as recited in claim 7, further comprising using a resistor connected across the first LED to produce a voltage from the photocurrent.

9. The method as recited in claim 8, wherein a resistance of the resistor is small enough such that the photocurrent times the resistance is substantially less than a turn on voltage of the first LED.

10. The method as recited in claim 6, further comprising producing light with approximately a single wavelength with the reference light source.

11. The method as recited in claim 10, wherein the single wavelength is longer than the peak emission wavelength of the first LED.

12. The method as recited in claim 10, wherein the single wavelength is shorter than the peak emission wavelength of the first LED.

13. The method as recited in claim 6, further comprising using the reference light source to produce light with approximately a first wavelength, measuring photocurrent induced in the first LED by the first wavelength light, using the reference light source to produce light with approximately a second wavelength different from the first wavelength, measuring photocurrent induced in the first LED by the second wavelength light, and determining a ratio of photocurrents induced in the first LED by the first and second wavelength lights.

14. The method as recited in claim 13, further comprising using two or more reference light sources to produce the different wavelength lights.

15. The method as recited in claim 13, wherein the peak emission wavelength of the first LED is known.

16. The method as recited in claim 15, further comprising determining a relationship between peak emission wavelength and the ratio of photocurrents induced in the first LED by the first and second wavelength lights.

17. The method as recited in claim 15, wherein the peak emission wavelength of the second LED is unknown.

18. The method as recited in claim 17, further comprising using the reference light source to produce light with approximately the first wavelength, measuring photocurrent induced in the second LED by the first wavelength light, using the reference light source to produce light with approximately the second wavelength, measuring photocurrent induced in the second LED by the second wavelength light, and determining a ratio of photocurrents induced in the second LED by the first and second wavelength lights wherein the unknown wavelength of the second LED is determined to be equal to the known wavelength of the first LED times the ratio of photocurrents induced in the first LED by the first and second wavelength lights divided by the ratio of photocurrents induced in the second LED by the first and second wavelength lights.

19. The method as recited in claim 18, further comprising using two or more reference light sources to produce the different wavelength lights.

20. The method as recited in claim 1, wherein the light source is a third LED contained within the group of LEDs or a reference light source not contained within the group of LEDs.

21. The method as recited in claim 1, wherein the light source is a third LED contained within the group of LEDs.

22. The method as recited in 21, further comprising configuring the second LED as a photo-detector to receive light emitted by the first LED during a second time, determining an intensity emission characteristic for the first LED based upon the light received by the second LED from the first LED, using the second LED to receive light emitted by the third LED, determining an intensity emission characteristic for the third LED based upon the light received by the second LED from the third LED, and adjusting an output intensity of the first LED, the second LED, the third LED or any combination of the three LEDs based upon the determined intensity emission characteristics.

23. The method as recited in claim 22, further comprising measuring a ratio of photocurrents induced in the second LED by the first and third LEDs to determine the intensity emission characteristics for the first and third LEDs.

24. The method as recited in claim 21, wherein emission intensities of the second and third LEDs were previously adjusted to produce desired output intensities.

25. The method as recited in claim 24, wherein the emission intensities of the second and third LEDs were previously adjusted using a separate control device having a plurality of LEDs with known output intensities.

26. The method as recited in claim 24, wherein the steps of measuring a ratio of photocurrents, comparing the ratio of photocurrents and calibrating light produced by the group of LEDs are conducted at a second time when the emission intensities for the second and third LEDs have changed to unknown intensities.

27. The method as recited in claim 21, further comprising comparing the ratio of photocurrents induced in the first LED by the second and third LEDs to a ratio of photocurrents induced on a control device by the second and third LED, wherein the ratio of photocurrents induced on the control device by the first, second and third LEDs have known output intensities.

28. The method as recited in claim 21, wherein the first, second, and third LEDs are a red LED, a red LED, and a white LED respectively.

29. The method as recited in claim 28, further comprising using the first, second, and third LEDs within an LED lamp.

30. The method as recited in claim 28, further comprising using the first, second, and third LEDs within an LCD backlight.

31. The method as recited in claim 21, wherein the first, second, and third LEDs are a first red LED, a second red LED, and a third green LED respectively.

32. The method as recited in claim 31, further comprising using a fourth blue LED as a light source, and using the first red LED to also determine an emission intensity for the fourth blue LED, wherein the second red LED, the third green LED and the fourth blue LED are located within a first pixel and wherein the first red LED is located in an adjacent pixel.

33. The method as recited in claim 1, further comprising using a resistor connected across the first LED to produce a voltage from the ratio of photocurrents induced in the first LED.

34. The method as recited in claim 33, wherein a resistance of the resistor is small enough such that the ratio of photocurrents induced in the first LED times the resistance is substantially less than a turn on voltage of the first LED.

35. The method as recited in claim 1, further comprising using the first LED within an LCD display.

36. The method as recited in claim 1, further comprising using the first LED in an organic LED display.

37. The method as recited in claim 1, further comprising using the first LED in a digital billboard.

38. The method as recited in claim 1, further comprising using the first LED in a projector.

39. The method as recited in claim 1, wherein the light source is a reference light source not contained within the group of LEDs.

40. The method as recited in claim 39, wherein the emission intensity of the second LED was previously adjusted to produce a desired output intensity.

41. The method as recited in claim 40, wherein the emission intensity of the second LED was previously adjusted using a separate control device having a plurality of LEDs with known output intensities.

42. The method as recited in claim 40, wherein the steps of measuring a ratio of photocurrents, comparing the ratio of photocurrents, and calibrating light produced by the group of LEDs are conducted a second time when the emission intensity for the second LED has changed to an unknown intensity.

43. The method as recited in claim 42, further comprising comparing a desired ratio of photocurrents with the ratio of photocurrents induced on the first LED by the second LED and the reference light source.

44. A system for calibrating light produced by a group of LEDs comprising at least a first LED and a second LED, the system comprising:
the first LED, wherein the first LED is configured as a photo-detector to receive light from the second LED and a light source during a first time; and
control circuitry configured during the first time to:
compare a ratio of photocurrents, which are induced in the first LED from the light received from the second LED and the light source, to a ratio of photocurrents of known intensities to determine a change in emission intensity associated with the second LED or the light source; and
calibrate light produced by the group of LEDs by adjusting an emission characteristic of the first LED, the second LED, or the light source based upon the determined change in emission intensity.

45. The system as recited in claim 44, wherein the first LED is configured as a light emitter to emit light along with other LEDs in the group during a second time.

46. The system as recited in claim 44, wherein the control circuitry is further configured to adjust an output intensity of the first LED, the second LED, or the light source based upon the determined change in emission intensity.

47. The system as recited in claim 44, wherein the control circuit if further configured to determine a peak emission wavelength for the first LED.

48. The system as recited in claim 47, wherein the control circuitry is further configured to determine a peak emission wavelength for the second LED or a peak emission wavelength for the light source based upon the determined peak emission wavelength the first LED.

49. The system as recited in claim 47, wherein the light source comprises at least one reference light source.

50. The system as recited in claim 49, wherein the control circuitry is configured to measure the photocurrent induced in the first LED by the reference light source.

51. The system as recited in claim 50, further comprising a resistor connected across the first LED, the resistor being configured to produce a voltage from the photocurrent.

52. The system as recited in claim 51, wherein a resistance of the resistor is small enough such that the photocurrent times the resistance is substantially less than a turn on voltage of the first LED.

53. The system as recited in claim 49, wherein the at least one reference light source is configured to produce light with approximately a single wavelength.

54. The system as recited in claim 53, wherein the single wavelength is longer than an emission wavelength of the first LED.

55. The system as recited in claim 53, wherein the single wavelength is shorter than an emission wavelength of the first LED.

56. The system as recited in claim 49, wherein the at least one reference light source is configured to produce light having a first wavelength and to produce light having a second wavelength different from the first wavelength, and wherein the control circuitry is configured to measure photocurrents induced in the first LED by the first and second wavelength lights and to determine a ratio of photocurrents induced in the first LED by the first and second wavelength lights.

57. The system as recited in claim 56, wherein the emission wavelength of the first LED is known.

58. The system as recited in claim 57, wherein the control circuitry is further configured to determine a relationship between emission wavelength and the ratio of photocurrents.

59. The system as recited in claim 57, wherein an emission wavelength of the second LED is unknown.

60. The system as recited in claim 59, wherein the control circuitry is configured to measure photocurrents induced in the second LED by the first and second wavelength lights from the at least one reference light source and to determine a ratio of photocurrents induced in the second LED by the first and second wavelength lights, wherein the unknown emission wavelength of the second LED is determined to be equal to the known wavelength of the first LED times the ratio of photocurrent induced in the first LED by the first and second wavelength lights divided by the ratio of photocurrent induced in the second LED by the first and second wavelength lights.

61. The system as recited in claim 44, wherein the light source is a third LED contained within the group of LEDs or a reference light source not contained within the group of LEDs.

62. The system as recited in claim 44, wherein the light source is a third LED contained within the group of LEDs.

63. The system as recited in 62, wherein the second LED is configured as a photo-detector to receive light from the first LED and the third LED during a second time, and wherein the control circuitry is further configured during the second time to determine emission characteristics associated with the first and third LEDs based upon the light received by the second LED from the first and third LEDs, and wherein the control circuitry is further configured to adjust an output intensity of the first LED, the second LED, the third LED or any combination of the three LEDs based upon the determined intensity emission characteristics.

64. The system as recited in claim 63, wherein the control circuitry is further configured to determine a ratio of photocurrents induced in the second LED by the first and third LEDs during the second time.

65. The system as recited in claim 62, further comprising a resistor connected across the first LED, the resistor being configured to produce a voltage from the ratio of photocurrents induced in the first LED.

66. The system as recited in claim 65, wherein a resistance of the resistor is small enough such that the ratio of photocurrents times the resistance is substantially less than a turn on voltage of the first LED.

67. The system as recited in claim 62, wherein the control circuitry is further configured to compare intensity emission characteristics for the second and third LEDs to desired intensity emissions characteristics that were previously determined.

68. The system as recited in claim 67, wherein the control circuitry is further configured to compare ratios of photocurrents induced on the first LED with ratios of photocurrents associated with desired intensity emission characteristics.

69. The system as recited in claim 62, wherein the first, second, and third LEDs are a red LED, a red LED, and a white LED respectively.

70. The system as recited in claim 69, wherein the first, second, and third LEDs reside in an LED lamp.

71. The system as recited in claim 62, wherein the first, second, and third LEDs reside in an LCD backlight.

72. The system as recited in claim 62, wherein the first, second, and third LEDs are a first red LED, a second red LED, and a third green LED respectively.

73. The system as recited in claim 72, further comprising a fourth blue LED, wherein the first red LED is configured to receive light from the fourth blue LED, wherein the control circuitry is further configured to determine an intensity emission characteristic for the fourth blue LED, wherein the second red LED, the third green LED and the fourth blue LED are located within a first pixel and wherein the first red LED is located in an adjacent pixel.

74. The system as recited in claim 44, wherein the first LED resides in an LCD display.

75. The system as recited in claim 44, wherein the first LED resides in an organic LED display.

76. The system as recited in claim 44, wherein the first LED resides in a digital billboard.

77. The system as recited in claim 44, wherein the first LED resides in a projector.

78. The system as recited in claim 44, wherein the light source comprises a reference light source not contained within the group of LEDs.

79. The system as recited in claim 78, wherein the control circuitry is configured to measure a ratio of photocurrents induced in the first LED by the second LED and the reference light source.

80. The system as recited in claim 79, wherein the control circuitry is configured to compare an intensity emission characteristic for the second LED to a desired intensity characteristic that was previously determined.

81. The system as recited in claim 80, wherein the control circuitry is further configured to compare a desired ratio of photocurrents with the ratio of photocurrents induced on the first LED by the second LED and the reference light source.

82. A controller for calibration of light produced by a group of LEDs comprising at least a first LED and a second LED, the controller comprising:
   control circuitry configured to be coupled to the first LED and the second LED, wherein:
      the control circuitry is configured during a first time to determine an emission characteristic associated with the second LED based upon light emitted from the second LED and received by the first LED; and
      the control circuitry is configured during a second time to determine an emission characteristic associated with the first LED based upon light emitted from the first LED and received by the second LED; and
   output driver circuitry configured to be coupled to the first LED and the second LED and configured to calibrate light produced by the group of LEDs by adjusting an emission characteristic of the first LED or the second LED based upon at least one of the emission characteristics determined during the first and second times.

83. The controller as recited in claim 82, wherein the determined emission characteristic is intensity.

84. The controller as recited in claim 83, wherein the control circuitry is further configured to adjust an output intensity of the first LED or the second LED based upon the determined intensity emission characteristic.

85. The controller as recited in claim 84, further comprising a third LED, wherein the control circuitry is further configured to determine an emission characteristic associated with the third LED based upon light received by the first LED or the second LED from the third LED and configured to adjust an output intensity of the first LED, the second LED, the third LED or any combination of the three LEDs based upon the determined intensity emission characteristics.

86. The controller as recited in claim 85, wherein the control circuitry is further configured during the first time to determine a ratio of photocurrents induced in the first LED by the second and third LEDs to determine the intensity emissions characteristics.

87. The controller as recited in claim 85, wherein during the second time the second LED is configured to receive light from the first LED and the third LED, and wherein the control circuitry is further configured during the second time to determine emission characteristics associated with the first and third LEDs based upon the light received by the second LED from the first and third LEDs, and wherein the control circuitry is further configured to adjust an output intensity of the first LED, the second LED, the third LED or any combination of the three LEDs based upon the determined intensity emission characteristics.

88. The controller as recited in claim 87, wherein the control circuitry is further configured during the second time to determine a ratio of photocurrents induced in the second LED by the first and third LEDs.

89. A controller for calibration of light produced by a group of LEDs comprising at least a first LED and a second LED, the controller comprising:
   control circuitry configured to be coupled to the first LED and the second LED, the control circuitry further configured to determine an emission characteristic based upon light received by the first LED from at least one of the second LED and one or more reference light sources, wherein the control circuitry is further configured to determine a ratio of photocurrents induced in the first LED based upon light having a first peak emission wavelength and based upon light having a second peak emission wavelength, the light being emitted by the one or more reference light sources and the first and second peak emissions wavelengths being different; and
   output driver circuitry configured to be coupled to the first LED to calibrate light produced by the group of LEDs by adjusting an emission characteristic of the first LED or the second LED based upon the determined emission characteristic.

90. The controller as recited in claim 89, wherein the determined emission characteristic is wavelength.

91. The controller as recited in claim 90, wherein the control circuitry is configured to determine a peak emission wavelength for the second LED based upon the determined wavelength emission characteristic.

* * * * *